(12) United States Patent
Volin

(10) Patent No.: US 11,096,458 B1
(45) Date of Patent: Aug. 24, 2021

(54) MULTI-USE UMBRELLA WITH WATER FILTRATION AND SAIL FUNCTIONS

(71) Applicant: Dee Volin, Gresham, OR (US)

(72) Inventor: Dee Volin, Gresham, OR (US)

( * ) Notice: Subject to any disclaimer, the term of this patent is extended or adjusted under 35 U.S.C. 154(b) by 0 days.

(21) Appl. No.: 17/211,533

(22) Filed: Mar. 24, 2021

(51) Int. Cl.
*A45B 23/00* (2006.01)
*B63H 9/067* (2020.01)
(Continued)

(52) U.S. Cl.
CPC .............. *A45B 23/00* (2013.01); *A45B 17/00* (2013.01); *B60K 8/00* (2013.01); *B63H 9/067* (2020.02);
(Continued)

(58) Field of Classification Search
CPC ... A45B 17/00; A45B 19/06; A45B 2025/186; A45B 2017/005
(Continued)

(56) References Cited

U.S. PATENT DOCUMENTS

| 920,400 A | * | 5/1909 | Schutte | ............... A45B 19/06 135/26 |
| 2,633,856 A | | 12/1948 | Weaklend | |

(Continued)

*Primary Examiner* — Noah Chandler Hawk

(57) ABSTRACT

A five-device-in-one water-and-leaf-separating leaf-filtering water-collecting wind-blocking wind-redirecting marine-yacht-land-yacht-balcony-bumper-and-trailer-hitch-mountable sail comprises: a central-sail intersector; central-sail-supporting ribs; central-sail-rib-raising arms; an adjustable water-and-leaf-separating leaf-filtering central sail attached to the central-sail-supporting ribs for functioning as a water diverting device to predeterminately redirect the flow of water, functioning as a leaf filtering device to filter leaves from rain water when used upside down, functioning as a water collector to collect rain water when used upside down, functioning as a wind blocker to block wind, functioning as a privacy screen to provide privacy, functioning as an awning to angledly block rain and sun beams, functioning as a canopy to vertically block rain and sun beams, functioning as a wind redirector to redirect wind in and out of sail, and functioning as a sail-steering wind-powered device to steer the sail in multiple different directions; a ring-sail-rib intersector; primary automatically-centered-and-reinforced ribs for resisting bending and warping due to heavy winds, providing reinforced infrastructure for a sail when used on a wind-powered land vehicle, providing reinforced infrastructure for an emergency rainwater collecting device on a marine vessel, and providing reinforced infrastructure for a shade canopy; secondary automatically-centered-and-reinforced ribs for resisting bending and warping due to heavy winds, providing reinforced infrastructure for a sail when used on a wind-powered land vehicle, providing reinforced infrastructure for an emergency rainwater collecting device on a marine vessel, and providing reinforced infrastructure for a shade canopy; multi-rib-connecting automatically-centered-and-reinforced adjustable cores inserted into and screwed to the primary automatically-centered-and-reinforced ribs and the secondary automatically-centered-and-reinforced ribs, the multi-rib-connecting automatically-centered-and-reinforced adjustable cores for allowing manufacturers to shorten long ribs into the primary automatically-centered-and-reinforced ribs and the secondary automatically-centered-and-reinforced ribs to reduce the length and volume of the shipping package of the five-device-in-one water-and-leaf-separating leaf-filtering water-collecting wind-blocking wind-redirecting marine-yacht-land-yacht-balcony-bumper-and-trailer-hitch-mountable sail in a shipping container to save money from expensive shipping costs, and securely and reinforcingly connecting the primary automatically-centered-and-reinforced ribs to the secondary automatically-centered-and-reinforced ribs to (Continued)

provide strength and structure to the five-device-in-one water-and-leaf-separating leaf-filtering water-collecting wind-blocking wind-redirecting marine-yacht-land-yacht-balcony-bumper-and-trailer-hitch-mountable sail; rib-length-adjusting holes drilled into the primary automatically-centered-and-reinforced ribs, the secondary automatically-centered-and-reinforced ribs, and the multi-rib-connecting automatically-centered-and-reinforced adjustable cores; a ring-sail-arm intersector; ring-sail-rib-raising arms foldably attached to the ring-sail-arm intersector; an adjustable water-collecting wind-blocking privacy-screen ring sail attached to the primary automatically-centered-and-reinforced ribs and the secondary automatically-centered-and-reinforced ribs, the adjustable water-collecting wind-blocking privacy-screen ring sail for functioning as an emergency rainwater collector on a marine vessel functioning as a water collector to collect rainwater when used upside down, functioning as a sail on a wind-powered land vehicle, functioning as a wind blocker to block wind, functioning as a privacy screen to provide privacy, functioning as an awning to angledly block rain and sun beams, functioning as a canopy to vertically block rain and sun beams, functioning as a water diverting device to predeterminately redirect the flow of water, functioning as a leaf filtering device to filter leaves from rain water when used upside down, functioning as a wind redirector to redirect wind in and out of sail, and functioning as a wind resistor to protect users; an upper post attached to the central-sail intersector, the ring-sail-arm intersector slidably attached to the upper post; a lower post; and a multi-angled multi-surface-mountable multi-plate-connecting reversible stackable base attached to the lower post for stackably connecting multiple the multi-angled multi-surface-mountable multi-plate-connecting reversible stackable bases together, securing the five-device-in-one water-and-leaf-separating leaf-filtering water-collecting wind-blocking wind-redirecting marine-yacht-land-yacht-balcony-bumper-and-trailer-hitch-mountable sail at the base of a wall, securely wedging the five-device-in-one water-and-leaf-separating leaf-filtering water-collecting wind-blocking wind-redirecting marine-yacht-land-yacht-balcony-bumper-and-trailer-hitch-mountable sail to a step recess built into a truck-bumper corner or an RV-bumper corner without need for bolting, securely wedging the five-device-in-one water-and-leaf-separating leaf-filtering water-collecting wind-blocking wind-redirecting marine-yacht-land-yacht-balcony-bumper-and-trailer-hitch-mountable sail into a tailgate gap without need for bolting, securely wedging the five-device-in-one water-and-leaf-separating leaf-filtering water-collecting wind-blocking wind-redirecting marine-yacht-land-yacht-balcony-bumper-and-trailer-hitch-mountable sail to a balcony railing without need for bolting, securely wedging the five-device-in-one water-and-leaf-separating leaf-filtering water-collecting wind-blocking wind-redirecting marine-yacht-land-yacht-balcony-bumper-and-trailer-hitch-mountable sail to a railing of a watercraft without need for bolting, securely attaching the five-device-in-one water-and-leaf-separating leaf-filtering water-collecting wind-blocking wind-redirecting marine-yacht-land-yacht-balcony-bumper-and-trailer-hitch-mountable sail to a tow hitch, securely attaching the five-device-in-one water-and-leaf-separating leaf-filtering water-collecting wind-blocking wind-redirecting marine-yacht-land-yacht-balcony-bumper-and-trailer-hitch-mountable sail to a utility hole of a truck bed without need for bolting, securely attaching the five-device-in-one water-and-leaf-separating leaf-filtering water-collecting wind-blocking wind-redirecting marine-yacht-land-yacht-balcony-bumper-and-trailer-hitch-mountable sail to a wind-powered land vehicle to act as a sail, and securely attaching the five-device-in-one water-and-leaf-separating leaf-filtering water-collecting wind-blocking wind-redirecting marine-yacht-land-yacht-balcony-bumper-and-trailer-hitch-mountable sail to a column, table, wall, fence, bumper, balcony, or patio.

20 Claims, 118 Drawing Sheets

(51) Int. Cl.
    *B63H 25/42*     (2006.01)
    *B60K 8/00*     (2006.01)
    *E03B 3/03*     (2006.01)
    *A45B 17/00*     (2006.01)
    *C02F 1/00*     (2006.01)
    *C02F 103/00*     (2006.01)

(52) U.S. Cl.
    CPC ............. *B63H 25/42* (2013.01); *C02F 1/001* (2013.01); *E03B 3/03* (2013.01); *A45B 2023/0012* (2013.01); *C02F 2103/001* (2013.01)

(58) Field of Classification Search
    USPC ........................................................ 135/118
    See application file for complete search history.

(56) References Cited

U.S. PATENT DOCUMENTS

| | | | | |
|---|---|---|---|---|
| 2,710,619 | A * | 6/1955 | Haupt | A45B 19/06 |
| | | | | 135/26 |
| 3,383,814 | A | 5/1968 | Rowe | |
| 4,750,509 | A | 6/1988 | Kim | |
| 4,945,936 | A | 8/1990 | Surrendi | |
| 5,060,907 | A | 10/1991 | Castano | |
| D350,643 | S | 9/1994 | Marco | |
| 5,482,069 | A * | 1/1996 | Lee | A45B 23/00 |
| | | | | 135/31 |
| 5,499,644 | A | 3/1996 | Geniele | |
| D371,902 | S | 7/1996 | Lee | |
| 5,640,984 | A | 6/1997 | Dubunsky | |
| D383,900 | S | 9/1997 | Bart | |
| 5,752,534 | A | 5/1998 | Becher | |
| 5,884,874 | A * | 3/1999 | Speece | E04H 12/2284 |
| | | | | 248/516 |
| 5,927,677 | A * | 7/1999 | Speece | E04H 12/2215 |
| | | | | 248/516 |
| 6,082,383 | A | 7/2000 | Wilson | |
| 6,173,724 | B1 * | 1/2001 | You | A45B 25/02 |
| | | | | 135/15.1 |
| 6,302,124 | B1 | 10/2001 | Demarco | |
| 6,314,976 | B1 | 11/2001 | Clarke | |
| 6,386,214 | B1 | 5/2002 | Clarke | |
| 6,497,242 | B1 | 12/2002 | Lin | |
| 6,736,151 | B2 | 5/2004 | Lin | |
| 6,941,959 | B2 * | 9/2005 | Kung-Tai | A45B 25/02 |
| | | | | 135/29 |
| 7,293,573 | B2 | 11/2007 | Clarke | |
| 7,302,745 | B2 | 12/2007 | Stahle | |
| 7,412,985 | B2 | 8/2008 | Ma | |
| 7,438,077 | B1 | 10/2008 | Wilson | |
| 7,484,517 | B2 | 2/2009 | Chen | |
| 8,061,375 | B2 | 11/2011 | Ma | |
| 8,075,217 | B2 | 12/2011 | Eason | |
| 8,656,937 | B1 | 2/2014 | Minasi | |
| 8,875,350 | B2 | 11/2014 | Bukovitz | |
| 8,985,129 | B2 | 3/2015 | Li | |

(56) References Cited

U.S. PATENT DOCUMENTS

| | | |
|---|---|---|
| D756,623 S | 5/2016 | Akin |
| 9,493,962 B2 | 11/2016 | Eddy |
| 9,504,299 B2 * | 11/2016 | Ma ........................ A45B 25/02 |
| 9,624,685 B1 | 4/2017 | Cordle |
| 9,713,367 B2 | 7/2017 | Duhon |
| 9,844,288 B2 | 12/2017 | Fu |
| 9,924,768 B1 | 3/2018 | Rosenberger |
| 10,016,033 B2 | 7/2018 | Volin |
| 10,344,496 B1 * | 7/2019 | Cefalo ................ E04H 12/2269 |
| 10,370,866 B1 | 8/2019 | Sanders |
| 10,376,027 B1 | 8/2019 | Kuelbs |
| 10,653,218 B1 | 5/2020 | Volin |
| 2002/0129847 A1 | 9/2002 | Ma |
| 2003/0140955 A1 | 7/2003 | Chou |
| 2005/0072453 A1 * | 4/2005 | Liang ..................... A45B 25/02 135/87 |
| 2006/0016950 A1 * | 1/2006 | Bright ................ E04H 12/2246 248/346.03 |
| 2011/0260029 A1 | 10/2011 | Kost |
| 2015/0060631 A1 | 3/2015 | Pan |
| 2019/0098862 A1 * | 4/2019 | Bolton ................ E04H 12/2246 |

* cited by examiner

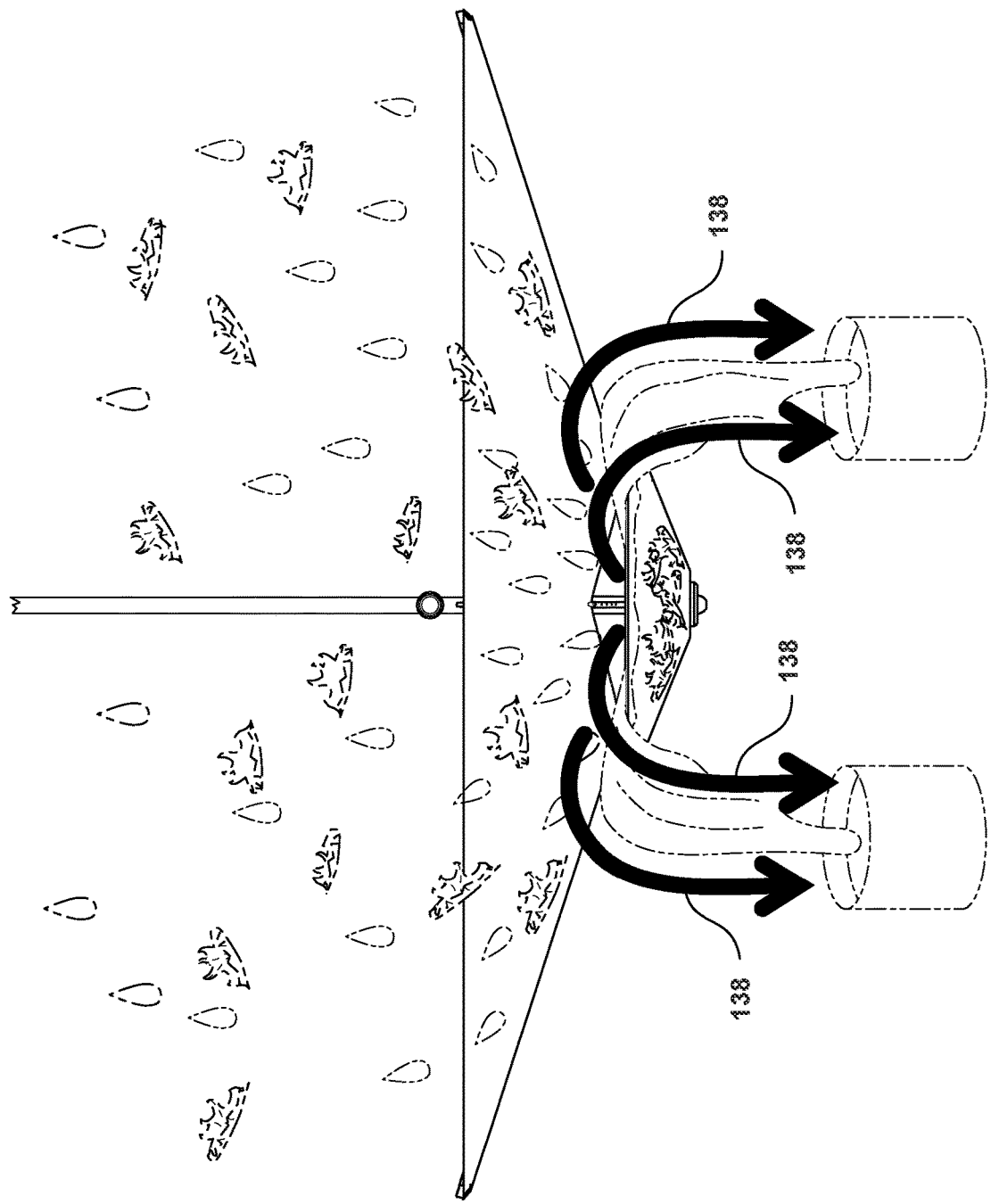

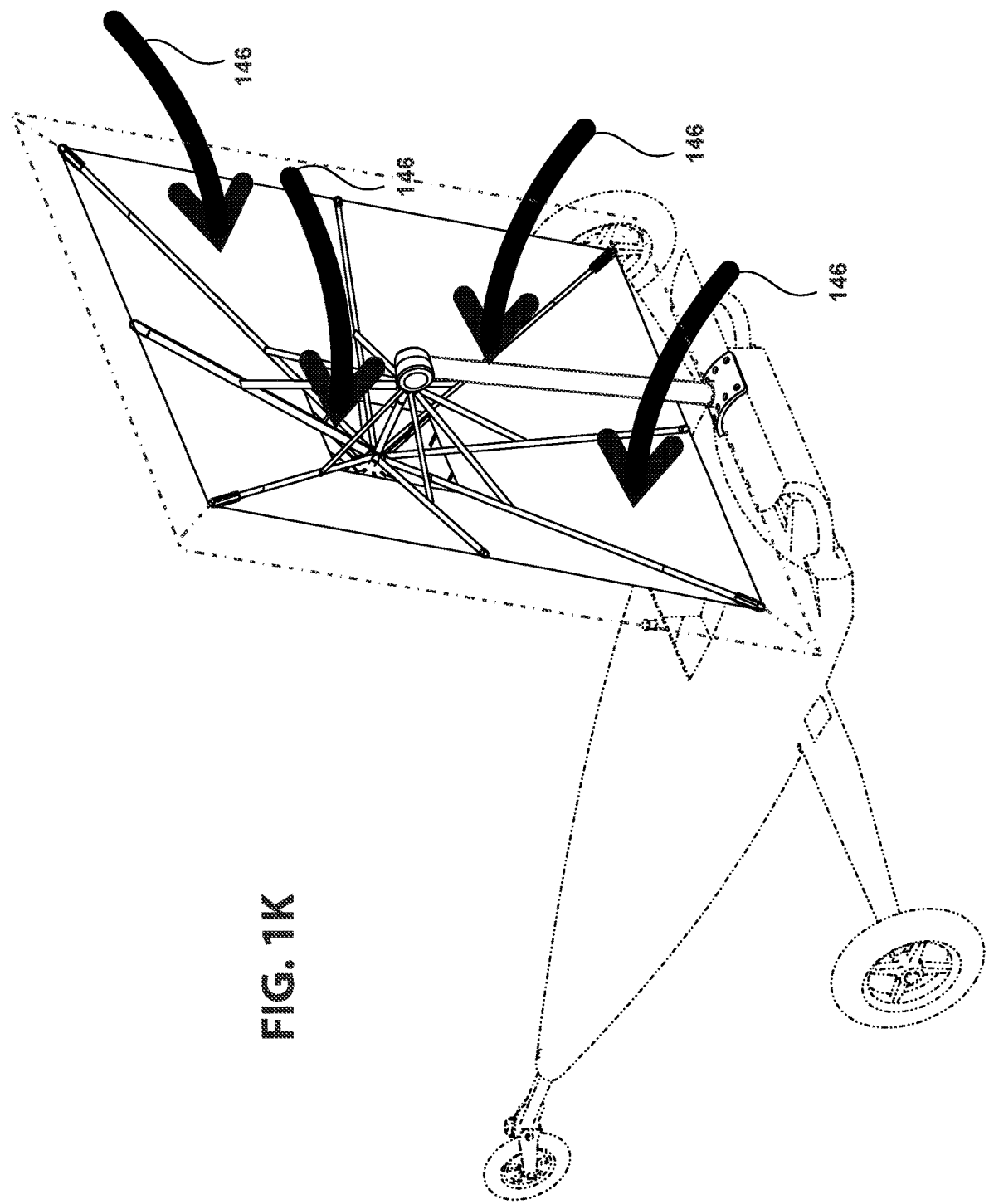

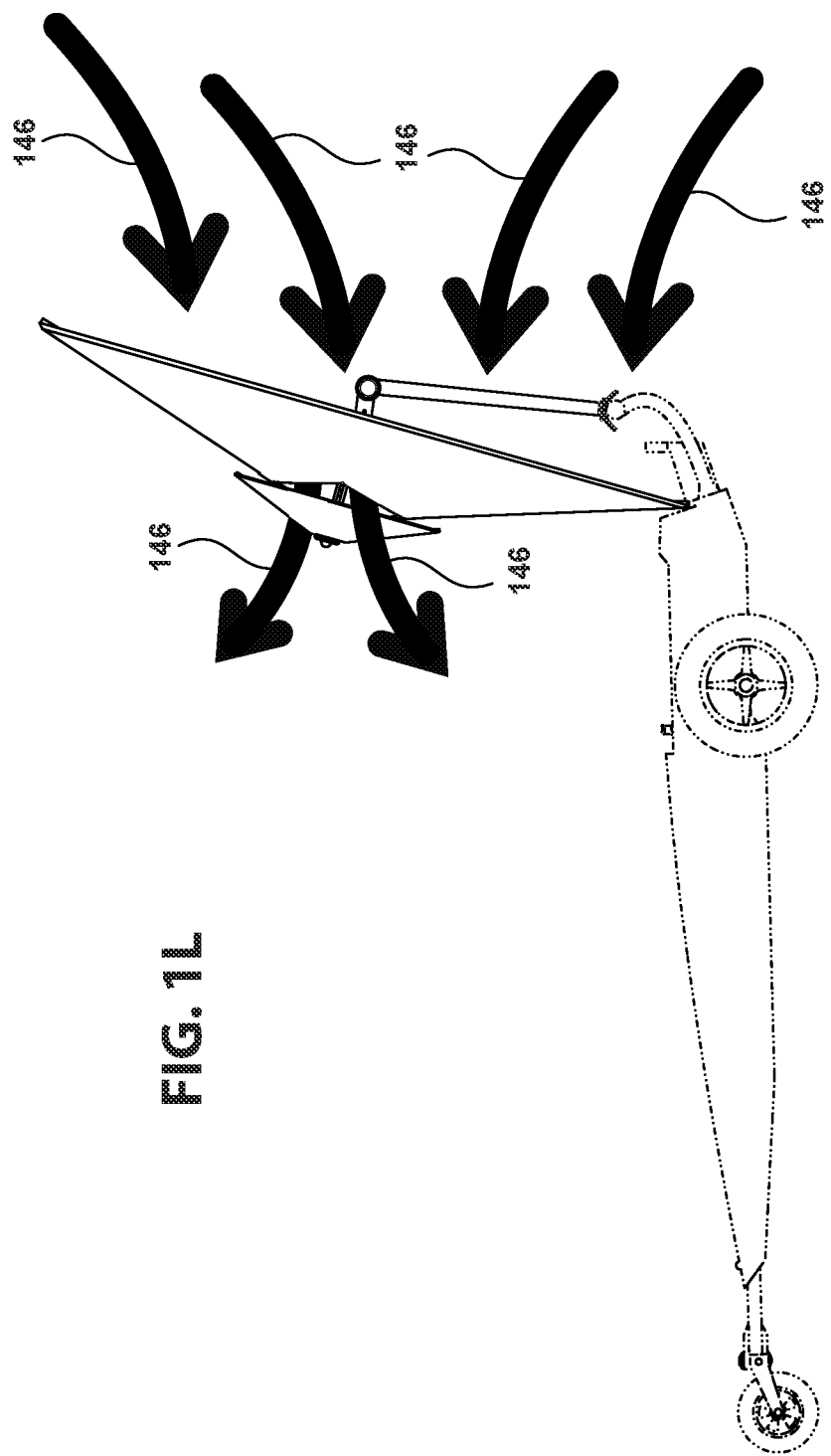

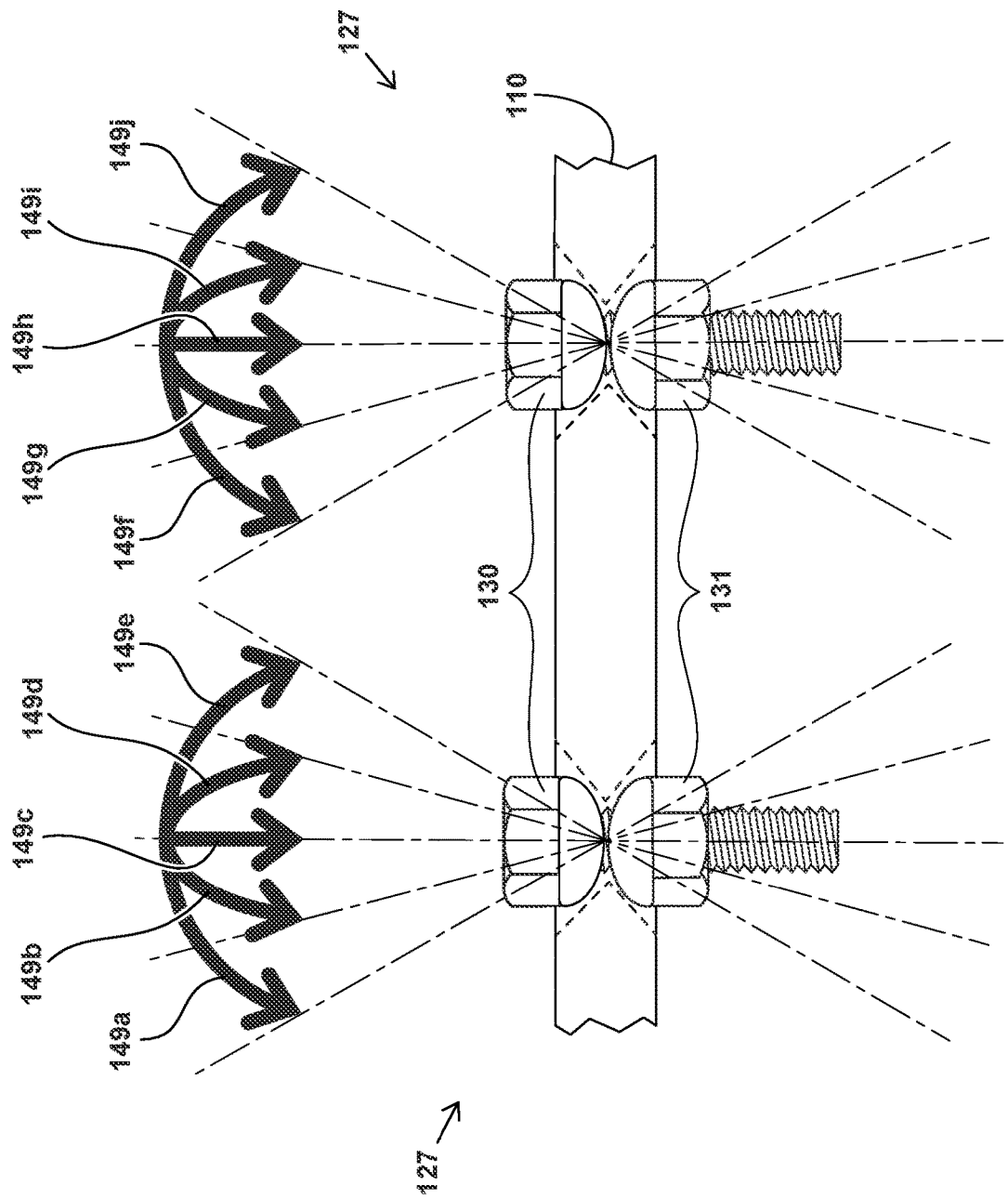

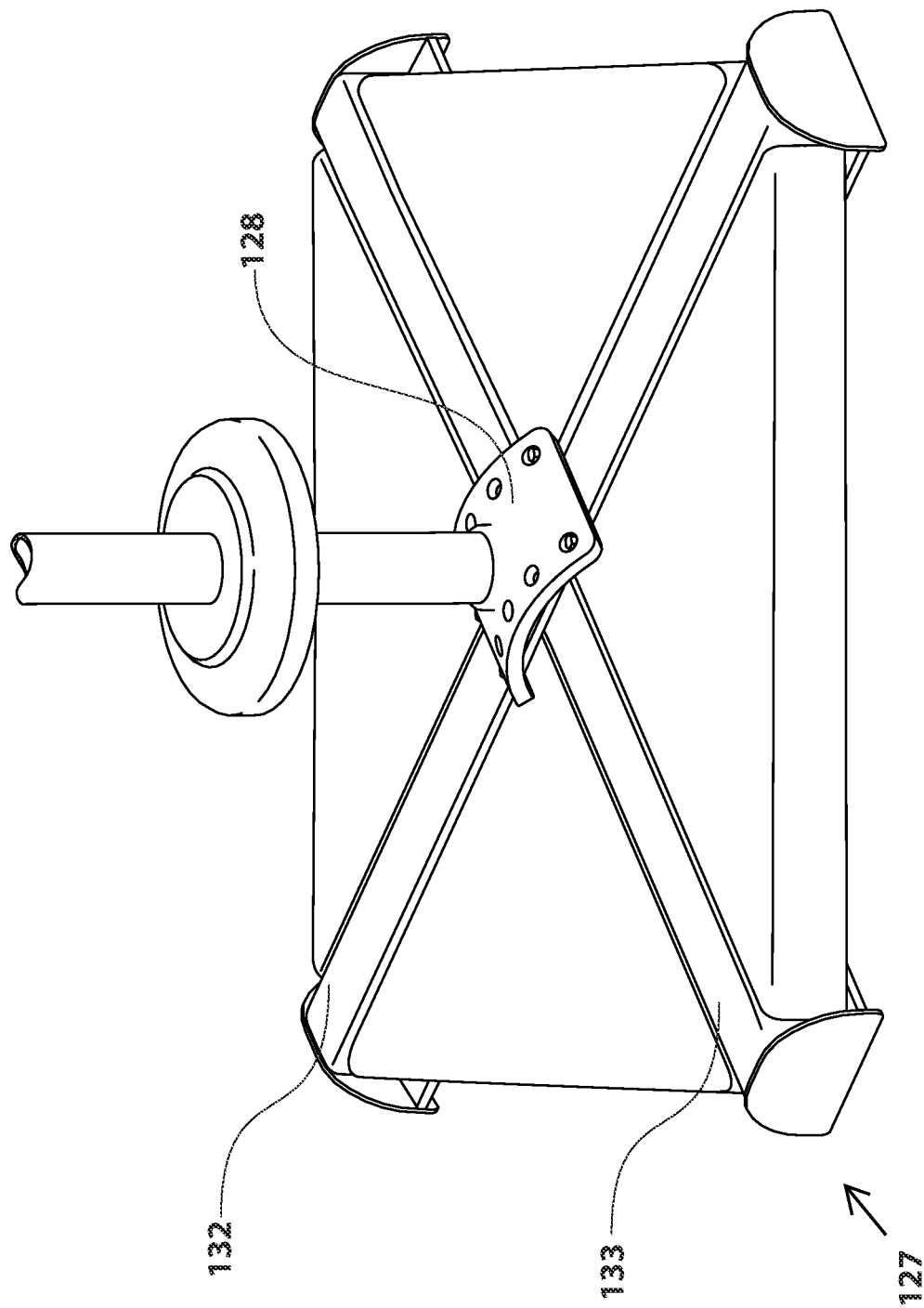

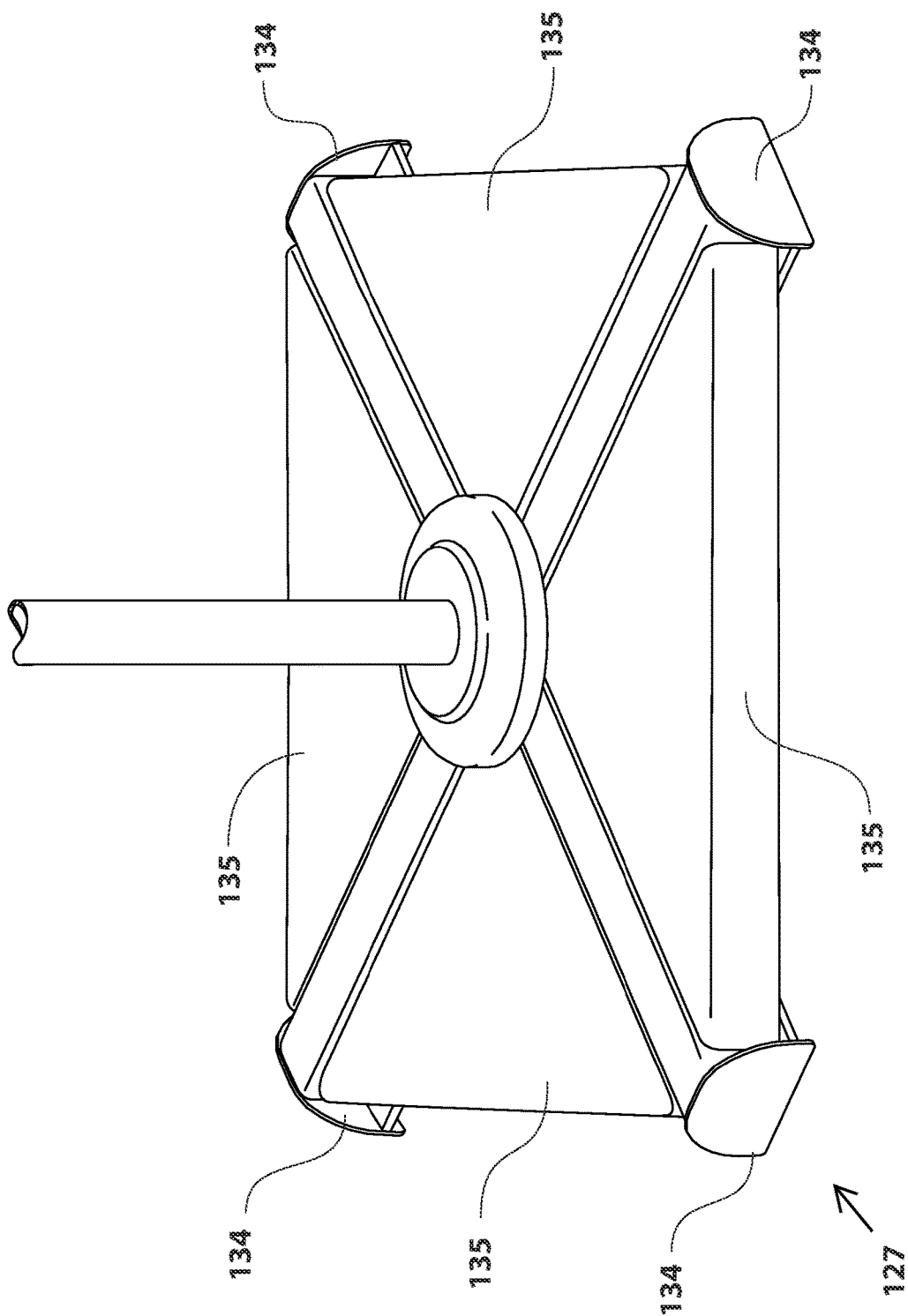

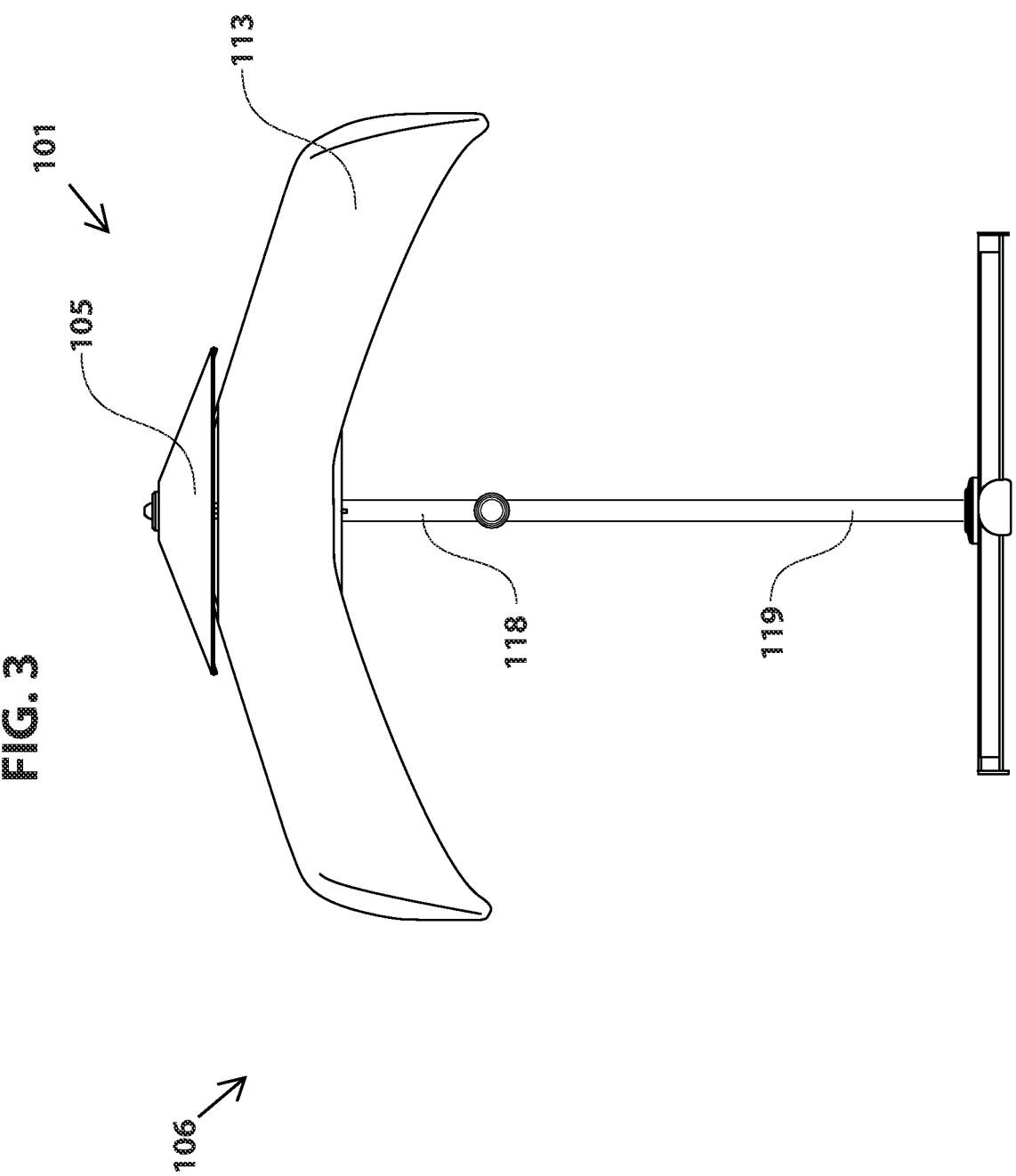

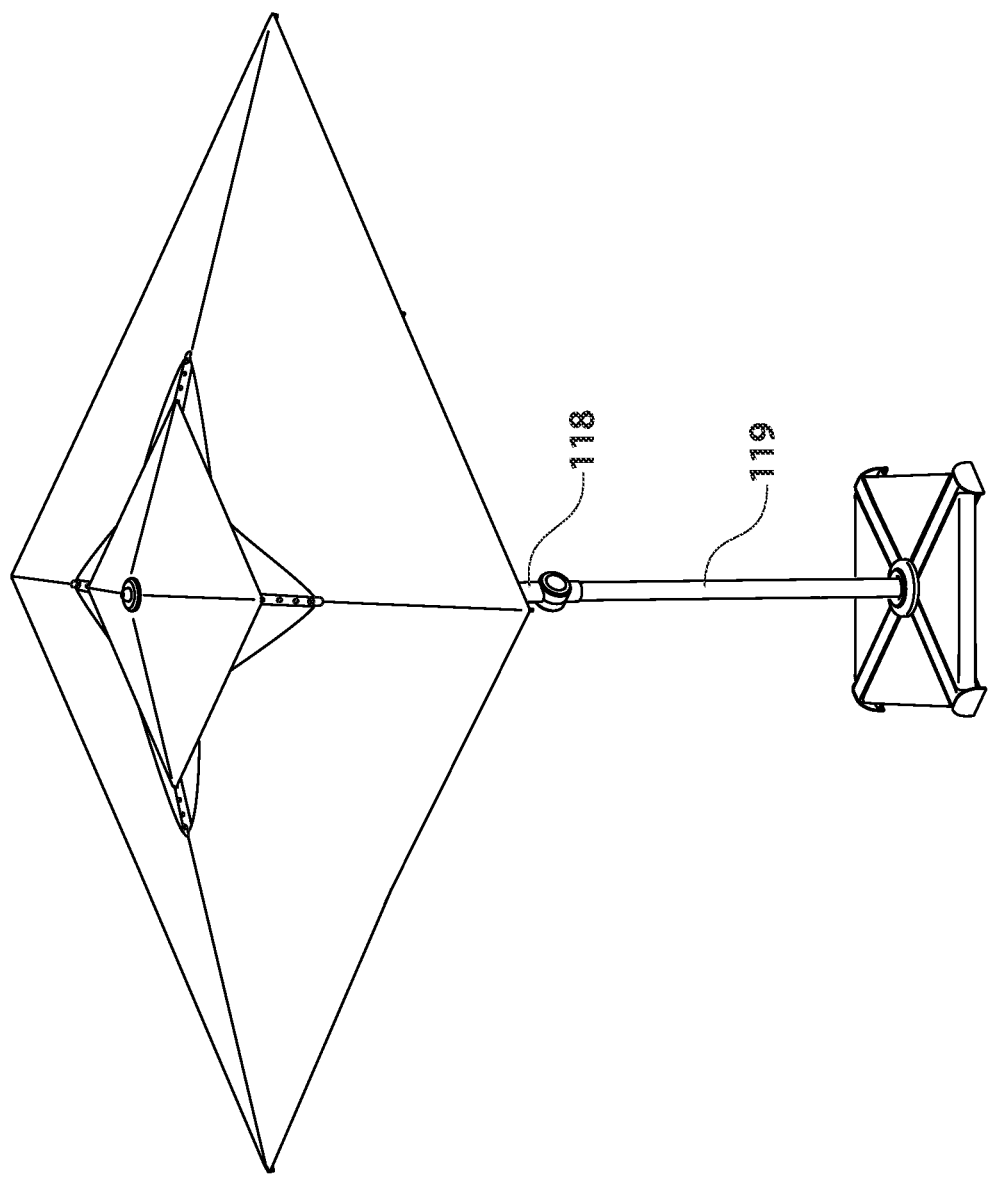

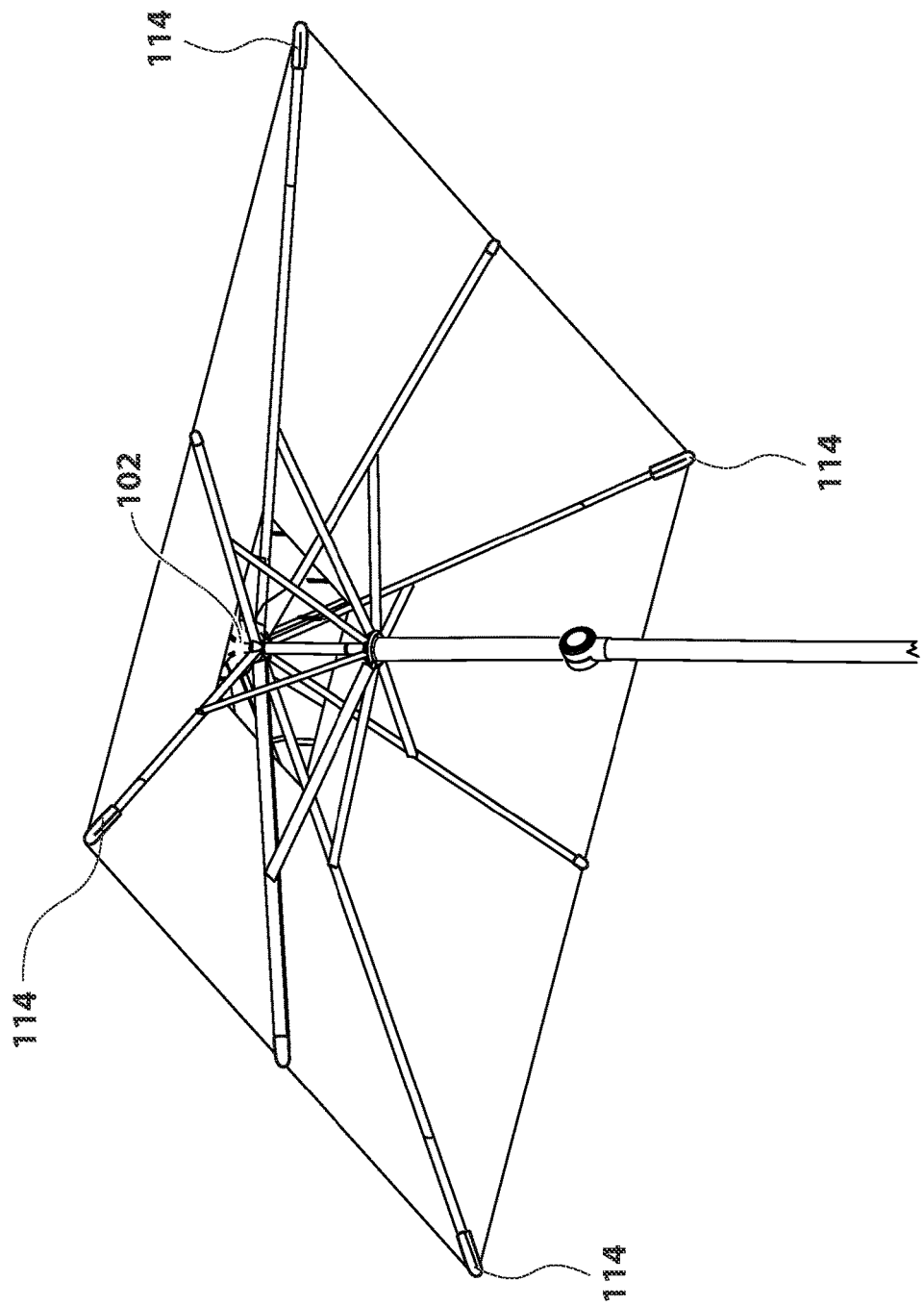

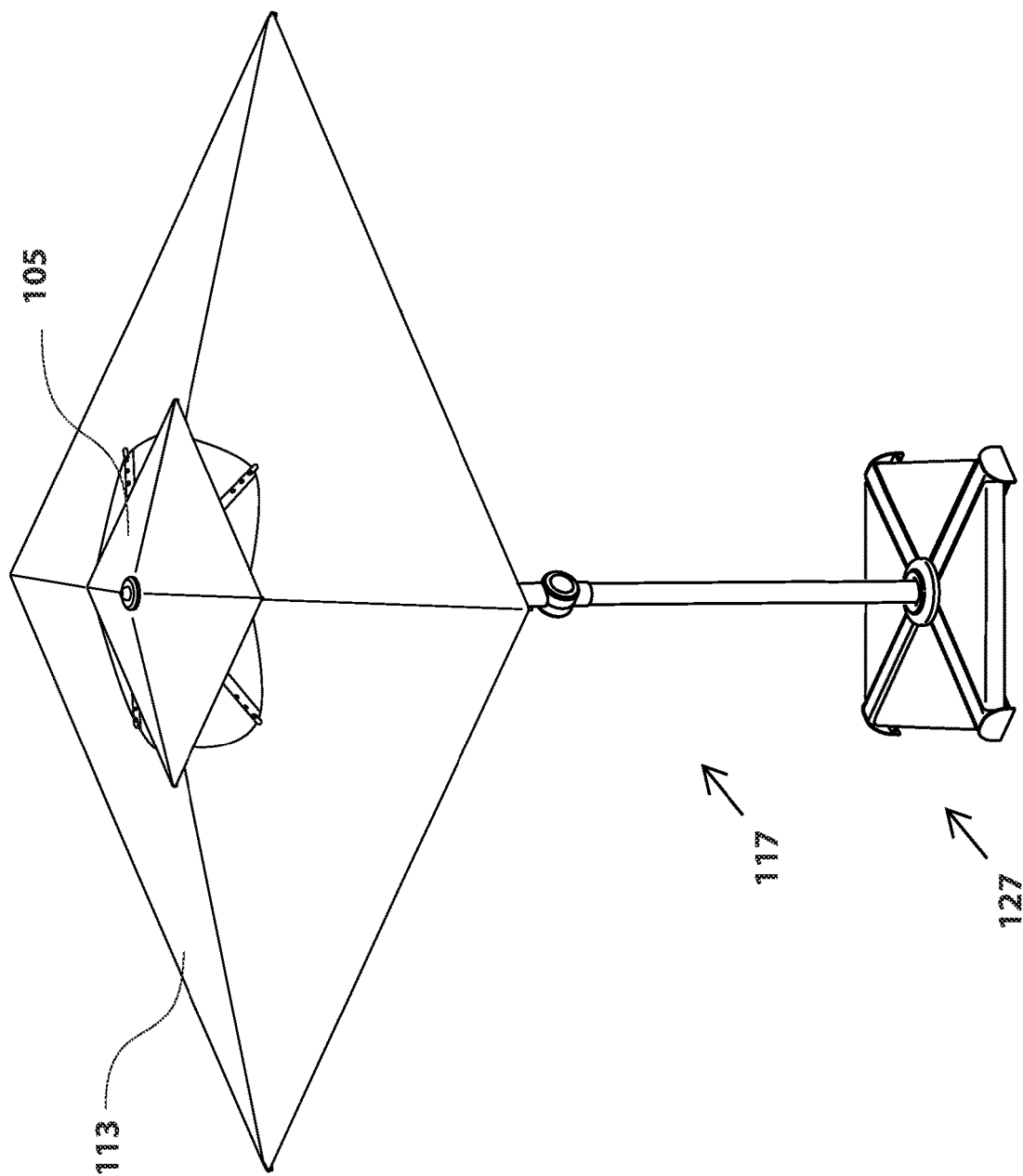

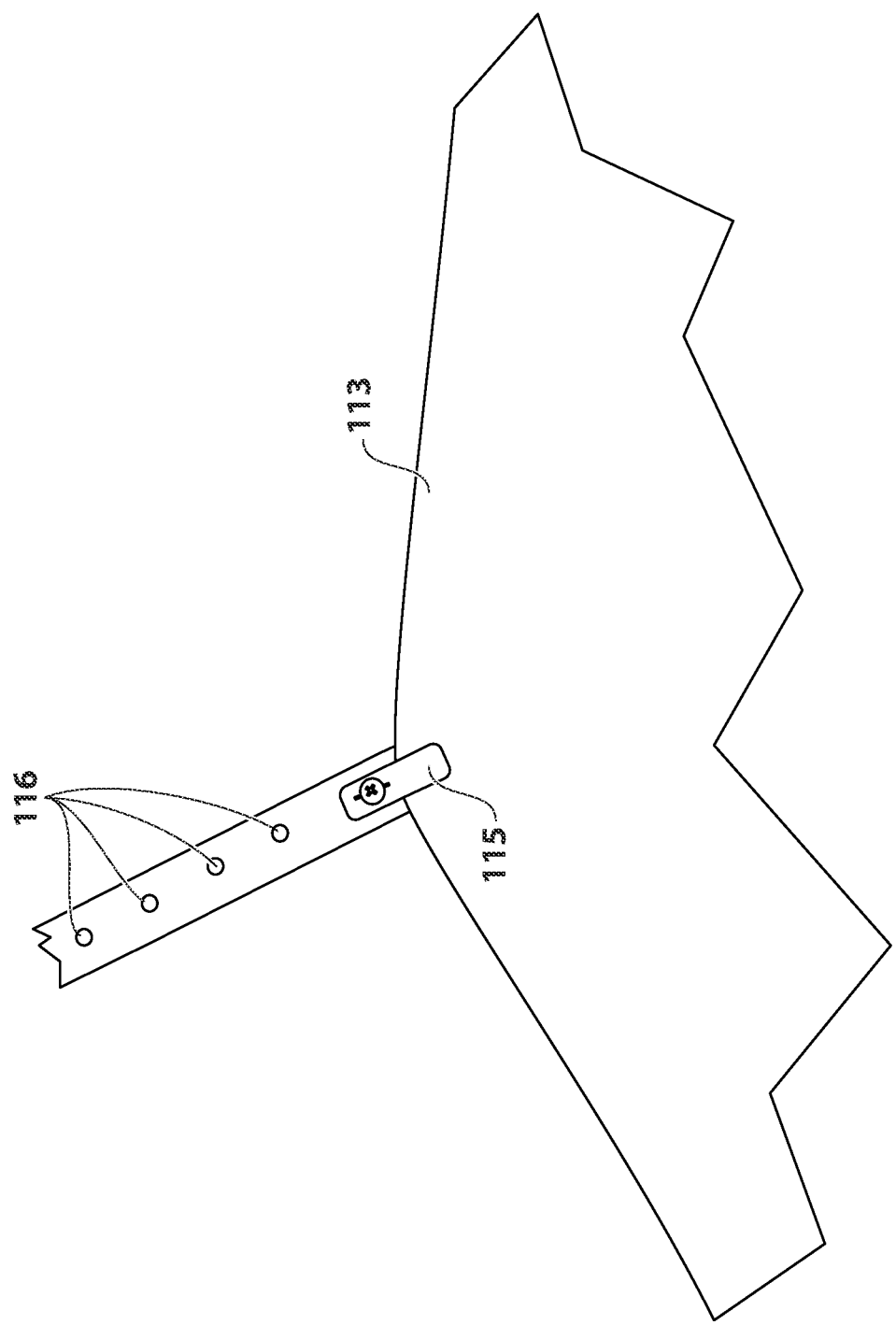

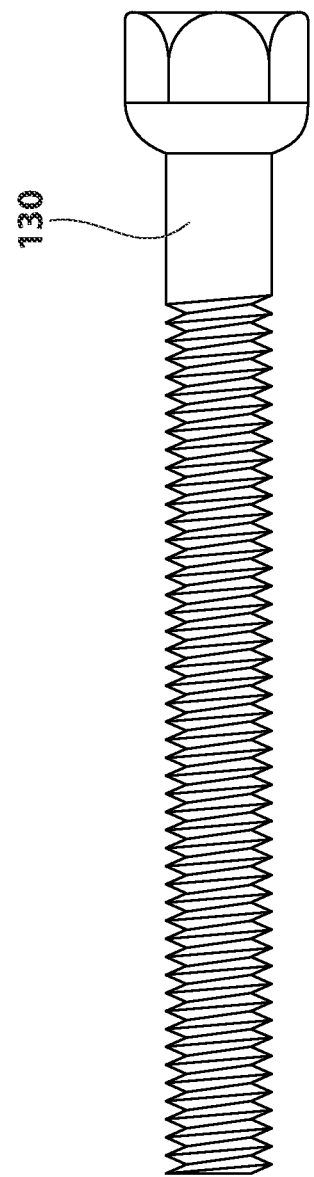
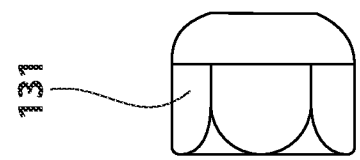
FIG. 12

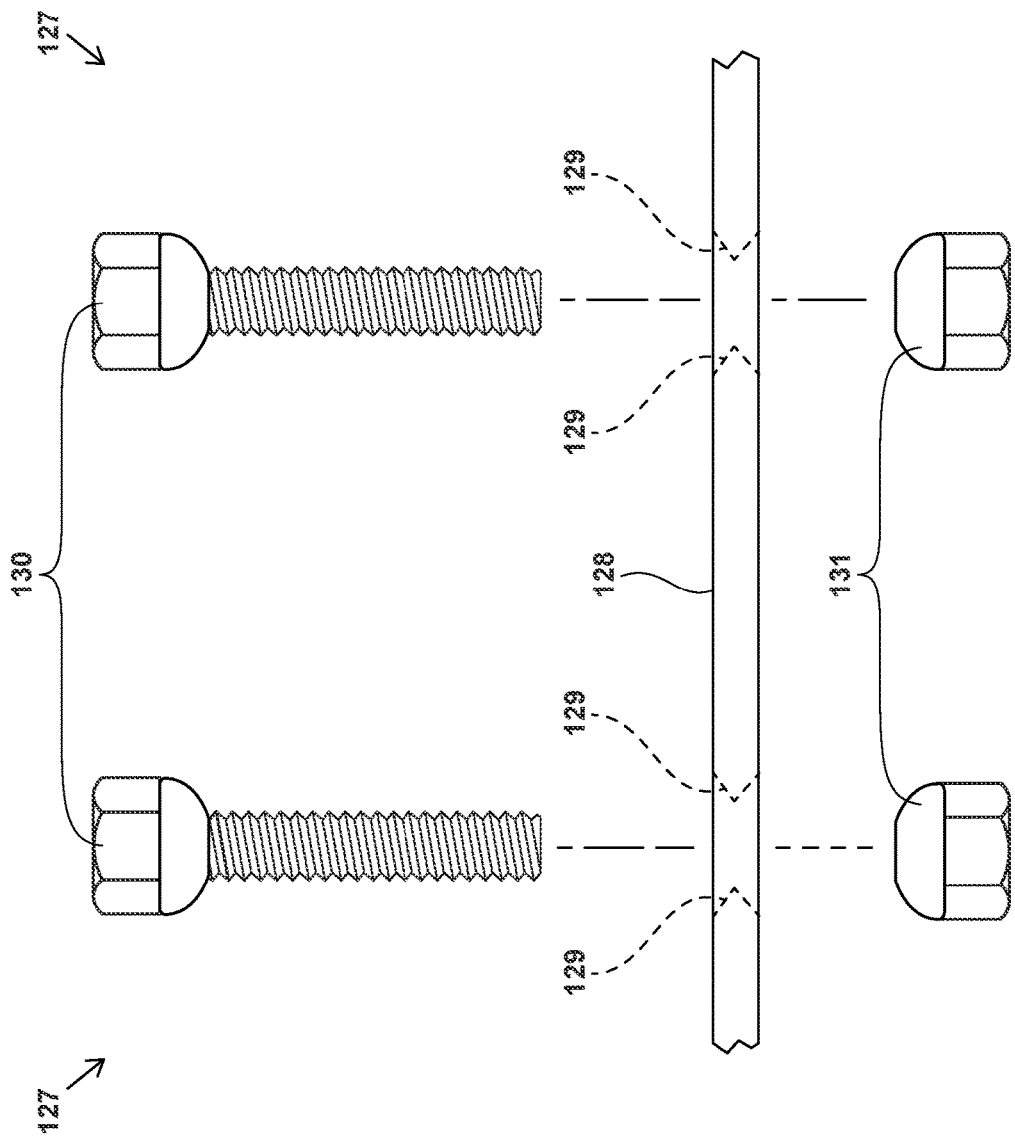

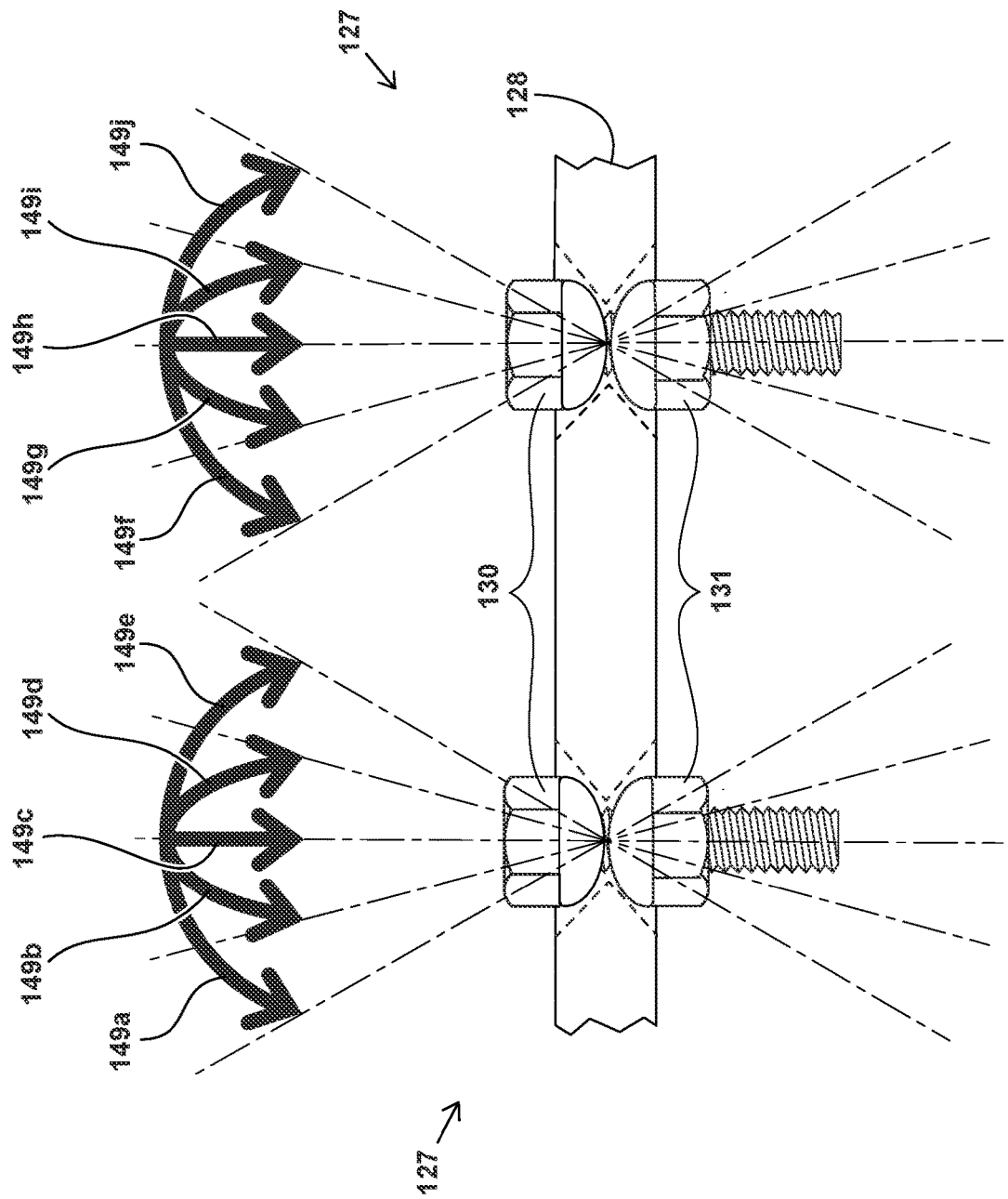

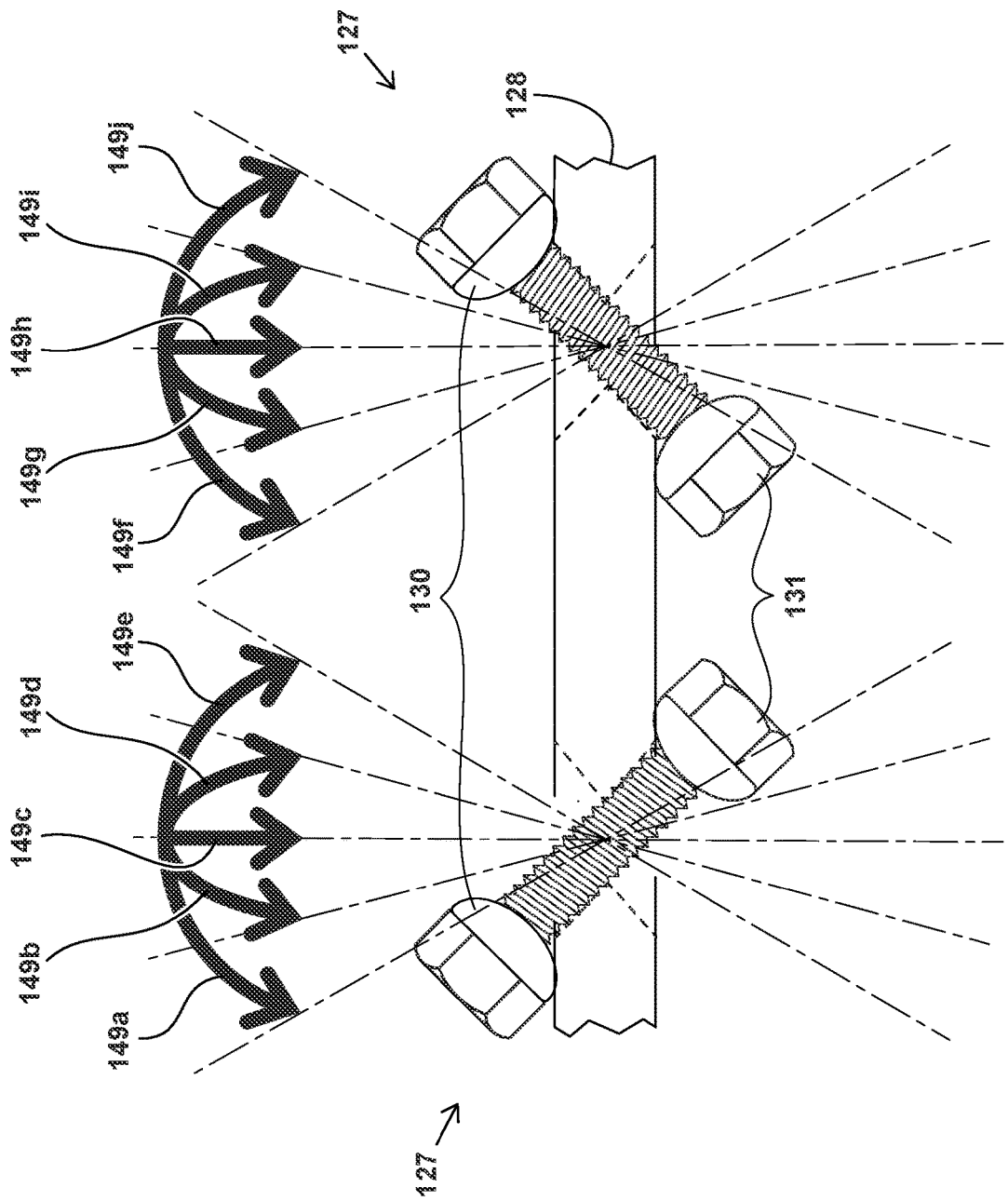

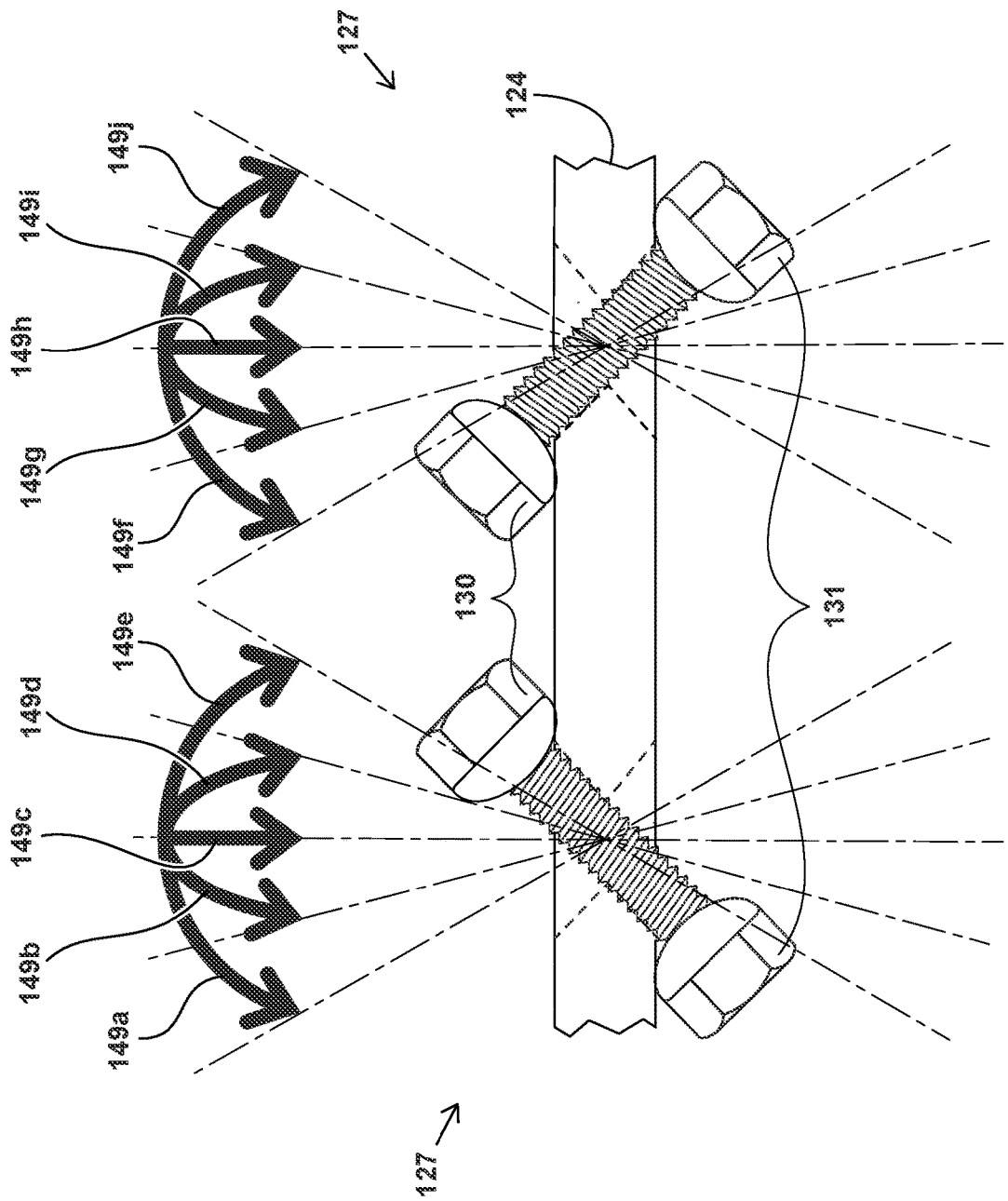

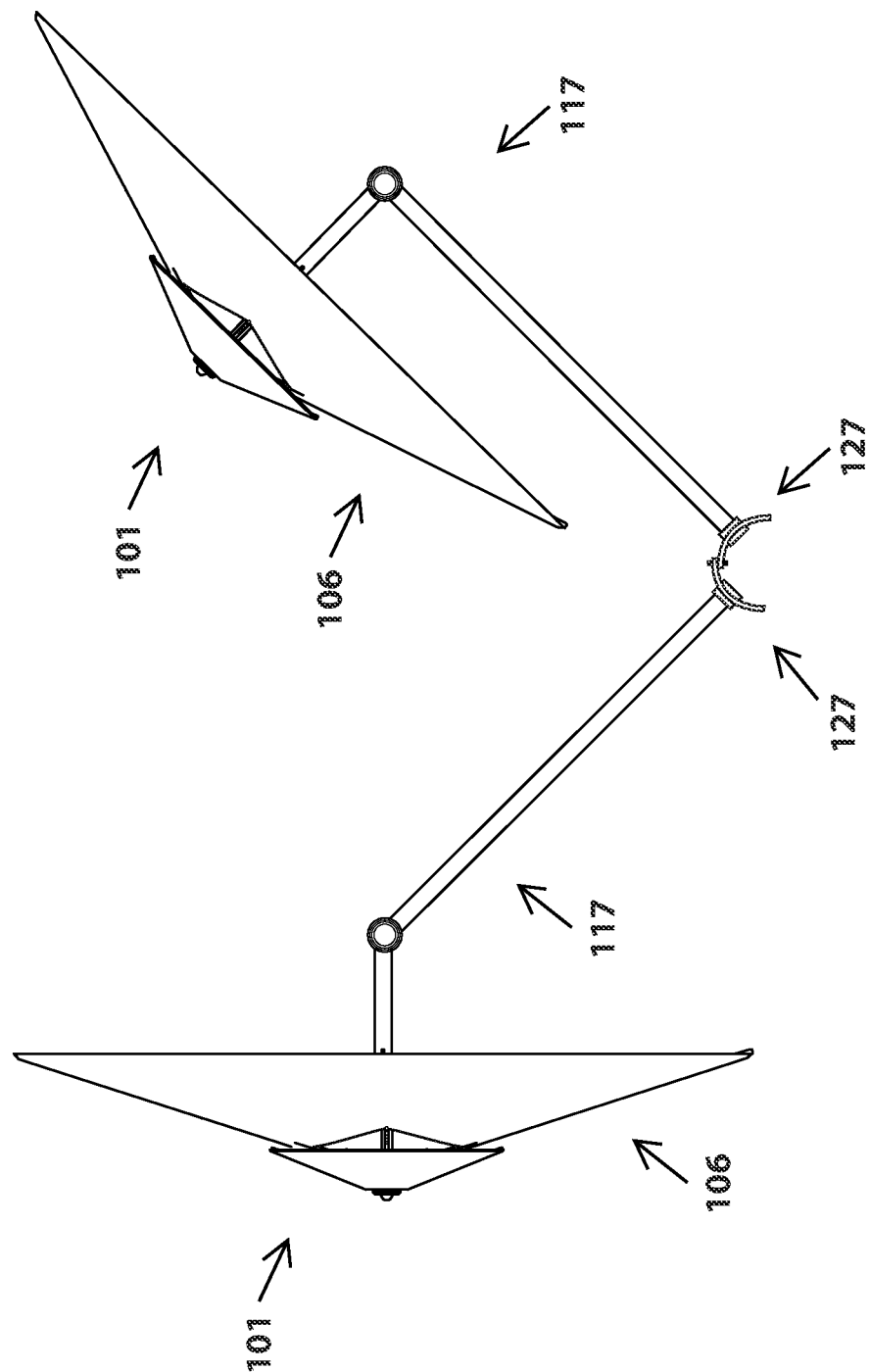

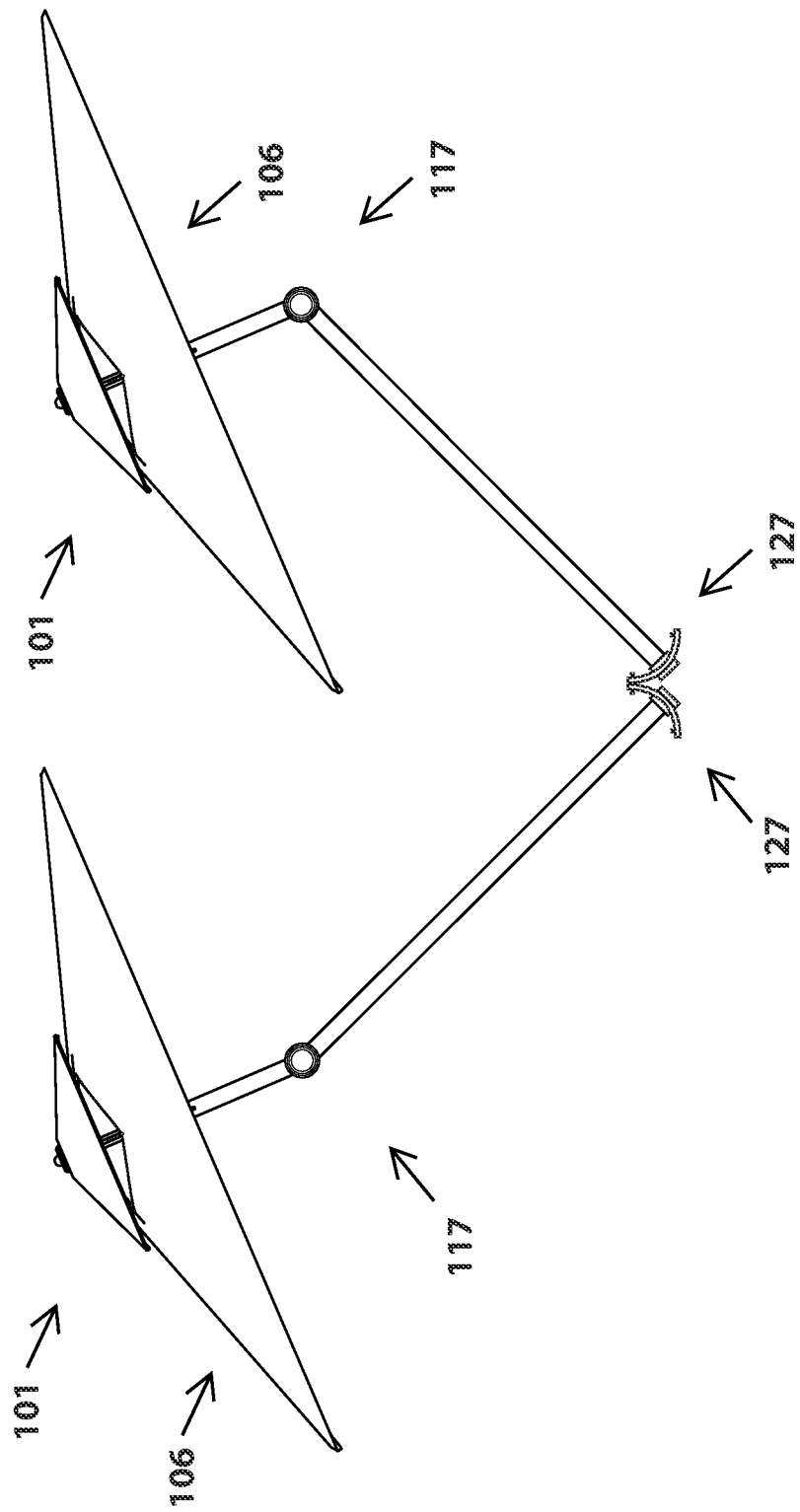

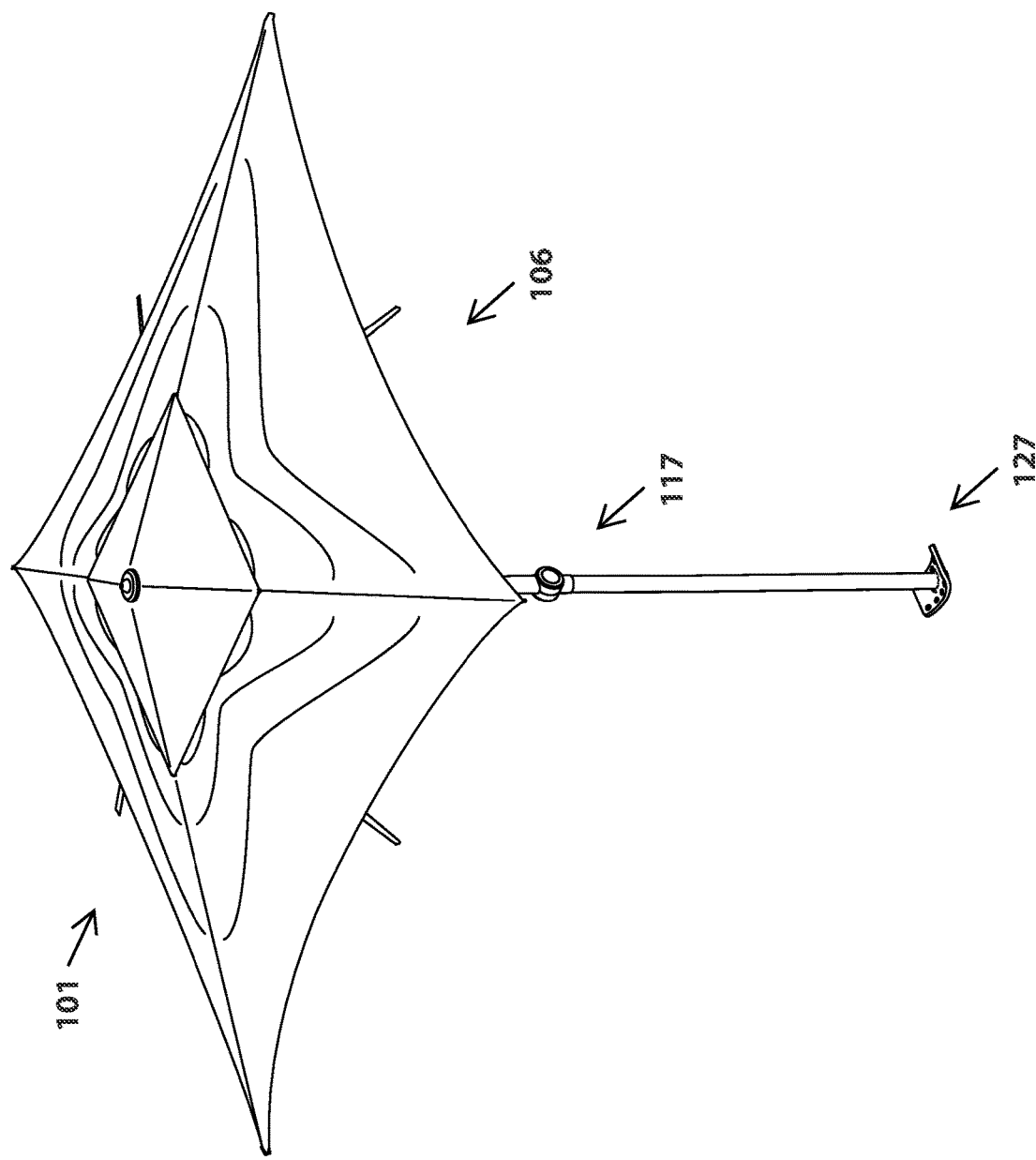

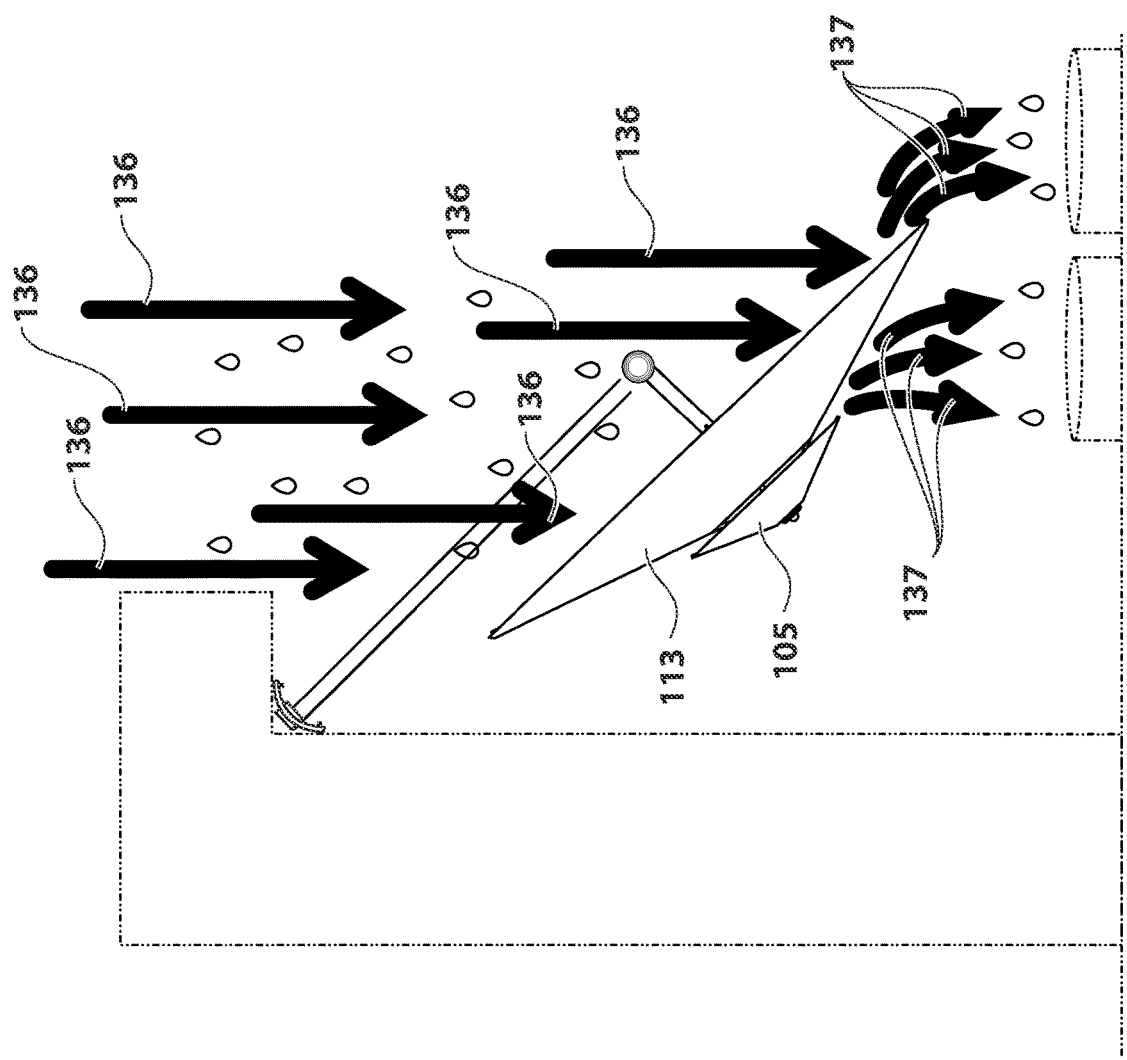

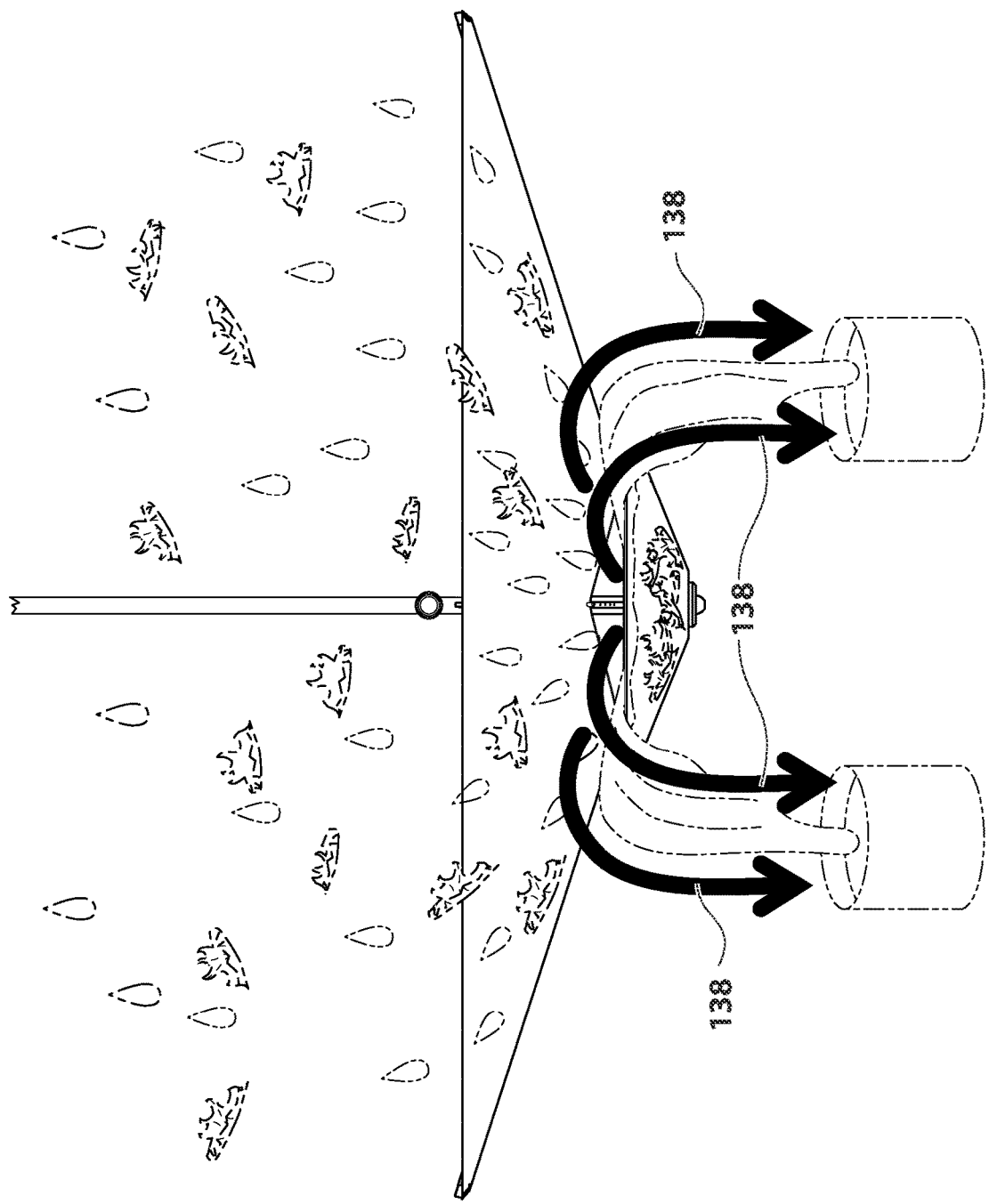

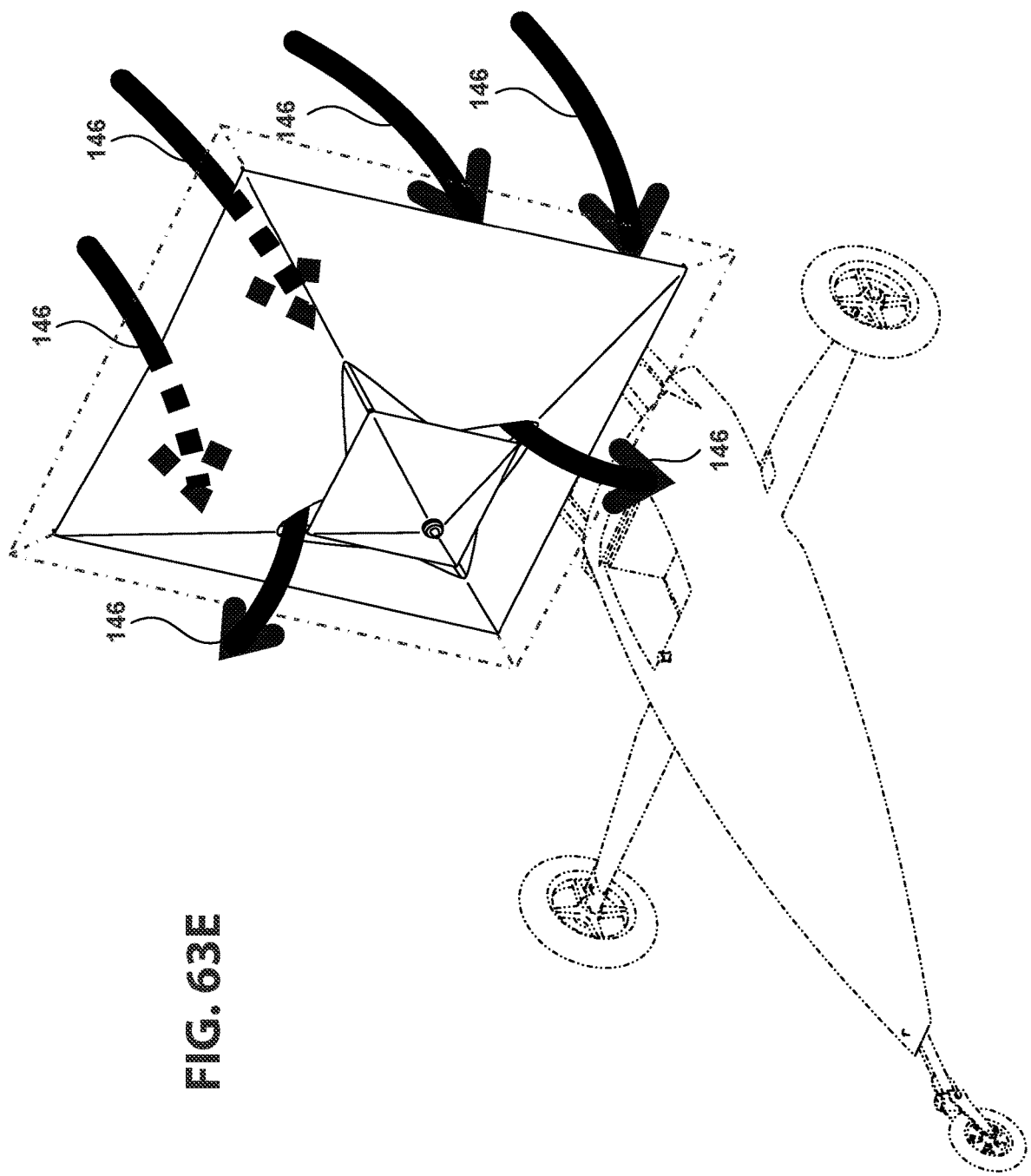

MULTI-USE UMBRELLA WITH WATER FILTRATION AND SAIL FUNCTIONS

1. FIELD OF THE INVENTION

The present invention relates to an umbrella, which is cheap to produce, is easy to ship as one unit, requires no assembly, and can be quickly and easily be unfolded. Particularly, the present invention relates to a five-device-in-one water-and-leaf-separating leaf-filtering water-collecting wind-blocking wind-redirecting marine-yacht-land-yacht-balcony-bumper-and-trailer-hitch-mountable sail, which comprises:
1) Adjustable water-and-leaf-separating leaf-filtering central sail system;
2) Adjustable water-collecting wind-blocking privacy-screen ring sail system;
3) Sail-multi-orienting snap-locking pivoting-elbow system; and
4) Multi-function marine-yacht-water-collecting land-yacht-wind-redirecting balcony-privacy-screen-providing bumper-hooking trailer-hitch-mounting base system.

2. DESCRIPTION OF THE PRIOR ART

A number of umbrellas have been introduced.

U.S. Pat. No. 2,633,856 issued 1948 Dec. 30 to Walter L. Weaklend, demonstrates in general to umbrellas and which deals more particularly with the construction and arrangement of articulated parallelogram linkages for off-setting the umbrella canopy or cover from the main post or pedestal.

U.S. Pat. No. 3,383,814 issued 1968 May 21 to Blaine F. Rowe, demonstrates a sunshade which utilizes an umbrella supported by a standard having an outwardly extending arm carrying a vertically adjustable cord to which the umbrella is attached. A brace having two parts relatively rotatable about a longitudinal axis, one part being pivoted to the standard and the other part to the umbrella, together with locking means for locking said parts from movement relative to the standard and the umbrella and clamping means for restraining relative rotation between the parts and operating means for the same.

U.S. Pat. No. 4,750,509 issued 1988 Jun. 14 to Soon-Tae Kim, demonstrates a tent and folding tent framework which enables quick and easy setup and taking down of the tent include a central hub member about which six ribs are pivotable. The hub member or fixed disk is made of plastic material and includes openings which enable the ribs to be easily assembled into the hub. Each rib includes two joints which pivot through 180 degrees. The joints are biased by springs toward the open position and include locking sleeves which are biased toward the locking position. The six ribs are loosely attached to the tent fabric via fabric loops, so that the entire framework is on the outside of the tent. A single user can easily open and set up the tent, or take down and store the tent, without assembling components and assistance.

U.S. Pat. No. 4,945,936 issued 1990 Aug. 7 to Dennis C. Surrendi, demonstrates the invention which provides an improved collapsible tent and tent frame of the umbrella type. The frame includes a plurality of legs pivoted, at the upper ends of the legs, to an upper clevis member. Each leg has pivoted thereto a radial stay member spaced downwardly from the upper end of the leg. The stay member extends inwardly of the tent to be pivoted to the lower clevis. The upper clevis includes a central downwardly opening recess and the lower clevis has fixed thereto an upperwardly projecting post or rod which is adapted to engage the upper clevis so as to stop movement of the lower clevis. Each leg comprises an elongated lower section which can be relatively stiff. The upper end of the lower section is pivoted to an upper section which is relatively flexible and resilient so that the upper portion of the legs can conform to the dome of the sheet material forming the tent cover or ceiling.

U.S. Pat. No. 5,060,907 issued 1991-1029 to Francisco Castano, demonstrates a base for an umbrella and the like which includes four legs set at substantially ninety degree angles with respect to one another and a tiltable umbrella pole receptacle. The four legs are restable upon a planar surface such as the ground or pavement. The legs are interconnected by tension rods whereby a first pair of adjacent legs are adjoined by a first tension rod, a second pair of adjacent legs are adjoined by a second tension rod, a third pair of adjacent legs are adjoined by a third tension rod, and a fourth pair of adjacent legs are adjoined by a fourth tension rod. The receptacle is pivotably mounted to the legs whereby the angle of the umbrella pole may be altered relative to the surface upon which the base is set at rest. The receptacle may be locked into a selected angle by a pair of adjustment rods fixed to two of the legs.

U.S. Pat. No. 5,499,644 issued 1996 Mar. 19 to Henry Geniele, demonstrates a sunshade assembly in which the sunshade covering or umbrella can easily be adjusted to any one of a plurality of angular positions all around a vertical stand which is offset and affixed either to the ground or to a supporting structure. The vertical stand includes an upper part and a lower part that extend upwardly and coaxially one above the other. A first ring is rigidly connected to and radially projects from the bottom end of the upper part. A second ring is rigidly connected to and radially projects from the top end of the lower part. Both of these rings are provided with a plurality of vertical perforations. A locking pin is insertable simultaneously into a selected perforation of the first ring and another selected peroration of the second ring to lock these two rings in the selected angular position.

U.S. Pat. No. 5,640,984 issued 1997 Jun. 24 to Emanuel Dubunsky, demonstrates a garden umbrella which employs an upper canopy extending from the top of the umbrella pole to the middle of long canopy ribs, and a lower outer canopy extending in a ring around the outer part of the umbrella and having long sleeves sewn across the canopy in a radial pattern for receiving a canopy rib in each sleeve. The canopy ribs are pivotally connected to a runner notch, while the other ends of the canopy ribs are received in the canopy sleeves. Stretcher ribs are pivotally connected between each canopy rib and a top rib holder secured at the top of the umbrella pole. The rib and runner notch configuration, together with the outer canopy, permit very easy opening and closing of the umbrella by movement of the runner notch between its upper, open umbrella position and its lower, closed umbrella position. The lower canopy comprises panels sewn together along the bottom of each rib such that a wind vent space is formed with the upper canopy which extends to the top of each rib. The lower canopy panels also include metal rods sewn therein at selected locations for maintaining the shape and handling of the canopy. Counterweights are provided in the canopy ribs to facilitate opening of the umbrella. Also, a strap is designed to wrap the lower canopy when the umbrella is closed.

U.S. Pat. No. 5,752,534 issued 1998 May 19 to Karl Klaus Becher, demonstrates in an umbrella, particularly a standing umbrella, sunshade, garden umbrella or similar, with a frame, a roof structure and a canopy, where the roof rods (5)

are linked to a pole element (2) bearing a cap (3) and moveable in a telescopic manner relative to the vertical pipe (1), and a slide (4), on which stretchers (6) linked to the roof rods (5) act flexibly, is moveable along the vertical pipe (1), the cap (3) and the slide (4) moving in opposite directions during opening and closing of the umbrella, and with at least one additional stretcher (8) arranged flexibly above the slide (4) between the umbrella pipe (1) and a roof rod (5), the slide (4) being fitted with a locking device (12) with which it can be locked in its upper position and the canopy can be tensioned, it is envisaged that the locking device (12) works in conjunction with a retaining device (13) located on the cap (3) or the moveable pole element (2) to enable simple manual opening of the umbrella and stretching of the canopy, particularly for umbrellas with large diameters.

U.S. Pat. No. 6,082,383 issued 2000 Jul. 4 to Robert Joe Wilson, demonstrates an operating mechanism for "patio type" umbrellas which uses an actuator sleeve in order to open and close the canopy. The sleeve is in connection an inner rod on the inside of the main shaft that in turn is used to open and close the ribs that support the canopy of the umbrella. Movement of the actuator sleeve upward will move the inner rod upward as well as pull the ribs downward so as to close the canopy. Movement of the actuator sleeve downward will pull the ribs away from the central shaft and hence open the canopy. Because of the short length of the ribs combined with the weight of the canopy itself, it is believed that this makes such large patio type umbrellas easier to open and close using this sleeve actuator mechanism.

U.S. Pat. No. 6,302,124 issued 2001 Oct. 16 to Joseph H. Demarco, demonstrates an open spaced apart patio sun umbrella which, when the top thereof is raised, undergoes a reshaping into an inverted v-shape closed condition and makes, to the extent it is raised, the location of an unlatching mechanism within convenient reach of a user making unobserved unlatching contact therewith through the bottom opening of the v-shape, even though the unlatching mechanism is masked from view.

U.S. Pat. No. 6,314,976 issued 2001 Nov. 13 to Dougan H. Clarke, demonstrates an umbrella frame which provides a stable and enduring support for an umbrella canopy while also allowing canopies of varying shapes and sizes to be mounted thereto. The umbrella frame includes a pair of hub members mounted about a pole member wherein each hub member has a plurality of slots formed in its outer perimeter. Ribs and struts are pivotally secured to the hub members using hub connectors which are removably secured to the hub slots so as to allow the size and shape of the attached canopy to be readily varied. The struts are also pivotally secured to the ribs by a collar member which helps prevent damage to the overlying canopy. The umbrella frame is rotatable about its axis in both the extended and retracted positions.

U.S. Pat. No. 6,386,214 issued 2002 May 14 to Dougan H. Clarke, demonstrates an umbrella operating system which allows for the simple opening, closing and locking of an umbrella while allowing the frame to freely rotate about the pole, wherein the pole is held in a stationary position. The umbrella includes a pair of hub members mounted about a pole member wherein the lower hub member is slidable up and down the pole. A pulley system with locking cam member may be employed to allow the umbrella to safely and easily open to any desired level. A locking stabilizer arm may be used to secure the main hub member in the fully open position and a stabilizer base provides strong support to the pole member to help it withstand severe weather conditions. The umbrella is rotatable about the pole axis regardless of the degree to which it is opened.

U.S. Pat. No. 6,497,242 issued 2002 Dec. 24 to Chung-Kuang Lin, and Jung-Jen Chang, demonstrates an umbrella rib assembly which includes a top rib pivotally connected with a stretcher rib both being made of aluminum alloy for light weight and easy processing; a middle rib pivotally secured to the stretcher rib and a tail rib pivotally connected with the middle rib, with the middle rib and the tail rib being made of light weight carbon-fiber-reinforced plastics.

U.S. Pat. No. 6,736,151 issued 2004 May 18 to Chung-Kuang Lin, and Jung-Jen Chang, demonstrates an anti-windforce rib assembly of multiple-fold umbrella which includes: a spring rib connected between an inner rib and an outer rib of the rib assembly, a buffer device formed on the spring rib and connected to the inner rib, whereby upon blowing of a strong wind to the rib assembly, the force of the strong wind will be dampened, weakend or released by the buffer device on the spring rib to minimize the wind force acting upon the rib assembly to prevent from bending, deformation, breakage or damage of the umbrella rib assembly.

U.S. Pat. No. 7,293,573 issued 2007 Nov. 13 to Dougan H. Clarke, demonstrates an improved, durable and versatile umbrella frame assembly which is provided to more readily endure abusive weather conditions and that may be quickly, easily and inexpensively repaired. In addition, the assembly is also easily modified to accommodate umbrella canopies of different sizes and shapes. In addition, an improved umbrella operating system is provided to permit simple opening, positioning, and locking of an umbrella while allowing the frame to freely rotate about the pole regardless of the degree to which it is opened, while the pole is held in a stationary position. The assembly includes a pair of hub members mounted about a pole member wherein the main hub member is slidable up and down the pole. A pulley system with a locking cam member may be employed to allow the umbrella to safely and easily open to any desired position. A locking stabilizer arm may be used to secure the main hub member in the fully open position.

U.S. Pat. No. 7,302,745 issued 2007 Dec. 4 to Ragnar Stahle, demonstrates a locking arrangement which includes an inner element (1) and an outer element (3), (302), where the inner element (1) is axially shiftable relative to the outer element (3), such as a shaft of a tool, one end of the outer element (3), (302) has a locking member (4) for locking the inner element (1) and the outer element (3), (302) relative to one another, the locking member (4) is maneuverable by a maneuvering member (5) that is remote from the locking member (4) in a direction toward another end of the outer element (3), (302) via an affecting member (301) that is shiftable along or rotatable about an axis that is parallel to a lengthwise axis of the outer element so that the affecting member has a tube (301) that completely or partially encloses the outer element (302).

U.S. Pat. No. 7,412,985 issued 2008 Aug. 19 to Oliver Joen-an Ma, demonstrates an umbrella which is provided that includes a lower pole portion, an upper pole portion, a canopy coupled with the upper pole portion, a crank, and a rotation mechanism. The upper pole portion is rotatably coupled with the lower pole portion. The crank is configured to articulate the canopy. The rotation mechanism is configured to apply a force to the upper pole portion. The rotation mechanism is at least partially located between the crank and the lower pole portion.

U.S. Pat. No. 7,438,077 issued 2008 Oct. 21 to Robert J. Wilson, demonstrates an umbrella which has an intermediate point of equilibrium between its fully open and closed positions, which reduces the peak force required to move the umbrella in either direction. To actuate the umbrella, a resiliently flexible steel band is able to not only carry tension to pull the umbrella open, but the band also has sufficient rigidity to operate in compression to push the umbrella closed. The band's flexibility allows it to feed through a small sidewall hole in the mast as well as snake through a hinge on an umbrella mast that can tilt. Manually sliding an actuator sleeve upward closes the umbrella. Sliding the sleeve down opens the umbrella. Although lifting to close and lowering to open may seem counterintuitive at first, such action greatly reduces the maximum force required to operate the umbrella.

U.S. Pat. No. 7,484,517 issued 2009 Feb. 3 to Fengchun Chen, demonstrates the invention which discloses a large portable umbrella which relates to the technical field of large foldable umbrella. A large portable umbrella of the invention includes an umbrella column, supporting arms, tarpaulin, cover arms supporting tarpaulin, a develop-fold mechanism, an upper umbrella disk fixed on the top of the umbrella column, and a lower umbrella disk movable up and down along the umbrella column, wherein one end of the cover arms being hinged on the upper umbrella disk, one end of the supporting arms being hinged on the lower umbrella disk and the other end of the supporting arms being hinged at the middle of the cover arms, characterized in that a: the moving space of the lower umbrella disk is from the upper umbrella disk down to the position of the lower umbrella disk when the large umbrella is developed, and the large portable umbrella is developed when the develop-fold mechanism drives the lower umbrella disk to move downwards along the umbrella column, and the large portable umbrella is folded when the lower umbrella disk moves upwards along the umbrella column causing the space between the lower umbrella disk and the upper umbrella disk is shortened; b: each cover arm is composed of an upper cover arm and a lower cover arm, the upper cover arm and the lower cover arm being hinged with each other via a position limiting hinge which serves for limiting the developing angle of the lower cover arm. Under the circumstance where the usable umbrella cover area of the invention is equal to that of the traditional large umbrella, the length of the large portable umbrella of the invention when folded is just one half of that of traditional large umbrella, and thereby the large portable umbrella can be put into car box and is convenient for carrying, and is applicable to family junketing, flexible booth setting, floating fieldwork, etc.

U.S. Pat. No. 8,061,375 issued 2011 Nov. 22 to Oliver Joen-an Ma, demonstrates the present inventions which relate generally to connectors for interconnecting members of shade structures (e.g. umbrellas and pavilions), such as support ribs and hubs. The connectors can be incorporated or attached to support ribs of shade structures to enable the support ribs to extend from the hubs at various angles to accommodate different shaped canopies. The connectors include an adjustable portion that enables the support ribs to extend to desired points on the periphery of the canopy at an angle that deviates from the angle of the hub channels, which are disposed around the periphery of the hubs.

U.S. Pat. No. 8,075,217 issued 2011 Dec. 13 to Donald H. Eason, demonstrates in at least one embodiment, an apparatus (1) that comprises a compression sleeve element (2) established at least partially around portions of a first elongated member (6) that telescopes from a larger elongated member (8) in which it may nest. A relative motion obstruction element (4) may disallow only certain types of motion, e.g., rotational and axial, of the compression sleeve element relative to the elongated members around which it may be at least partially established. As it may be the compression enhancement element (3)—which may be used to generate a retaining compression force element—that prevents perpendicular displacement of the compression sleeve element, deactivation and effective disengagement of the compression enhancement element may allow for a quick removal of the compression sleeve element without requiring that it be slid off an end of either elongated member.

U.S. Pat. No. 8,656,937 issued 2014 Feb. 25 to Connie Minasi, and Vincent Minasi, demonstrates an outdoor umbrella stabilizer system for preventing wind damage to an outdoor umbrella having a plurality of cords, a plurality of clips and a means of securing the cords to a weighted object. The stabilizer system flexibly maintains the canopy in position, preventing strong winds from catching the canopy and twisting, warping, contorting, buckling or deforming the umbrella, thereby stabilizing the outdoor umbrella. The stabilizer system installs on many styles of outdoor umbrellas, including a cantilever, a beach umbrella, a deck or patio umbrella, a center pole or vertical pole of the umbrella unnecessary for installation. The stabilizer system has a sac containing ballast as a weighted object. The cords attach to the sac. For an umbrella accommodated by a table having a center hold for the umbrella, the table is the weighted object, the cords attaching to the legs.

U.S. Pat. No. 8,875,350 issued 2014 Nov. 4 to Richard K. Bukovitz, demonstrates a reversible tip assembly for selectively connecting an extension pole/handle extension to tool handles having either compatible quick release lock mechanisms or conventional internally threaded sockets. The tip assembly comprises a body having oppositely extending rod-like tips at opposite ends of the body. One of the tips has a plurality of circumferentially spaced axially extending external thread segments. The other tip has an end portion that is compatible with quick release lock mechanisms.

U.S. Pat. No. 8,985,129 issued 2015 Mar. 24 to Ren Li, and Yunsheng Wang, demonstrates the present invention which discloses a sunshade umbrella capable of adjusting umbrella surface angle, including an upright rod and an upright rod handle which moves up and down along the upright rod, wherein one end of the upright rod is connected with umbrella base, the other end of the upright rod is hinged with the connecting rod, the other end of the connecting rod is hinged with a circumferential fixed hanger rod, the hanger rod is hinged with the upright rod handle, an umbrella surface angle adjusting device is mounted on one end of the hanger rod, an executing device that takes the circumferential movement around the hanger rod is mounted on the other end of the hanger rod, and the executing device is connected with an upper umbrella plate. This umbrella has the following advantages: increased overall firmness of the sunshade umbrella, simple structure, and is convenient to operate.

U.S. Pat. No. 9,493,962 issued 2016 Nov. 15 to Darrel W. Eddy, demonstrates an umbrella stand which is used to mount umbrellas or flags to tables, vehicles, structures, and various structures. The umbrella stand includes a mounting assembly and a rod holder. The rod holder is used to attach an umbrella or flag to the umbrella stand. The mounting assembly is used to secure the umbrella or flag to a surface. The mounting assembly includes a support plate, a first mounting plate and a first mounting fastener. The support plate is used as a base. The first mounting plate and the first mounting fastener connect to the support plate and help secure the support plate to a surface. The rod holder includes a holder tube and a plurality of holder fasteners. The holder tube is connected to the support plate and houses the shaft of an umbrella or a flagpole. The plurality of holder fasteners secure the umbrella shaft or the flagpole in place.

U.S. Pat. No. 9,624,685 issued 2017 Apr. 18 to Ian Blake Cordle, demonstrates a mount system for an umbrella which includes a base configured to be adhered to a ground surface. An attachment assembly is connected to the base. A main tube assembly is connected to the attachment assembly with a key such that the key can hold the main tube assembly to the base at any angle. An umbrella is connected to the main tube assembly.

U.S. Pat. No. 9,713,367 issued 2017 Jul. 25 to Ronald Duhon, demonstrates an umbrella shaft assembly which is provided for securing an umbrella to a chair or table. The umbrella shaft assembly includes an elongated shaft having a first end and a second end. A plurality of hinged finger projections are located on the elongated shaft. The finger projections are configured to extend outward and retract inward toward the elongated shaft. Further, an aperture is located on the elongated shaft, wherein a cord extends therethrough. The umbrella shaft assembly can be secured to a chair via securing the cord to a chair frame. Similarly, the umbrella shaft assembly can be secured to a table by extending the finger projections such that the umbrella cannot be hoisted through an umbrella receiving opening of the table. The umbrella shaft assembly further includes a conventional umbrella assembly construction that is large enough to shield a person or persons from the elements encountered outdoors.

U.S. Pat. No. 9,844,288 issued 2017 Dec. 19 to Yong Fu, and Chung-Wai Cheng, demonstrates a connector system which facilitates the connection of a first tree trunk to a second tree trunk of an artificial tree system. The connector system can prohibit rotation of the first tree trunk relative to the second tree trunk.

U.S. Pat. No. 9,924,768 issued 2018 Mar. 27 to Yoel Rosenberger, and Aron Kohn, demonstrates an umbrella which has a vertical pole extending downward from the fabric region, but it also has horizontal poles extending outwards from this vertical pole. In addition, it has a plurality of further vertical poles extending downward from the horizontal poles. In this manner, the umbrella is supported by four, six, or more vertical poles. Any or all of the poles can be telescoping poles, such that they can be increased or decreased in length. The connection of the horizontal poles to a vertical pole above and/or below can also be rotatable connections which lock into place at 90 degrees, but through human force, can unlock to place the horizontal poles in parallel with a vertical pole above or below itself. In this manner, one can fold the umbrella over the poles and shorten the length and/or width of the device.

U.S. Pat. No. 10,016,033 issued 2018 Jul. 10 to Dee Volin, demonstrates an arthritic-aiding pin-centering-and-guiding auditorily-snap-locking umbrella comprising: a canopy having tension-adjusting oval openings, a pole having a fixed hub and a movable hub, tension-adjusting rods, rod-locking screws respectively screwed through the tension-adjusting oval openings and into the tension-adjusting rod, three pulleys respectively screwed to the fixed hub and the movable hub, a pulley cord threaded on the three pulleys and attached to the movable hub, a cord hook, two gear cams attached to the movable hub, a cord blocker attached to the two gear cams, at least one pin opening drilled through the pole, an arthritic-aiding grip ring attached to the cord hook, a locking pin attached to the arthritic-aiding grip ring, a recess molded on the locking pin, at least one pin-centering-and-guiding plug and tube having built-in auditorily-snap-locking leaf springs and leaf-spring towers inserted into the pole and aligned with the at least one pin opening, and a tower-locking screw screwed between the leaf-spring towers for locking the plug inside the pole.

U.S. Pat. No. 10,370,866 issued to 2019 Aug. 6 to Eunice Sanders, demonstrates a rollable curtain patio umbrella for creating a shaded, netted, and private area includes an umbrella assembly comprising a pole, a support structure and a canopy. The canopy is coupled to the support structure, which is coupled to the pole. The canopy has an outside surface, an inside surface, a front perimeter, a rear perimeter, a right perimeter, and a left perimeter. A plurality of rollable shade curtains is coupled to the umbrella assembly, each shade curtain having a top edge coupled to the outside surface proximal the front perimeter, the rear perimeter, the right perimeter, and the left perimeter, respectively. Each of the shade curtains has a stored position and an alternate deployed position. Each shade curtain in the stored position is rolled adjacent the outside surface of the canopy, while in the alternate deployed position each shade curtain extends from the canopy to the ground.

U.S. Pat. No. 10,376,027 issued 2019 Aug. 13 to Gregory G. Kuelbs, demonstrates an umbrella apparatus having a canopy portion hingedly coupled to a pole portion. The umbrellas apparatus includes a rechargeable electrical power system that provides electrical power to an electromechanical opening and closing system and a light assembly and an entertainment system. A solar energy system is conductively coupled to the rechargeable electrical power system and is utilized to collect and convert solar energy to electrical energy for recharging the electrical power system. The entertainment system features a USB port and allows users to stream music and control the color of the light assembly.

U.S. Pat. No. 10,653,218 issued 2020 May 19 to Dee Volin, demonstrates an illumination providing umbrella with two water sealing cable pulleys and an LED projector. The umbrella having a canopy, upper and lower ribs, foldable rib joints respectively attached to the upper ribs, an umbrella pole, and a cable pulley with a counter wright. An upper hub attached to the top of the umbrella pole for housing the two rotatable pulleys and for preventing rainwater from entering the umbrella pole. The LED projector having an interchangeable image which can be magnified on a surface below and being attached to the umbrella pole.

U.S. Pat. No. D350,643 issued 1994 Sep. 20 to Joseph H. De Marco, demonstrates the ornamental design for improved outdoor umbrella, as shown and described.

U.S. Pat. No. D371,902 issued 1996 Jul. 23 to Chorng-Cheng Lee, demonstrates the ornamental design for a sunshade with support, as shown and described.

U.S. Pat. No. D383,900 issued 1997 Sep. 23 to Robert M. Bart, demonstrates the ornamental design for an outdoor umbrella, as shown and described.

U.S. Pat. No. D756,623 issued 2016 May 24 to Sarah Akin, and David Johnson, demonstrates the ornamental design for an umbrella cap, as shown and described.

U.S. Publication No. P20020129847 issued 2002 Sep. 19 to Mark J. S. Ma, demonstrates a parasol opening device which is incorporated in a parasol for opening/closing a canopy of the parasol. The parasol includes a tubular post for movably receiving the parasol opening device therein. The parasol opening device is movable along the post between an open position and a closed position. A canopy support arm has a first end pivotally attached to the parasol opening device and a second end to which a canopy system is pivoted. A link has a first end pivoted to the post and a second end pivotally attached to a slide which is movable along the arm. A rope having a predetermined and fixed length partially extends through the post, the parasol opening device and the arm with a first end of the rope fixed to the post and a second end of the rope attached to a runner of the canopy system whereby driving the rope causes the canopy system to open/close. The parasol opening device includes a movement control device for guiding/controlling the parasol opening device to move along the post between the open position and the closed position and thus driving the rope to open/close the canopy system.

U.S. Publication No. P20030140955 issued 2003 Jul. 31 to Shin Chung Chou, demonstrates an improved collapsible frame structure for use on an outdoor sunshade or parasol which is equipped with a minor extension arm coupled to a main runner of a main mast and a main extension arm in pivotal connection to a top retainer of the main mast at one end and to a lower end of a secondary stretching strut at the other end. The main extension arm and the minor extension arm are mutually coupled to each other at their middle points. The secondary stretching strut is further pivotally coupled to an extended pivot end of either the minor runner or the top notch of the sunshade or parasol so as to permit the sunshade to be extended in an easier and smoother manner when the main runner is pushed up or pulled down by a user.

U.S. Publication No. P20110260029 issued 2011 Oct. 27 to Thomas L. Kost, demonstrates an adjustable mount for an umbrella which may include one or more adjustments to allow the umbrella to be secured at different positions both horizontally and vertically. The mount may include a beam that fits into a standard receiver hitch on a vehicle. The mount may be used without the beam to secure an umbrella to a horizontal or vertical surface. The mount may be used to hold other objects besides an umbrella, such as a flag.

U.S. Publication No. P20150060631 issued 2015 Mar. 5 to Lianzhang Pan, demonstrates a pole securement sleeve which is disclosed herein. The pole securement sleeve includes a tubular housing member having a sidewall defining an internal passageway configured to receive a pole therein; a clamping member, a portion of the clamping member disposed in the internal passageway of the tubular housing member, the clamping member configured to apply a compressive force about a portion of an outer periphery of the pole; and a clamping member adjustment means operatively coupled to the clamping member, the clamping member adjustment means together with the clamping member circumscribing an area configured to be intersected by the pole. When a moment or torque is applied to the clamping member adjustment means, a size of the area circumscribed by the clamping member adjustment means and the clamping member is adjusted. A pole securement system and an umbrella base assembly, each including the pole securement sleeve, are also disclosed herein.

Disadvantages of the Prior Art

The prior art have failed to solve many problems associated with umbrella, as follows:
1) No prior art mention or disclose any umbrella, having adjustable water-and-leaf-separating leaf-filtering central sail 105.
   Therefore, the prior art of umbrella:
      a) Not capable of functioning as a water diverting device
         to predeterminately redirect the flow of water
         in the directions of arrows 136 and 137
         (see FIG. 36);
      b) Not capable of functioning as a leaf filtering device
         to filter leaves from rain water when used upside down
         in the direction of arrow 138
         (see FIG. 37A and FIG. 37B);
      c) Not capable of functioning as a water collector
         to collect rain water when used upside down
         in the directions of arrows 136 and 137
         (see FIG. 36);
      d) Not capable of functioning as a wind blocker
         to block wind
         (see FIG. 58 and FIG. 60);
      e) Not capable of functioning as a privacy screen
         to provide privacy
         (see FIG. 57);
      f) Not capable of functioning as an awning
         to angledly block rain and sun beams
         (see FIG. 53);
      g) Not capable of functioning as a canopy
         to vertically block rain and sun beams
         (see FIG. 53);
      h) Not capable of functioning as a wind redirector
         to redirect wind in and out of sail
         in the directions of arrows 139, 140, 141, and 142
         (see FIG. 39, and FIG. 40); and
      i) Not capable of functioning as a sail-steering wind-powered device
         to steer the sail in multiple different directions
         in the directions of arrows 143 and 144
         (see FIG. 41, FIG. 63E, FIG. 63F, and FIG. 63G).
2) No prior art mention or disclose any umbrella, having primary automatically-centered-and-reinforced ribs 108*a*.
   Therefore, the prior art of umbrella:
      a) Not capable of resisting bending and warping due to heavy winds
         in the direction of arrow 145
         (see FIG. 38A (Prior Art);
      b) Not capable of providing reinforced infrastructure for a sail when used on a wind-powered land vehicle
         in the direction of arrow 146
         (see FIG. 63E, FIG. 63F, and FIG. 63G);
      c) Not capable of proving reinforced infrastructure for an emergency rainwater collecting device on a marine vessel
         (see FIG. 63C and FIG. 63D); and
      d) Not capable of providing reinforced infrastructure for a shade canopy.
3) No prior art mention or disclose any umbrella, having primary automatic-rib-centering-and-reinforcing rail 108*b*.
   Therefore, the prior art of umbrella:
      a) Not capable of resisting bending and warping due to heavy winds
         in the direction of arrow 145
         (see FIG. 38A (Prior Art);
      b) Not capable of providing reinforced infrastructure for a sail when used on a wind-powered land vehicle
         in the direction of arrow 146
         (see FIG. 63E, FIG. 63F, and FIG. 63G);
      c) Not capable of proving reinforced infrastructure for an emergency rainwater collecting device on a marine vessel
         (see FIG. 63C and FIG. 63D); and
      d) Not capable of providing reinforced infrastructure for a shade canopy.

4) No prior art mention or disclose any umbrella, having secondary automatically-centered-and-reinforced ribs 109*a*.
   Therefore, the prior art of umbrella:
   a) Not capable of resisting bending and warping due to heavy winds
      in the direction of arrow 145
      (see FIG. 38A (Prior Art);
   b) Not capable of providing reinforced infrastructure for a sail when used on a wind-powered land vehicle
      in the direction of arrow 146
      (see FIG. 63E, FIG. 63F, and FIG. 63G);
   c) Not capable of proving reinforced infrastructure for an emergency rainwater collecting device on a marine vessel
      (see FIG. 63C and FIG. 63D); and
   d) Not capable of providing reinforced infrastructure for a shade canopy.
5) No prior art mention or disclose any umbrella, having secondary automatic-rib-centering-and-reinforcing rail 109*b*.
   Therefore, the prior art of umbrella:
   a) Not capable of resisting bending and warping due to heavy winds
      in the direction of arrow 145
      (see FIG. 38A (Prior Art);
   b) Not capable of providing reinforced infrastructure for a sail when used on a wind-powered land vehicle
      in the direction of arrow 146
      (see FIG. 63E, FIG. 63F, and FIG. 63G);
   c) Not capable of proving reinforced infrastructure for an emergency rainwater collecting device on a marine vessel
      (see FIG. 63C and FIG. 63D); and
   d) Not capable of providing reinforced infrastructure for a shade canopy.
6) No prior art mention or disclose any umbrella, having multi-rib-connecting automatically-centered-and-reinforced adjustable cores 110*a*.
   Therefore, the prior art of umbrella:
   a) Not capable of allowing manufacturers to shorten long ribs into shorter primary ring-sail-supporting ribs 108*a* and shorter secondary ring-sail-supporting ribs 109*a*
      to reduce the length and volume of the shipping package of the five-device-in-one water-and-leaf-separating leaf-filtering water-collecting wind-blocking wind-redirecting marine-yacht-land-yacht-balcony-bumper-and-trailer-hitch-mountable sail in a shipping container to save money from expensive shipping costs
      (see FIG. 1A (Prior Art); and
   b) Not capable of securely and reinforcingly connecting ring-sail-supporting ribs 108*a* to secondary ring-sail-supporting ribs 109*a*
      to provide strength and structure to the five-device-in-one water-and-leaf-separating leaf-filtering water-collecting wind-blocking wind-redirecting marine-yacht-land-yacht-balcony-bumper-and-trailer-hitch-mountable sail
      (see FIG. 9A and FIG. 9B).
7) No prior art mention or disclose any umbrella, having automatic-core-centering-and-reinforcing rail 110*b*.
   Therefore, the prior art of umbrella:
   a) Not capable of resisting bending and warping due to heavy winds
      in the direction of arrow 145
      (see FIG. 38A (Prior Art);
   b) Not capable of providing reinforced infrastructure for a sail when used on a wind-powered land vehicle
      in the direction of arrow 146
      (see FIG. 63E, FIG. 63F, and FIG. 63G);
   c) Not capable of proving reinforced infrastructure for an emergency rainwater collecting device on a marine vessel
      (see FIG. 63C and FIG. 63D); and
   d) Not capable of providing reinforced infrastructure for a shade canopy.
8) No prior art mention or disclose any umbrella, having adjustable water-collecting wind-blocking privacy-screen ring sail 113.
   Therefore, the prior art of umbrella:
   a) Not capable of functioning as an emergency rainwater collector on a marine vessel
      (see FIG. 63C and FIG. 63D);
   b) Not capable of functioning as a water collector to collect rainwater when used upside down
      in the directions of arrows 136 and 137
      (see FIG. 36);
   c) Not capable of functioning as a sail on a wind-powered land vehicle
      in the direction of arrow 146
      (see FIG. 63E, FIG. 63F, and FIG. 63G);
   d) Not capable of functioning as a wind blocker to block wind
      (see FIG. 58 and FIG. 60);
   e) Not capable of functioning as a privacy screen to provide privacy
      (see FIG. 57);
   f) Not capable of functioning as an awning to angledly block rain and sun beams
      (see FIG. 53);
   g) Not capable of functioning as a canopy to vertically block rain and sun beams
      (see FIG. 53);
   h) Not capable of functioning as a water diverting device
      to predeterminately redirect the flow of water
      in the directions of arrows 136 and 137
      (see FIG. 36);
   i) Not capable of functioning as a leaf filtering device to filter leaves from rain water when used upside down
      in the directions of arrows 37A and 37B
      (see FIGS. 37A and 37B);
   j) Not capable of functioning as a wind redirector to redirect wind in and out of sail
      in the directions of arrows 139, 140, 141, and 142
      (see FIG. 39 and FIG. 40); and
   k) Not capable of functioning as a wind resistor to protect users
      in the directions of arrows 143 and 144
      (see FIG. 41).
9) No prior art mention or disclose any umbrella, having multi-angled multi-surface-mountable multi-plate-connecting reversible stackable base 128.
   Therefore, the prior art of umbrella:
   a) Not capable of stackably connecting multiple multi-angled multi-surface-mountable multi-plate-connecting reversible stackable bases 128 together
      (see FIG. 16, FIG. 17, FIG. 18, and FIG. 19)
   b) Not capable of securing the five-device-in-one water-and-leaf-separating leaf-filtering water-collecting wind-blocking wind-redirecting marineyacht-land-yacht-balcony-bumper-and-trailer-hitch-mountable sail at the base of a wall
(see FIG. 53);
c) Not capable of securely wedging the five-device-in-one water-and-leaf-separating leaf-filtering water-collecting wind-blocking wind-redirecting marine-yacht-land-yacht-balcony-bumper-and-trailer-hitch-mountable sail to a step recess built into a truck-bumper corner or an RV-bumper corner without need for bolting
(see FIG. 43A, FIG. 43B, FIG. 44, and FIG. 45);
d) Not capable of securely wedging the five-device-in-one water-and-leaf-separating leaf-filtering water-collecting wind-blocking wind-redirecting marine-yacht-land-yacht-balcony-bumper-and-trailer-hitch-mountable sail into a tailgate gap without the need for bolting
(see FIG. 42);
e) Not capable of securely wedging the five-device-in-one water-and-leaf-separating leaf-filtering water-collecting wind-blocking wind-redirecting marine-yacht-land-yacht-balcony-bumper-and-trailer-hitch-mountable sail to a balcony railing without the need for bolting
(see 62A, and FIG. 62B);
f) Not capable of securely wedging the five-device-in-one water-and-leaf-separating leaf-filtering water-collecting wind-blocking wind-redirecting marine-yacht-land-yacht-balcony-bumper-and-trailer-hitch-mountable sail to a railing of a watercraft without the need for bolting
(see FIG. 63A, FIG. 63B, FIG. 63C, and FIG. 63D);
g) Not capable of securely attaching the five-device-in-one water-and-leaf-separating leaf-filtering water-collecting wind-blocking wind-redirecting marine-yacht-land-yacht-balcony-bumper-and-trailer-hitch-mountable sail to a tow hitch
(see FIG. 48, and FIG. 49);
h) Not capable of securely attaching the five-device-in-one water-and-leaf-separating leaf-filtering water-collecting wind-blocking wind-redirecting marine-yacht-land-yacht-balcony-bumper-and-trailer-hitch-mountable sail to a utility hole of a truck bed
(see FIG. 46, and FIG. 47);
i) Not capable of securely attaching the five-device-in-one water-and-leaf-separating leaf-filtering water-collecting wind-blocking wind-redirecting marine-yacht-land-yacht-balcony-bumper-and-trailer-hitch-mountable sail to a wind-powered land vehicle to act as a sail
in the direction of arrow 146
(see FIG. 63E, FIG. 63F, and FIG. 63G); and
j) Not capable of securely attaching the five-device-in-one water-and-leaf-separating leaf-filtering water-collecting wind-blocking wind-redirecting marine-yacht-land-yacht-balcony-bumper-and-trailer-hitch-mountable sail to a column, table, wall, fence, bumper, balcony, or patio
(see FIG. 51, FIG. 52, FIG. 53, FIG. 54, FIG. 55, FIG. 56, FIG. 57, FIG. 58, FIG. 59, FIG. 60, and FIG. 61).
10) No prior art mention or disclose any umbrella, having multi-angled double-beveled base-mounting holes 129.
Therefore, the prior art of umbrella:
a) Not capable of providing beveled holes for multi-angled semi-spherical-headed base-mounting bolts 130 and multi-angled semi-spherical-headed base-mounting nuts 131 to be adjustably installed;
b) Not capable of providing beveled holes where multi-angled semi-spherical-headed base-mounting bolts 130 and multi-angled semi-spherical-headed base-mounting nuts 131 can be pivotably inserted in a variety of angles
in the direction of arrow 149a, 149b, 149c, 149d, 149e, 149f, 149g, 149h, 149i, and 149j;
(see FIG. 30, FIG. 31A, FIG. 31B, and FIG. 31C); and
c) Not capable of providing a number of holes for installing the five-device-in-one water-and-leaf-separating leaf-filtering water-collecting wind-blocking wind-redirecting marine-yacht-land-yacht-balcony-bumper-and-trailer-hitch-mountable sail in a variety of locations
(see FIG. 15).
11) No prior art mention or disclose any umbrella, having multi-angled semi-spherical-headed base-mounting bolts 130.
Therefore, the prior art of umbrella:
a) Not capable of being pivotably inserted into multi-angled double-beveled base-mounting holes 129;
b) Not capable of providing a semi-spherical head to pivot within multi-angled double-beveled base-mounting holes 129
to allow many angles for inserting and installing
in the direction of arrow 149a, 149b, 149c, 149d, 149e, 149f, 149g, 149h, 149i, and 149j;
(see FIG. 30, FIG. 31A, FIG. 31B, and FIG. 31C); and
c) Not capable of threadedly attaching to multi-angled semi-spherical-headed base-mounting nuts 131.
12) No prior art mention or disclose any umbrella, having multi-angled semi-spherical-headed base-mounting nuts 131.
Therefore, the prior art of umbrella:
a) Not capable of being pivotably capable of fitting into multi-angled double-beveled base-mounting holes 129;
b) Not capable of providing a semi-spherical shape to pivot within multi-angled double-beveled base-mounting holes 129
to allow many angles for inserting and installing
in the direction of arrow 149a, 149b, 149c, 149d, 149e, 149f, 149g, 149h, 149i, and 149j;
(see FIG. 30, FIG. 31A, FIG. 31B, and FIG. 31C); and
c) Not capable of threadedly attaching to multi-angled semi-spherical-headed base-mounting bolts 130.

Objects and Advantages of the Invention

The present invention substantially departs from the conventional concepts and methods of the prior art. In doing so, the present invention provides (a or an) five-device-in-one water-and-leaf-separating leaf-filtering water-collecting wind-blocking wind-redirecting marine-yacht-land-yacht-balcony-bumper-and-trailer-hitch-mountable sail, having many unique and significant features, functions, and advantages, which overcome all the disadvantages of the prior art, as follows:
1) It is an object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
adjustable water-and-leaf-separating leaf-filtering central sail 105.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of functioning as a water diverting device
    to predeterminately redirect the flow of water
    in the directions of arrows 136 and 137
    (see FIG. 36);
  b) Capable of functioning as a leaf filtering device
    to filter leaves from rain water when used upside down
    in the direction of arrow 138
    (see FIG. 37A and FIG. 37B);
  c) Capable of functioning as a water collector
    to collect rain water when used upside down
    in the directions of arrows 136 and 137
    (see FIG. 36);
  d) Capable of functioning as a wind blocker
    to block wind
    (see FIG. 58 and FIG. 60);
  e) Capable of functioning as a privacy screen
    to provide privacy
    (see FIG. 57);
  f) Capable of functioning as an awning
    to angledly block rain and sun beams
    (see FIG. 53);
  g) Capable of functioning as a canopy
    to vertically block rain and sun beams
    (see FIG. 53);
  h) Capable of functioning as a wind redirector
    to redirect wind in and out of sail
    in the directions of arrows 139, 140, 141, and 142
    (see FIG. 39, and FIG. 40); and
  i) Capable of functioning as a sail-steering wind-powered device
    to steer the sail in multiple different directions
    in the directions of arrows 143 and 144
    (see FIG. 41, FIG. 63E, FIG. 63F, and FIG. 63G).
2) It is yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
primary automatically-centered-and-reinforced ribs 108a.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of resisting bending and warping due to heavy winds
    in the direction of arrow 145
    (see FIG. 38A (Prior Art);
  b) Capable of providing reinforced infrastructure for a sail when used on a wind-powered land vehicle
    in the direction of arrow 146
    (see FIG. 63E, FIG. 63F, and FIG. 63G);
  c) Capable of proving reinforced infrastructure for an emergency rainwater collecting device on a marine vessel
    (see FIG. 63C and FIG. 63D); and
  d) Capable of providing reinforced infrastructure for a shade canopy.
3) It is still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
primary automatic-rib-centering-and-reinforcing rail 108b.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of resisting bending and warping due to heavy winds
    in the direction of arrow 145
    (see FIG. 38A (Prior Art);
  b) Capable of providing reinforced infrastructure for a sail when used on a wind-powered land vehicle
    in the direction of arrow 146
    (see FIG. 63E, FIG. 63F, and FIG. 63G);
  c) Capable of proving reinforced infrastructure for an emergency rainwater collecting device on a marine vessel
    (see FIG. 63C and FIG. 63D); and
  d) Capable of providing reinforced infrastructure for a shade canopy.
4) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
secondary automatically-centered-and-reinforced ribs 109a.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of resisting bending and warping due to heavy winds
    in the direction of arrow 145
    (see FIG. 38A (Prior Art);
  b) Capable of providing reinforced infrastructure for a sail when used on a wind-powered land vehicle
    in the direction of arrow 146
    (see FIG. 63E, FIG. 63F, and FIG. 63G);
  c) Capable of proving reinforced infrastructure for an emergency rainwater collecting device on a marine vessel
    (see FIG. 63C and FIG. 63D); and
  d) Capable of providing reinforced infrastructure for a shade canopy.
5) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
secondary automatic-rib-centering-and-reinforcing rail 109b.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of resisting bending and warping due to heavy winds
    in the direction of arrow 145
    (see FIG. 38A (Prior Art);
  b) Capable of providing reinforced infrastructure for a sail when used on a wind-powered land vehicle
    in the direction of arrow 146
    (see FIG. 63E, FIG. 63F, and FIG. 63G);

c) Capable of proving reinforced infrastructure for an emergency rainwater collecting device on a marine vessel
(see FIG. 63C and FIG. 63D); and
d) Capable of providing reinforced infrastructure for a shade canopy.
6) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
multi-rib-connecting automatically-centered-and-reinforced adjustable cores 110*a*.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of allowing manufacturers to shorten long ribs into shorter primary ring-sail-supporting ribs 108*a* and shorter secondary ring-sail-supporting ribs 109*a*
    to reduce the length and volume of the shipping package of the five-device-in-one water-and-leaf-separating leaf-filtering water-collecting wind-blocking wind-redirecting marine-yacht-land-yacht-balcony-bumper-and-trailer-hitch-mountable sail in a shipping container to save money from expensive shipping costs
    (see FIG. 1A (Prior Art); and
  b) Capable of securely and reinforcingly connecting ring-sail-supporting ribs 108*a* to secondary ring-sail-supporting ribs 109*a*
    to provide strength and structure to the five-device-in-one water-and-leaf-separating leaf-filtering water-collecting wind-blocking wind-redirecting marine-yacht-land-yacht-balcony-bumper-and-trailer-hitch-mountable sail
    (see FIG. 9A and FIG. 9B).
7) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
automatic-core-centering-and-reinforcing rail 110*b*.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of resisting bending and warping due to heavy winds
    in the direction of arrow 145
    (see FIG. 38A (Prior Art);
  b) Capable of providing reinforced infrastructure for a sail when used on a wind-powered land vehicle
    in the direction of arrow 146
    (see FIG. 63E, FIG. 63F, and FIG. 63G);
  c) Capable of proving reinforced infrastructure for an emergency rainwater collecting device on a marine vessel
    (see FIG. 63C and FIG. 63D); and
  d) Capable of providing reinforced infrastructure for a shade canopy.
8) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
adjustable water-collecting wind-blocking privacy-screen ring sail 113.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of functioning as an emergency rainwater collector on a marine vessel
    (see FIG. 63C and FIG. 63D);
  b) Capable of functioning as a water collector
    to collect rainwater when used upside down
    in the directions of arrows 136 and 137
    (see FIG. 36);
  c) Capable of functioning as a sail on a wind-powered land vehicle
    in the direction of arrow 146
    (see FIG. 63E, FIG. 63F, and FIG. 63G);
  d) Capable of functioning as a wind blocker
    to block wind
    (see FIG. 58 and FIG. 60);
  e) Capable of functioning as a privacy screen
    to provide privacy
    (see FIG. 57);
  f) Capable of functioning as an awning
    to angledly block rain and sun beams
    (see FIG. 53);
  g) Capable of functioning as a canopy
    to vertically block rain and sun beams
    (see FIG. 53);
  h) Capable of functioning as a water diverting device
    to predeterminately redirect the flow of water
    in the directions of arrows 136 and 137
    (see FIG. 36);
  i) Capable of functioning as a leaf filtering device
    to filter leaves from rain water when used upside down
    in the directions of arrows 37A and 37B
    (see FIGS. 37A and 37B);
  j) Capable of functioning as a wind redirector
    to redirect wind in and out of sail
    in the directions of arrows 139, 140, 141, and 142
    (see FIG. 39 and FIG. 40); and
  k) Capable of functioning as a wind resistor
    to protect users
    in the directions of arrows 143 and 144
    (see FIG. 41).
9) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
multi-angled multi-surface-mountable multi-plate-connecting reversible stackable base 128.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of stackably connecting multiple multi-angled multi-surface-mountable multi-plate-connecting reversible stackable bases 128 together
    (see FIG. 16, FIG. 17, FIG. 18, and FIG. 19)
  b) Capable of securing the five-device-in-one water-and-leaf-separating leaf-filtering water-collecting wind-blocking wind-redirecting marine-yacht-land-yacht-balcony-bumper-and-trailer-hitch-mountable sail at the base of a wall
    (see FIG. 53);

c) Capable of securely wedging the five-device-in-one water-and-leaf-separating leaf-filtering water-collecting wind-blocking wind-redirecting marine-yacht-land-yacht-balcony-bumper-and-trailer-hitch-mountable sail to a step recess built into a truck-bumper corner or an RV-bumper corner without need for bolting
(see FIG. 43A, FIG. 43B, FIG. 44, and FIG. 45);
d) Capable of securely wedging the five-device-in-one water-and-leaf-separating leaf-filtering water-collecting wind-blocking wind-redirecting marine-yacht-land-yacht-balcony-bumper-and-trailer-hitch-mountable sail into a tailgate gap without the need for bolting
(see FIG. 42);
e) Capable of securely wedging the five-device-in-one water-and-leaf-separating leaf-filtering water-collecting wind-blocking wind-redirecting marine-yacht-land-yacht-balcony-bumper-and-trailer-hitch-mountable sail to a balcony railing without the need for bolting
(see 62A, and FIG. 62B);
f) Capable of securely wedging the five-device-in-one water-and-leaf-separating leaf-filtering water-collecting wind-blocking wind-redirecting marine-yacht-land-yacht-balcony-bumper-and-trailer-hitch-mountable sail to a railing of a watercraft without the need for bolting
(see FIG. 63A, FIG. 63B, FIG. 63C, and FIG. 63D);
g) Capable of securely attaching the five-device-in-one water-and-leaf-separating leaf-filtering water-collecting wind-blocking wind-redirecting marine-yacht-land-yacht-balcony-bumper-and-trailer-hitch-mountable sail to a tow hitch
(see FIG. 48, and FIG. 49);
h) Capable of securely attaching the five-device-in-one water-and-leaf-separating leaf-filtering water-collecting wind-blocking wind-redirecting marine-yacht-land-yacht-balcony-bumper-and-trailer-hitch-mountable sail to a utility hole of a truck bed
(see FIG. 46, and FIG. 47);
i) Capable of securely attaching the five-device-in-one water-and-leaf-separating leaf-filtering water-collecting wind-blocking wind-redirecting marine-yacht-land-yacht-balcony-bumper-and-trailer-hitch-mountable sail to a wind-powered land vehicle to act as a sail
in the direction of arrow 146
(see FIG. 63E, FIG. 63F, and FIG. 63G); and
j) Capable of securely attaching the five-device-in-one water-and-leaf-separating leaf-filtering water-collecting wind-blocking wind-redirecting marine-yacht-land-yacht-balcony-bumper-and-trailer-hitch-mountable sail to a column, table, wall, fence, bumper, balcony, or patio
(see FIG. 51, FIG. 52, FIG. 53, FIG. 54, FIG. 55, FIG. 56, FIG. 57, FIG. 58, FIG. 59, FIG. 60, and FIG. 61).

10) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
multi-angled double-beveled base-mounting holes 129.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
a) Capable of providing beveled holes for multi-angled semi-spherical-headed base-mounting bolts 130 and multi-angled semi-spherical-headed base-mounting nuts 131 to be adjustably installed;
b) Capable of providing beveled holes where multi-angled semi-spherical-headed base-mounting bolts 130 and multi-angled semi-spherical-headed base-mounting nuts 131 can be pivotably inserted in a variety of angles
in the direction of arrow 149*a*, 149*b*, 149*c*, 149*d*, 149*e*, 149*f*, 149*g*, 149*h*, 149*i*, and 149*j*;
(see FIG. 30, FIG. 31A, FIG. 31B, and FIG. 31C); and
c) Capable of providing a number of holes for installing the five-device-in-one water-and-leaf-separating leaf-filtering water-collecting wind-blocking wind-redirecting marine-yacht-land-yacht-balcony-bumper-and-trailer-hitch-mountable sail in a variety of locations
(see FIG. 15).

11) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
multi-angled semi-spherical-headed base-mounting bolts 130.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
a) Capable of being pivotably inserted into multi-angled double-beveled base-mounting holes 129;
b) Capable of providing a semi-spherical head to pivot within multi-angled double-beveled base-mounting holes 129
to allow many angles for inserting and installing
in the direction of arrow 149*a*, 149*b*, 149*c*, 149*d*, 149*e*, 149*f*, 149*g*, 149*h*, 149*i*, and 149*j*;
(see FIG. 30, FIG. 31A, FIG. 31B, and FIG. 31C); and
c) Capable of threadedly attaching to multi-angled semi-spherical-headed base-mounting nuts 131.

12) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
multi-angled semi-spherical-headed base-mounting nuts 131
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
a) Capable of being pivotably capable of fitting into multi-angled double-beveled base-mounting holes 129;
b) Capable of providing a semi-spherical shape to pivot within multi-angled double-beveled base-mounting holes 129
to allow many angles for inserting and installing
in the direction of arrow 149*a*, 149*b*, 149*c*, 149*d*, 149*e*, 149*f*, 149*g*, 149*h*, 149*i*, and 149*j*;
(see FIG. 30, FIG. 31A, FIG. 31B, and FIG. 31C); and
c) Capable of threadedly attaching to multi-angled semi-spherical-headed base-mounting bolts 130.

SUMMARY OF THE INVENTION

A five-device-in-one water-and-leaf-separating leaf-filtering water-collecting wind-blocking wind-redirecting marine-yacht-land-yacht-balcony-bumper-and-trailer-hitch-mountable sail comprises: a central-sail intersector; central-sail-supporting ribs; central-sail-rib-raising arms; an adjustable water-and-leaf-separating leaf-filtering central sail attached to the central-sail-supporting ribs for functioning as a water diverting device to predeterminately redirect the flow of water, functioning as a leaf filtering device to filter leaves from rain water when used upside down, functioning as a water collector to collect rain water when used upside down, functioning as a wind blocker to block wind, functioning as a privacy screen to provide privacy, functioning as an awning to angledly block rain and sun beams, functioning as a canopy to vertically block rain and sun beams, functioning as a wind redirector to redirect wind in and out of sail, and functioning as a sail-steering wind-powered device to steer the sail in multiple different directions; a ring-sail-rib intersector; primary automatically-centered-and-reinforced ribs for resisting bending and warping due to heavy winds, providing reinforced infrastructure for a sail when used on a wind-powered land vehicle, providing reinforced infrastructure for an emergency rainwater collecting device on a marine vessel, and providing reinforced infrastructure for a shade canopy; secondary automatically-centered-and-reinforced ribs for resisting bending and warping due to heavy winds, providing reinforced infrastructure for a sail when used on a wind-powered land vehicle, providing reinforced infrastructure for an emergency rainwater collecting device on a marine vessel, and providing reinforced infrastructure for a shade canopy; multi-rib-connecting automatically-centered-and-reinforced adjustable cores inserted into and screwed to the primary automatically-centered-and-reinforced ribs and the secondary automatically-centered-and-reinforced ribs, the multi-rib-connecting automatically-centered-and-reinforced adjustable cores for allowing manufacturers to shorten long ribs into the primary automatically-centered-and-reinforced ribs and the secondary automatically-centered-and-reinforced ribs to reduce the length and volume of the shipping package of the five-device-in-one water-and-leaf-separating leaf-filtering water-collecting wind-blocking wind-redirecting marine-yacht-land-yacht-balcony-bumper-and-trailer-hitch-mountable sail in a shipping container to save money from expensive shipping costs, and securely and reinforcingly connecting the primary automatically-centered-and-reinforced ribs to the secondary automatically-centered-and-reinforced ribs to provide strength and structure to the five-device-in-one water-and-leaf-separating leaf-filtering water-collecting wind-blocking wind-redirecting marine-yacht-land-yacht-balcony-bumper-and-trailer-hitch-mountable sail; rib-length-adjusting holes drilled into the primary automatically-centered-and-reinforced ribs, the secondary automatically-centered-and-reinforced ribs, and the multi-rib-connecting automatically-centered-and-reinforced adjustable cores; a ring-sail-arm intersector; ring-sail-rib-raising arms foldably attached to the ring-sail-arm intersector; an adjustable water-collecting wind-blocking privacy-screen ring sail attached to the primary automatically-centered-and-reinforced ribs and the secondary automatically-centered-and-reinforced ribs, the adjustable water-collecting wind-blocking privacy-screen ring sail for functioning as an emergency rainwater collector on a marine vessel functioning as a water collector to collect rainwater when used upside down, functioning as a sail on a wind-powered land vehicle, functioning as a wind blocker to block wind, functioning as a privacy screen to provide privacy, functioning as an awning to angledly block rain and sun beams, functioning as a canopy to vertically block rain and sun beams, functioning as a water diverting device to predeterminately redirect the flow of water, functioning as a leaf filtering device to filter leaves from rain water when used upside down, functioning as a wind redirector to redirect wind in and out of sail, and functioning as a wind resistor to protect users; an upper post attached to the central-sail intersector, the ring-sail-arm intersector slidably attached to the upper post; a lower post; and a multi-angled multi-surface-mountable multi-plate-connecting reversible stackable base attached to the lower post for stackably connecting multiple the multi-angled multi-surface-mountable multi-plate-connecting reversible stackable bases together, securing the five-device-in-one water-and-leaf-separating leaf-filtering water-collecting wind-blocking wind-redirecting marine-yacht-land-yacht-balcony-bumper-and-trailer-hitch-mountable sail at the base of a wall, securely wedging the five-device-in-one water-and-leaf-separating leaf-filtering water-collecting wind-blocking wind-redirecting marine-yacht-land-yacht-balcony-bumper-and-trailer-hitch-mountable sail to a step recess built into a truck-bumper corner or an RV-bumper corner without need for bolting, securely wedging the five-device-in-one water-and-leaf-separating leaf-filtering water-collecting wind-blocking wind-redirecting marine-yacht-land-yacht-balcony-bumper-and-trailer-hitch-mountable sail into a tailgate gap without need for bolting, securely wedging the five-device-in-one water-and-leaf-separating leaf-filtering water-collecting wind-blocking wind-redirecting marine-yacht-land-yacht-balcony-bumper-and-trailer-hitch-mountable sail to a balcony railing without need for bolting, securely wedging the five-device-in-one water-and-leaf-separating leaf-filtering water-collecting wind-blocking wind-redirecting marine-yacht-land-yacht-balcony-bumper-and-trailer-hitch-mountable sail to a railing of a watercraft without need for bolting, securely attaching the five-device-in-one water-and-leaf-separating leaf-filtering water-collecting wind-blocking wind-redirecting marine-yacht-land-yacht-balcony-bumper-and-trailer-hitch-mountable sail to a tow hitch, securely attaching the five-device-in-one water-and-leaf-separating leaf-filtering water-collecting wind-blocking wind-redirecting marine-yacht-land-yacht-balcony-bumper-and-trailer-hitch-mountable sail to a utility hole of a truck bed without need for bolting, securely attaching the five-device-in-one water-and-leaf-separating leaf-filtering water-collecting wind-blocking wind-redirecting marine-yacht-land-yacht-balcony-bumper-and-trailer-hitch-mountable sail to a wind-powered land vehicle to act as a sail, and securely attaching the five-device-in-one water-and-leaf-separating leaf-filtering water-collecting wind-blocking wind-redirecting marine-yacht-land-yacht-balcony-bumper-and-trailer-hitch-mountable sail to a column, table, wall, fence, bumper, balcony, or patio.

BRIEF DESCRIPTION OF THE DRAWINGS

FIG. 1C and FIG. 1D illustrate a front views of the five-device-in-one water-and-leaf-separating leaf-filtering water-collecting wind-blocking wind-redirecting marineyacht-land-yacht-balcony-bumper-and-trailer-hitch-mountable sail demonstrating how it filters leaves out of collected rainwater.

FIG. 1H and FIG. 1I illustrate perspective views demonstrating how the multi-angled multi-surface-mountable multi-plate-connecting reversible stackable base 128 can be hooked underneath the lower railing of a boat to be used as an emergency rainwater collector.

FIG. 1J, FIG. 1K, and FIG. 1L illustrate perspective and side views demonstrating how the five-device-in-one water-and-leaf-separating leaf-filtering water-collecting wind-blocking wind-redirecting marine-yacht-land-yacht-balcony-bumper-and-trailer-hitch-mountable sail can be used as a sail on a wind-powered land vehicle.

FIG. 1M, FIG. 1N, and FIG. 1O illustrate side views demonstrating how the multi-angled semi-spherical-headed base-mounting bolts 130 and multi-angled semi-spherical-headed base-mounting nuts 131 can be hooked through the multi-angled double-beveled base-mounting holes 129 securing the multi-angled multi-surface-mountable multi-plate-connecting reversible stackable base 128 to provide options for installation.

FIG. 2A and FIG. 2B illustrate perspective views of multi-angled multi-surface-mountable multi-plate-connecting reversible stackable base 128, first post-stabilizing foot 132, second post-stabilizing foot 133, four weight securing toe-plates 134, and four base-stabilizing weights 135, respectively.

FIG. 3 illustrates a side view of the five-device-in-one water-and-leaf-separating leaf-filtering water-collecting wind-blocking wind-redirecting marine-yacht-land-yacht-balcony-bumper-and-trailer-hitch-mountable sail without secondary automatically-centered-and-reinforced ribs 109*a*.

FIG. 4 illustrates a top perspective view of how to use the sail-size-adjusting flaps 115 and rib-length-adjusting holes 110*c* to adjust the shape of the adjustable water-collecting wind-blocking privacy-screen ring sail 113.

FIG. 5 illustrates a perspective bottom view of four zipper pockets 114.

FIG. 6 illustrates a top perspective view of how to use the sail-size-adjusting flaps 115 and rib-length-adjusting holes 110*c* to adjust the shape of the adjustable water-collecting wind-blocking privacy-screen ring sail 113.

FIG. 12 and FIG. 13 illustrate side and perspective views of multi-angled semi-spherical-headed base-mounting bolts 130 and multi-angled semi-spherical-headed base-mounting nuts 131, respectively.

FIG. 30 illustrates a side view demonstrating the multi-angled multi-surface-mountable multi-plate-connecting reversible stackable base 128, multi-angled double-beveled base-mounting holes 129, multi-angled semi-spherical-headed base-mounting bolts 130, and multi-angled semi-spherical-headed base-mounting nuts 131.

FIG. 31A, FIG. 31B, and FIG. 31C illustrate side views demonstrating how the multi-angled semi-spherical-headed base-mounting bolts 130 and multi-angled semi-spherical-headed base-mounting nuts 131 can be inserted through the multi-angled double-beveled base-mounting holes 129 securing the multi-angled multi-surface-mountable multi-plate-connecting reversible stackable base 128 to provide options for installation.

FIG. 32, FIG. 33, and FIG. 34 illustrate how two connected five-device-in-one water-and-leaf-separating leaf-filtering water-collecting wind-blocking wind-redirecting marine-yacht-land-yacht-balcony-bumper-and-trailer-hitch-mountable sails can be configured by angling sail-multi-orienting snap-locking pivoting-elbow system 117, respectively.

FIG. 35 illustrates a top perspective view demonstrating how the sail-size-adjusting flaps 115 can be adjusted to draw the adjustable water-collecting wind-blocking privacy-screen ring sail 113 inward.

FIG. 36 illustrates a side view demonstrating how the adjustable water-collecting wind-blocking privacy-screen ring sail 113 collects water.

FIG. 37A and FIG. 37B illustrates a side view demonstrating how the Adjustable water-and-leaf-separating leaf-filtering central sail system 101 diverts water and filters leaves.

FIG. 63E, FIG. 63F, and FIG. 63G illustrate perspective and side views demonstrating how the five-device-in-one water-and-leaf-separating leaf-filtering water-collecting wind-blocking wind-redirecting marine-yacht-land-yacht-balcony-bumper-and-trailer-hitch-mountable sail can be installed on a wind-powered land vehicle to function as a sail.

DETAILED DESCRIPTION OF THE INVENTION

The five-device-in-one water-and-leaf-separating leaf-filtering water-collecting wind-blocking wind-redirecting marine-yacht-land-yacht-balcony-bumper-and-trailer-hitch-mountable sail comprises:
1) Adjustable water-and-leaf-separating leaf-filtering central sail system;
2) Adjustable water-collecting wind-blocking privacy-screen ring sail system;
3) Sail-multi-orienting snap-locking pivoting-elbow system; and
4) Multi-function marine-yacht-water-collecting land-yacht-wind-redirecting balcony-privacy-screen-providing bumper-hooking trailer-hitch-mounting base system.

System and Component

Figure 1A:
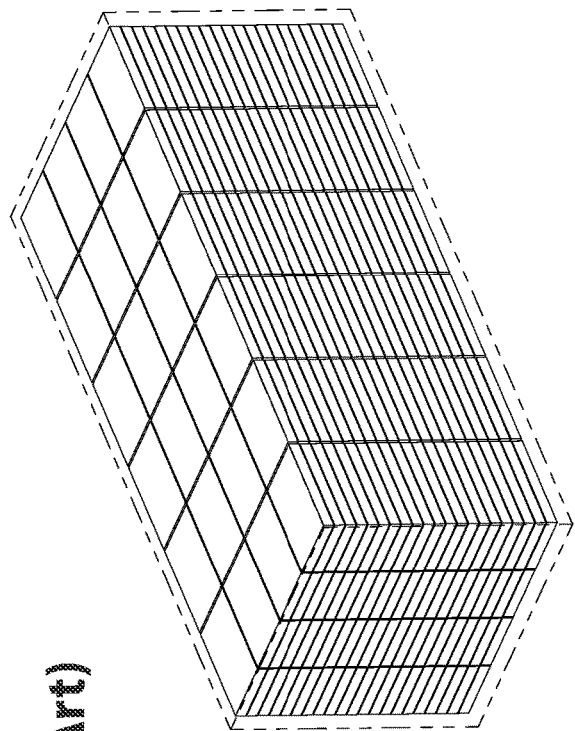
FIG. 1A (Prior Art) and FIG. 1B illustrate perspective views of the full amount of space inside a shipping container the prior art takes to ship, as opposed to a lot of less space taken by the multi-function double-sail umbrella.
Figure 1B:
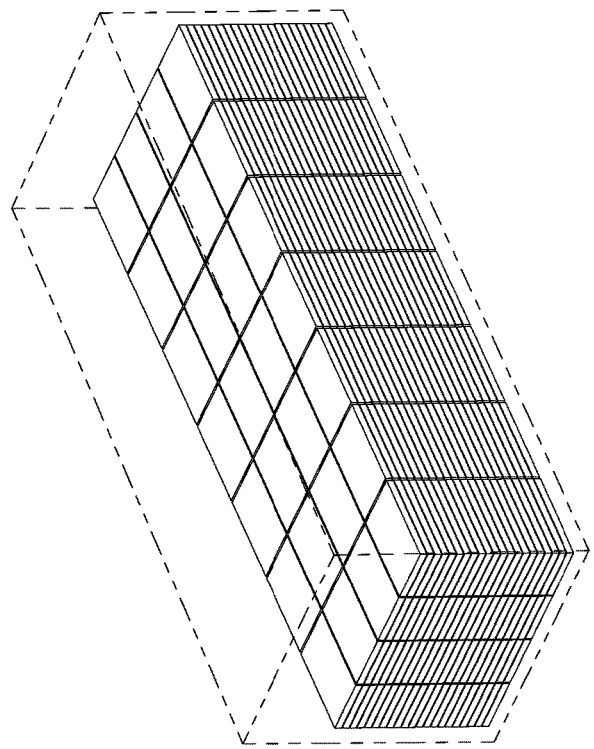
Figure 1D:
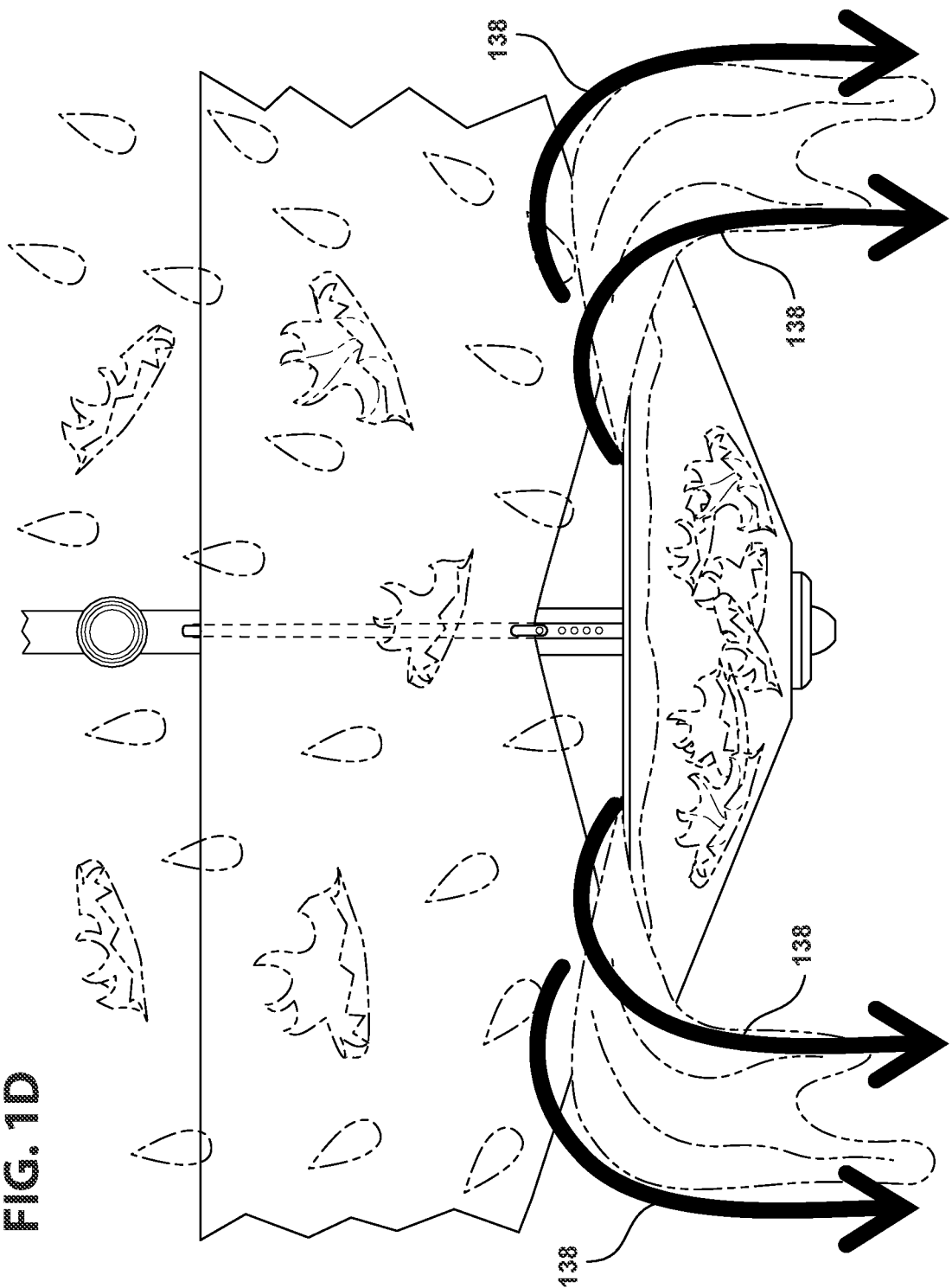
Figure 1E:
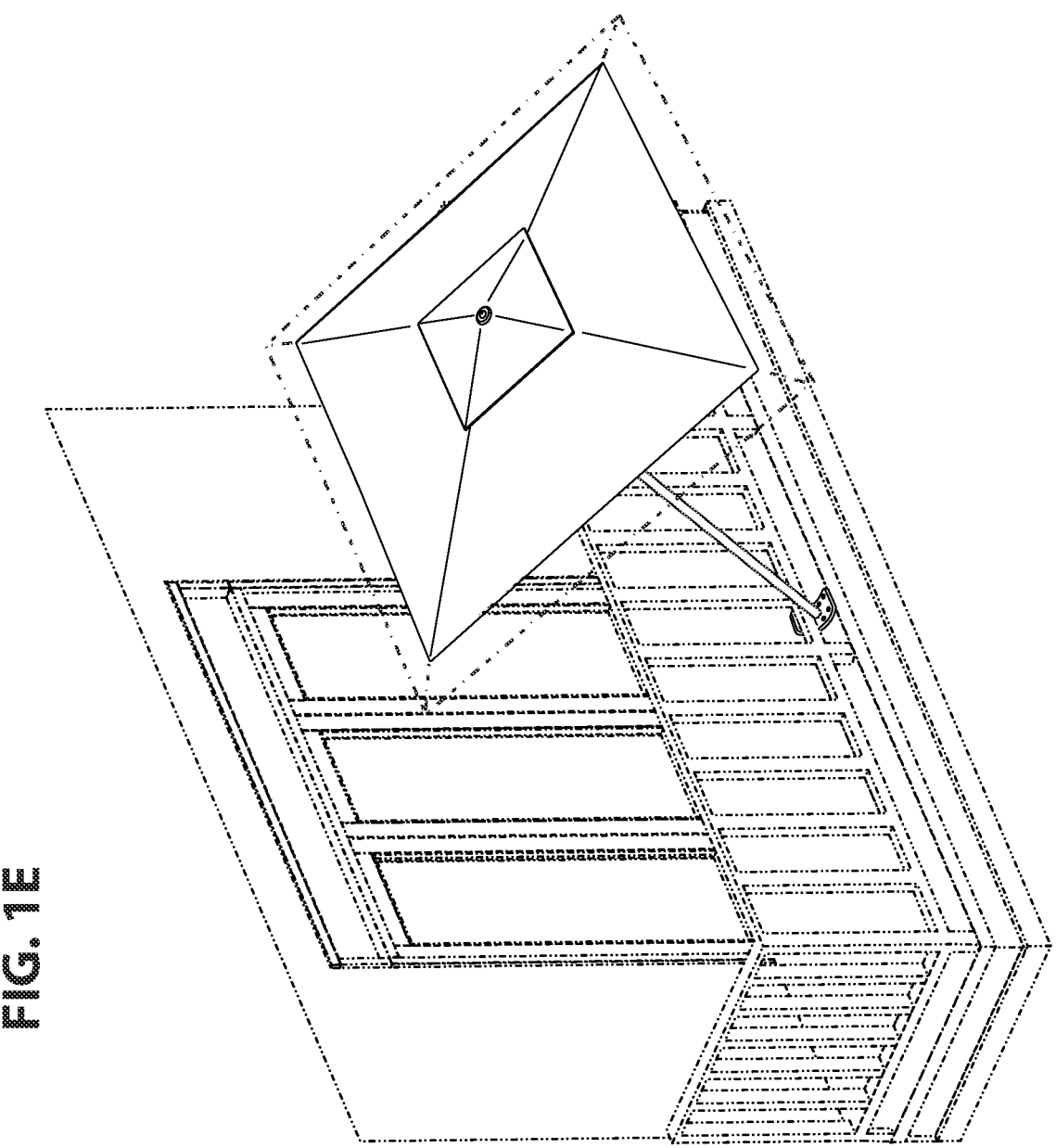
FIG. 1E illustrates a perspective view demonstrating how the five-device-in-one water-and-leaf-separating leaf-filtering water-collecting wind-blocking wind-redirecting marine-yacht-land-yacht-balcony-bumper-and-trailer-hitch-mountable sail can be installed under the railing of a balcony.
Figure 1F:
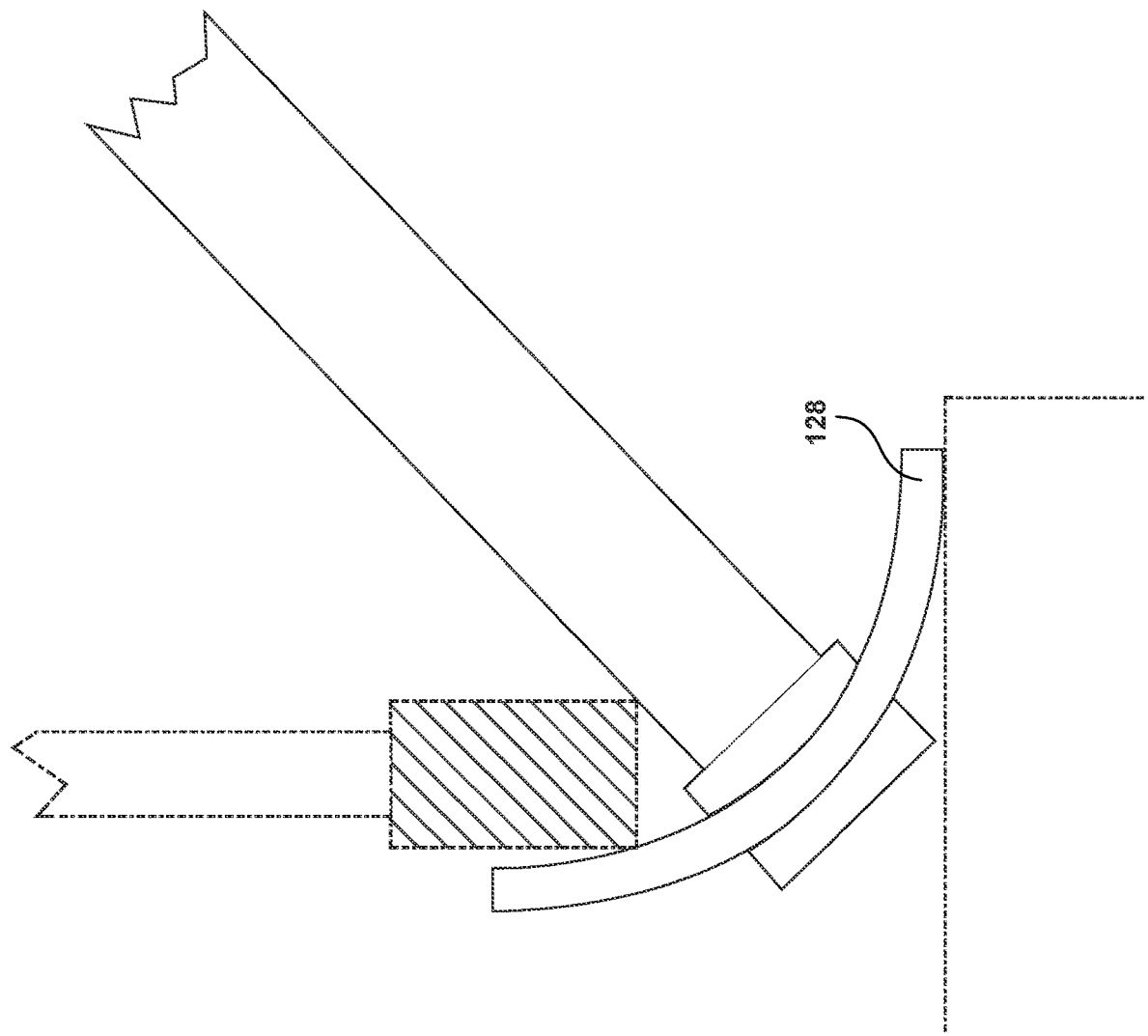
FIG. 1F illustrates a side cut-away view demonstrating how the multi-angled multi-surface-mountable multi-plate-connecting reversible stackable base 128 can be hooked underneath the bottom railing of a balcony or boat.
Figure 1G:
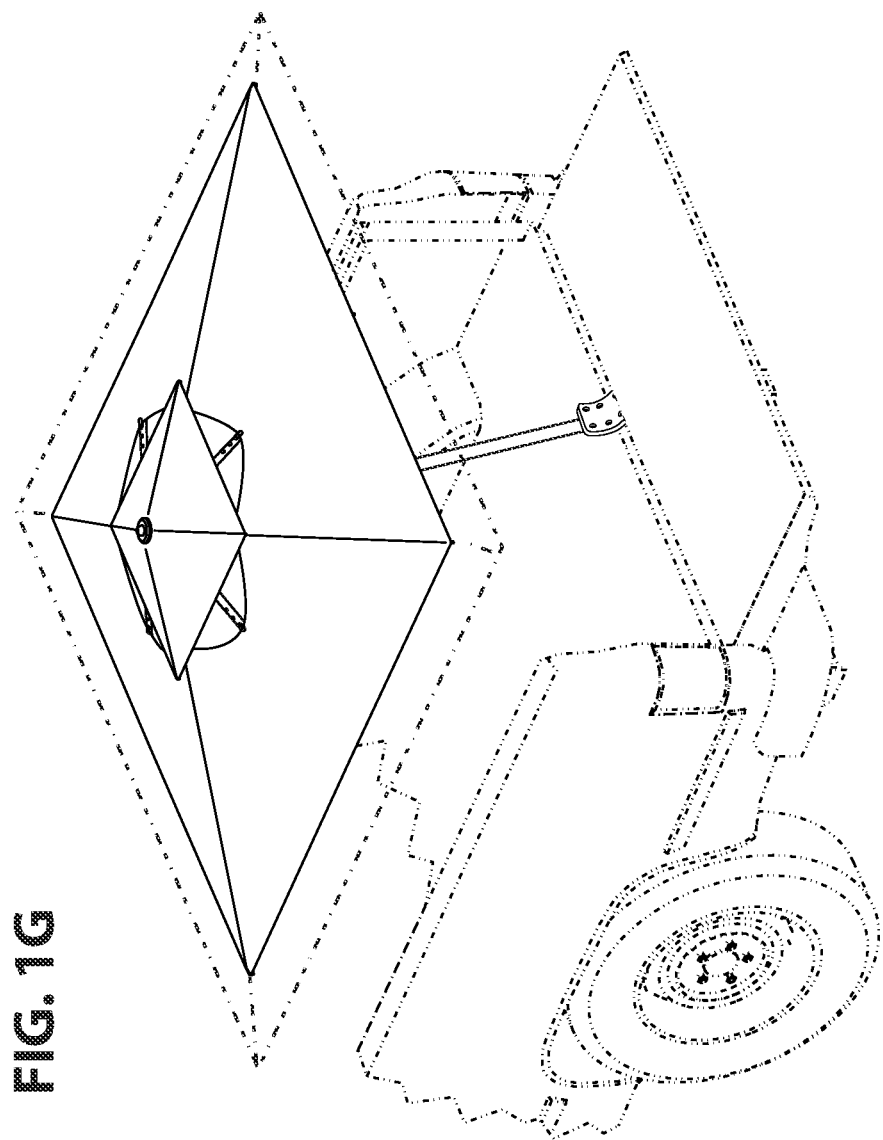
FIG. 1G illustrates a perspective view demonstrating how the multi-angled multi-surface-mountable multi-plate-connecting reversible stackable base 128 can be hooked into the gap of a truck tailgate.
Figure 1H:
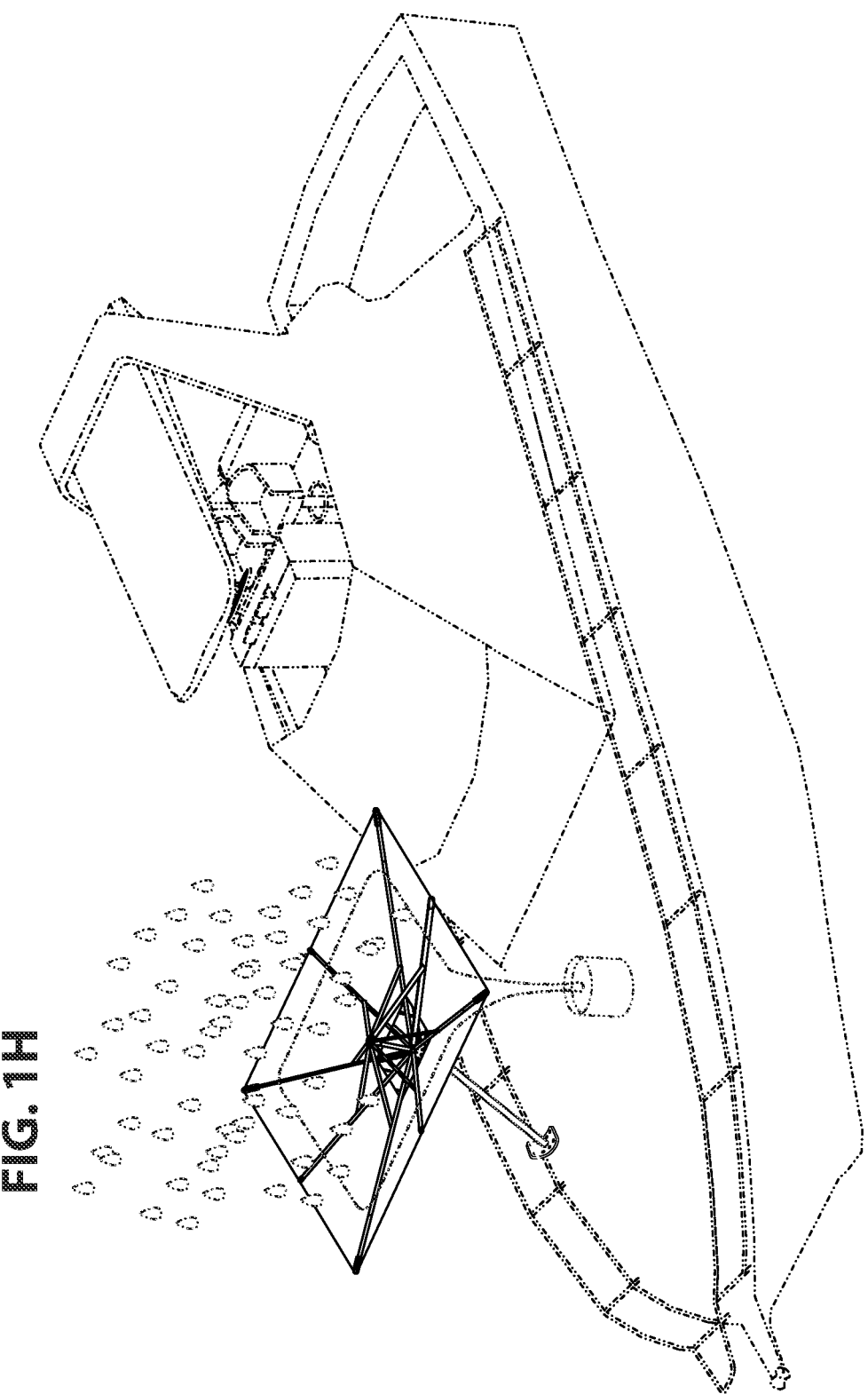
Figure 11:
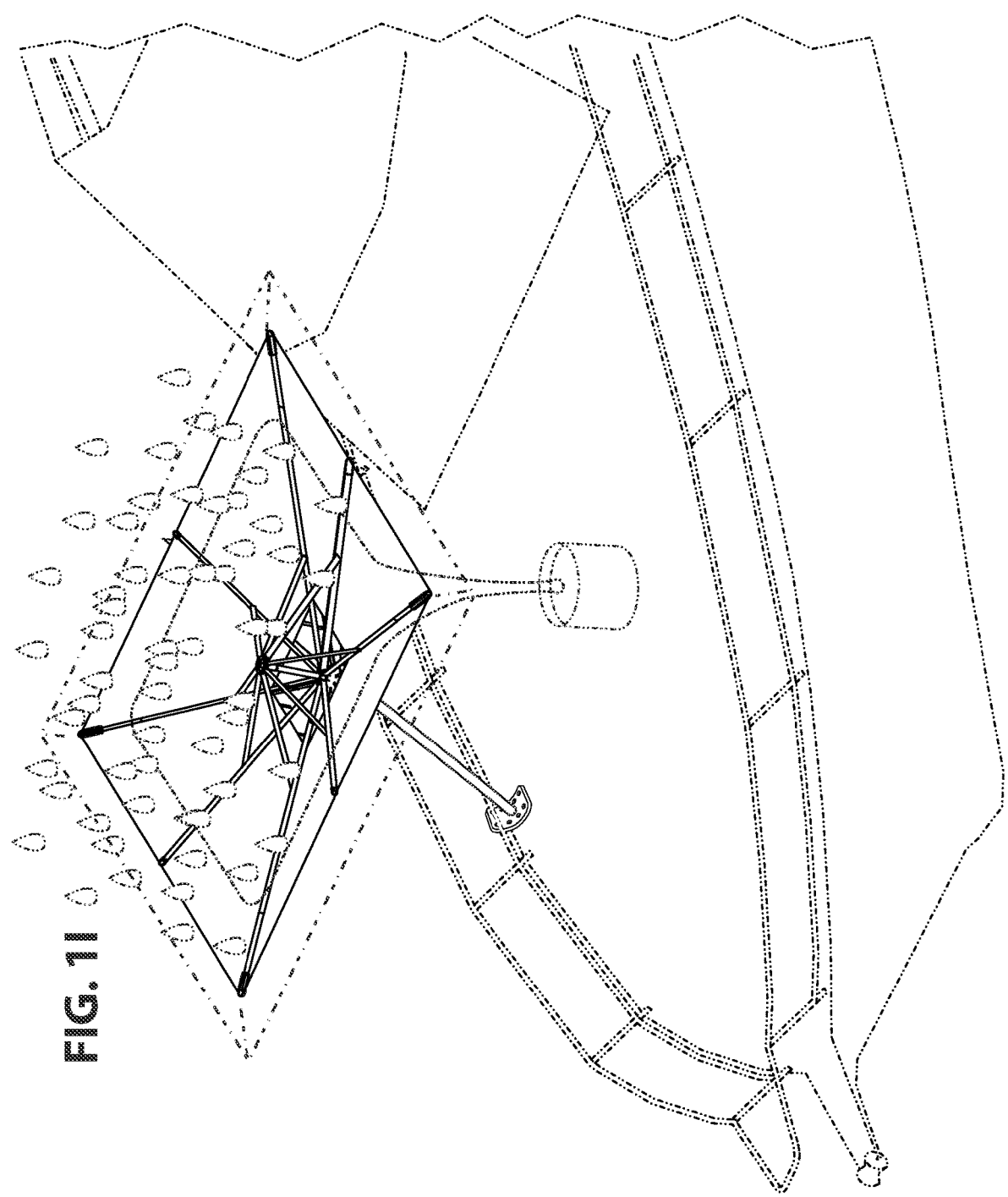
FIG. 10 and FIG. 11 illustrate close-up perspective views of how to use the sail-size-adjusting flaps 115 and rib-length-adjusting holes 116 to adjust the shape of the adjustable water-collecting wind-blocking privacy-screen ring sail 113.
Figure 1J:
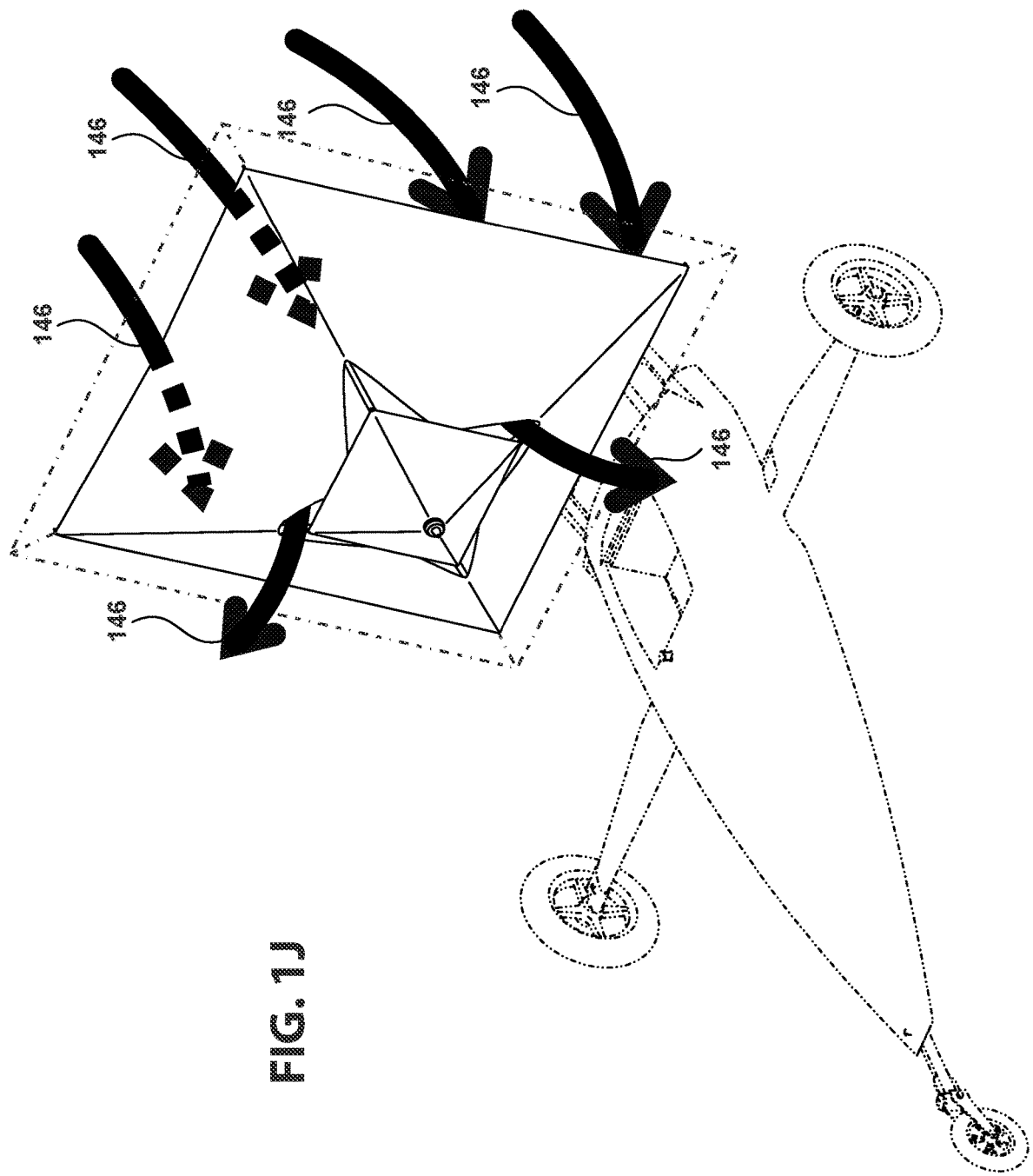
Figure 1N:
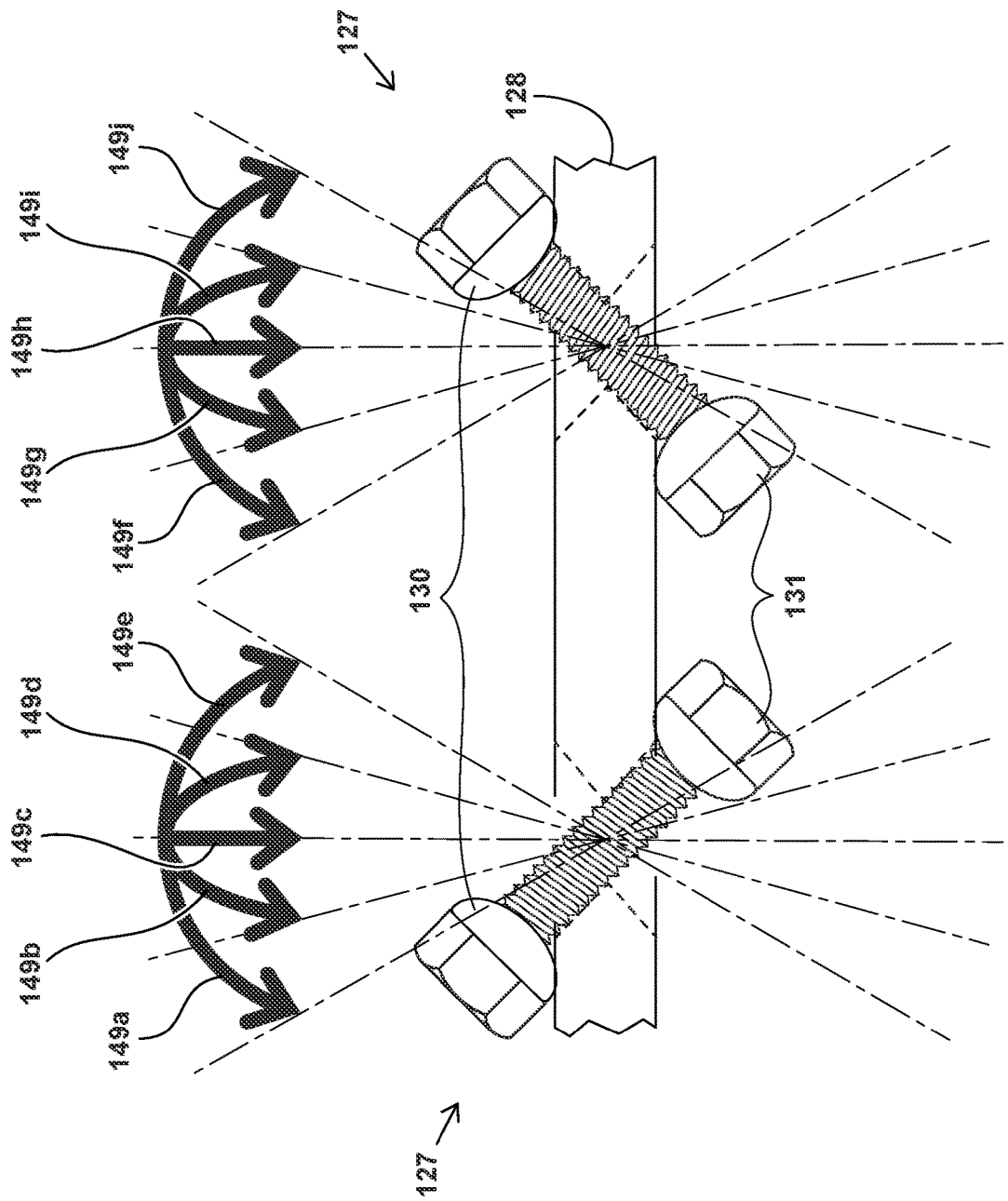
Figure 10:
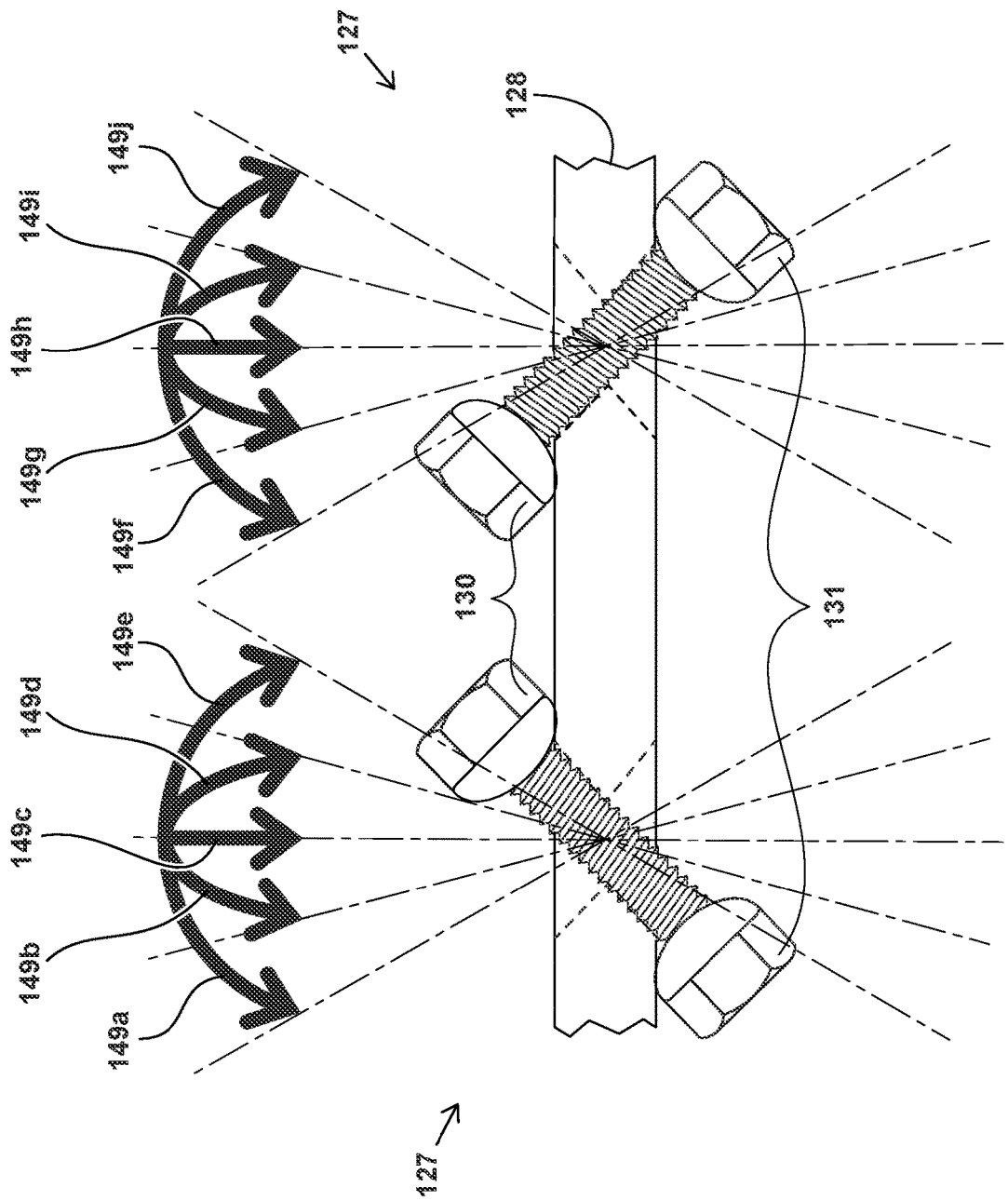
Figure 7:
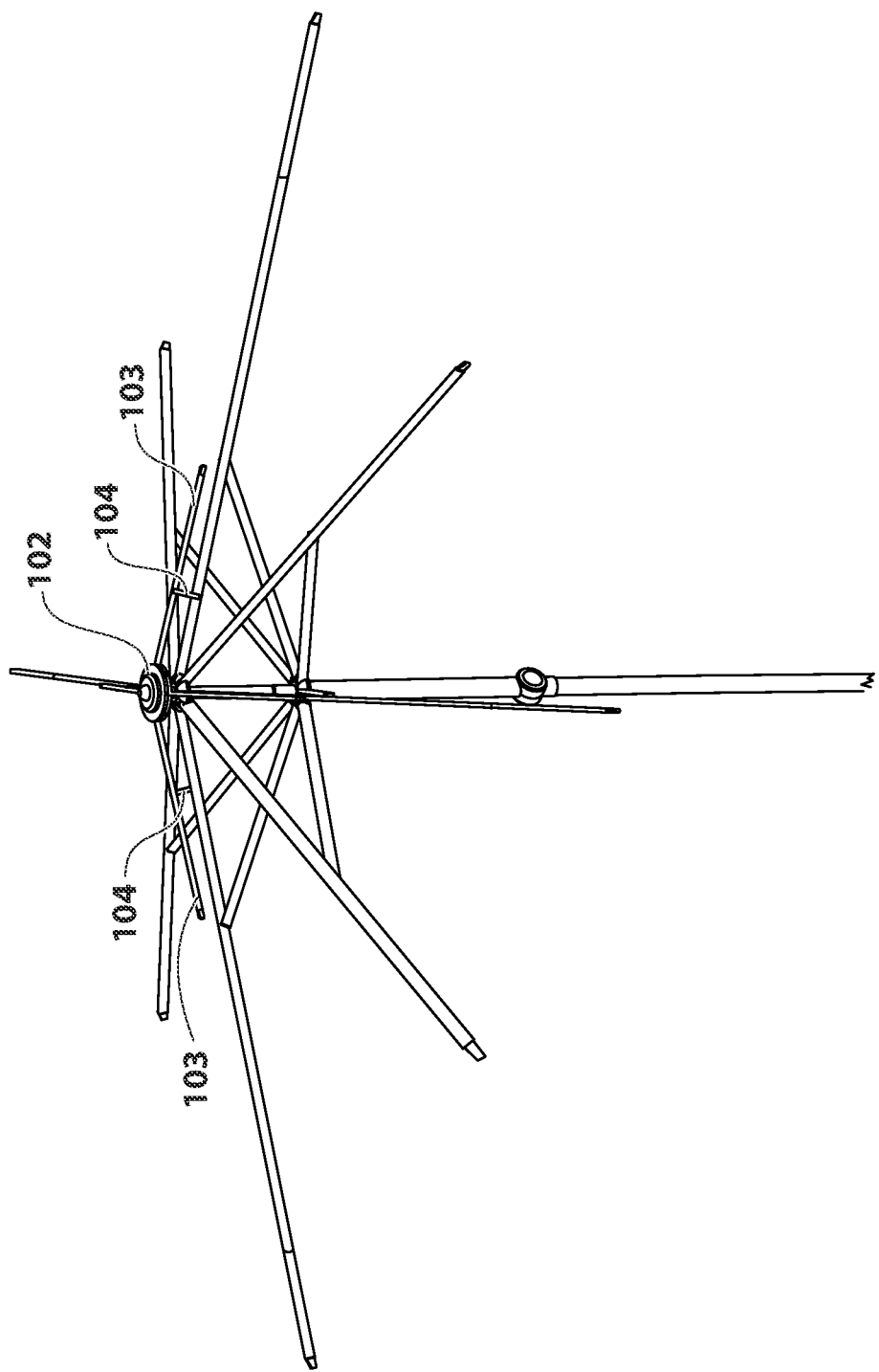
FIG. 7 illustrates a top perspective view of central-sail intersector 102, central-sail-supporting ribs 103, and central-sail-rib-raising arms 104, respectively.
Figure 8A:
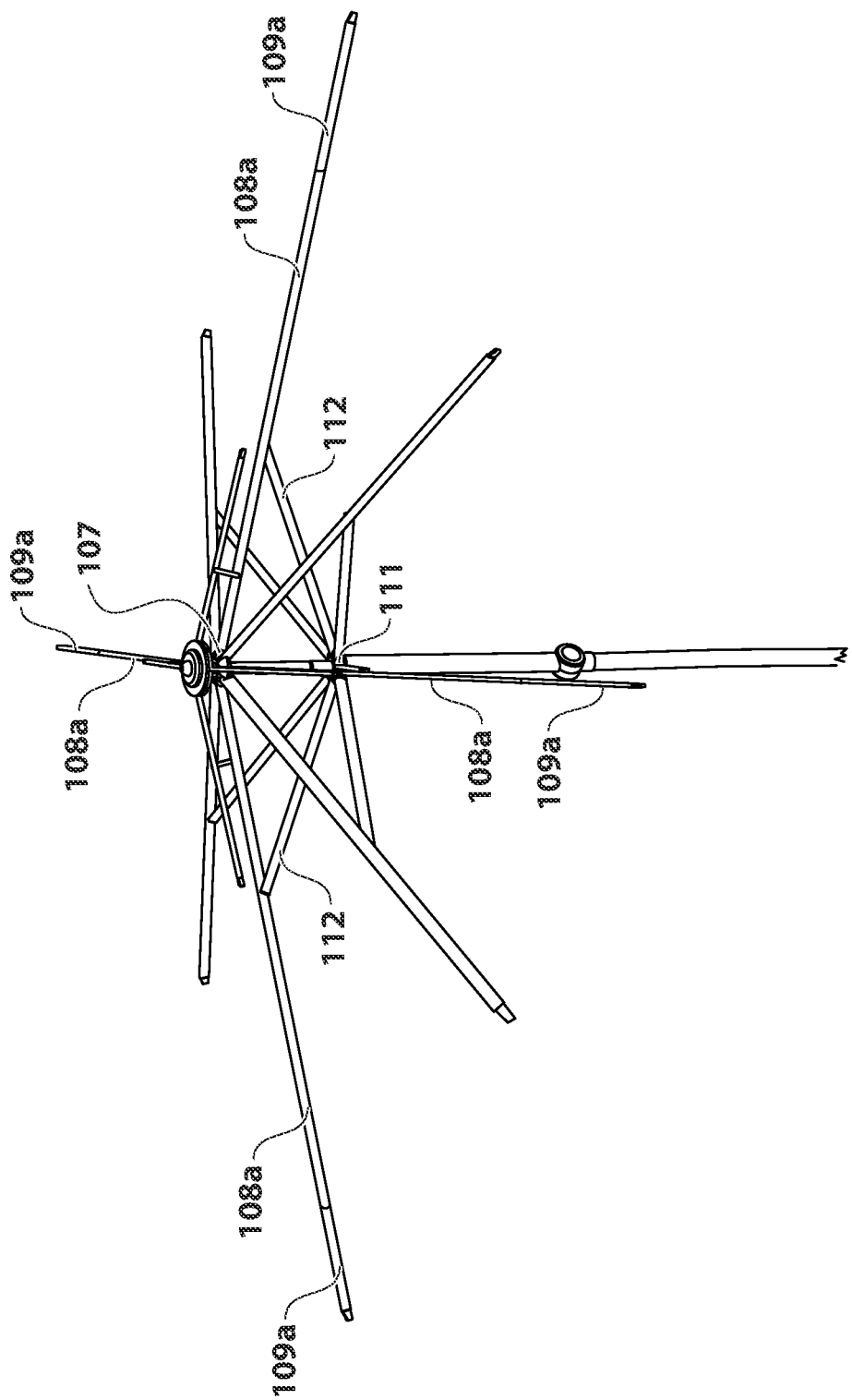
FIG. 8A illustrates a top perspective view of ring-sail-rib intersector 107, primary automatically-centered-and-reinforced ribs 108*a*, secondary automatically-centered-and-reinforced ribs 109*a*, ring-sail-arm intersector 111, and ring-sail-rib-raising arms 112, respectively.
Figure 8B:
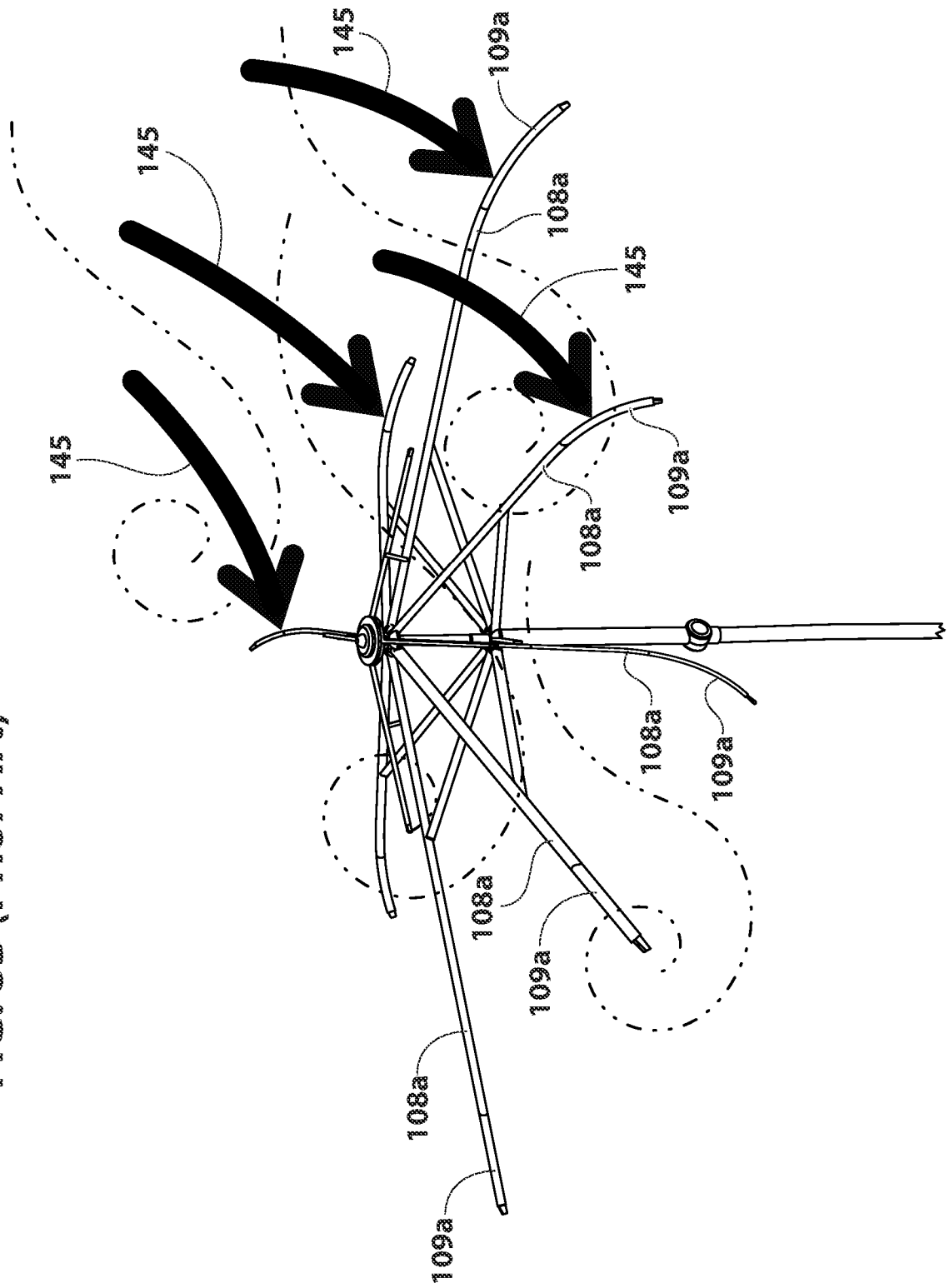
FIG. 8B (Prior Art) illustrates a perspective view demonstrating how sail ribs can be susceptible to bending when blown by wind.

Referring to FIG. 1A (Prior Art), FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 2A, FIG. 2B, FIG. 3, FIG. 4, FIG. 5, FIG. 6, FIG. 7, FIG. 8A, FIG. 8B (Prior Art), FIG. 9A, FIG. 9B, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31A, FIG. 31B, and FIG. 31C, the five-device-in-one water-and-leaf-separating leaf-filtering water-collecting wind-blocking wind-redirecting marine-yacht-land-yacht-balcony-bumper-and-trailer-hitch-mountable sail comprises:
1) Adjustable water-and-leaf-separating leaf-filtering central sail system 101 comprising (or each comprising):
2) Central-sail intersector 102,
3) Central-sail-supporting ribs 103,
4) Central-sail-rib-raising arms 104, and
5) Adjustable water-and-leaf-separating leaf-filtering central sail 105;
6) Adjustable water-collecting wind-blocking privacy-screen ring sail system 106 comprising (or each comprising):
7) Ring-sail-rib intersector 107,
8) Primary automatically-centered-and-reinforced ribs 108a,
   Primary automatic-rib-centering-and-reinforcing rail 108b,
9) Secondary automatically-centered-and-reinforced ribs 109a,
   Secondary automatic-rib-centering-and-reinforcing rail 109b,
10) Multi-rib-connecting automatically-centered-and-reinforced adjustable cores 110a,
    Automatic-core-centering-and-reinforcing rail 110b,
    Rib-length-adjusting holes 110c,
11) Ring-sail-arm intersector 111,
12) Ring-sail-rib-raising arms 112,
13) Adjustable water-collecting wind-blocking privacy-screen ring sail 113,
14) Four zipper pockets 114,
15) Sail-size-adjusting flaps 115, and
16) Sail-size-adjusting holes 116;
17) Sail-multi-orienting snap-locking pivoting-elbow system 117 comprising (or each comprising (or each comprising)):
18) Upper post 118,
19) Lower post 119,
20) Sail-multi-orienting snap-lock housing 120,
21) Snap-lock button 121,
22) Snap-lock-button pin 122,
23) Snap-lock-button spring 123,
24) Stationary snap-lock housing 124,
25) Adjustable multi-orienting pole-rotation-locking holes 125, and
26) Pole-rotation-locking screw 126;
27) Multi-function marine-yacht-water-collecting land-yacht-wind-redirecting balcony-privacy-screen-providing bumper-hooking trailer-hitch-mounting base system 127 comprising (or each comprising):
28) Multi-angled multi-surface-mountable multi-plate-connecting reversible stackable base 128,
29) Multi-angled double-beveled base-mounting holes 129,
30) Multi-angled semi-spherical-headed base-mounting bolts 130,
31) Multi-angled semi-spherical-headed base-mounting nuts 131,
32) First post-stabilizing foot 132,
33) Second post-stabilizing foot 133,
34) Four weight securing toe-plates 134, and
35) Four base-stabilizing weights 135.

Material

Referring to FIG. 1A (Prior Art), FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 2A, FIG. 2B, FIG. 3, FIG. 4, FIG. 5, FIG. 6, FIG. 7, FIG. 8A, FIG. 8B (Prior Art), FIG. 9A, FIG. 9B, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31A, FIG. 31B, and FIG. 31C:
1) Adjustable water-and-leaf-separating leaf-filtering central sail system 101 is made of the combined materials of its components.
2) Central-sail intersector 102
   is (or are each) made of plastic material.
3) Central-sail-supporting ribs 103
   is (or are each) made of metallic material.
4) Central-sail-rib-raising arms 104
   is (or are each) made of metallic material.
5) Adjustable water-and-leaf-separating leaf-filtering central sail 105
   is (or are each) made of nylon and/or fabric material.

6) Adjustable water-collecting wind-blocking privacy-screen ring sail system 106 is made of the combined materials of its components.
7) Ring-sail-rib intersector 107
is (or are each) made of plastic material.
8) Primary automatically-centered-and-reinforced ribs 108*a*
is (or are each) made of metallic material.
Primary automatic-rib-centering-and-reinforcing rail 108*b*
is (or are each) made of metallic material.
9) Secondary automatically-centered-and-reinforced ribs 109*a*
is (or are each) made of metallic material.
Secondary automatic-rib-centering-and-reinforcing rail 109*b*
is (or are each) made of metallic material.
10) Multi-rib-connecting automatically-centered-and-reinforced adjustable cores 110*a*
is (or are each) made of metallic or plastic material.
Automatic-core-centering-and-reinforcing rail 110*b*
is (or are each) made of metallic or plastic material.
Rib-length-adjusting holes 110*c*
is (or are each) made of empty space.
11) Ring-sail-arm intersector 111
is (or are each) made of plastic material.
12) Ring-sail-rib-raising arms 112
is (or are each) made of metallic material.
13) Adjustable water-collecting wind-blocking privacy-screen ring sail 113
is (or are each) made of nylon and/or fabric material.
14) Four zipper pockets 114
is (or are each) made of plastic, nylon, and/or fabric material.
15) Sail-size-adjusting flaps 115
is (or are each) made of leather, rubber, plastic, nylon, and/or fabric material.
16) Sail-size-adjusting holes 116
is (or are each) made of empty space.
17) Sail-multi-orienting snap-locking pivoting-elbow system 117 is made of the combined materials of its components.
18) Upper post 118
is (or are each) made of metallic material.
19) Lower post 119
is (or are each) made of metallic material.
20) Sail-multi-orienting snap-lock housing 120
is (or are each) made of plastic material.
21) Snap-lock button 121
is (or are each) made of metallic and/or plastic material.
22) Snap-lock-button pin 122
is (or are each) made of plastic and/or metallic material.
23) Snap-lock-button spring 123
is (or are each) made of metallic material.
24) Stationary snap-lock housing 124
is (or are each) made of plastic material.
25) Adjustable multi-orienting pole-rotation-locking holes 125
is (or are each) made of empty space.
26) Pole-rotation-locking screw 126
is (or are each) made of metallic material.
27) Multi-function marine-yacht-water-collecting land-yacht-wind-redirecting balcony-privacy-screen-providing bumper-hooking trailer-hitch-mounting base system 127 is made of the combined materials of its components.
28) Multi-angled multi-surface-mountable multi-plate-connecting reversible stackable base 128
is (or are each) made of metallic material.
29) Multi-angled double-beveled base-mounting holes 129
is (or are each) made of empty space.
30) Multi-angled semi-spherical-headed base-mounting bolts 130
is (or are each) made of metallic material.
31) Multi-angled semi-spherical-headed base-mounting nuts 131
is (or are each) made of metallic material.
32) First post-stabilizing foot 132
is (or are each) made of metallic material.
33) Second post-stabilizing foot 133
is (or are each) made of metallic material.
34) Four weight securing toe-plates 134
is (or are each) made of metallic material.
35) Four base-stabilizing weights 135
is (or are each) made of plastic and/or metallic material.

Shape

Referring to FIG. 1A (Prior Art), FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 2A, FIG. 2B, FIG. 3, FIG. 4, FIG. 5, FIG. 6, FIG. 7, FIG. 8A, FIG. 8B (Prior Art), FIG. 9A, FIG. 9B, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31A, FIG. 31B, and FIG. 31C:
1) Adjustable water-and-leaf-separating leaf-filtering central sail system 101 is made of the combined shapes of its components.
2) Central-sail intersector 102
is (or are each) formed into a round shape with a notched perimeter.
3) Central-sail-supporting ribs 103
is (or are each) formed into a tubular shape with an oval cross-section.
4) Central-sail-rib-raising arms 104
is (or are each) formed into a rectangular shape.
5) Adjustable water-and-leaf-separating leaf-filtering central sail 105
is (or are each) formed into a square shape.
6) Adjustable water-collecting wind-blocking privacy-screen ring sail system 106 is made of the combined shapes of its components.
7) Ring-sail-rib intersector 107
is (or are each) formed into a donut shape with a notched perimeter.
8) Primary automatically-centered-and-reinforced ribs 108*a*
is (or are each) formed into a tubular shape with an oval cross-section.
Primary automatic-rib-centering-and-reinforcing rail 108*b*
is (or are each) formed into a tubular U shape.
9) Secondary automatically-centered-and-reinforced ribs 109*a*
is (or are each) formed into a tubular shape with an oval cross-section.
Secondary automatic-rib-centering-and-reinforcing rail 109*b*
is (or are each) formed into a tubular U shape.
10) Multi-rib-connecting automatically-centered-and-reinforced adjustable cores 110*a*
is (or are each) formed into a tubular shape with a U shaped cross-section.
Automatic-core-centering-and-reinforcing rail 110*b*
is (or are each) formed into a tubular U shape.
Rib-length-adjusting holes 110*c*
is (or are each) formed into a circular shape.

11) Ring-sail-arm intersector 111
is (or are each) formed into a donut shape with a notched perimeter.
12) Ring-sail-rib-raising arms 112
is (or are each) formed into a tubular shape with an oval cross-section.
13) Adjustable water-collecting wind-blocking privacy-screen ring sail 113
is (or are each) formed into a square ring shape.
14) Four zipper pockets 114
is (or are each) formed into a triangular shape.
15) Sail-size-adjusting flaps 115
is (or are each) formed into a rectangular shape.
16) Sail-size-adjusting holes 116
is (or are each) formed into a circular shape.
17) Sail-multi-orienting snap-locking pivoting-elbow system 117 is made of the combined shapes of its components.
18) Upper post 118
is (or are each) formed into a tubular shape with an oval cross section.
19) Lower post 119
is (or are each) formed into a tubular shape with an oval cross section.
20) Sail-multi-orienting snap-lock housing 120
is (or are each) formed into a tubular shape with a tubular-shaped lower segment at a perpendicular orientation.
21) Snap-lock button 121
is (or are each) formed into a tubular shape with a closed end.
22) Snap-lock-button pin 122
is (or are each) formed into a tubular shape.
23) Snap-lock-button spring 123
is (or are each) formed into a spring shape.
24) Stationary snap-lock housing 124
is (or are each) formed into a tubular shape with a tubular-shaped upper segment at a perpendicular orientation.
25) Adjustable multi-orienting pole-rotation-locking holes 125
is (or are each) formed into a circular shape.
26) Pole-rotation-locking screw 126
is (or are each) formed into a screw shape.
27) Multi-function marine-yacht-water-collecting land-yacht-wind-redirecting balcony-privacy-screen-providing bumper-hooking trailer-hitch-mounting base system 127 is made of the combined shapes of its components.
28) Multi-angled multi-surface-mountable multi-plate-connecting reversible stackable base 128
is (or are each) formed into a square shape with radius corners.
29) Multi-angled double-beveled base-mounting holes 129
is (or are each) formed into a circular shape.
30) Multi-angled semi-spherical-headed base-mounting bolts 130
is (or are each) formed into an elongated threaded cylindrical shape with a hexagonal head with a semi-spherical end.
31) Multi-angled semi-spherical-headed base-mounting nuts 131
is (or are each) formed into a hexagonal shape with a semi-spherical end, the opposite end being flat, with a threaded central hole.
32) First post-stabilizing foot 132
is (or are each) formed into a formed into an I shape. A groove is formed into the undersurface of first post-stabilizing foot 132.
33) Second post-stabilizing foot 133
is (or are each) formed into an I shape. A groove is formed into the undersurface of second post-stabilizing foot 133.
34) Four weight securing toe-plates 134
is (or are each) formed into formed into a semi-oval shape with a recess. The lower portion below the recess of each of wedging plates 134 is bent to slidably fit behind the lower portion of an adjacent plate 134 of another multi-function umbrella.
35) Four base-stabilizing weights 135
is (or are each) formed into a triangular shape.

Connection

Referring to FIG. 1A (Prior Art), FIG. 1B, FIG. 1C, FIG. 1D, FIG. 1E, FIG. 1F, FIG. 1G, FIG. 1H, FIG. 1I, FIG. 1J, FIG. 1K, FIG. 1L, FIG. 1M, FIG. 1N, FIG. 1O, FIG. 2A, FIG. 2B, FIG. 3, FIG. 4, FIG. 5, FIG. 6, FIG. 7, FIG. 8A, FIG. 8B (Prior Art), FIG. 9A, FIG. 9B, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31A, FIG. 31B, and FIG. 31C:
1) Adjustable water-and-leaf-separating leaf-filtering central sail system 101 has the combined connections of its components.
2) Central-sail intersector 102
is (or are respectively)
attached to upper post 118.
3) Central-sail-supporting ribs 103
is (or are respectively)
pivotably connected to intersector 102.
4) Central-sail-rib-raising arms 104
is (or are respectively)
pivotably attached to central-sail-supporting ribs 103.
5) Adjustable water-and-leaf-separating leaf-filtering central sail 105
is (or are respectively)
attached to central-sail-supporting ribs 103.
6) Adjustable water-collecting wind-blocking privacy-screen ring sail system 106 has the combined connections of its components.
7) Ring-sail-rib intersector 107
is (or are respectively)
is connected to attached to upper post 118.
8) Primary automatically-centered-and-reinforced ribs 108a
is (or are respectively)
pivotably connected to ring-sail-rib intersector 107.
Primary automatic-rib-centering-and-reinforcing rail 108b
is (or are respectively)
formed into primary automatically-centered-and-reinforced ribs 108a.
9) Secondary automatically-centered-and-reinforced ribs 109a
is (or are respectively)
connected to multi-rib-connecting automatically-centered-and-reinforced adjustable cores 110a.
Secondary automatic-rib-centering-and-reinforcing rail 109b
is (or are respectively)
formed into secondary automatically-centered-and-reinforced ribs 109a.

10) Multi-rib-connecting automatically-centered-and-reinforced adjustable cores 110*a*
 is (or are respectively)
  inserted into and screwed to primary automatically-centered-and-reinforced ribs 108*a* and secondary automatically-centered-and-reinforced ribs 109*a*.
Automatic-core-centering-and-reinforcing rail 110*b*
 is (or are respectively)
  formed into multi-rib-connecting automatically-centered-and-reinforced adjustable cores 110*a*.
Rib-length-adjusting holes 110*c*
 is (or are respectively)
  drilled into primary automatically-centered-and-reinforced ribs 108*a*,
  secondary automatically-centered-and-reinforced ribs 109*a*, and multi-rib-connecting automatically-centered-and-reinforced adjustable cores 110*a*.
11) Ring-sail-arm intersector 111
 is (or are respectively)
  slidably attached to upper post 118 and
  foldably attached to ring-sail-rib-raising arms 112.
12) Ring-sail-rib-raising arms 112
 is (or are respectively)
  foldably attached to ring-sail-arm intersector 111.
13) Adjustable water-collecting wind-blocking privacy-screen ring sail 113
 is (or are respectively)
  attached to primary automatically-centered-and-reinforced ribs 108*a* and secondary automatically-centered-and-reinforced ribs 109*a*.
14) Four zipper pockets 114
 is (or are respectively)
  sewn to the corners of adjustable water-collecting wind-blocking privacy-screen ring sail 113.
15) Sail-size-adjusting flaps 115
 is (or are respectively)
  sewn to the inner edges of adjustable water-collecting wind-blocking privacy-screen ring sail 113.
16) Sail-size-adjusting holes 116
 is (or are respectively)
  drilled into primary automatically-centered-and-reinforced ribs 108*a*.
17) Sail-multi-orienting snap-locking pivoting-elbow system 117 has the combined connections of its components.
18) Upper post 118
 is (or are respectively)
  attached to the central-sail intersector 102.
19) Lower post 119
 is (or are respectively)
  attached stationary snap-lock housing 124.
20) Sail-multi-orienting snap-lock housing 120
 is (or are respectively)
  attached to upper post 118.
21) Snap-lock button 121
 is (or are respectively)
  attached to snap-lock-button pin 122.
22) Snap-lock-button pin 122
 is (or are respectively)
  springably attached to snap-lock-button spring 123.
23) Snap-lock-button spring 123
 is (or are respectively)
  attached to stationary snap-lock housing 124.
24) Stationary snap-lock housing 124
 is (or are respectively)
  attached to lower post 119.
25) Adjustable multi-orienting pole-rotation-locking holes 125
 is (or are respectively)
  drilled through upper post 118.
26) Pole-rotation-locking screw 126
 is (or are respectively)
  interchangeably inserted into adjustable multi-orienting pole-rotation-locking holes 125.
27) Multi-function marine-yacht-water-collecting land-yacht-wind-redirecting balcony-privacy-screen-providing bumper-hooking trailer-hitch-mounting base system 127 has the combined connections of its components.
28) Multi-angled multi-surface-mountable multi-plate-connecting reversible stackable base 128
 is (or are respectively)
  attached to lower post 119.
29) Multi-angled double-beveled base-mounting holes 129
 is (or are respectively)
  drilled out of multi-angled multi-surface-mountable multi-plate-connecting reversible stackable base 128.
30) Multi-angled semi-spherical-headed base-mounting bolts 130
 is (or are respectively)
  inserted into multi-angled multi-surface-mountable multi-plate-connecting reversible stackable base 128.
31) Multi-angled semi-spherical-headed base-mounting nuts 131
 is (or are respectively)
  threadedly attached to multi-angled semi-spherical-headed base-mounting bolts 130.
32) First post-stabilizing foot 132
 is (or are respectively)
  bolted to multi-angled multi-surface-mountable multi-plate-connecting reversible stackable base 128.
33) Second post-stabilizing foot 133
 is (or are respectively)
  bolted to multi-angled multi-surface-mountable multi-plate-connecting reversible stackable base 128.
34) Four weight securing toe-plates 134
 is (or are respectively)
  welded to first post-stabilizing foot 132 and second post-stabilizing foot 133.
35) Four base-stabilizing weights 135
 is (or are respectively)
  attached to first post-stabilizing foot 132 and second post-stabilizing foot 133.
Function
 Referring to FIG. 4, FIG. 5, FIG. 6, FIG. 7, FIG. 8A, FIG. 8B (Prior Art), FIG. 9A, FIG. 9B, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31A, FIG. 31B, FIG. 31C, FIG. 32, FIG. 33, FIG. 34, FIG. 35, FIG. 36, FIG. 37A, FIG. 37B, FIG. 38A (Prior Art), FIG. 38B, FIG. 39, FIG. 40, FIG. 41, FIG. 42, FIG. 43A, FIG. 43B, FIG. 44, FIG. 45, FIG. 46, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, FIG. 60, FIG. 61, FIG. 62A, FIG. 62B, FIG. 63A, FIG. 63B, FIG. 63C, FIG. 63D, FIG. 63E, FIG. 63F, FIG. 63G, FIG. 63H, FIG. 63I, FIG. 63J, FIG. 63K, and FIG. 63L:

1) Adjustable water-and-leaf-separating leaf-filtering central sail system 101 is for performing the combined functions of its components.
2) Central-sail intersector 102
   is (or are respectively) for:
   Connecting upper post 118 to central-sail-supporting ribs 103.
3) Central-sail-supporting ribs 103
   is (or are respectively) for:
   Folding and unfolding adjustable water-and-leaf-separating leaf-filtering central sail 105.
4) Central-sail-rib-raising arms 104
   is (or are respectively) for:
   a) Supporting central-sail-supporting ribs 103
      to provide adjustable water-and-leaf-separating leaf-filtering central sail 105 structural support;
   b) Hingedly connecting central-sail-supporting ribs 103 and primary ring-sail-supporting ribs 108
      to provide structural support; and
   c) Hingedly connecting central-sail-supporting ribs 103 and primary ring-sail-supporting ribs 108
      to help make folding the multi-function double-sail umbrella easier.
5) Adjustable water-and-leaf-separating leaf-filtering central sail 105
   is (or are respectively) for:
   a) Functioning as a water diverting device
      to predeterminately redirect the flow of water
      in the directions of arrows 136 and 137
      (see FIG. 36);
   b) Functioning as a leaf filtering device
      to filter leaves from rain water when used upside down
      in the direction of arrow 138
      (see FIG. 37A and FIG. 37B);
   c) Functioning as a water collector
      to collect rain water when used upside down
      in the directions of arrows 136 and 137
      (see FIG. 36);
   d) Functioning as a wind blocker
      to block wind
      (see FIG. 58 and FIG. 60);
   e) Functioning as a privacy screen
      to provide privacy
      (see FIG. 57);
   f) Functioning as an awning
      to angledly block rain and sun beams
      (see FIG. 53);
   g) Functioning as a canopy
      to vertically block rain and sun beams
      (see FIG. 53);
   h) Functioning as a wind redirector
      to redirect wind in and out of sail
      in the directions of arrows 139, 140, 141, and 142
      (see FIG. 39, and FIG. 40); and
   i) Functioning as a sail-steering wind-powered device
      to steer the sail in multiple different directions
      in the directions of arrows 143 and 144
      (see FIG. 41, FIG. 63E, FIG. 63F, and FIG. 63G).
6) Adjustable water-collecting wind-blocking privacy-screen ring sail system 106 is for performing the combined functions of its components.
7) Ring-sail-rib intersector 107
   is (or are respectively) for:
   Connecting upper post 118 to primary ring-sail-supporting ribs 108.
8) Primary automatically-centered-and-reinforced ribs 108a
   is (or are respectively) for:
   a) Resisting bending and warping due to heavy winds
      in the direction of arrow 145
      (see FIG. 38A (Prior Art);
   b) Providing reinforced infrastructure for a sail when used on a wind-powered land vehicle
      in the direction of arrow 146
      (see FIG. 63E, FIG. 63F, and FIG. 63G);
   c) Providing reinforced infrastructure for an emergency rainwater collecting device on a marine vessel
      (see FIG. 63C and FIG. 63D); and
   d) Providing reinforced infrastructure for a shade canopy.
Primary automatic-rib-centering-and-reinforcing rail 108b
   is (or are respectively) for:
   a) Resisting bending and warping due to heavy winds
      in the direction of arrow 145
      (see FIG. 38A (Prior Art);
   b) Providing reinforced infrastructure for a sail when used on a wind-powered land vehicle
      in the direction of arrow 146
      (see FIG. 63E, FIG. 63F, and FIG. 63G);
   c) Providing reinforced infrastructure for an emergency rainwater collecting device on a marine vessel
      (see FIG. 63C and FIG. 63D); and
   d) Providing reinforced infrastructure for a shade canopy.
9) Secondary automatically-centered-and-reinforced ribs 109a
   is (or are respectively) for:
   a) Resisting bending and warping due to heavy winds
      in the direction of arrow 145
      (see FIG. 38A (Prior Art);
   b) Providing reinforced infrastructure for a sail when used on a wind-powered land vehicle
      in the direction of arrow 146
      (see FIG. 63E, FIG. 63F, and FIG. 63G);
   c) Providing reinforced infrastructure for an emergency rainwater collecting device on a marine vessel
      (see FIG. 63C and FIG. 63D); and
   d) Providing reinforced infrastructure for a shade canopy.
Secondary automatic-rib-centering-and-reinforcing rail 109b
   is (or are respectively) for:
   a) Resisting bending and warping due to heavy winds
      in the direction of arrow 146
      (see FIG. 63E, FIG. 63F, and FIG. 63G);
   b) Providing reinforced infrastructure for a sail when used on a wind-powered land vehicle
      in the direction of arrow 146
      (see FIG. 63E, FIG. 63F, and FIG. 63G);
   c) Providing reinforced infrastructure for an emergency rainwater collecting device on a marine vessel
      (see FIG. 63C and FIG. 63D); and
   d) Providing reinforced infrastructure for a shade canopy.
10) Multi-rib-connecting automatically-centered-and-reinforced adjustable cores 110a is (or are respectively) for:
   a) Allowing manufacturers to horten long ribs into shorter primary ring-sail-supporting ribs 108a and shorter secondary ring-sail-supporting ribs 109a
      to reduce the length and volume of the shipping package of the five-device-in-one water-and-leaf-separating leaf-filtering water-collecting wind-blocking wind-redirecting marine-yacht-land-yacht-balcony-bumper-and-trailer-hitch-mountable sail in a shipping container to save money from expensive shipping costs
      (see FIG. 1A (Prior Art); and
   b) Securely and reinforcingly connecting ring-sail-supporting ribs 108a to secondary ring-sail-supporting ribs 109a to provide strength and structure to the five-device-in-one water-and-leaf-separating leaf-filtering water-collecting wind-blocking wind-redirecting marine-yacht-land-yacht-balcony-bumper-and-trailer-hitch-mountable sail
(see FIG. 9A and FIG. 9B).

Automatic-core-centering-and-reinforcing rail 110*b*
is (or are respectively) for:
a) Resisting bending and warping due to heavy winds
in the direction of arrow 146
(see FIG. 63E, FIG. 63F, and FIG. 63G);
b) Providing reinforced infrastructure for a sail when used on a wind-powered land vehicle
in the direction of arrow 146
(see FIG. 63E, FIG. 63F, and FIG. 63G);
c) Providing reinforced infrastructure for an emergency rainwater collecting device on a marine vessel
(see FIG. 63C and FIG. 63D); and
d) Providing reinforced infrastructure for a shade canopy.

Rib-length-adjusting holes 110*c*
is (or are respectively) for:
Adjusting primary ring-sail-supporting ribs 108*a*, secondary ring-sail-supporting ribs 109*a*, and multi-rib-connecting automatically-centered-and-reinforced adjustable cores 110*a*
to adjust primary ring-sail-supporting ribs 108*a*, and secondary ring-sail-supporting ribs 109*a*, to different lengths, and to adjust adjustable water-collecting wind-blocking privacy-screen ring sail 113 to multiple different sizes
(see FIG. 10 and FIG. 11).

11) Ring-sail-arm intersector 111
is (or are respectively) for:
Slidably connecting upper post 118 to ring-sail-rib-raising arms 112.

12) Ring-sail-rib-raising arms 112
is (or are respectively) for:
Primary ring-sail-supporting ribs 108*a* and secondary ring-sail-supporting ribs 109*a*.

Figure 41:
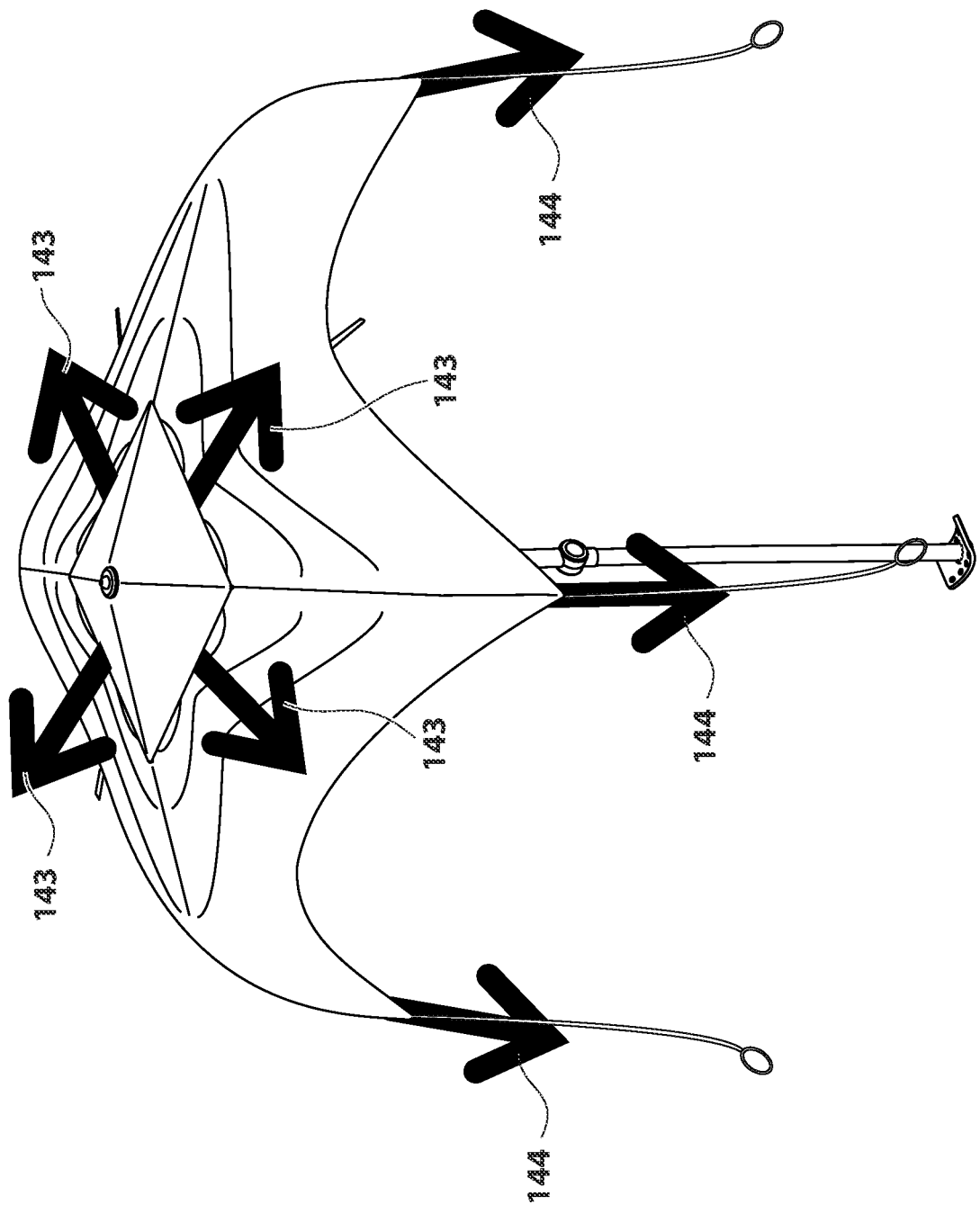
FIG. 41 illustrates a side view demonstrating how the adjustable water-and-leaf-separating leaf-filtering central sail system 101 and adjustable water-collecting wind-blocking privacy-screen ring sail system 106 can have tension released by removing secondary automatically-centered-and-reinforced ribs 109*a*, respectively.
Figure 42:
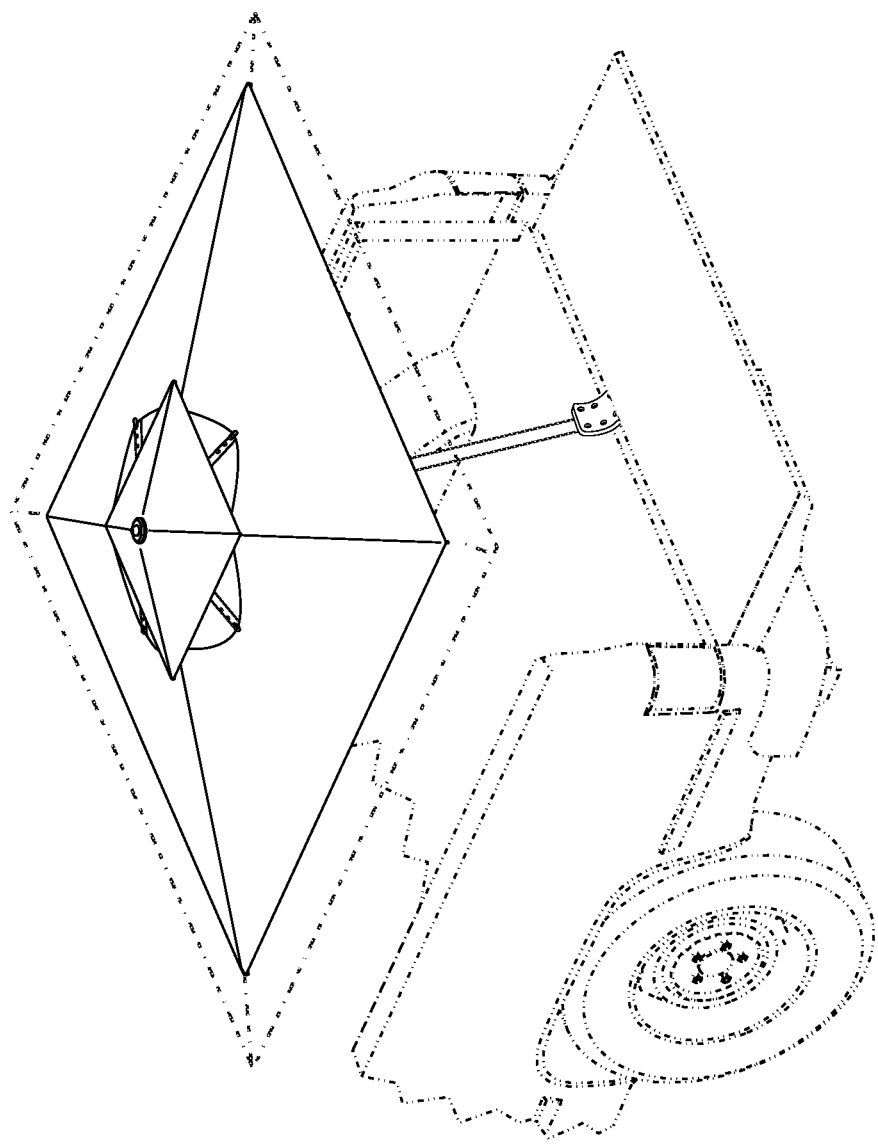
FIG. 42 illustrates a perspective view demonstrating how the five-device-in-one water-and-leaf-separating leaf-filtering water-collecting wind-blocking wind-redirecting marine-yacht-land-yacht-balcony-bumper-and-trailer-hitch-mountable sail can be attached to the gap of a truck tailgate by the multi-angled multi-surface-mountable multi-plate-connecting reversible stackable base 128.
Figure 43A:
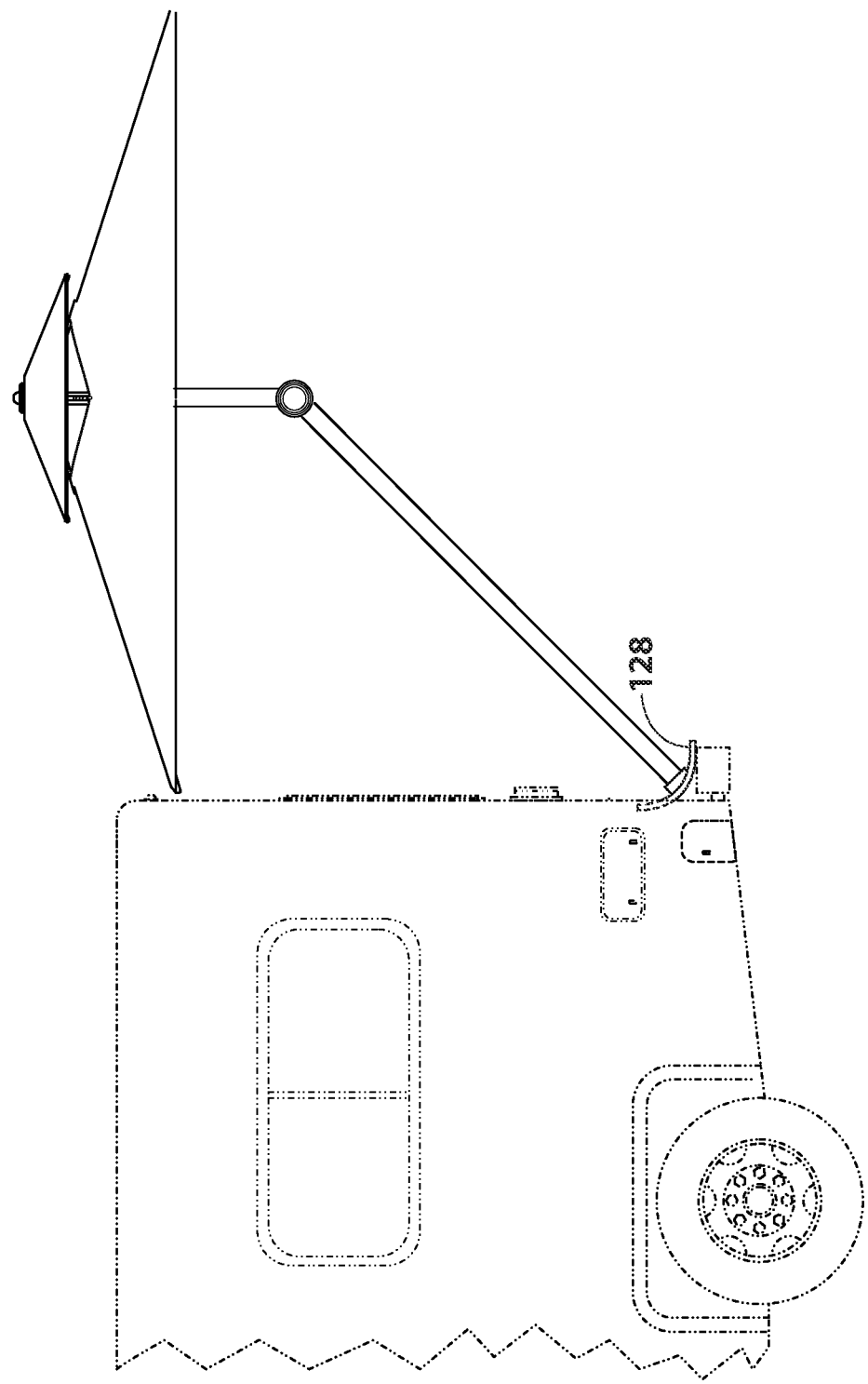
FIG. 43A, FIG. 43B, FIG. 44, FIG. 45, FIG. 46, and FIG. 47 illustrate side views demonstrating how five-device-in-one water-and-leaf-separating leaf-filtering water-collecting wind-blocking wind-redirecting marine-yacht-land-yacht-balcony-bumper-and-trailer-hitch-mountable sails can be attached and configured in multiple orientations on a recreational vehicle and a pick-up truck using the multi-angled multi-surface-mountable multi-plate-connecting reversible stackable base 128.
Figure 43B:
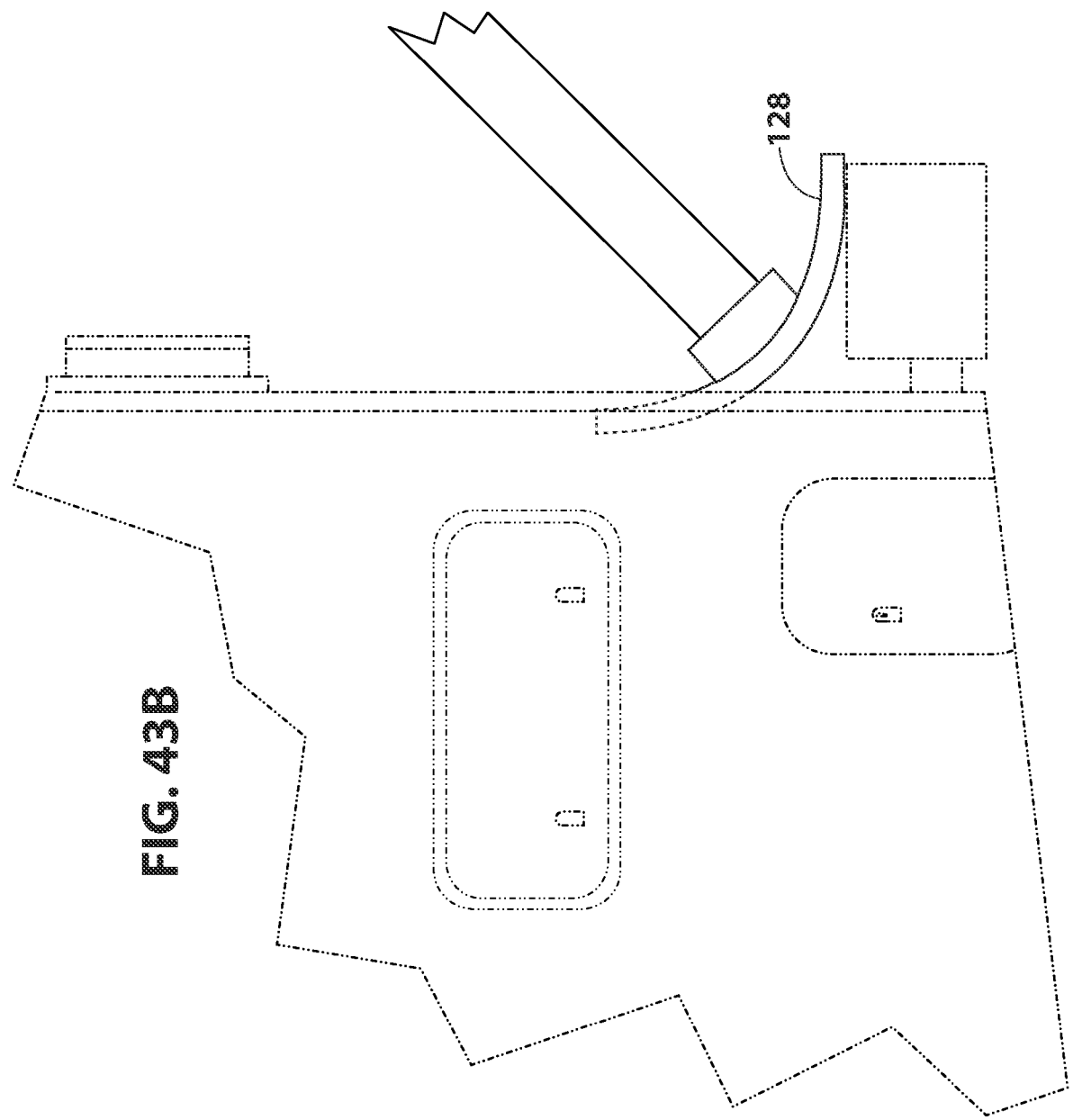
Figure 44:
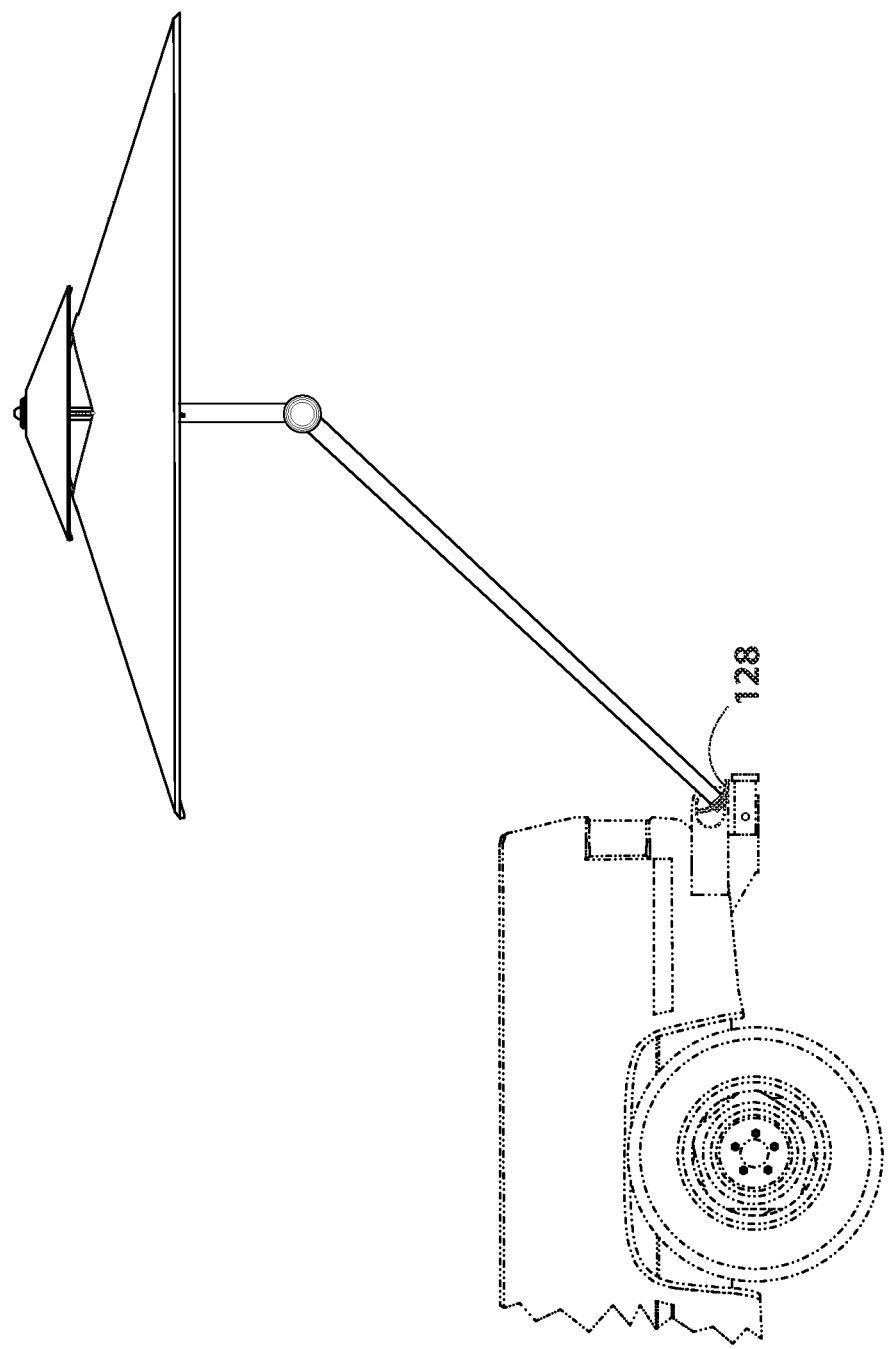
Figure 45:
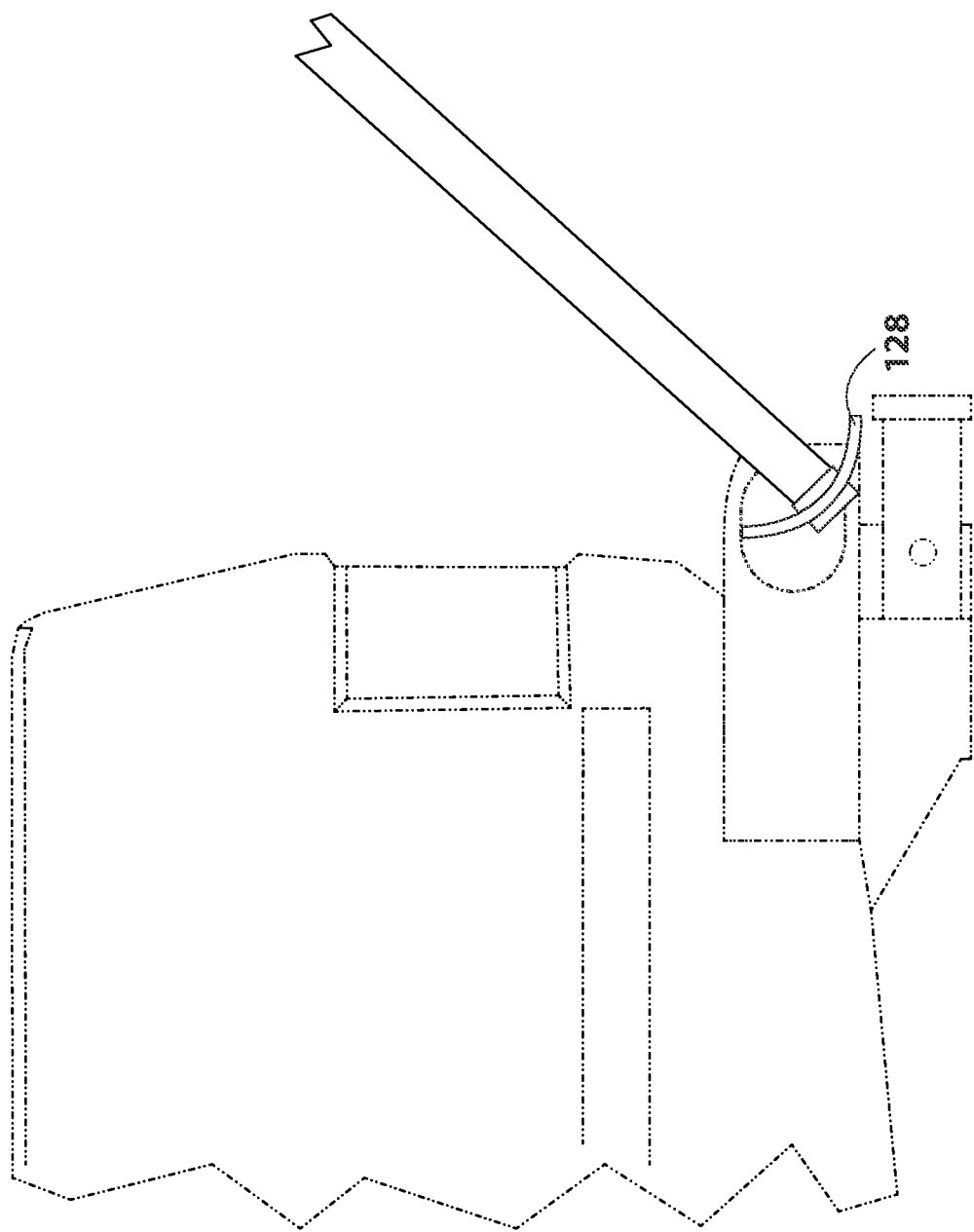
Figure 46:
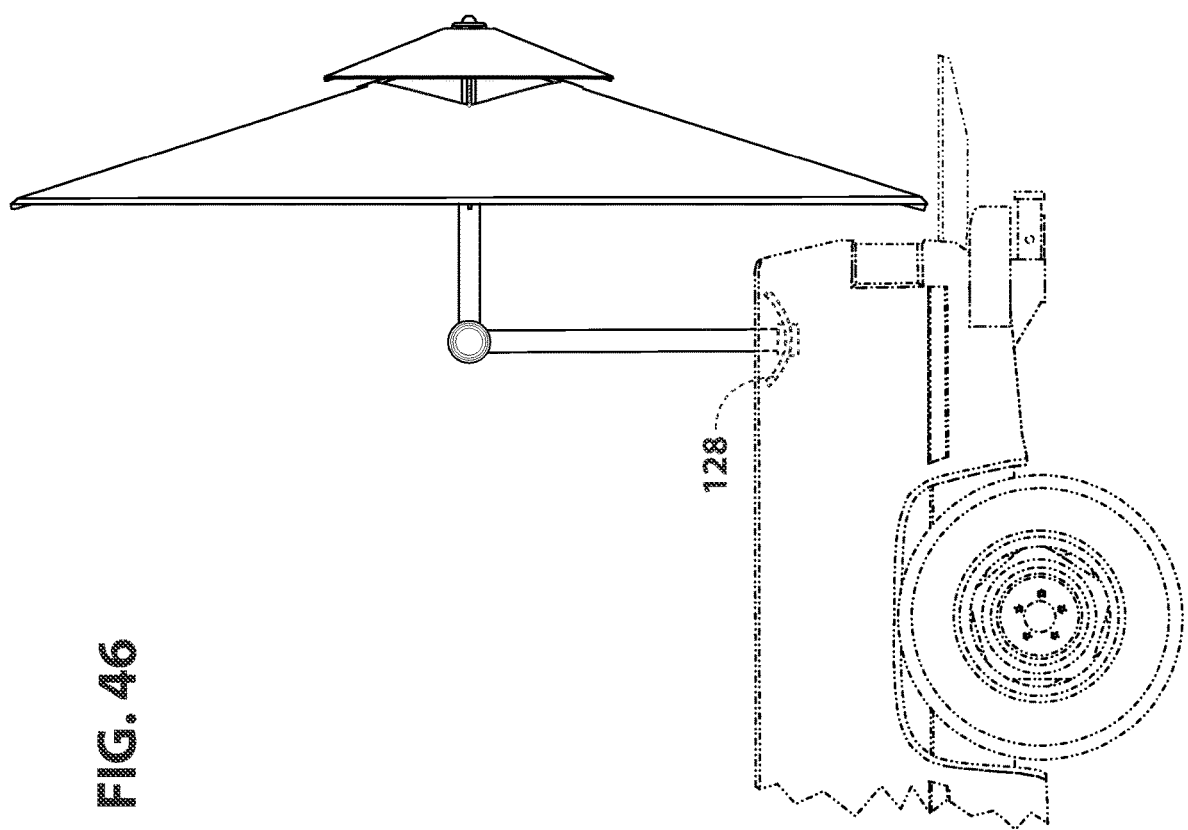
Figure 47:
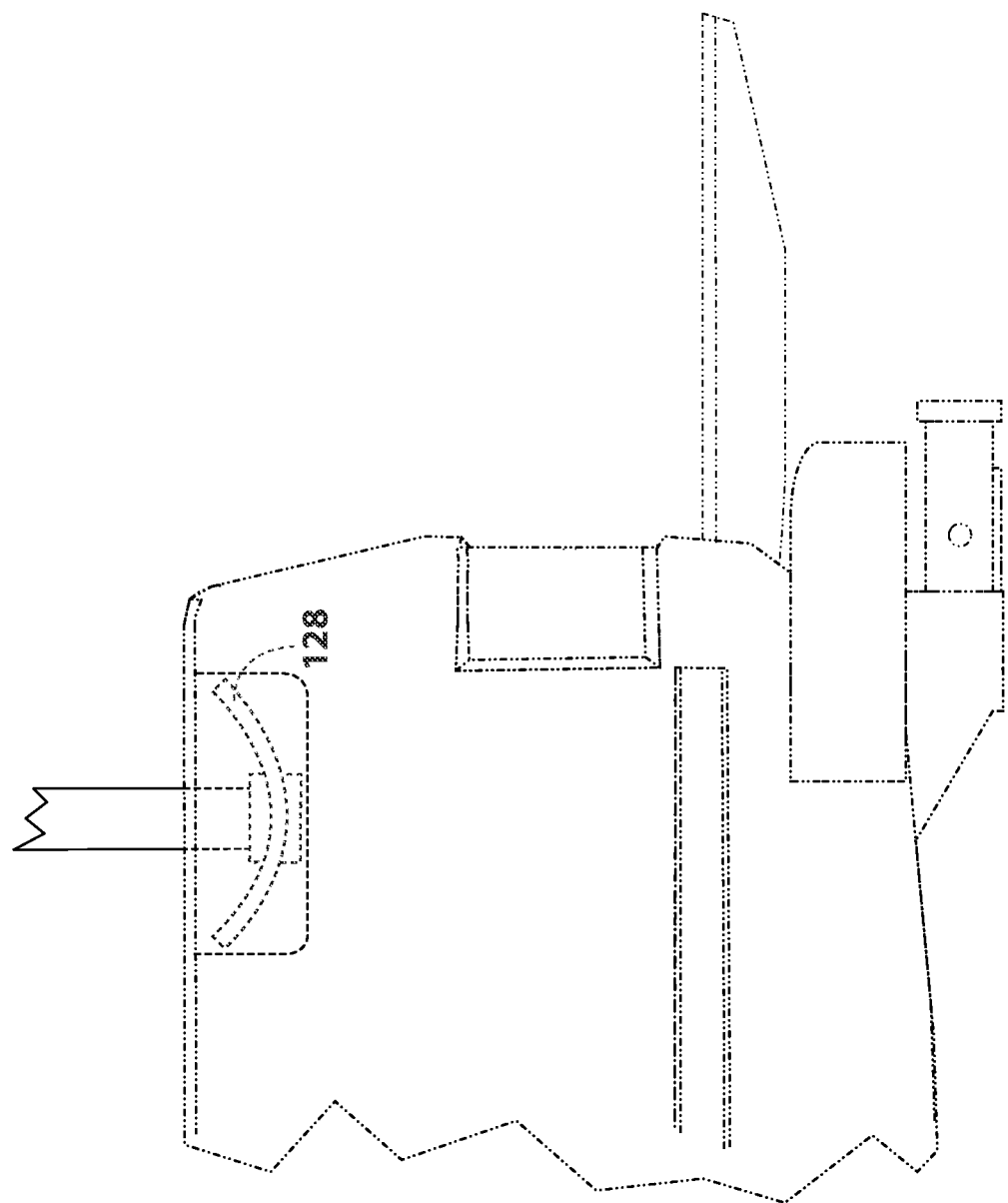
Figure 48:
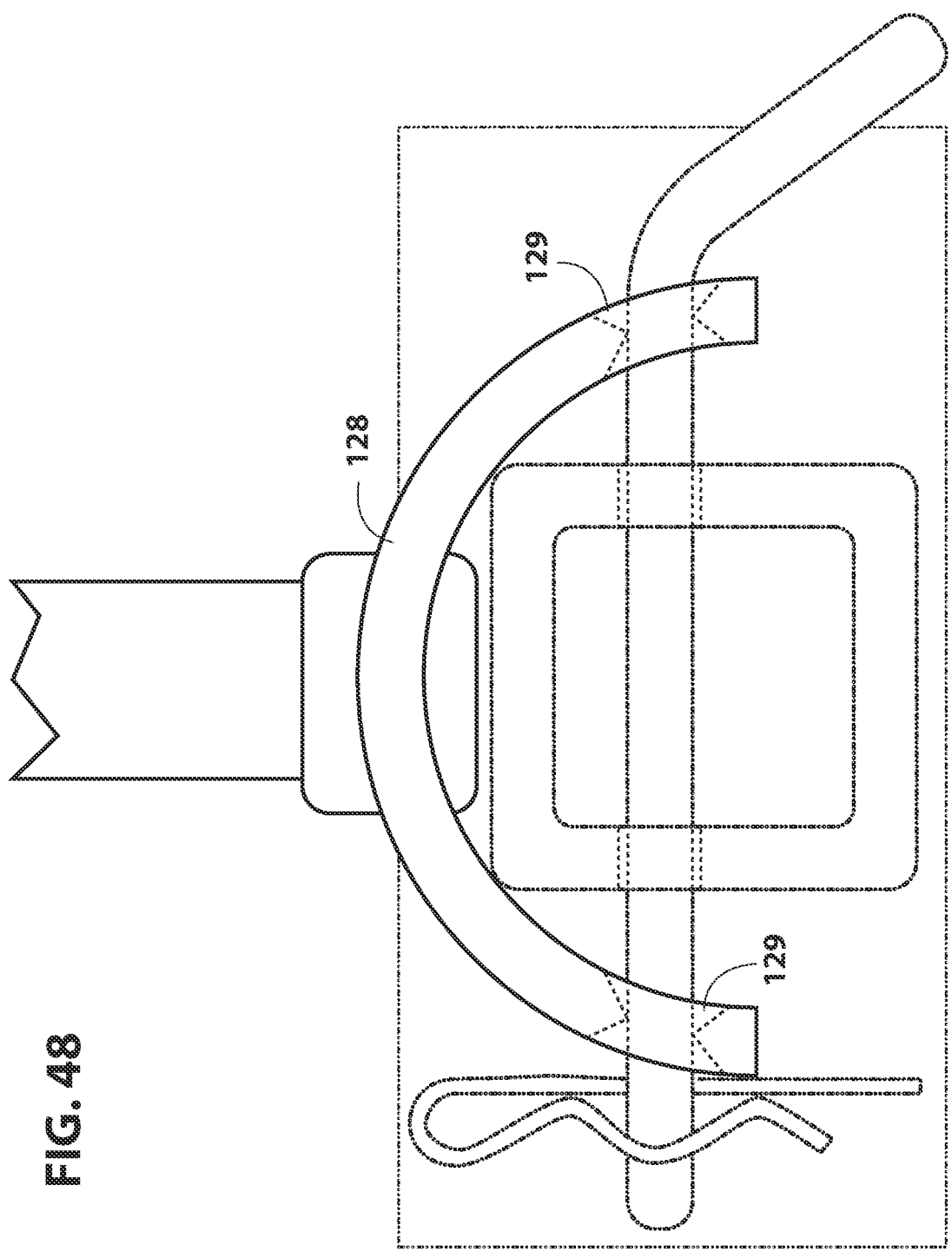
FIG. 48 and FIG. 49 illustrate front and side views demonstrating how five-device-in-one water-and-leaf-separating leaf-filtering water-collecting wind-blocking wind-redirecting marine-yacht-land-yacht-balcony-bumper-and-trailer-hitch-mountable sails can be attached to a tow-hitch by attaching multi-angled multi-surface-mountable multi-plate-connecting reversible stackable base 128.
Figure 49:
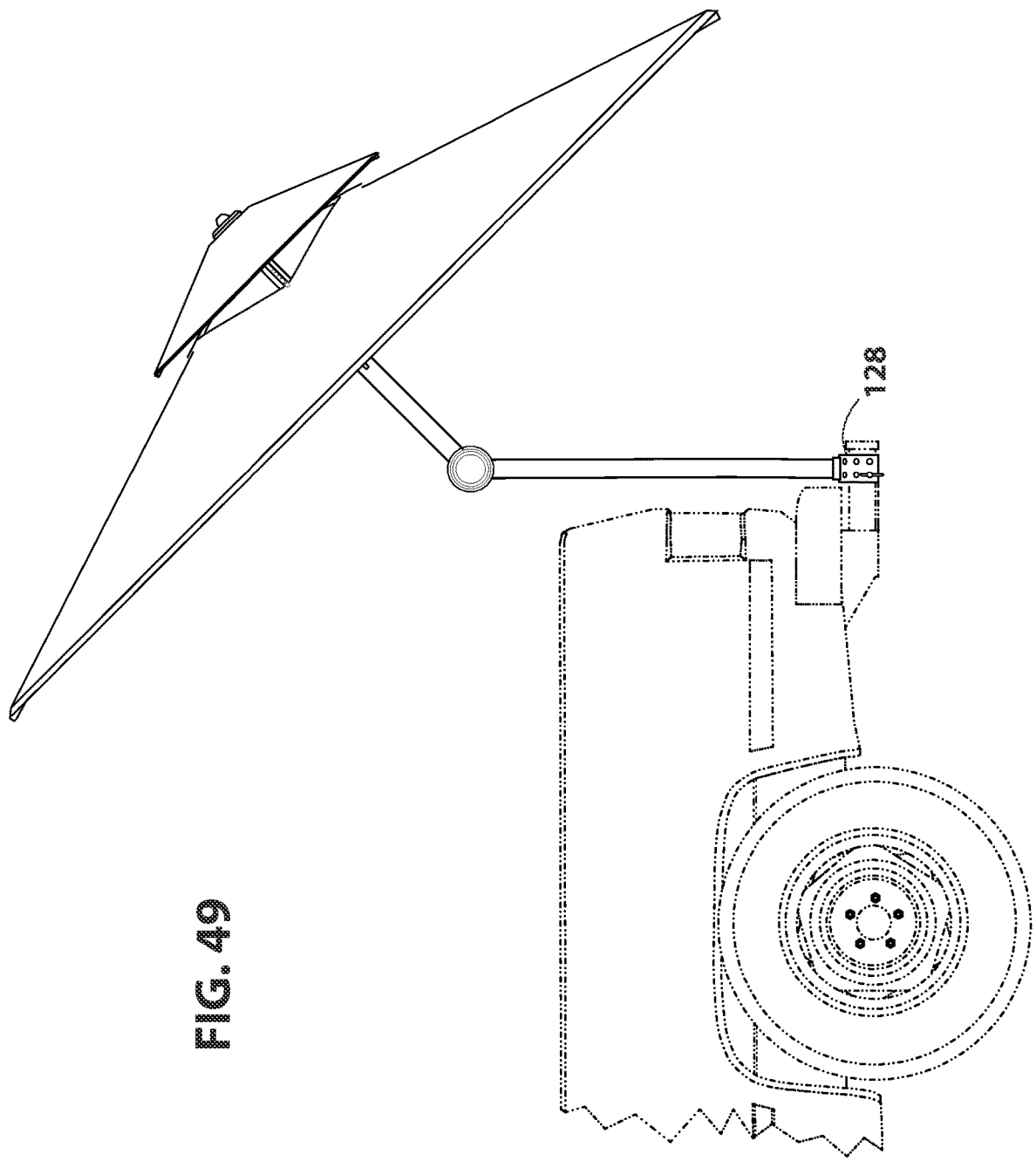
Figure 50:
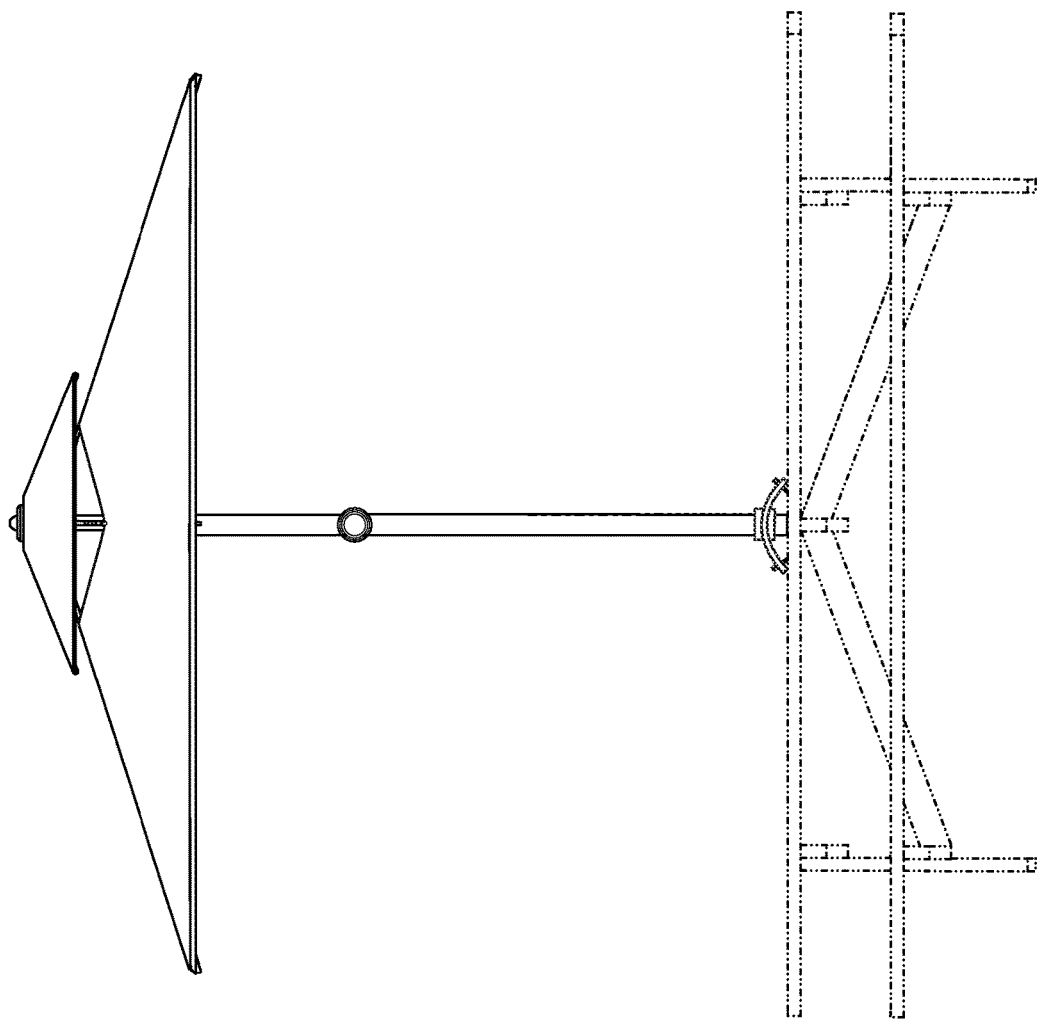
FIG. 50, FIG. 51, FIG. 52, FIG. 53, and FIG. 54 illustrate side views demonstrating how the five-device-in-one water-and-leaf-separating leaf-filtering water-collecting wind-blocking wind-redirecting marine-yacht-land-yacht-balcony-bumper-and-trailer-hitch-mountable sails can be mounted to various structures using the multi-angled multi-surface-mountable multi-plate-connecting reversible stackable base 128.
Figure 51:
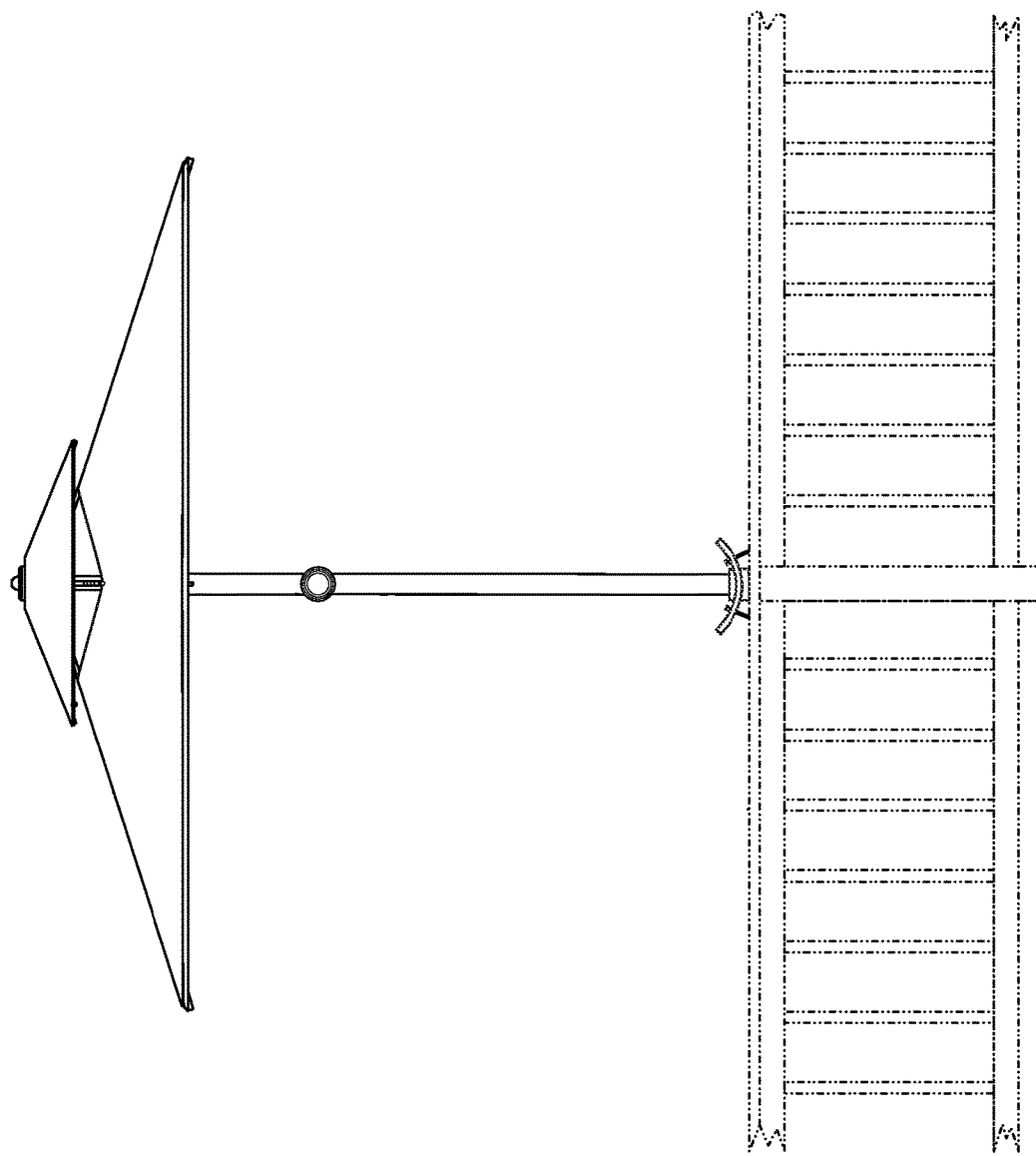
Figure 52:
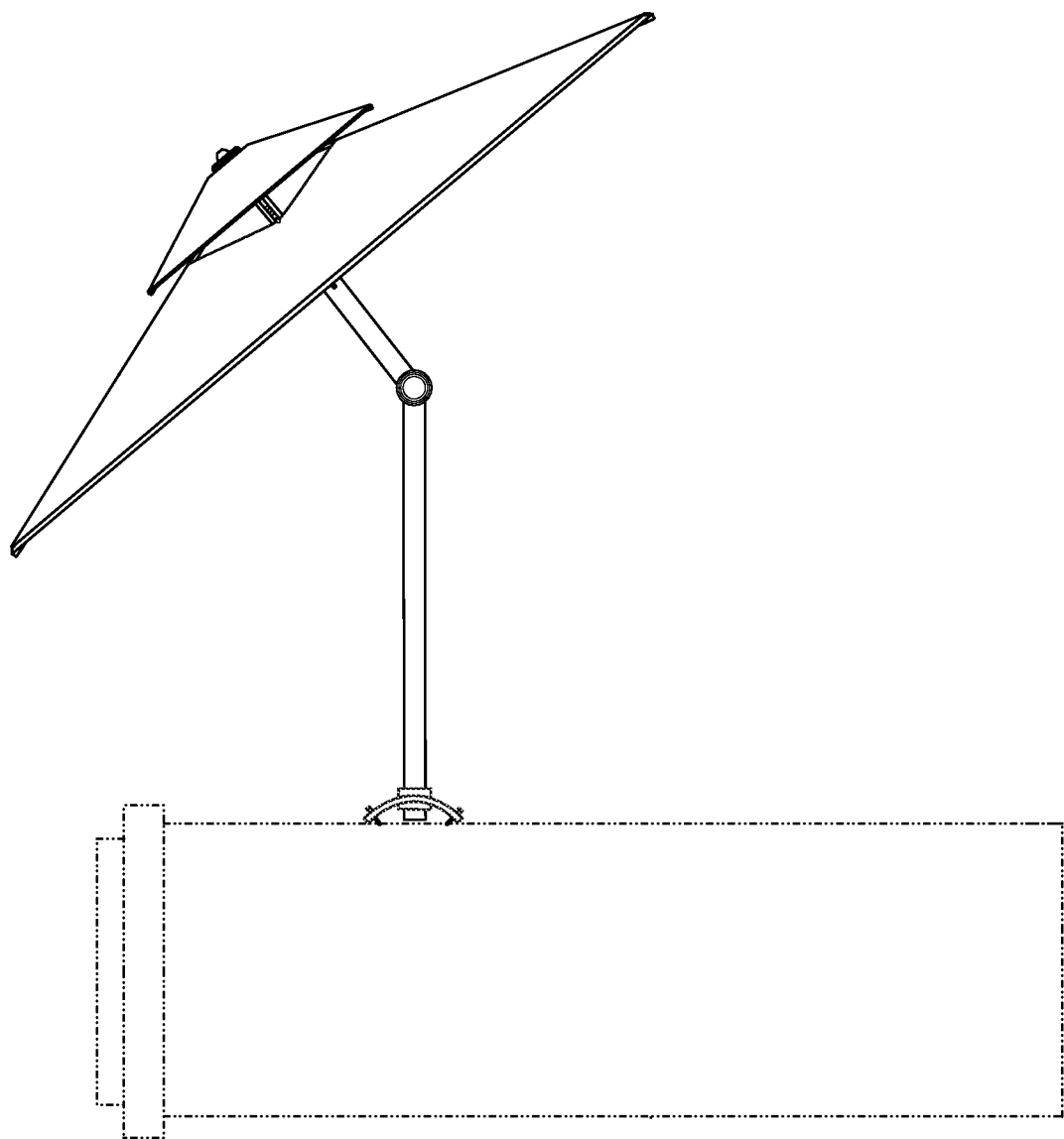
Figure 53:
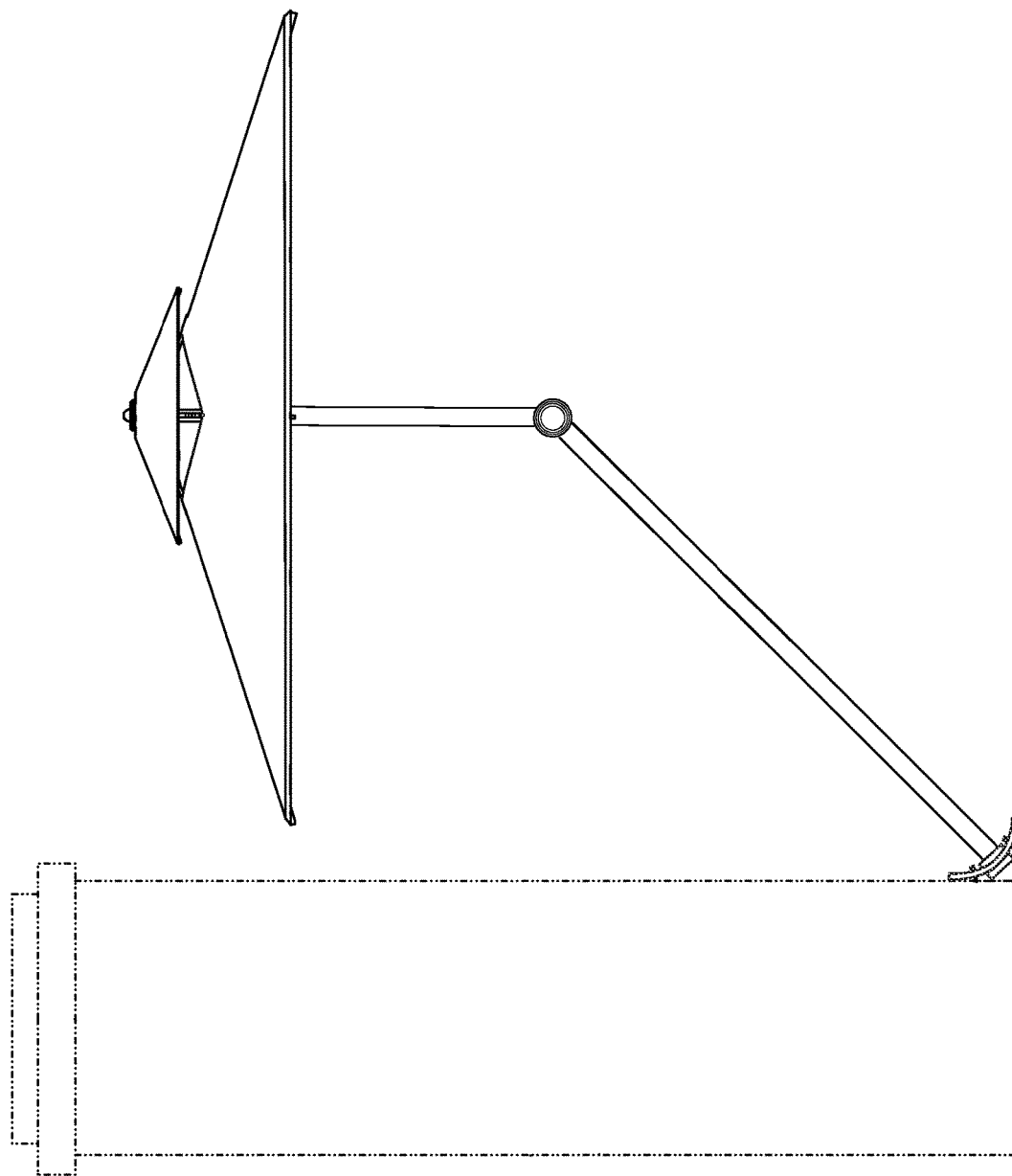
Figure 54:
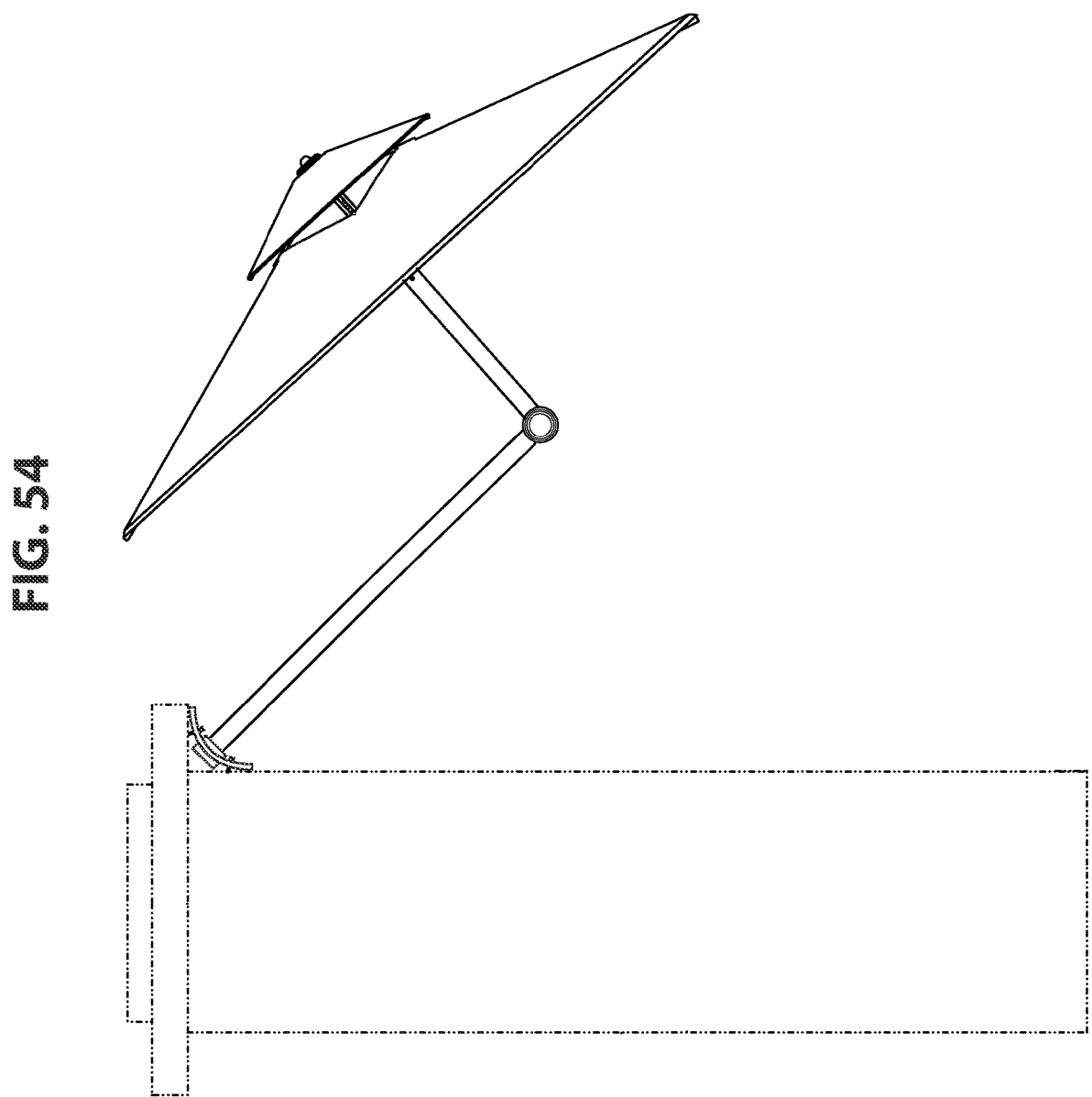
Figure 55:
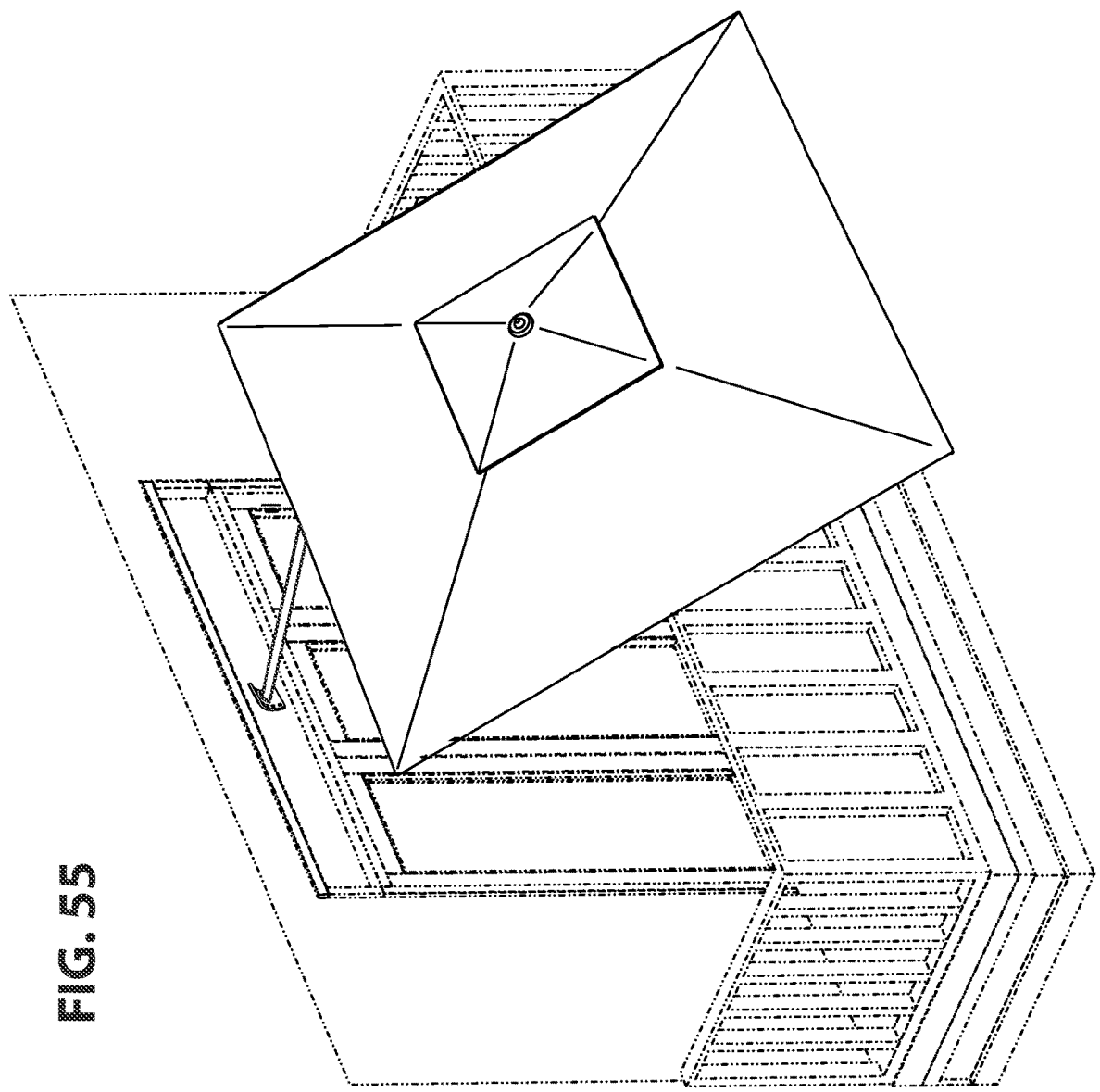
FIG. 55, FIG. 56, FIG. 57, FIG. 58, FIG. 59, FIG. 60, and FIG. 61 illustrate perspective and side views demonstrating how the five-device-in-one water-and-leaf-separating leaf-filtering water-collecting wind-blocking wind-redirecting marine-yacht-land-yacht-balcony-bumper-and-trailer-hitch-mountable sails can be attached to a balcony using the multi-angled multi-surface-mountable multi-plate-connecting reversible stackable base 128.
Figure 56:
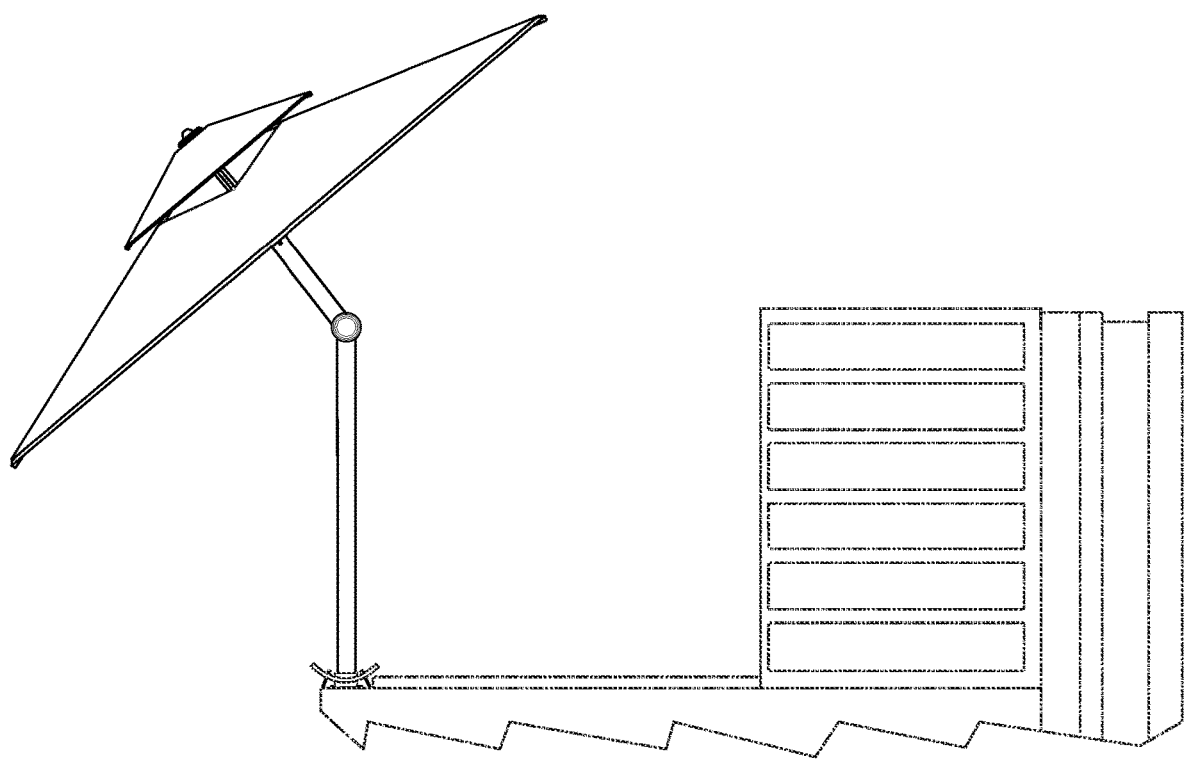
Figure 57:
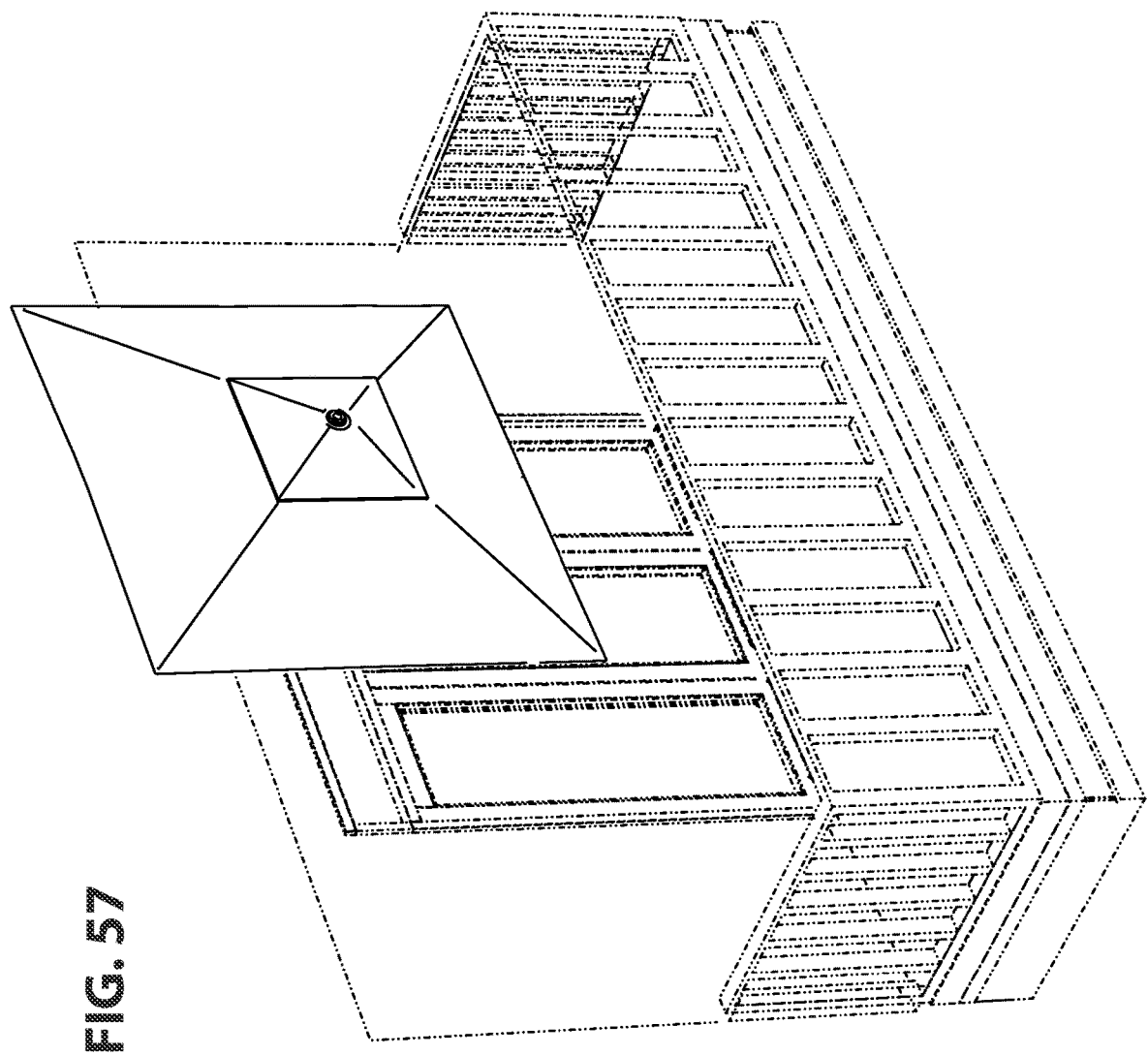
Figure 58:
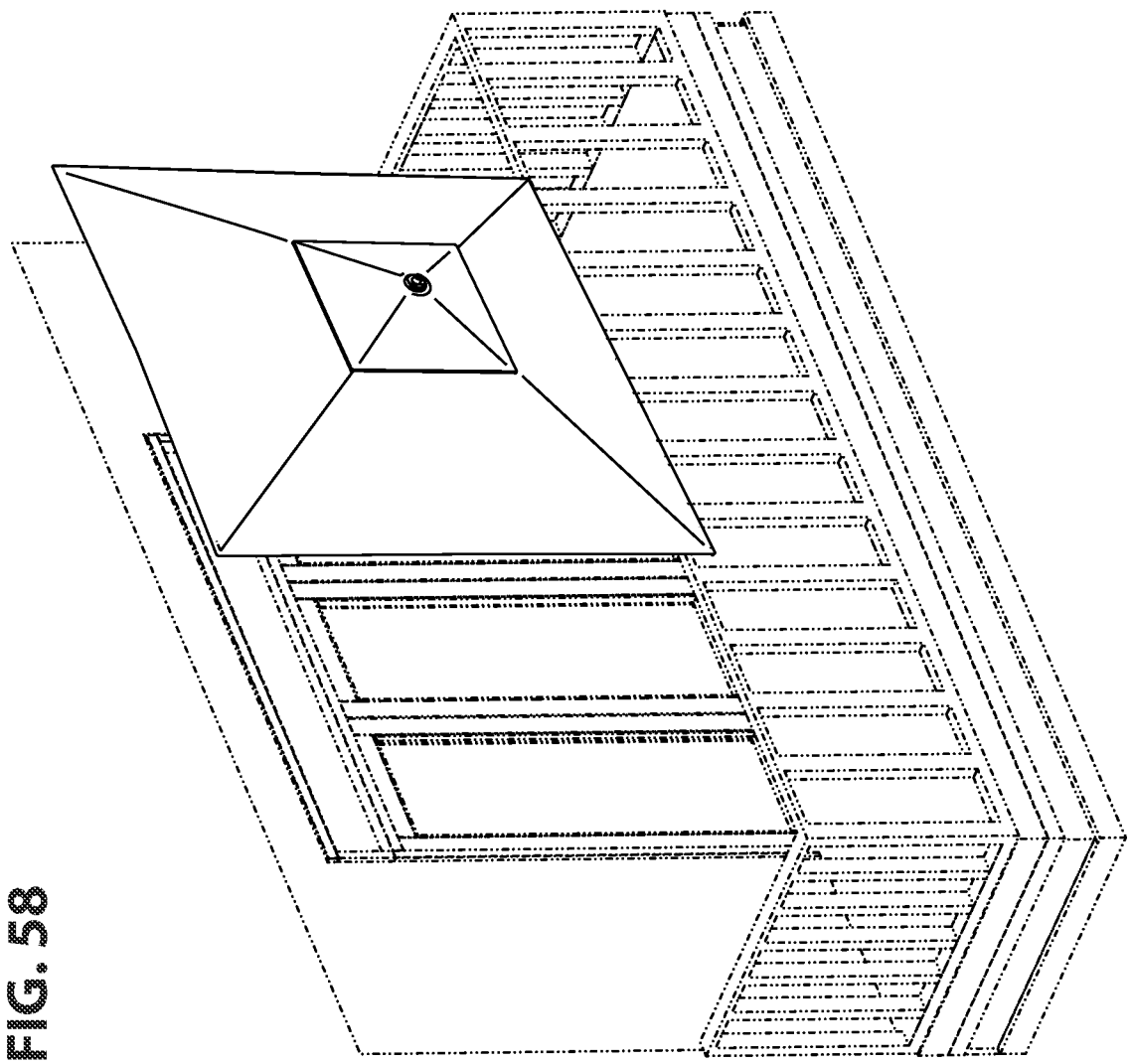
Figure 59:
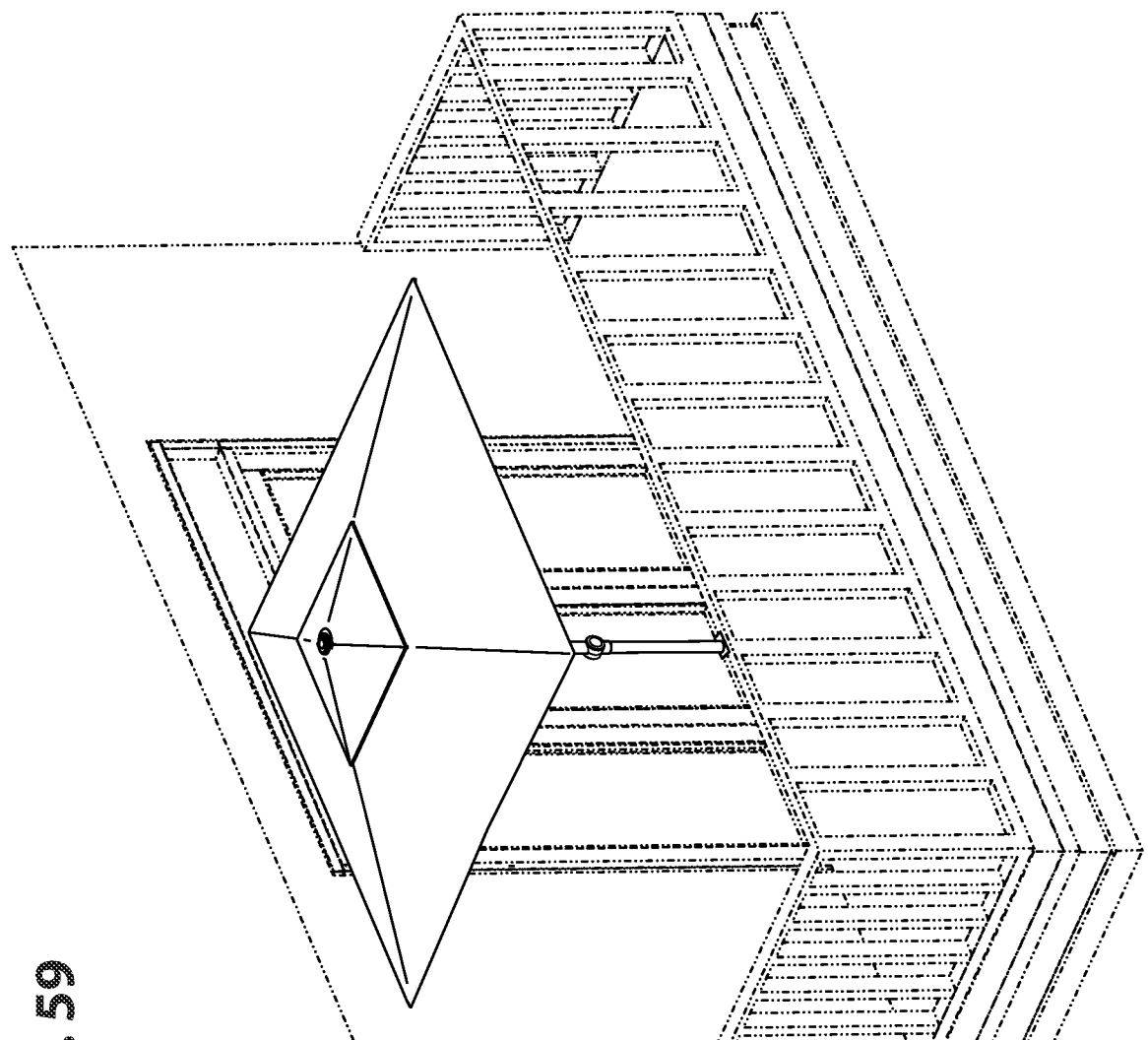
Figure 60:
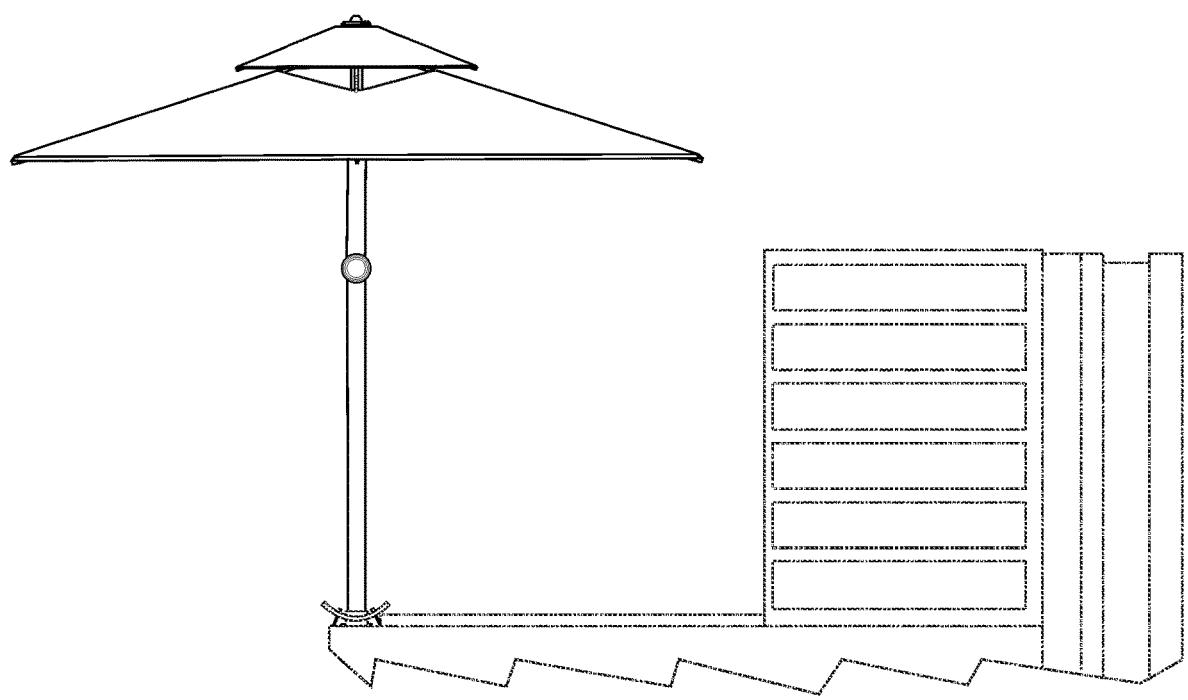
Figure 61:
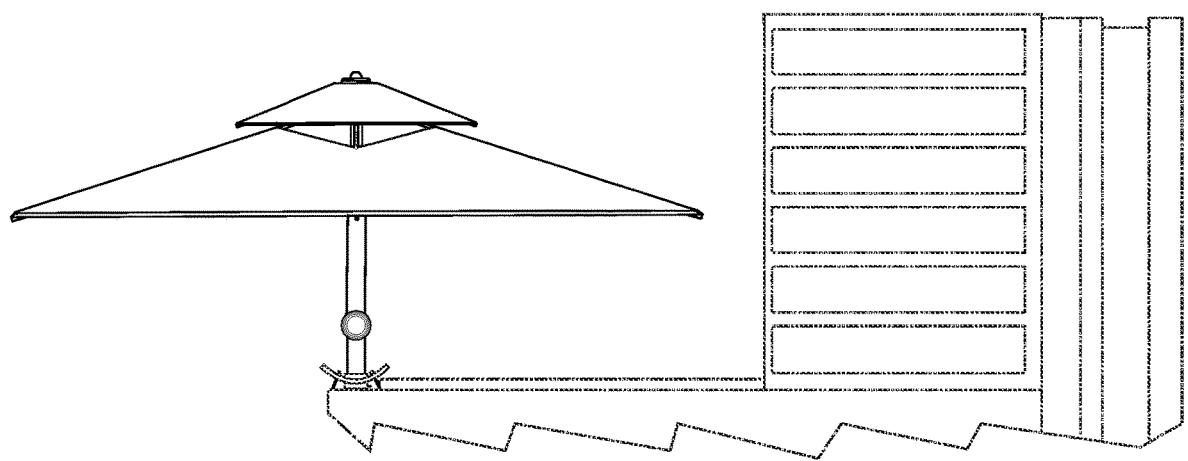
Figure 62A:
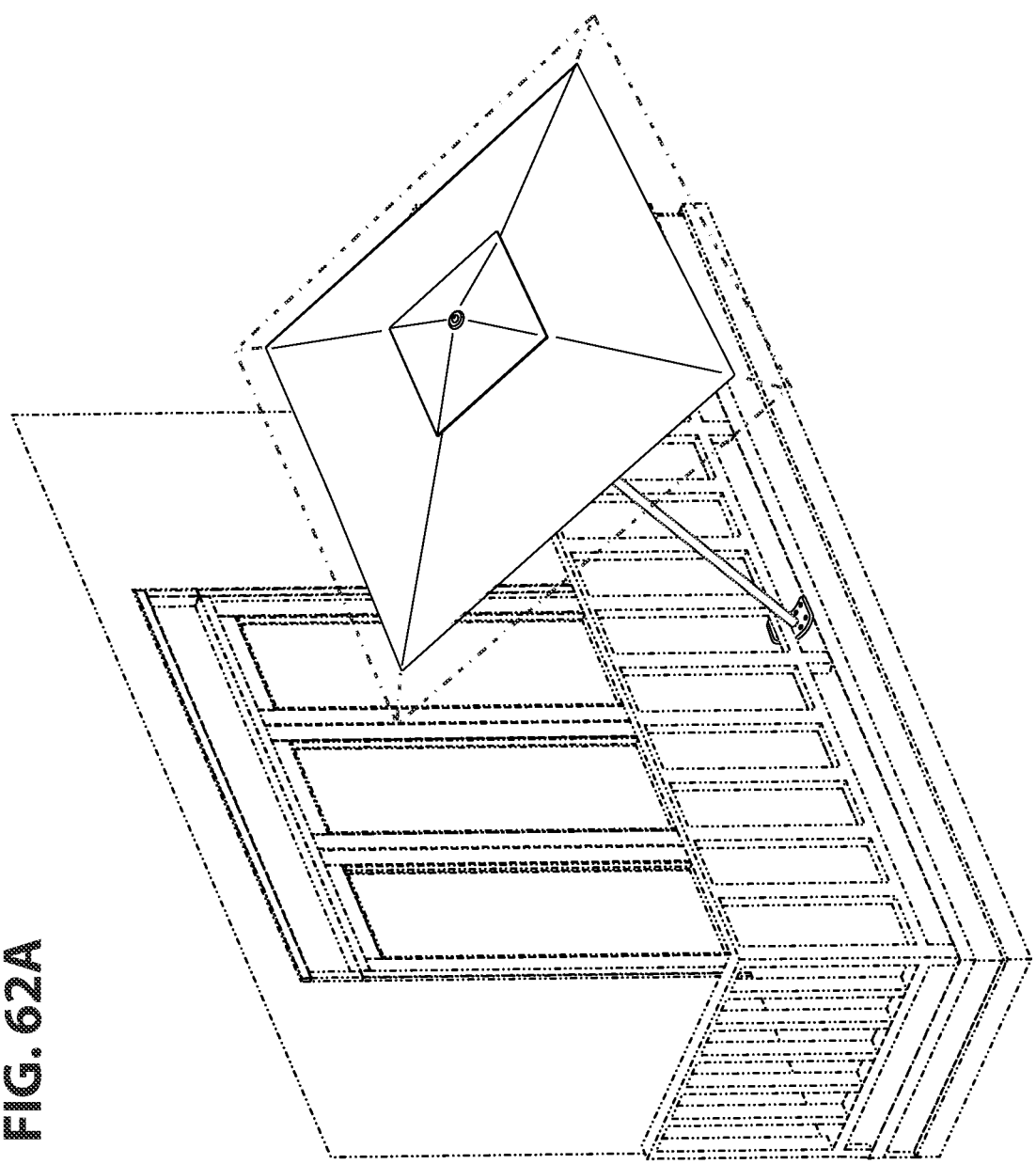
FIG. 62A and FIG. 62B illustrate perspective and cross-sectional views demonstrating how the five-device-in-one water-and-leaf-separating leaf-filtering water-collecting wind-blocking wind-redirecting marine-yacht-land-yacht-balcony-bumper-and-trailer-hitch-mountable sail can be installed under a balcony railing without tools.
Figure 62B:
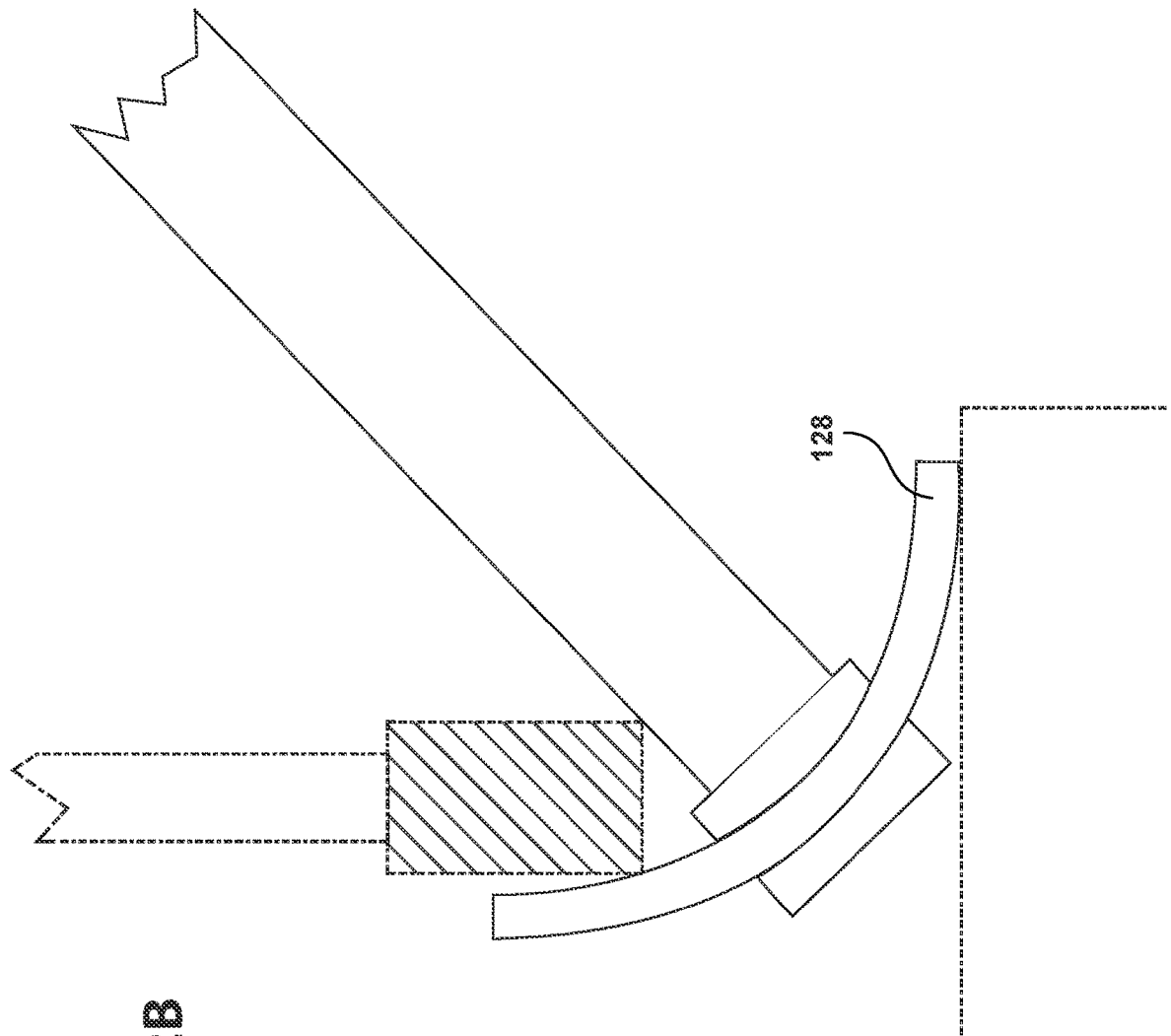
Figure 63A:
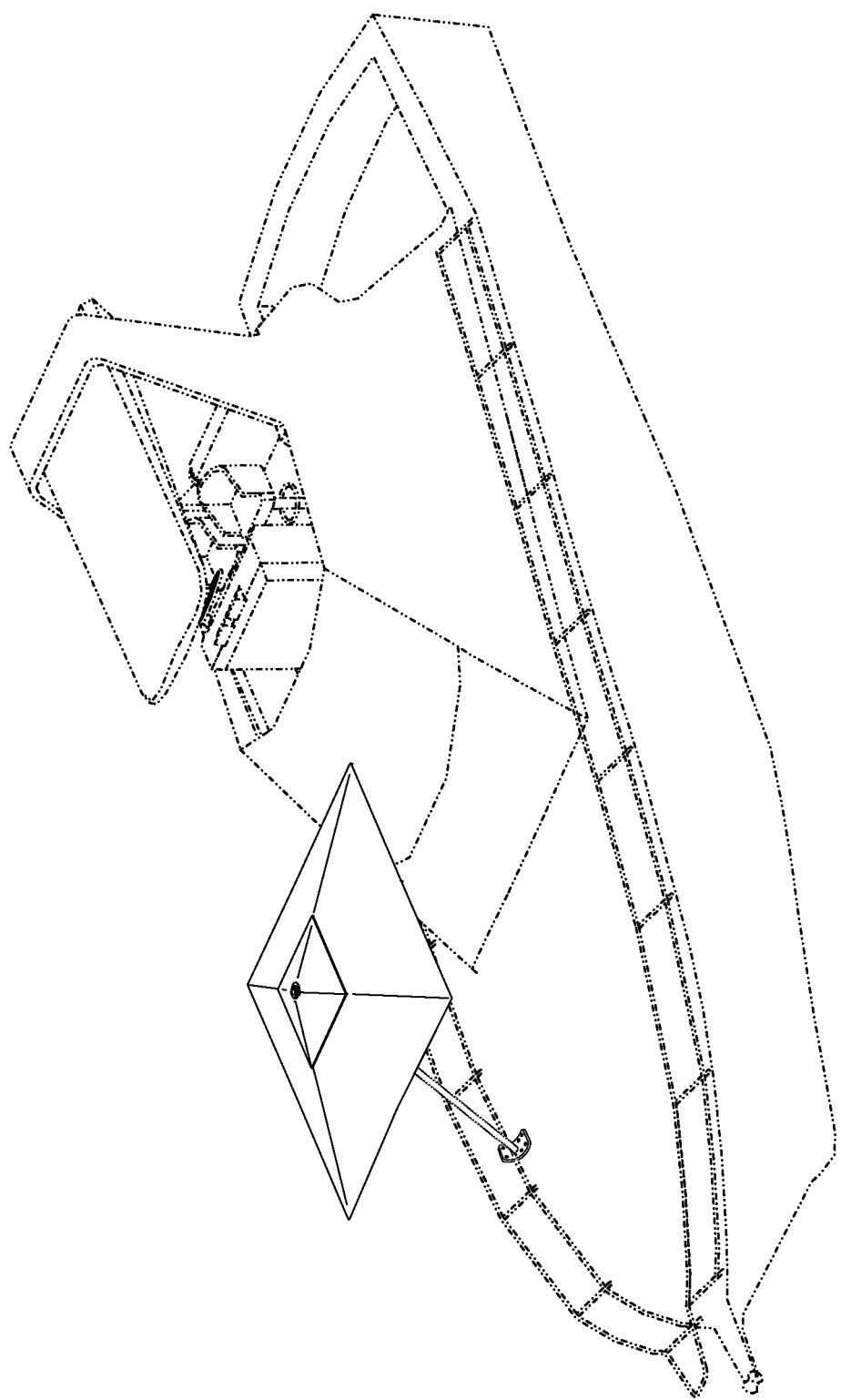
FIG. 63A and FIG. 63B illustrate perspective views demonstrating how the five-device-in-one water-and-leaf-separating leaf-filtering water-collecting wind-blocking wind-redirecting marine-yacht-land-yacht-balcony-bumper-and-trailer-hitch-mountable sail can be installed under the railing of a marine-craft without tools.
Figure 63B:
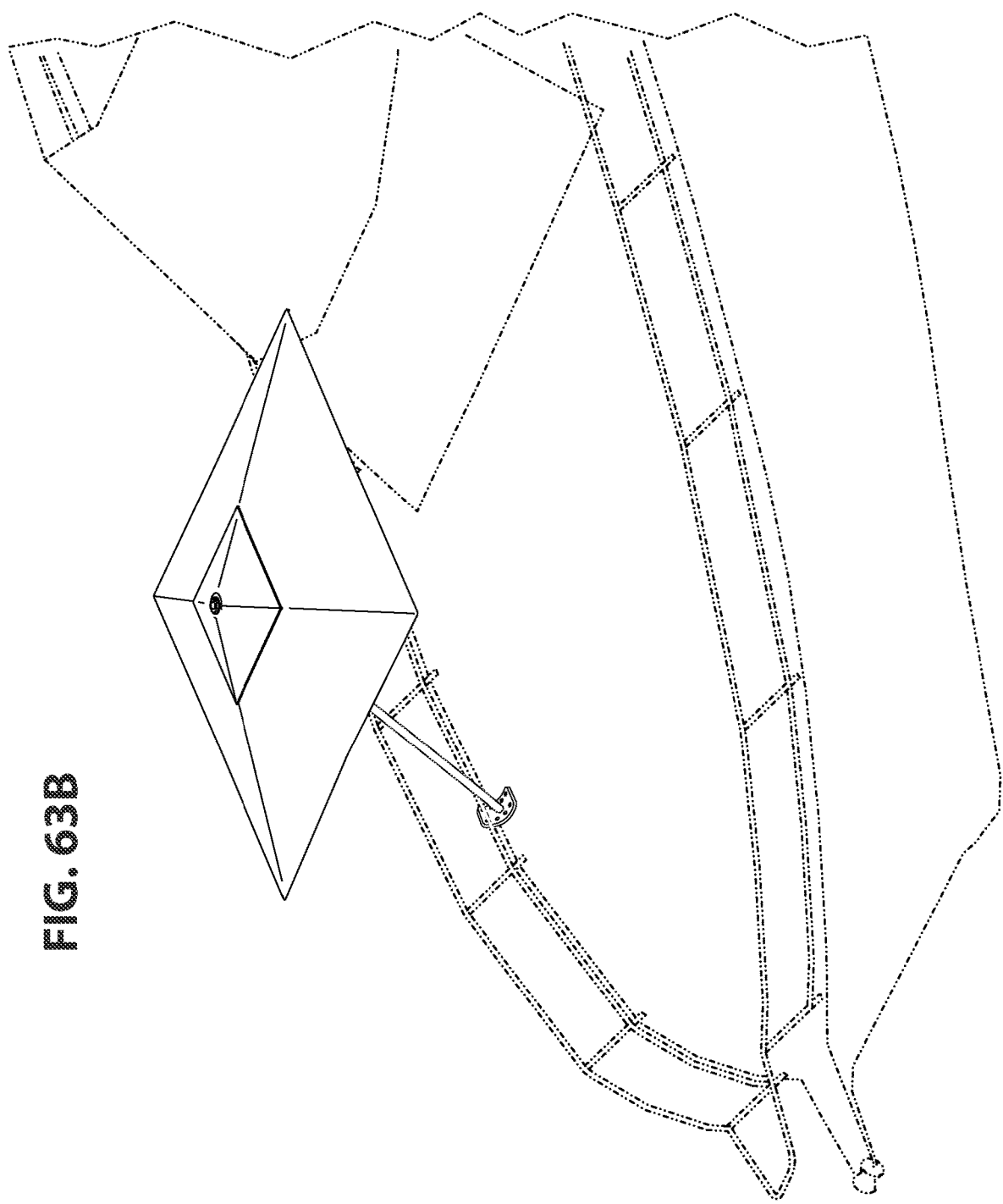
Figure 63C:
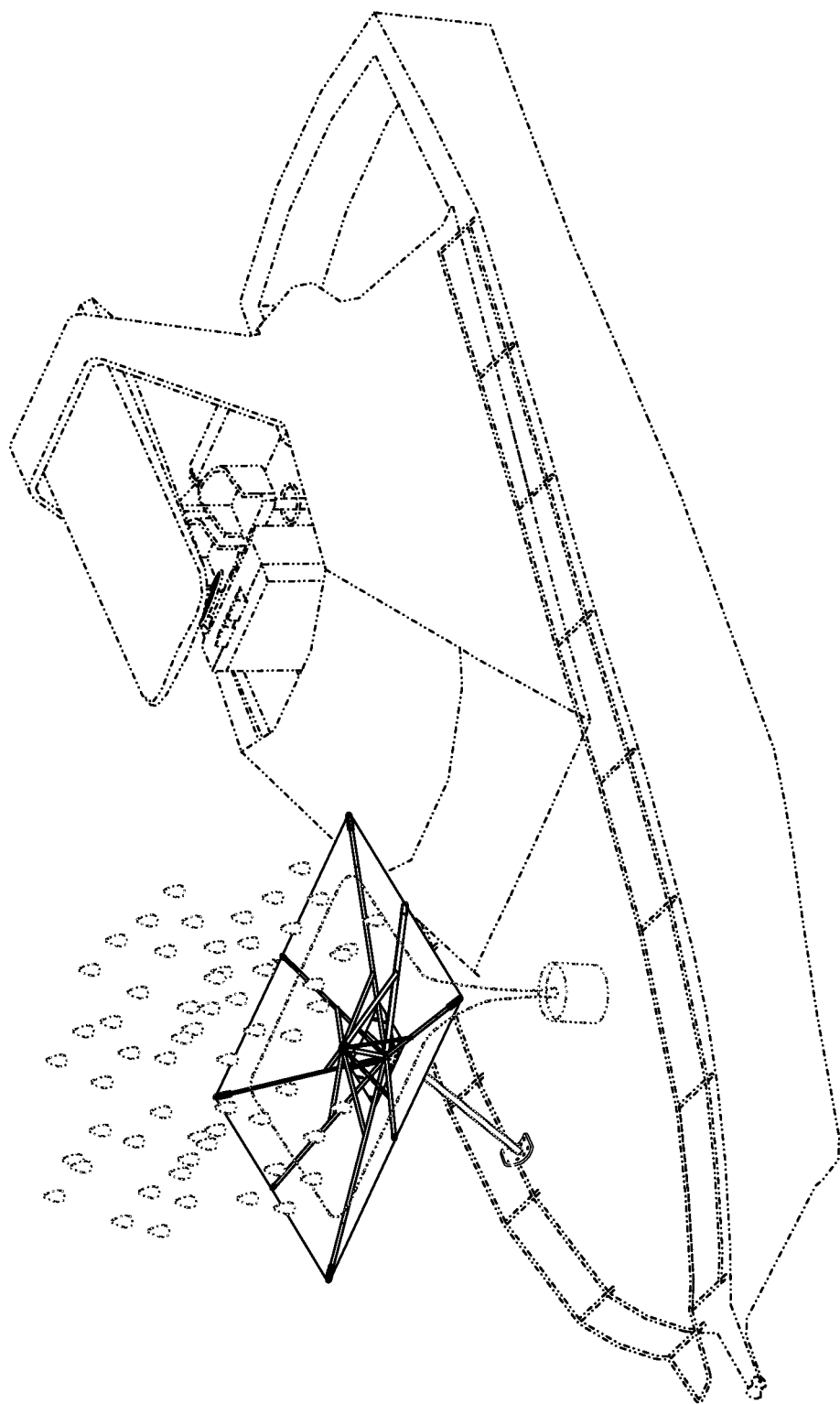
FIG. 63C and FIG. 63D illustrate perspective views demonstrating how the five-device-in-one water-and-leaf-separating leaf-filtering water-collecting wind-blocking wind-redirecting marine-yacht-land-yacht-balcony-bumper-and-trailer-hitch-mountable sail can be installed under the railing of a marine-craft without tools to act as an emergency rainwater-collecting device.
Figure 63D:
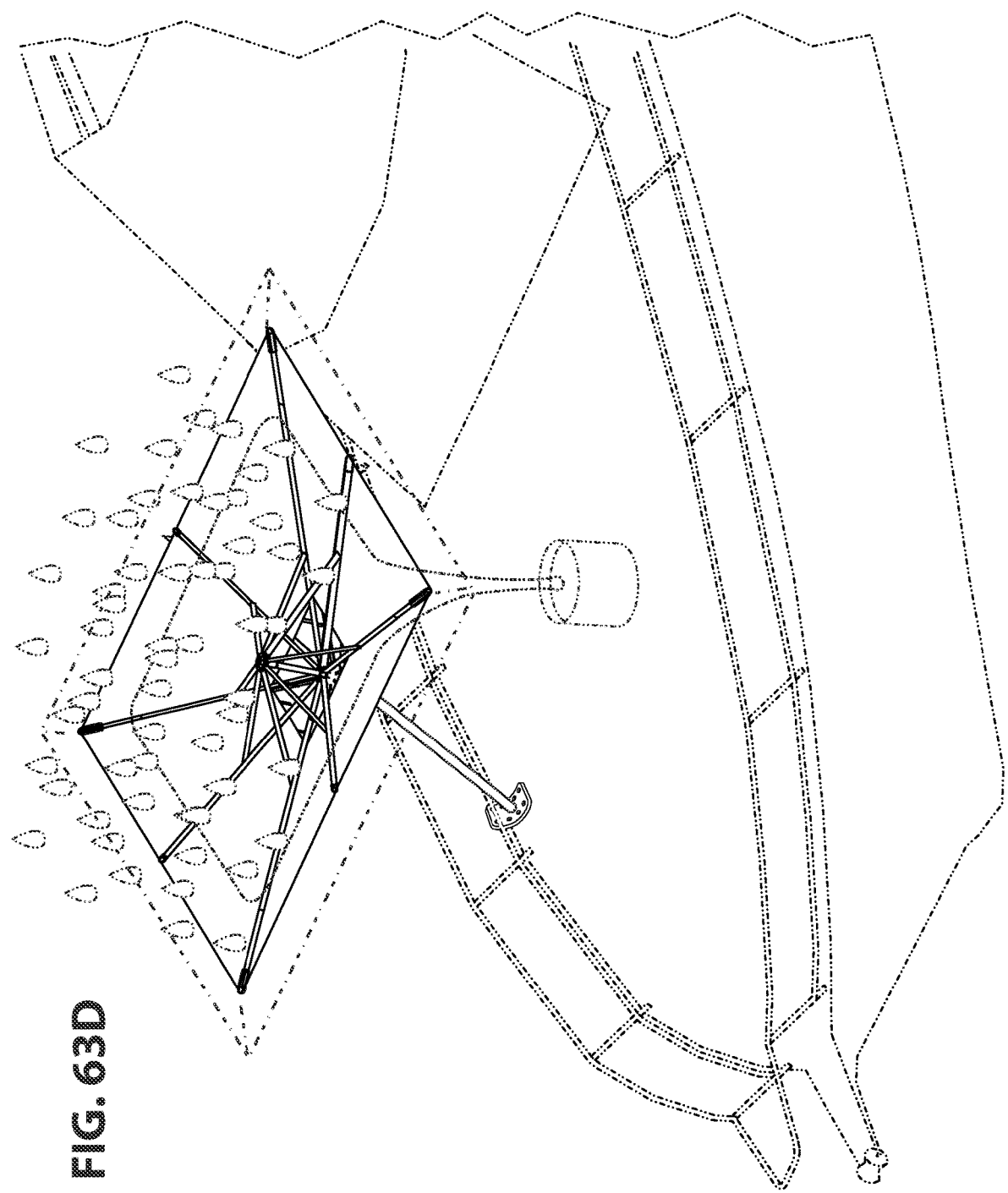
Figure 63F:
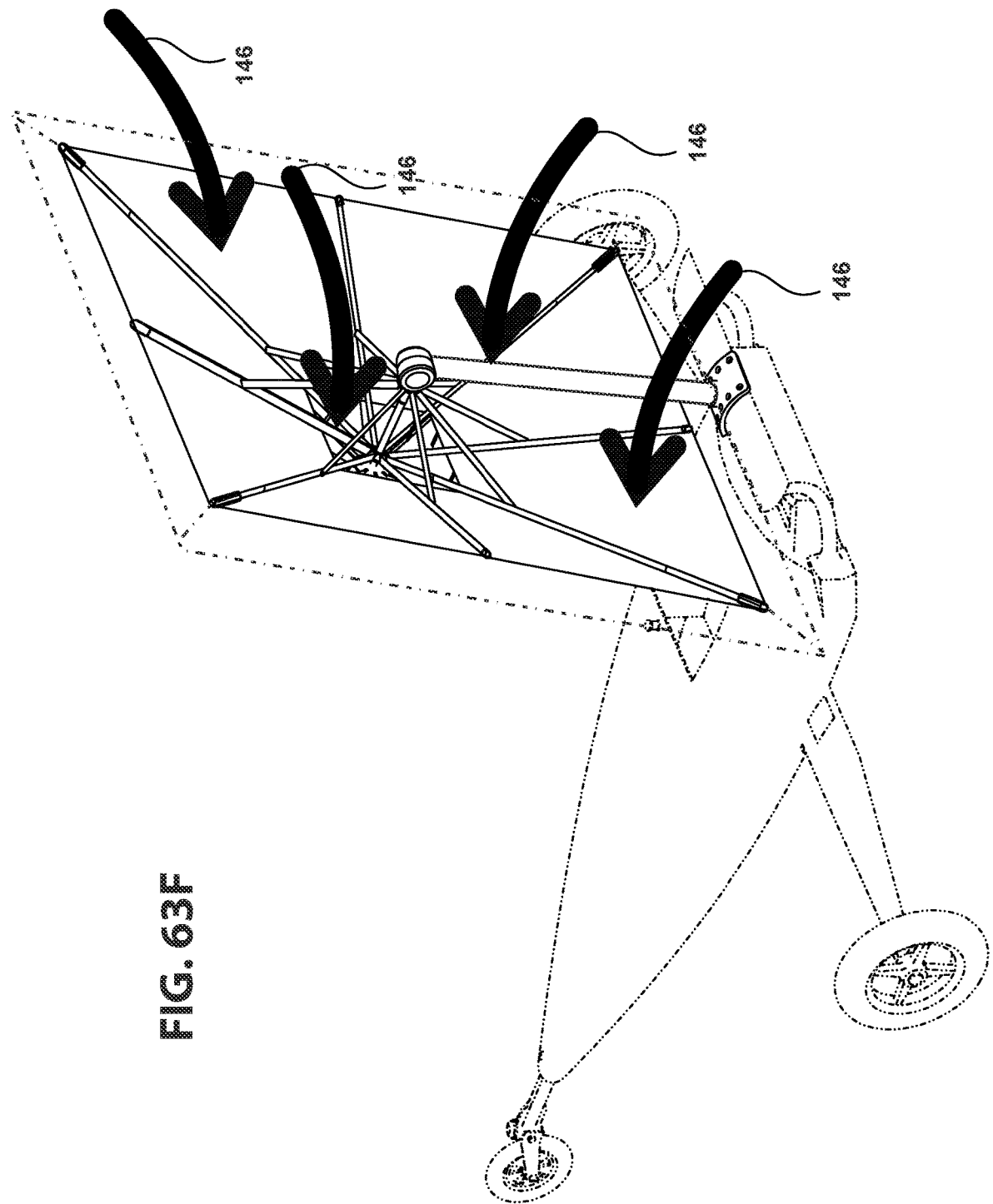
Figure 63G:
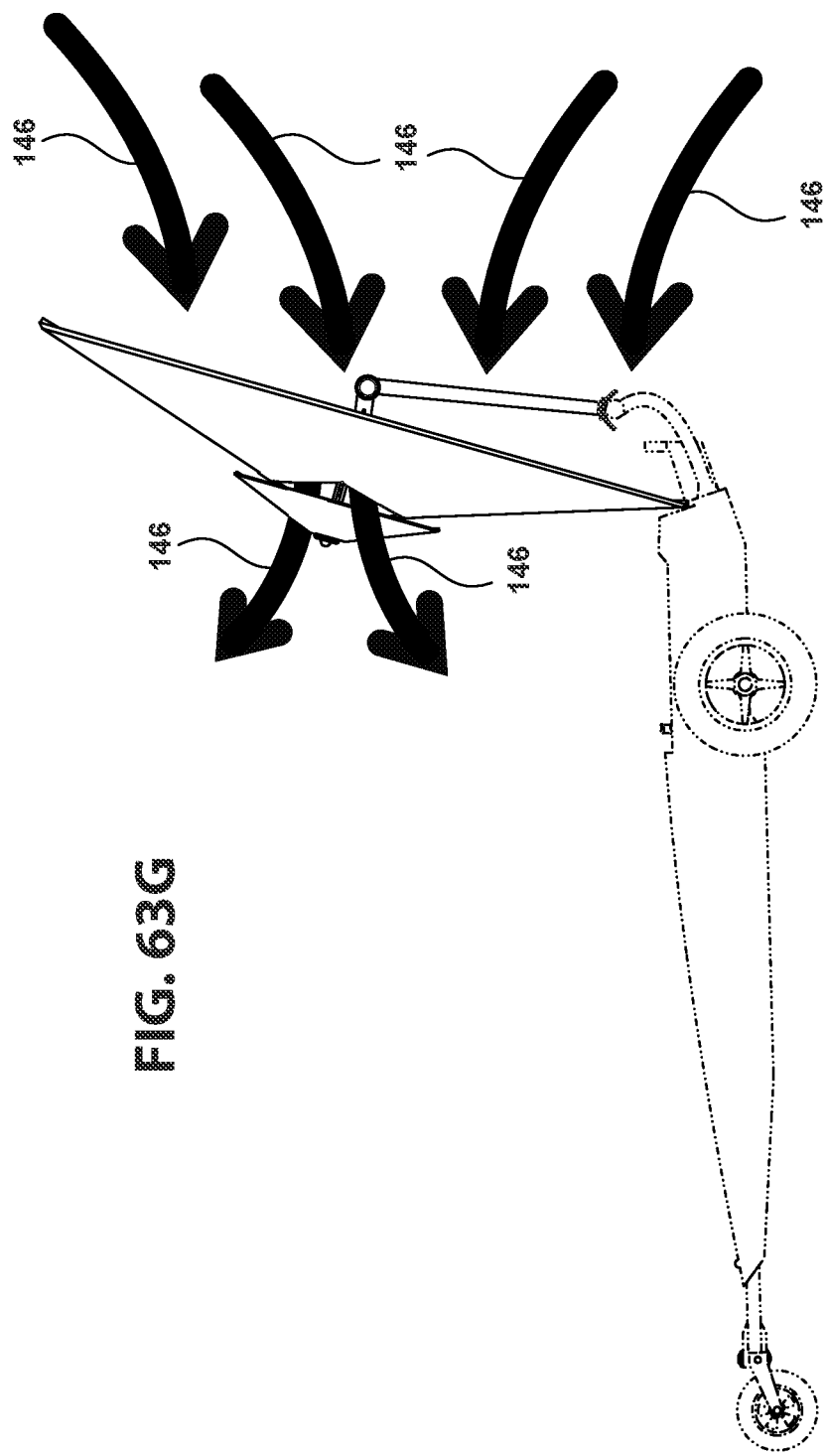
Figure 63H:
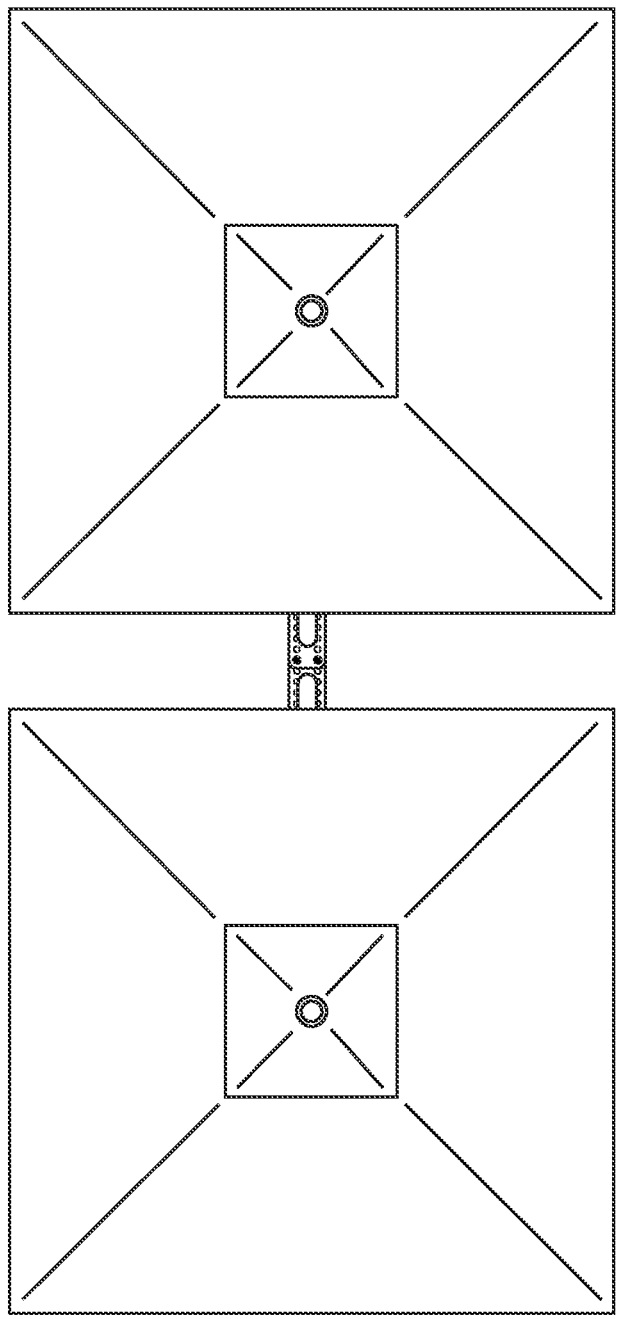
FIG. 63H, FIG. 63I, FIG. 63J, FIG. 63K, and FIG. 63L illustrate top views demonstrating how to bolt the multi-angled multi-surface-mountable multi-plate-connecting reversible stackable base 128 of five-device-in-one water-and-leaf-separating leaf-filtering water-collecting wind-blocking wind-redirecting marine-yacht-land-yacht-balcony-bumper-and-trailer-hitch-mountable sails together to create multiple different configurations for different purposes and events.
Figure 63I:
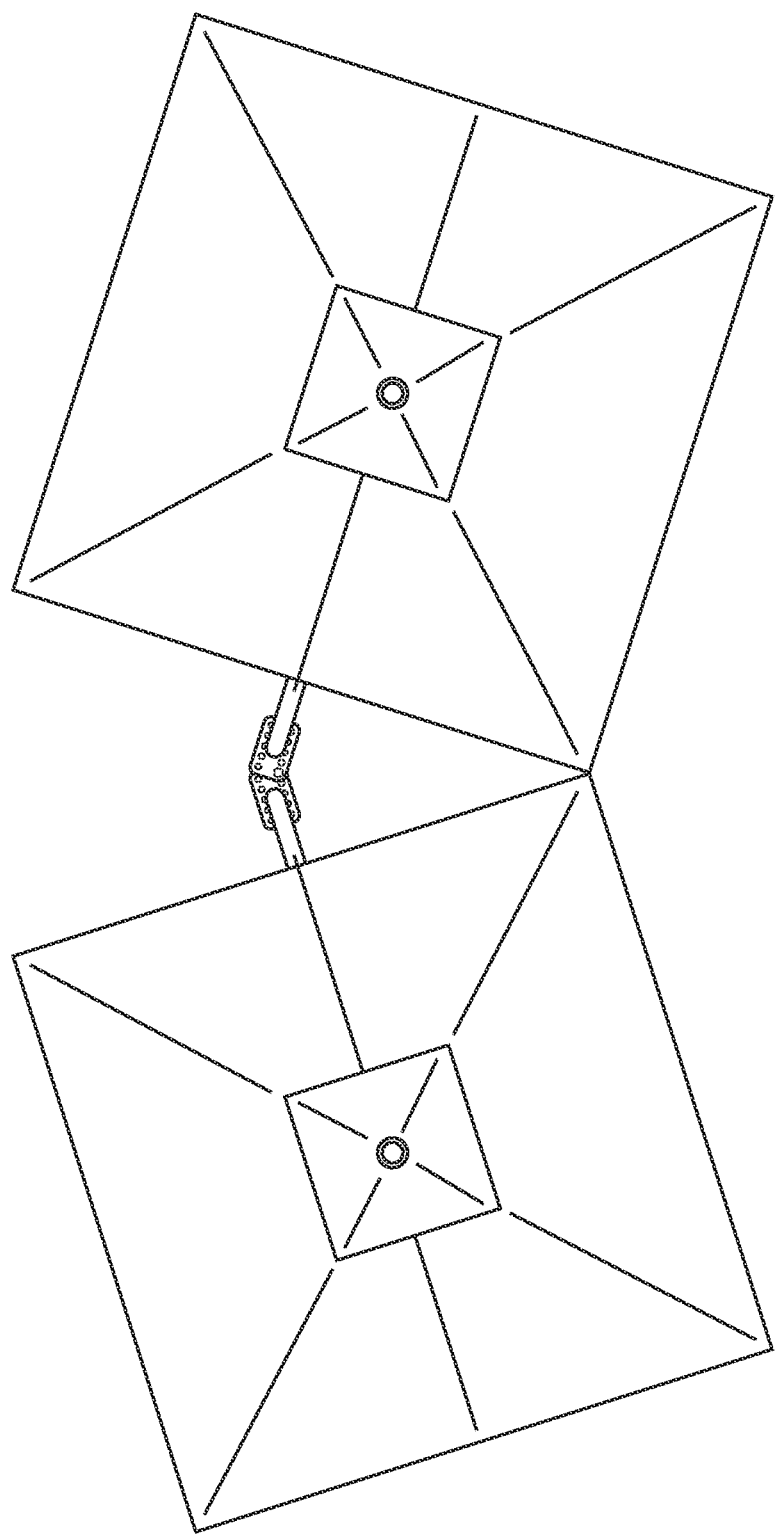
Figure 63J:
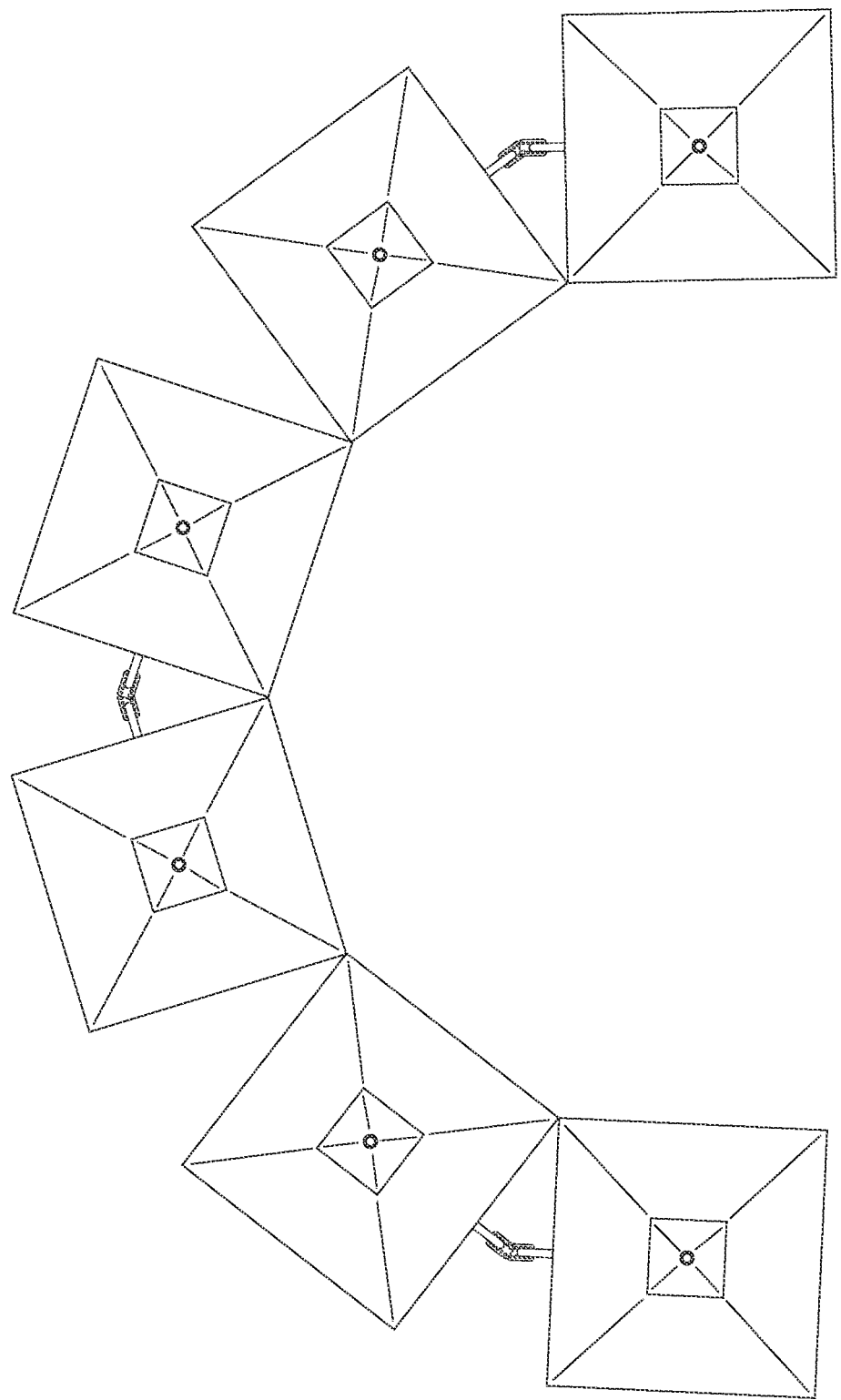
Figure 63K:
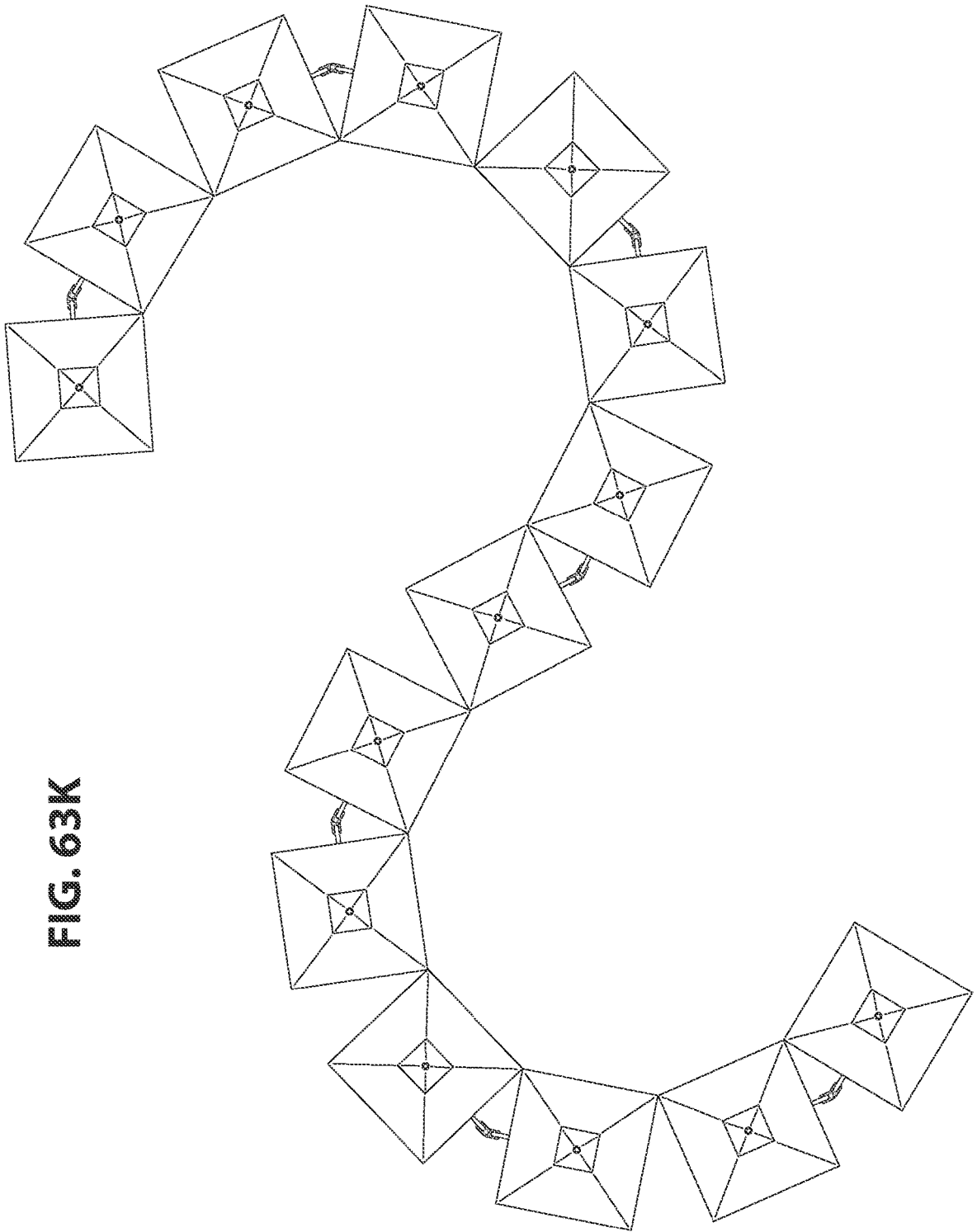
Figure 63L:
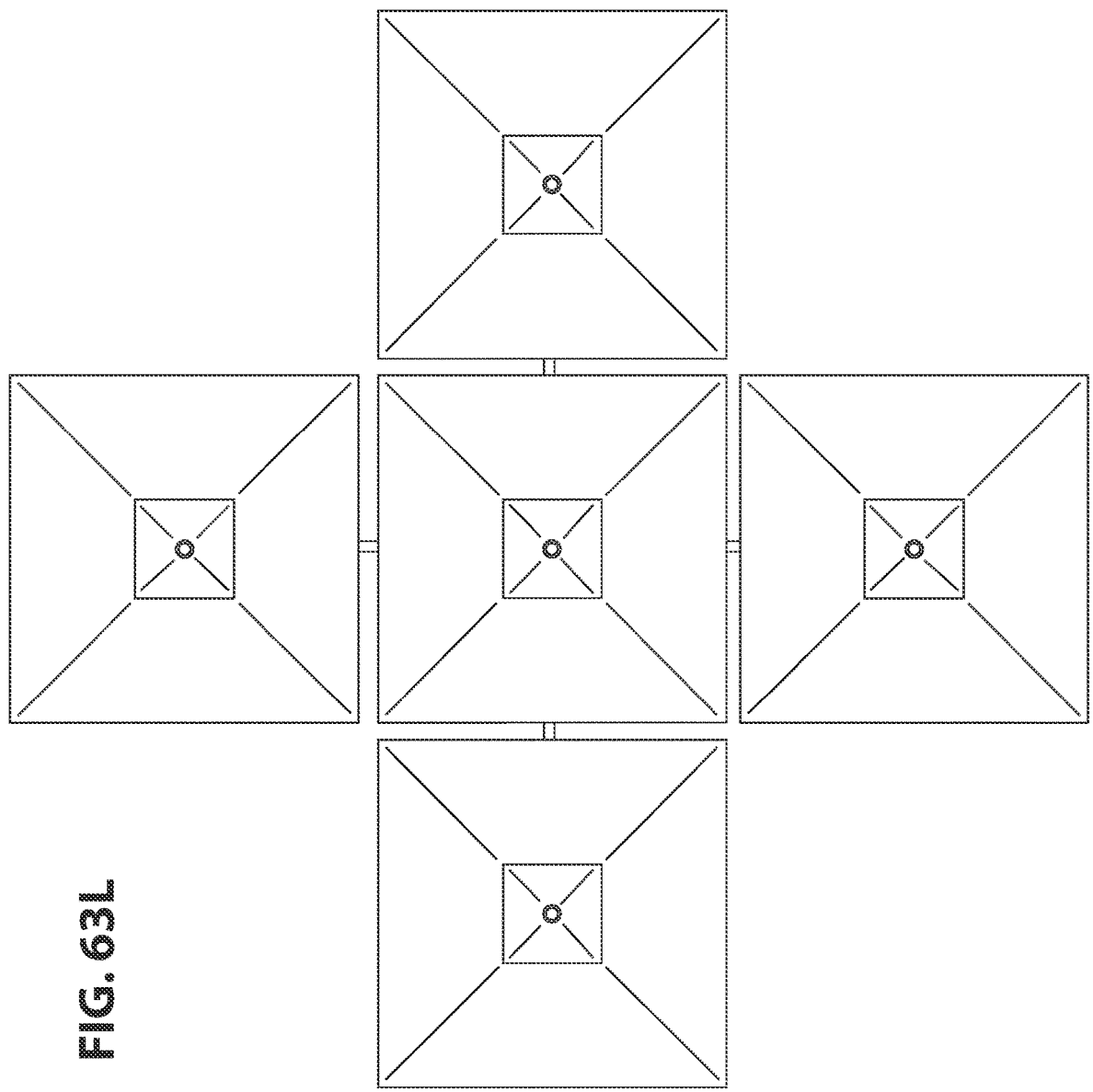
Figure 65A:
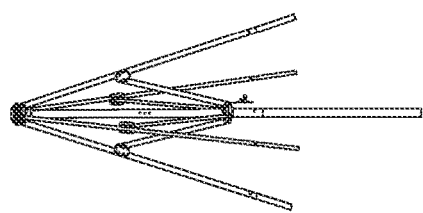
FIG. 65A, FIG. 65B, FIG. 66A, FIG. 66B, FIG. 67A, FIG. 67B, FIG. 68, FIG. 68, FIG. 68, FIG. 69, FIG. 70, FIG. 71, FIG. 72, FIG. 73, FIG. 74, FIG. 75, FIG. 76, FIG. 77, FIG. 78, FIG. 79, FIG. 80, FIG. 81, FIG. 82, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, FIG. 98, FIG. 99, FIG. 100, FIG. 101, FIG. 102, FIG. 103, FIG. 104, FIG. 105, FIG. 106, FIG. 107, FIG. 108, FIG. 109, FIG. 110, FIG. 111, FIG. 112, FIG. 113, FIG. 114, FIG. 115, FIG. 116, FIG. 117, FIG. 118, FIG. 119, FIG. 120, FIG. 121, FIG. 122, FIG. 123, FIG. 124, FIG. 125, FIG. 126, FIG. 127, FIG. 128, FIG. 129, FIG. 130, FIG. 131, FIG. 132, FIG. 133, FIG. 134, FIG. 135, FIG. 136, FIG. 137, FIG. 138, and FIG. 139 illustrate equivalent variations of five-device-in-one water-and-leaf-separating leaf-filtering water-collecting wind-blocking wind-redirecting marine-yacht-land-yacht-balcony-bumper-and-trailer-hitch-mountable sail.
Figure 66A:
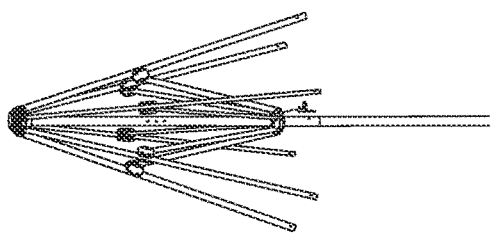

13) Adjustable water-collecting wind-blocking privacy-screen ring sail 113
is (or are respectively) for:
a) Functioning as an emergency rainwater collector on a marine vessel
(see FIG. 63C and FIG. 63D);
b) Functioning as a water collector
to collect rainwater when used upside down
in the directions of arrows 136 and 137
(see FIG. 36);
c) Functioning as a sail on a wind-powered land vehicle
in the direction of arrow 146
(see FIG. 63E, FIG. 63F, and FIG. 63G);
d) Functioning as a wind blocker
to block wind
(see FIG. 58 and FIG. 60);
e) Functioning as a privacy screen
to provide privacy
(see FIG. 57);
f) Functioning as an awning
to angledly block rain and sun beams
(see FIG. 53);
g) Functioning as a canopy
to vertically block rain and sun beams
(see FIG. 53);
h) Functioning as a water diverting device
to predeterminately redirect the flow of water
in the directions of arrows 136 and 137
(see FIG. 36);
i) Functioning as a leaf filtering device
to filter leaves from rain water when used upside down
in the directions of arrows 138
(see FIGS. 37A and 37B);
j) Functioning as a wind redirector
to redirect wind in and out of sail
in the directions of arrows 139, 140, 141, and 142
(see FIG. 39 and FIG. 40); and
k) Functioning as a wind resistor
to protect the sail from blowing when corners are attached to ground
with ropes and stakes
in the directions of arrows 143 and 144
(see FIG. 41).

14) Four zipper pockets 114
is (or are respectively) for:
Connecting the four corners of adjustable water-collecting wind-blocking privacy-screen ring sail 113 to the four tips of secondary ring-sail-supporting ribs 109.

15) Sail-size-adjusting flaps 115
is (or are respectively) for:
Adjustably being attached to primary ring-sail-supporting ribs 108 to adjust adjustable water-collecting wind-blocking privacy-screen ring sail 113 to multiple different sizes
(see FIG. 10 and FIG. 11).

16) Sail-size-adjusting holes 116
is (or are respectively) for:
Adjusting primary ring-sail-supporting ribs 108*a* and sail-size-adjusting flaps 115 to adjust adjustable water-collecting wind-blocking privacy-screen ring sail 113 to multiple different sizes
(see FIG. 10 and FIG. 11).

17) Sail-multi-orienting snap-locking pivoting-elbow system 117 is for performing the combined functions of its components.

18) Upper post 118
is (or are respectively) for:
Supporting central-sail intersector 102, ring-sail-rib intersector 107, and
providing the means for ring-sail-arm intersector 111 to slide vertically thereon.

19) Lower post 119
is (or are respectively) for:
Supporting stationary snap-lock housing 124

Figure 28:
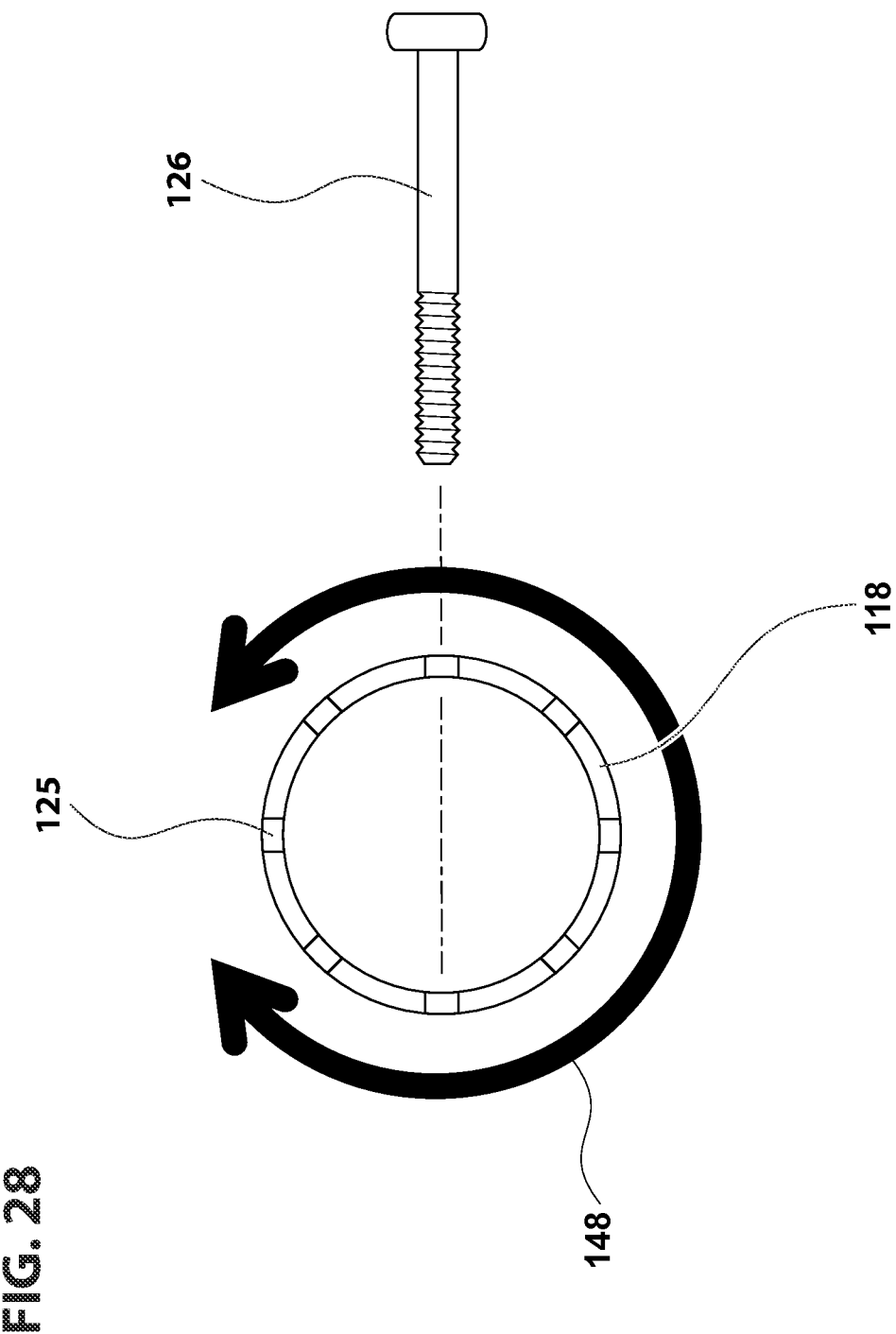
Figure 29:
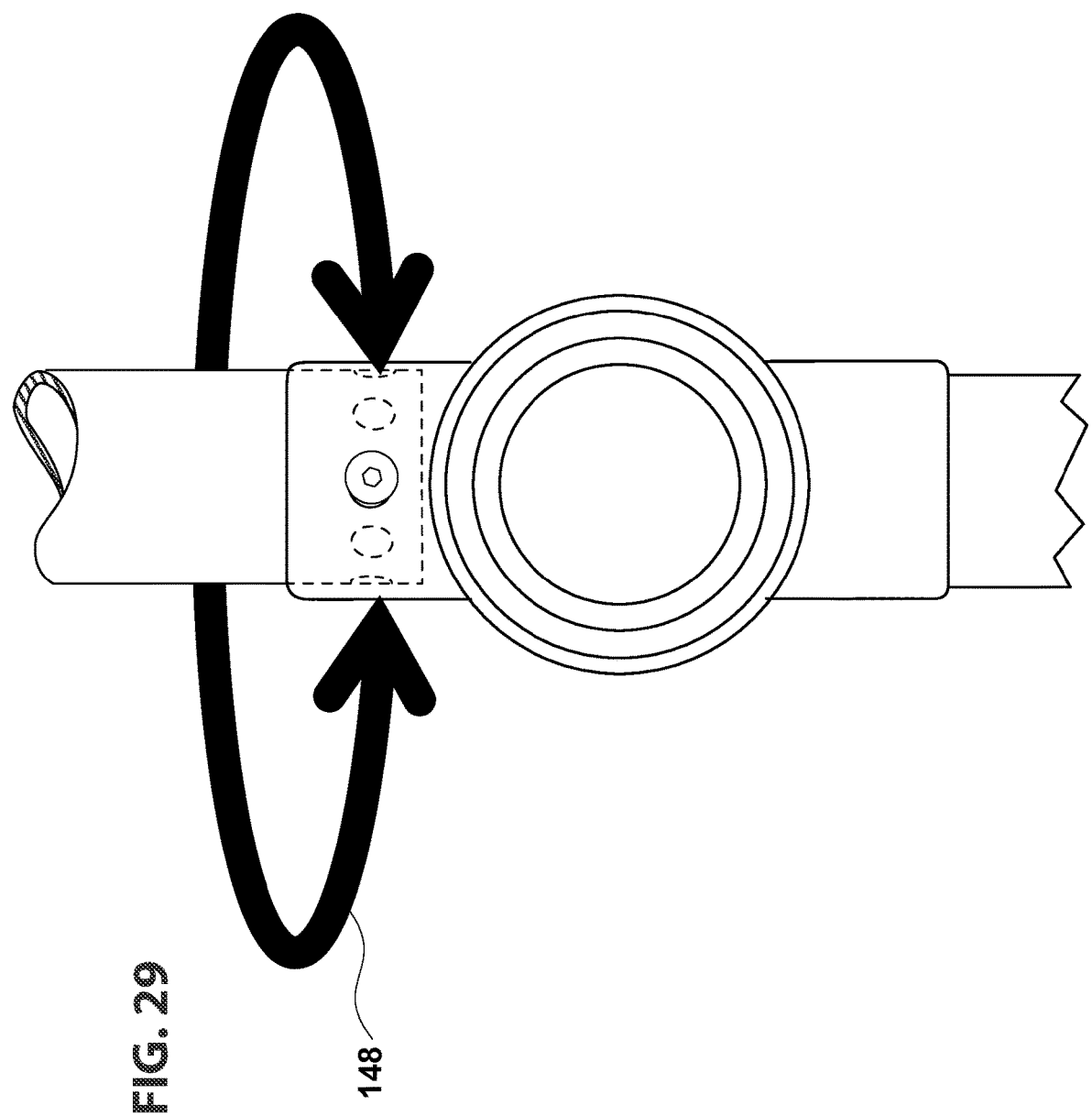
Figure 32:
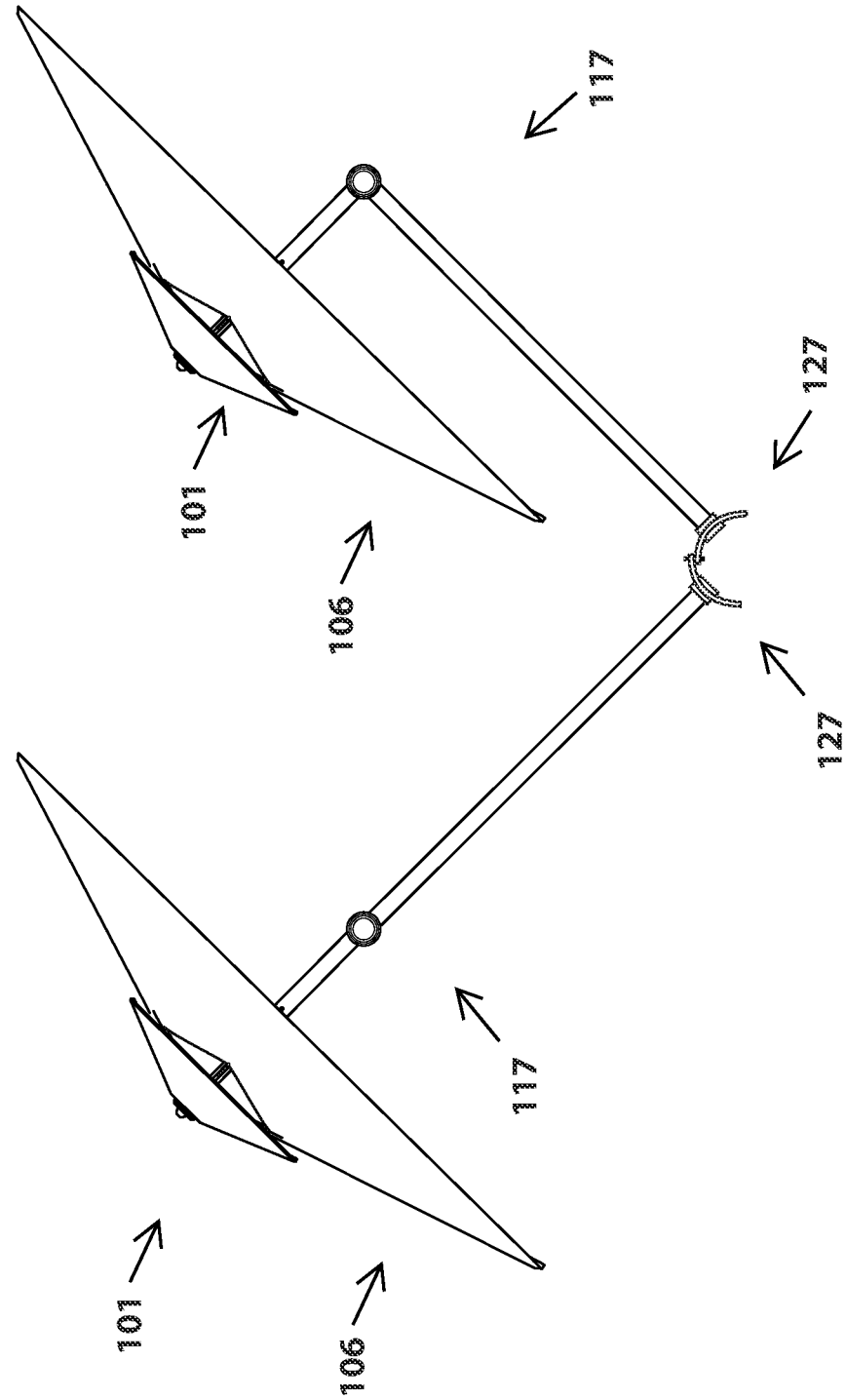
Figure 37B:
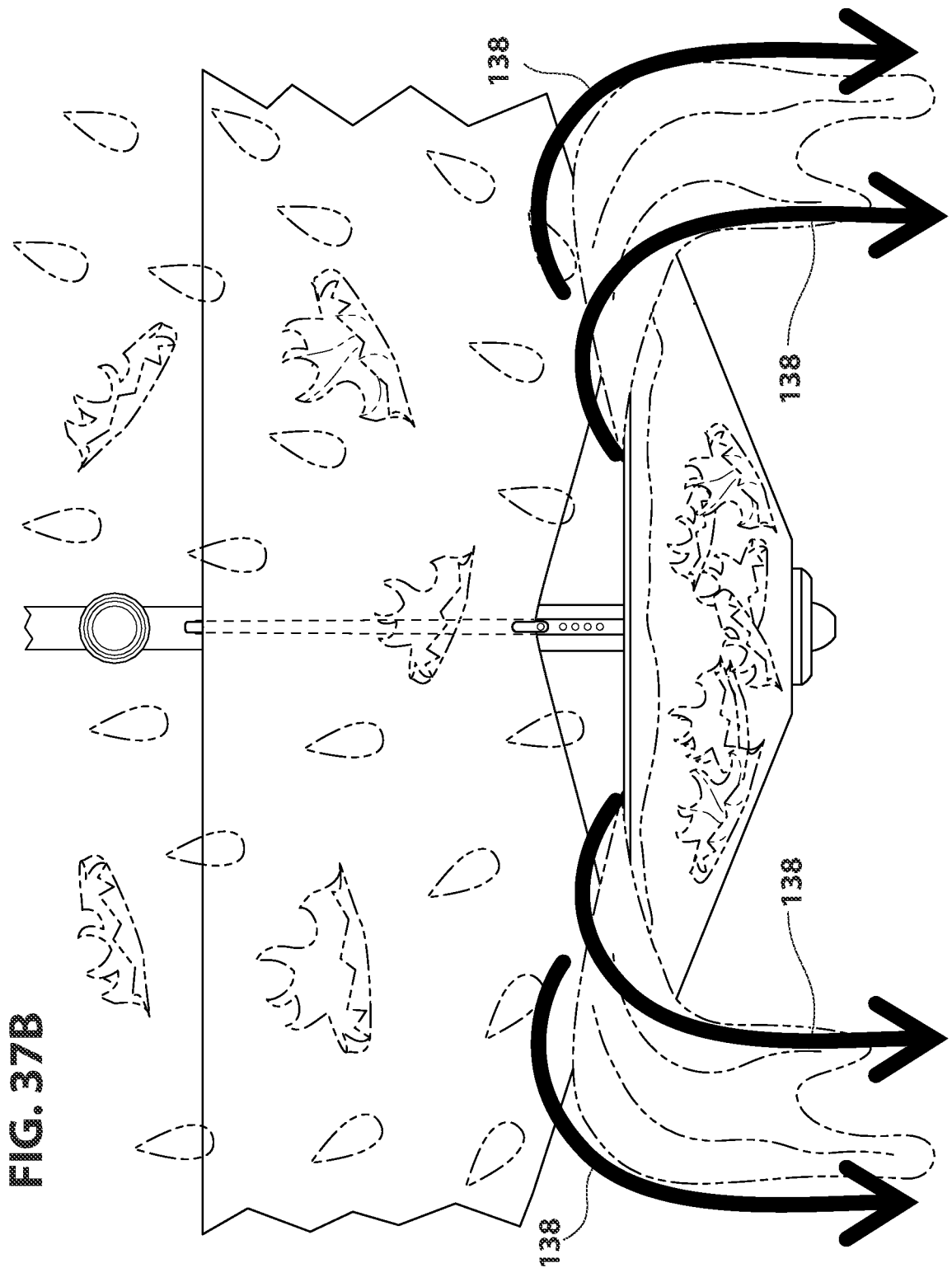

20) Sail-multi-orienting snap-lock housing 120
is (or are respectively) for:
a) Supporting upper post 118;
b) Providing means for upper post 118 to be oriented in multiple positions rotationally around a vertical axis
in the direction of arrow 147
(see FIG. 25); and
c) Working in conjunction with adjustable multi-orienting pole-rotation-locking holes 125 and pole-rotation-locking screw 126
to securely lock upper post 118 into predetermined positions
rotationally around a horizontal axis
in the direction of arrow 148
(see FIG. 28 and FIG. 29).

Figure 64B:
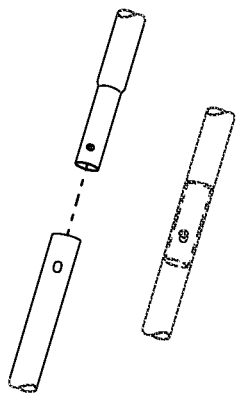
FIG. 64A, FIG. 64B, FIG. 64C, and FIG. 64D illustrate equivalent variations of five-device-in-one water-and-leaf-separating leaf-filtering water-collecting wind-blocking wind-redirecting marine-yacht-land-yacht-balcony-bumper-and-trailer-hitch-mountable sail, primary automatically-centered-and-reinforced ribs 108*a*, secondary automatically-centered-and-reinforced ribs 109*a*, and multi-rib-connecting automatically-centered-and-reinforced adjustable cores 110*a*.
Figure 64D:
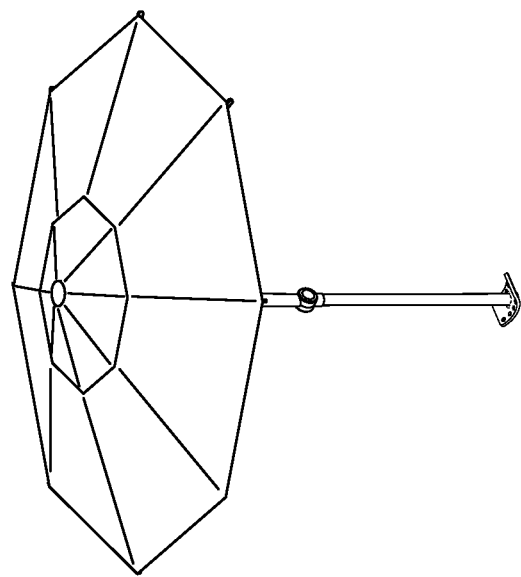
Figure 64A:
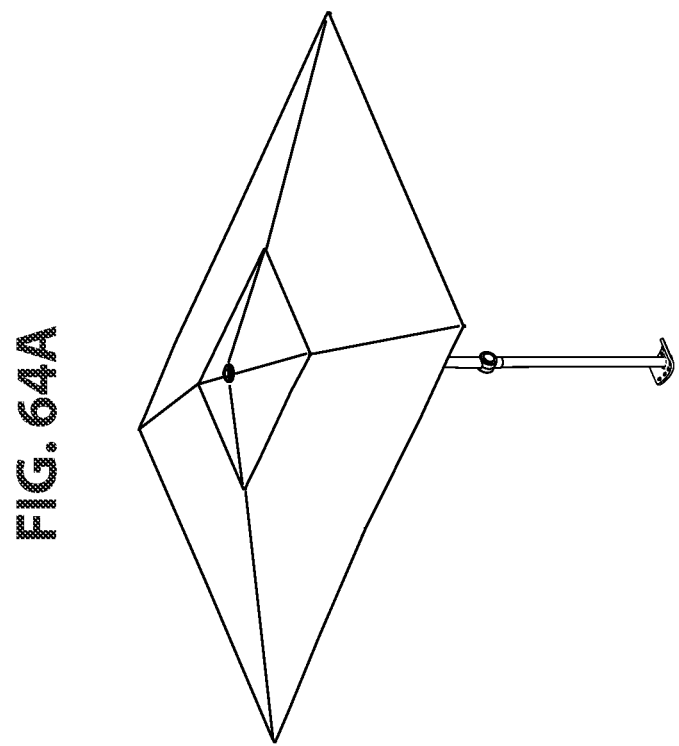
Figure 64C:
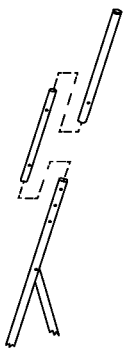
Figure 64E:
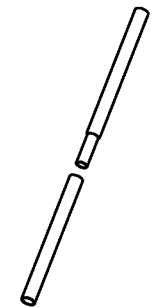
FIG. 64E, FIG. 64F, FIG. 64G, FIG. 64H, FIG. 64I, FIG. 64J, FIG. 64K, and FIG. 64L illustrate an equivalent variation of primary automatically-centered-and-reinforced ribs 108*a*, secondary automatically-centered-and-reinforced ribs 109a, and multi-rib-connecting automatically-centered-and-reinforced adjustable cores 110a, respectively.
Figure 64F:
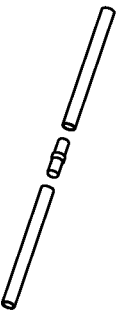
Figure 64G:
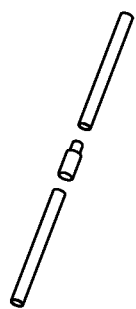
Figure 64H:
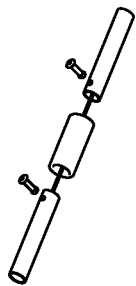
Figure 64I:
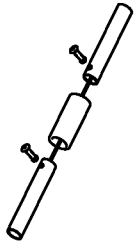
Figure 64J:
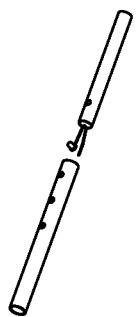
Figure 64K:
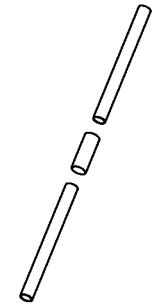
Figure 64L:
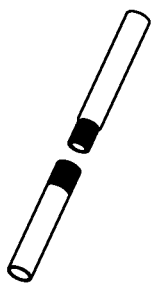
Figure 64M:
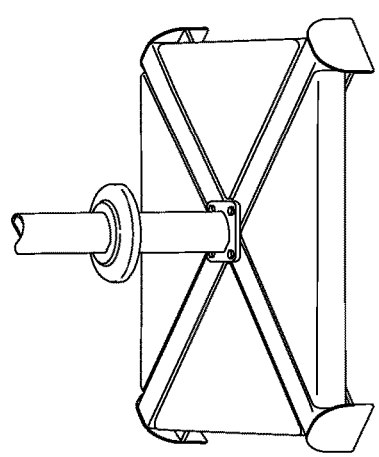
FIG. 64M illustrates equivalent variations of multi-function marine-yacht-water-collecting land-yacht-wind-redirecting balcony-privacy-screen-providing bumper-hooking trailer-hitch-mounting base system 127.
Figure 65B:
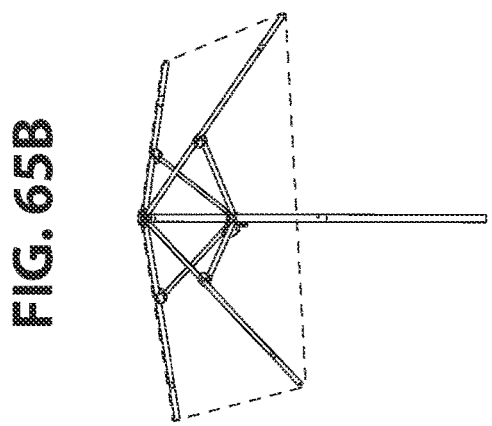
Figure 67A:
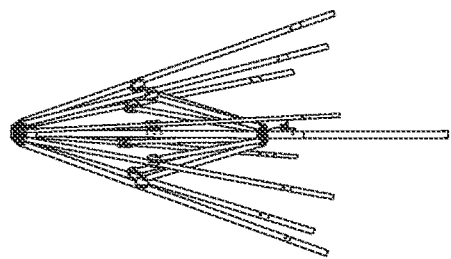
Figure 68:
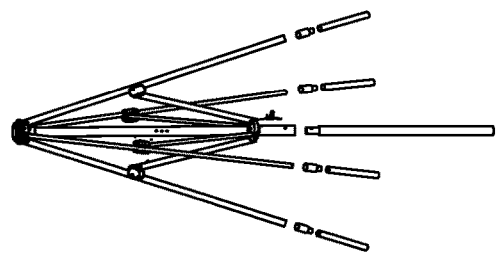
Figure 66B:
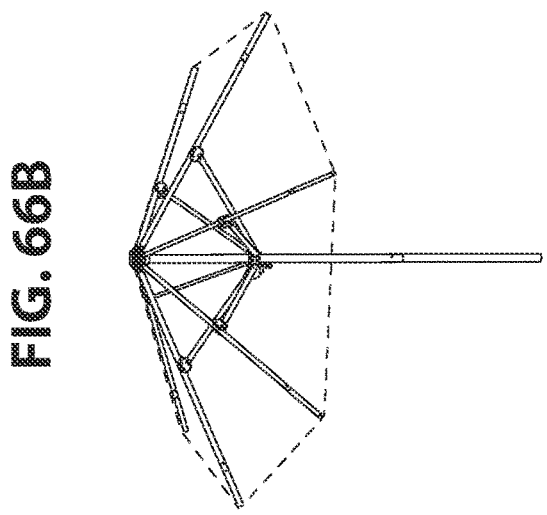
Figure 67B:
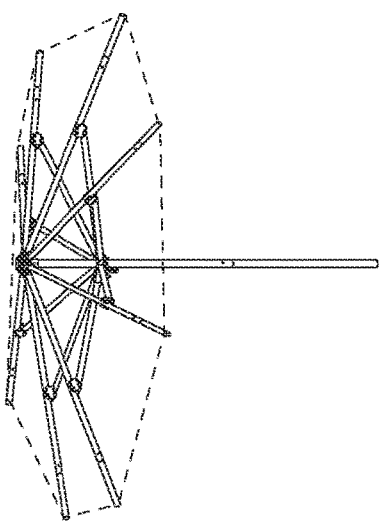
Figure 69:
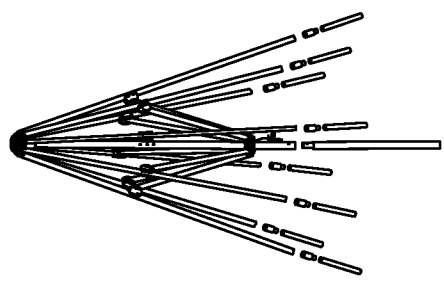
Figure 70:
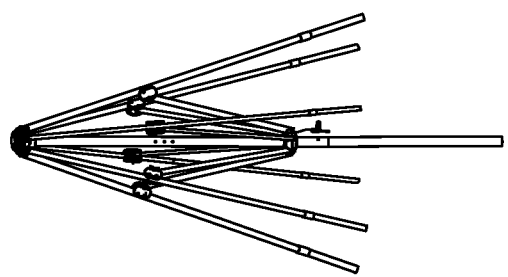
Figure 71:
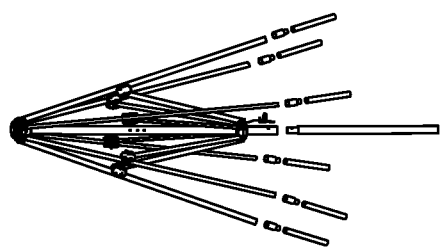
Figure 72:
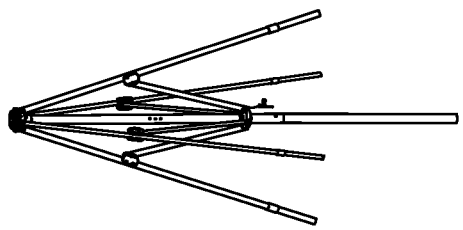
Figure 74:
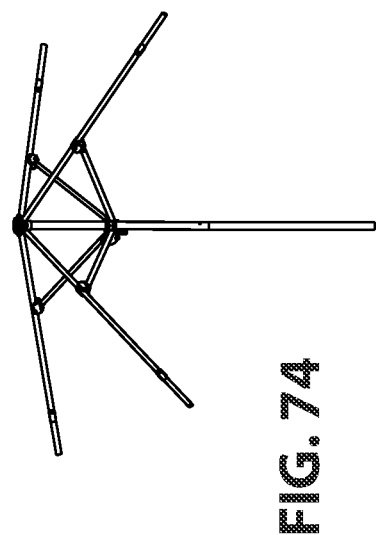
Figure 76:
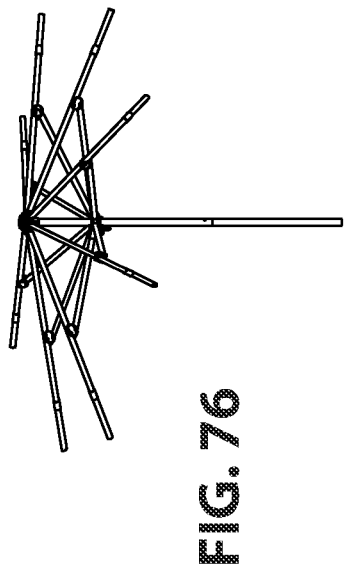
Figure 73:
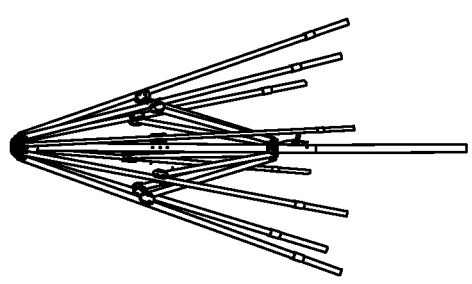
Figure 75:
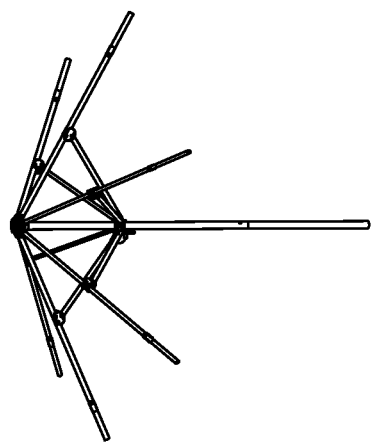
Figure 78:
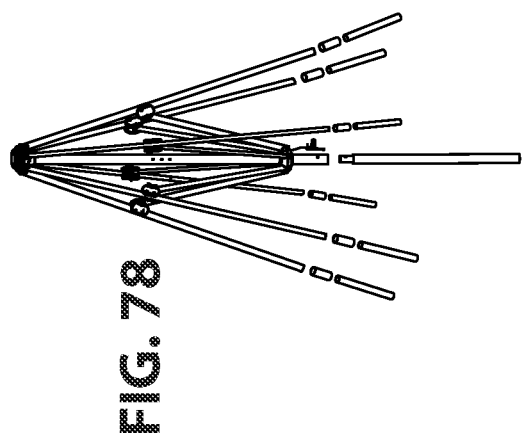
Figure 80:
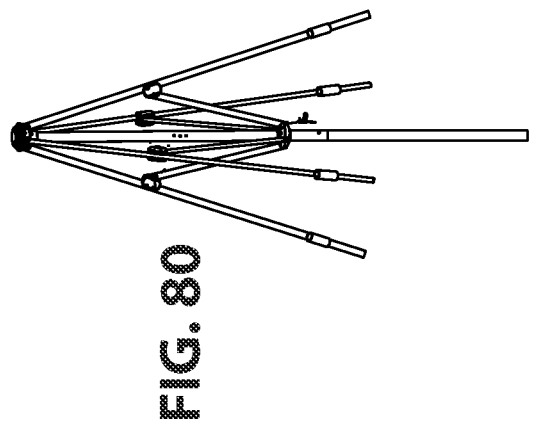
Figure 77:
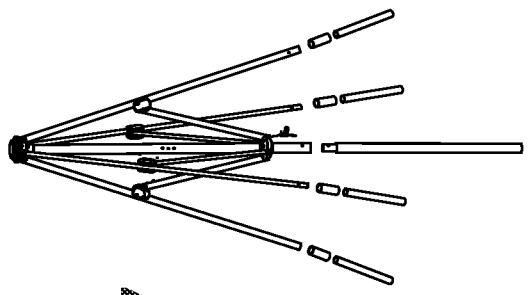
Figure 79:
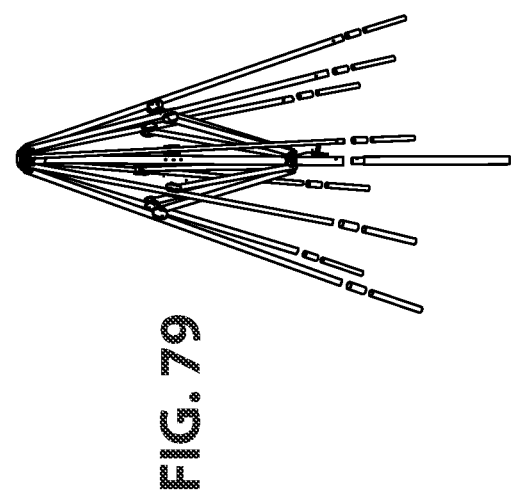
Figure 81:
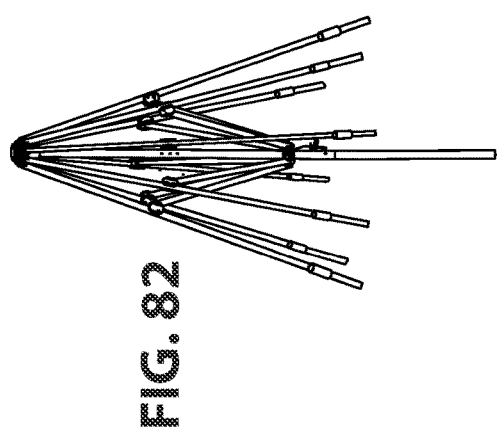
Figure 82:
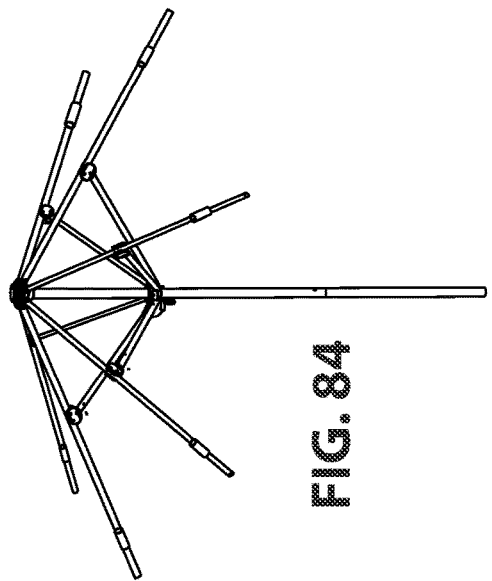
Figure 83:
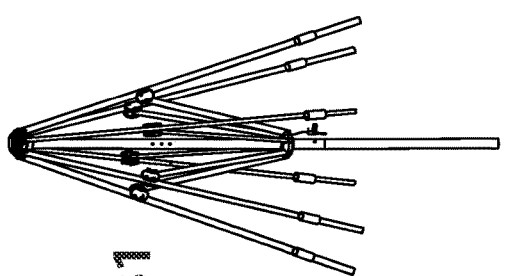
Figure 84:
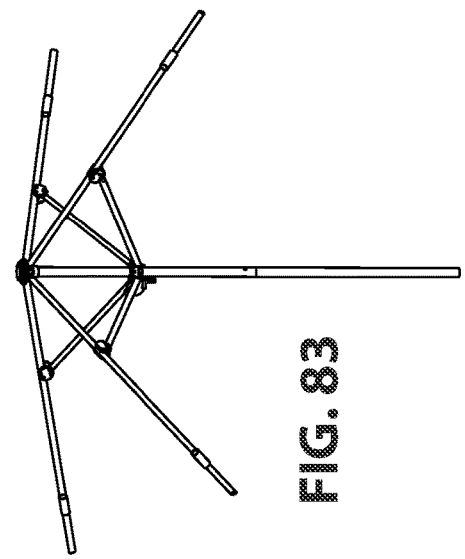
Figure 86:
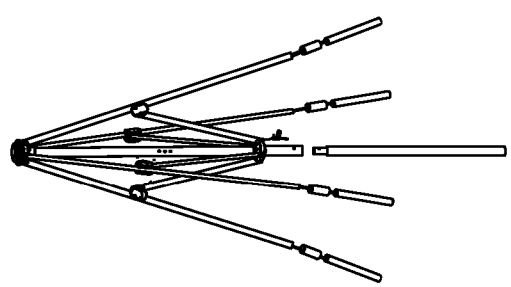
Figure 88:
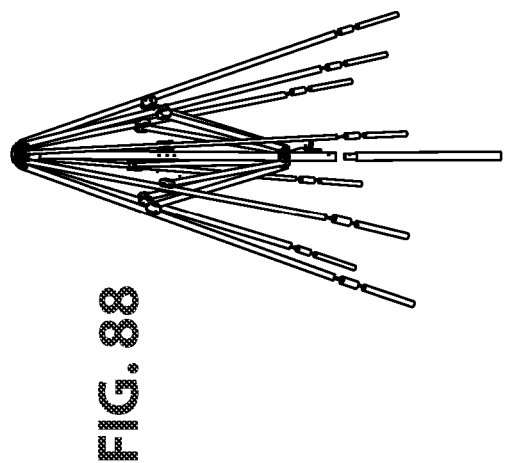
Figure 85:
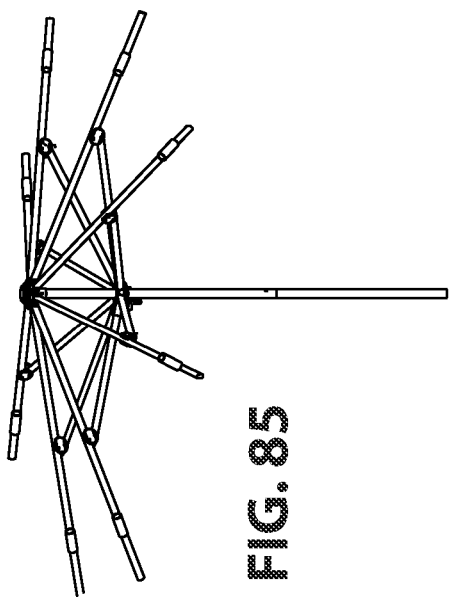
Figure 87:
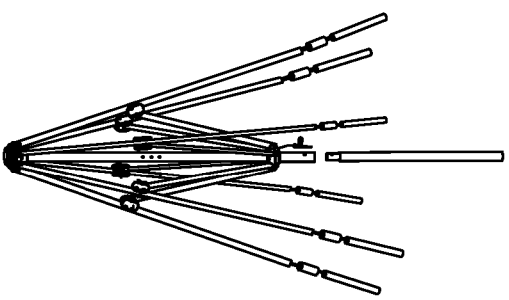
Figure 90:
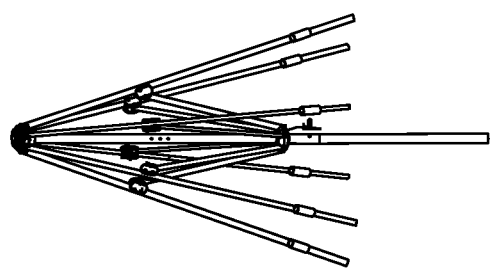
Figure 92:
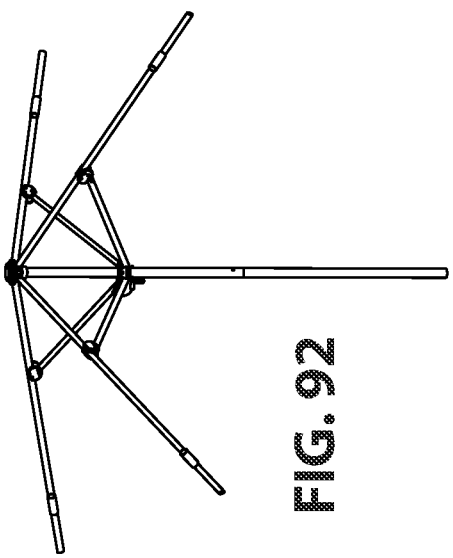
Figure 89:
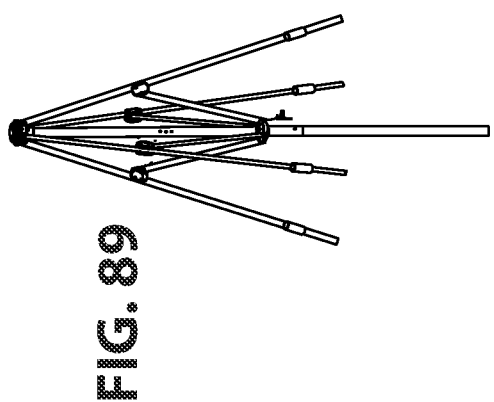
Figure 91:
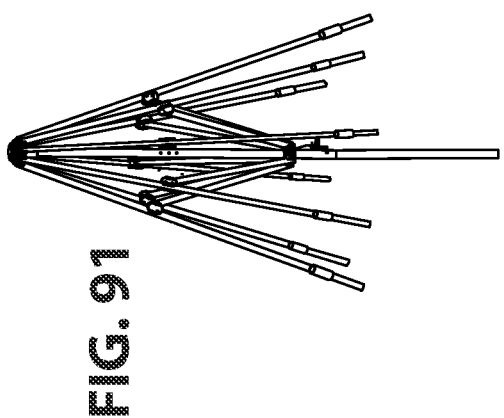
Figure 94:
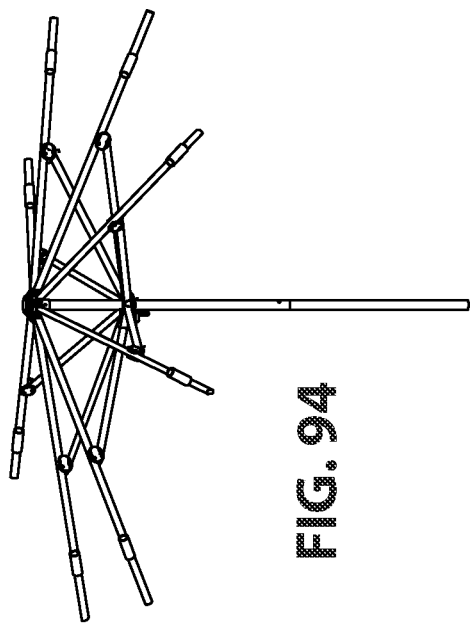
Figure 96:
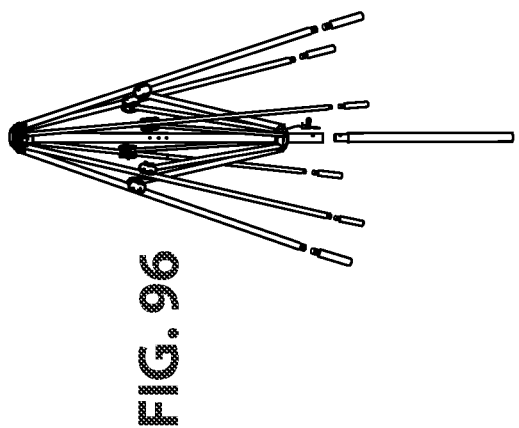
Figure 93:
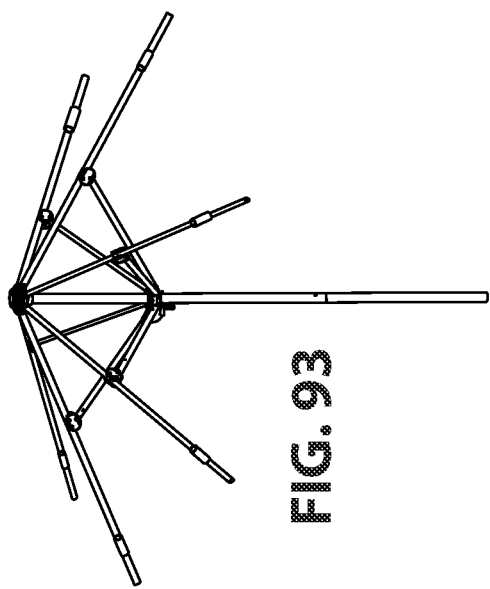
Figure 95:
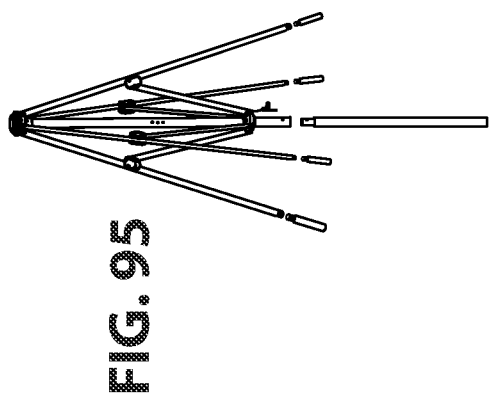
Figure 98:
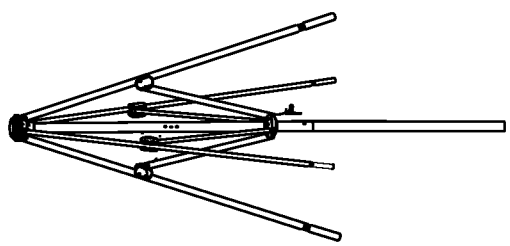
Figure 100:
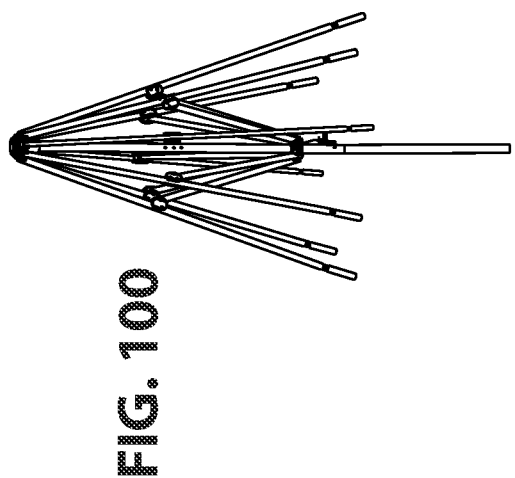
Figure 97:
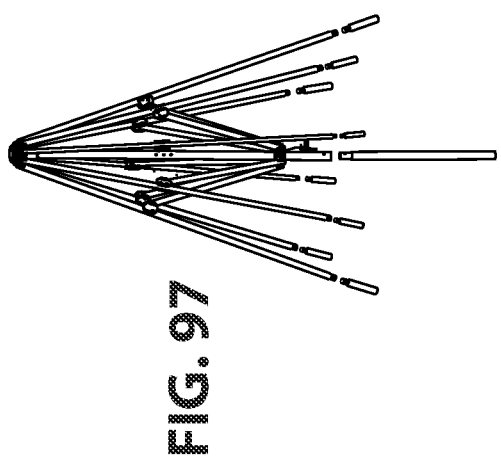
Figure 99:
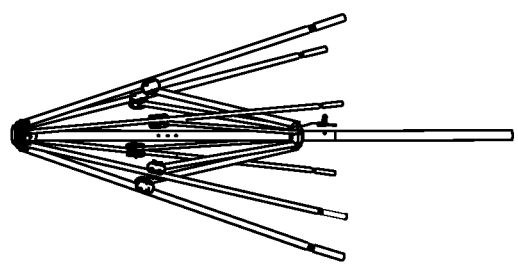
Figure 102:
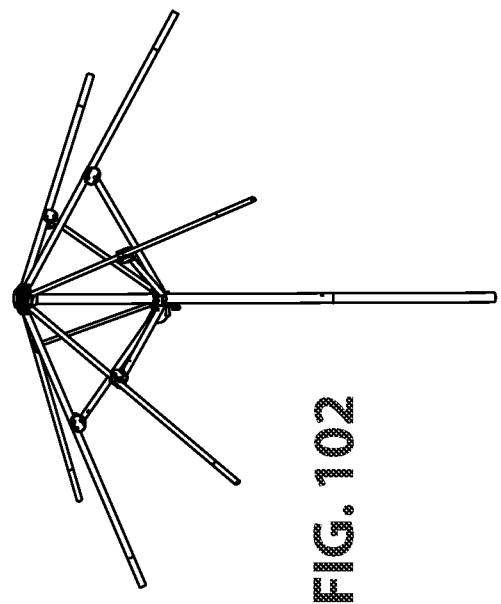
Figure 104:
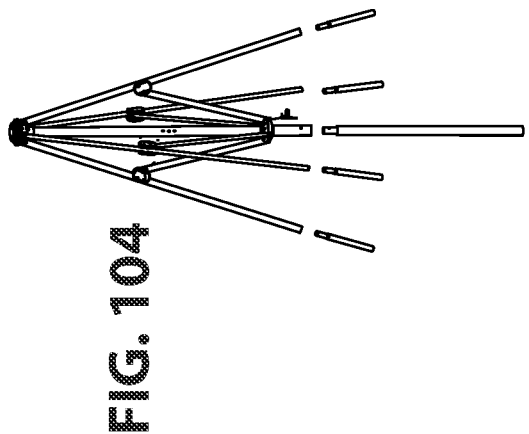
Figure 101:
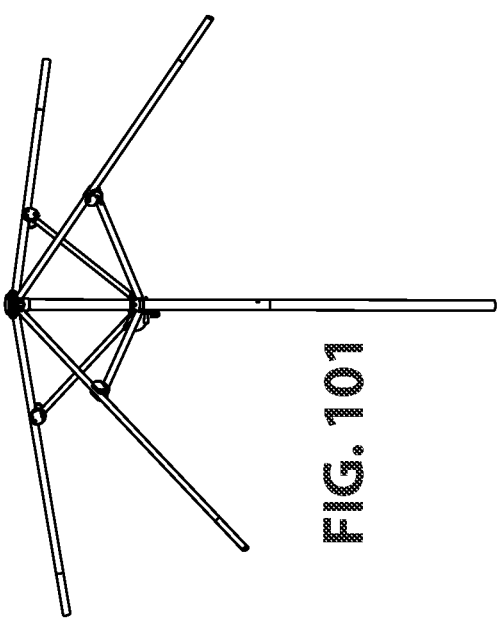
Figure 103:
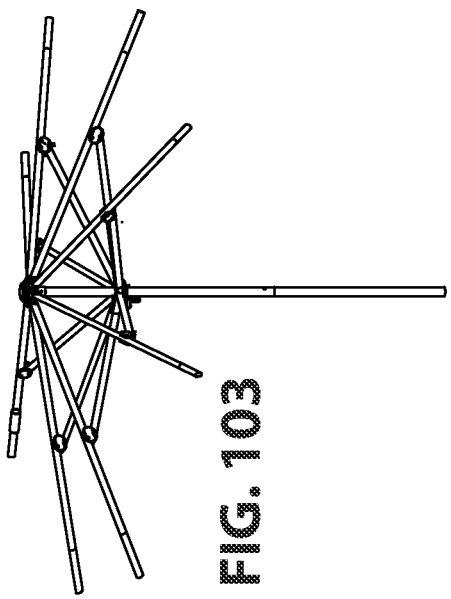
Figure 106:
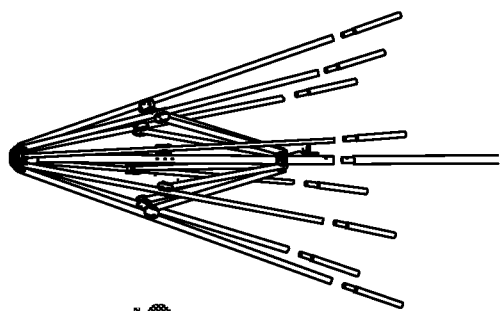
Figure 108:
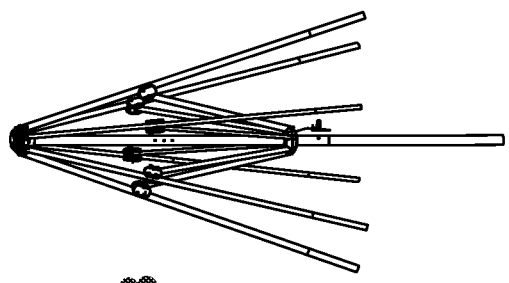
Figure 105:
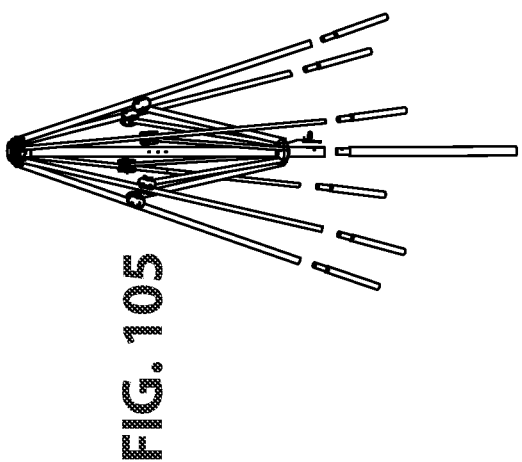
Figure 107:
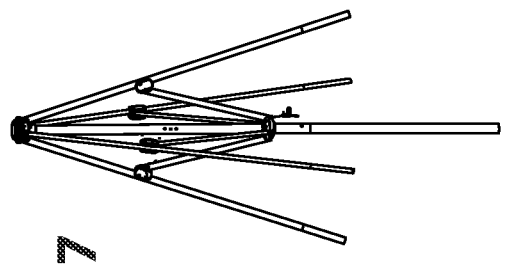
Figure 109:
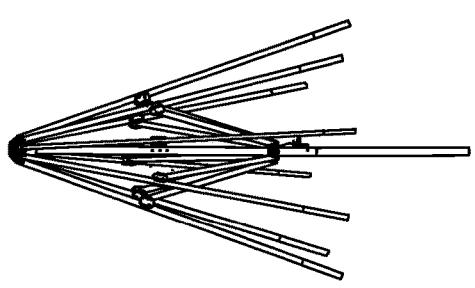
Figure 110:
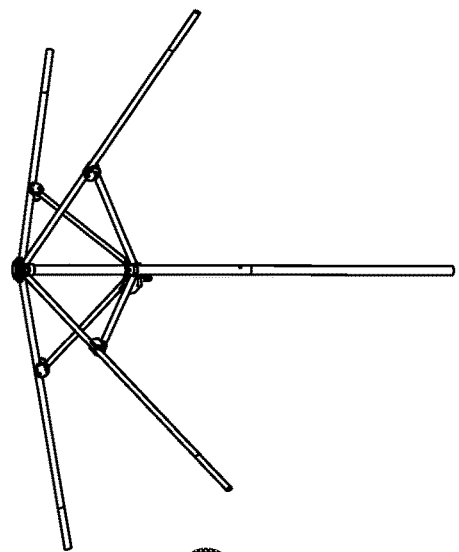
Figure 111:
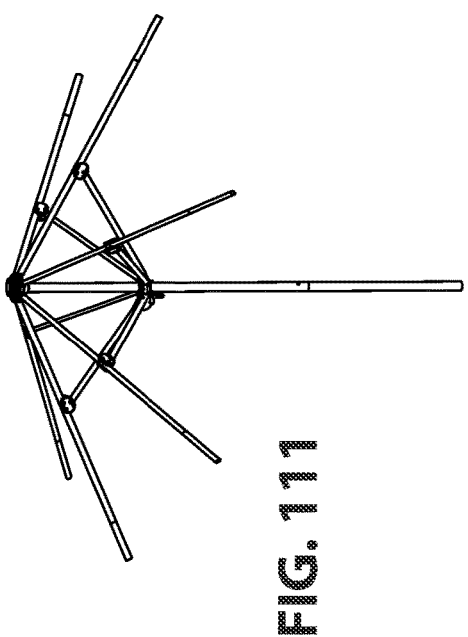
Figure 112:
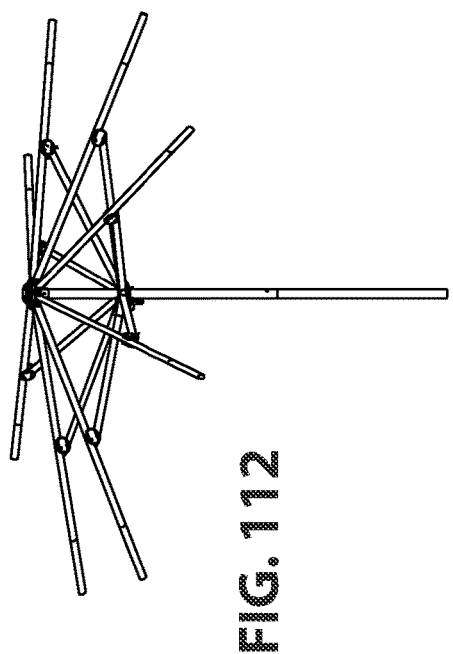
Figure 114:
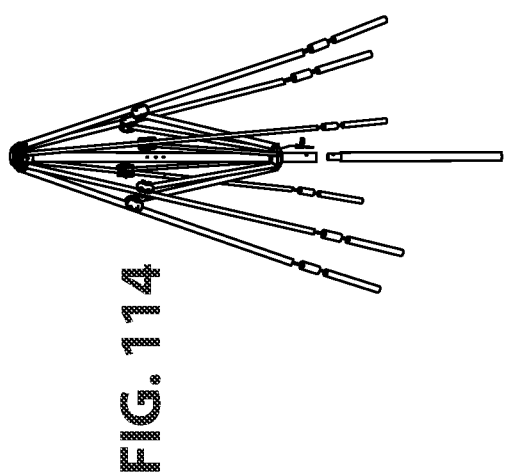
Figure 116:
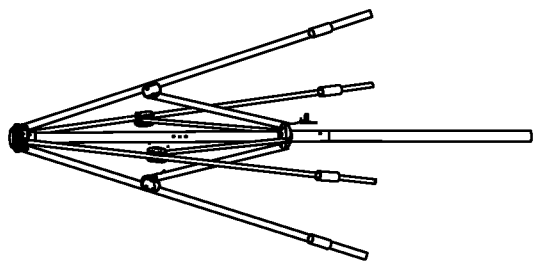
Figure 113:
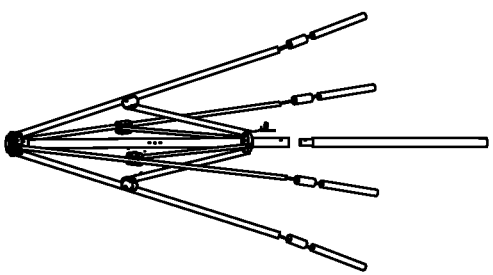
Figure 115:
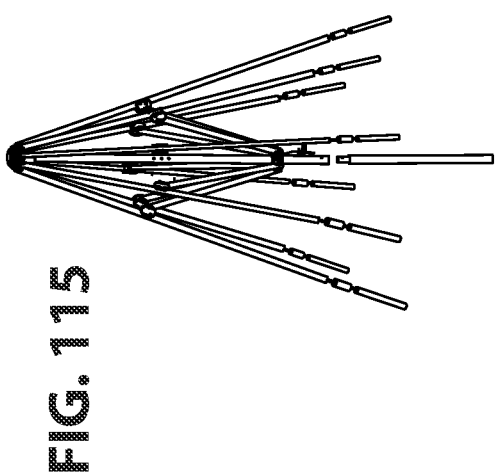
Figure 117:
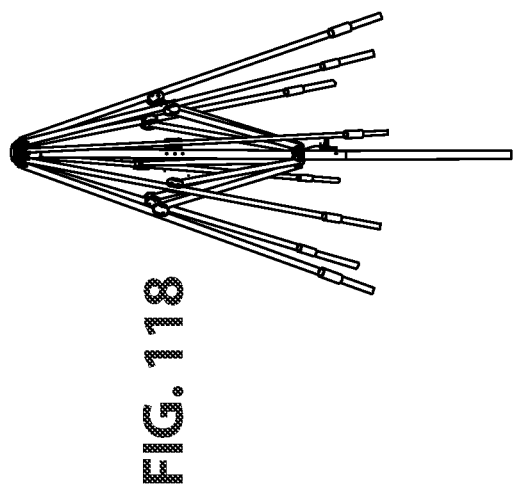
Figure 118:
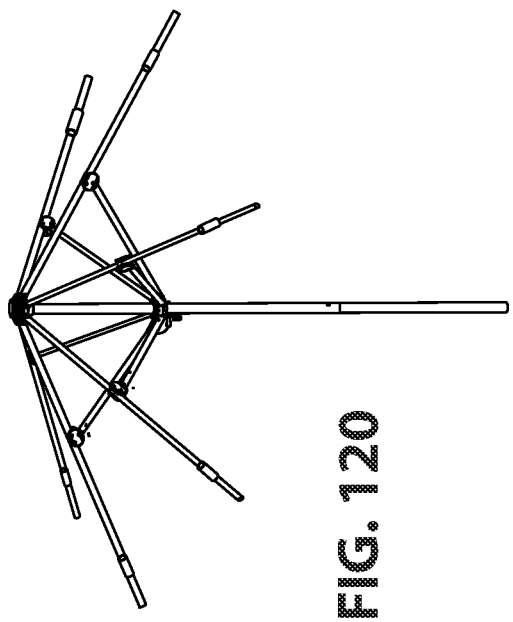
Figure 119:
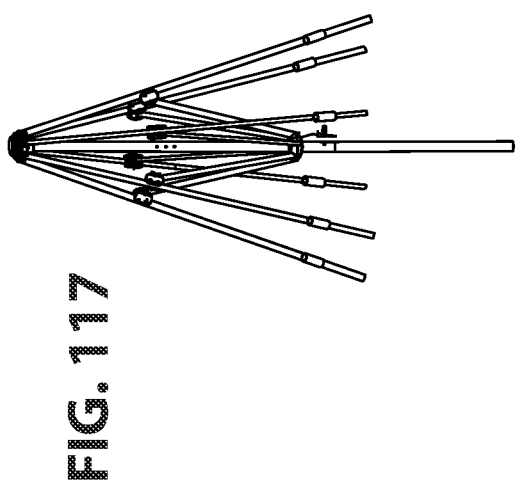
Figure 120:
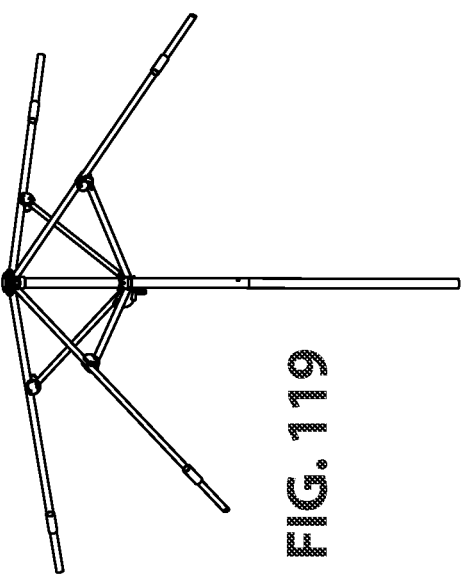
Figure 122:
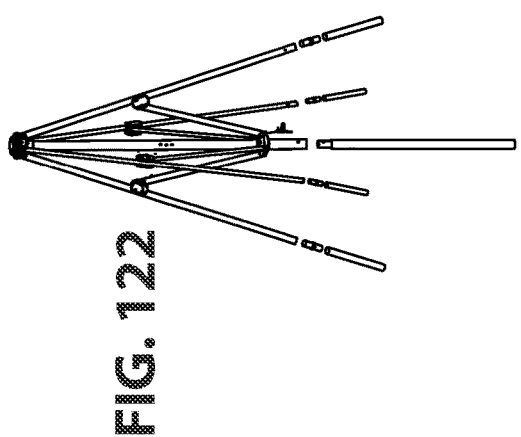
Figure 124:
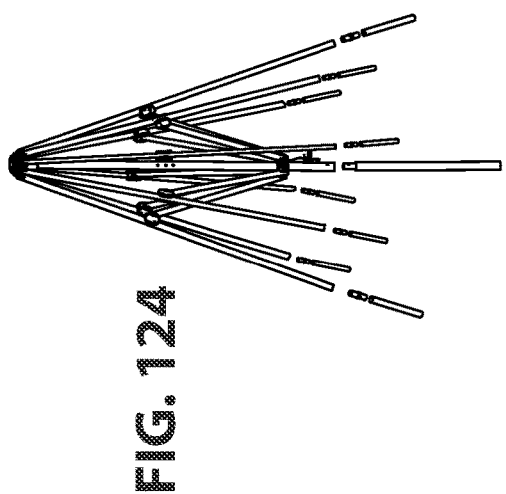
Figure 121:
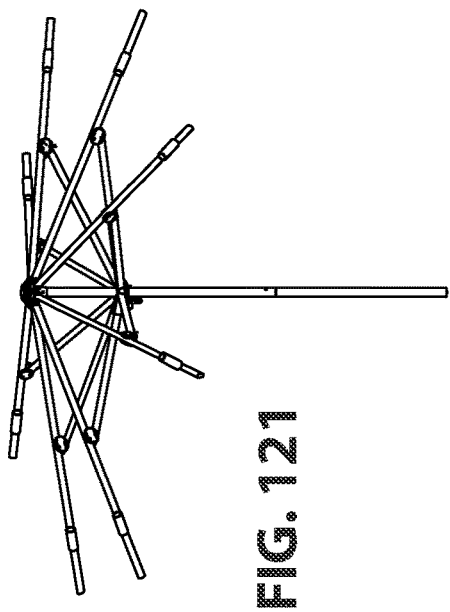
Figure 123:
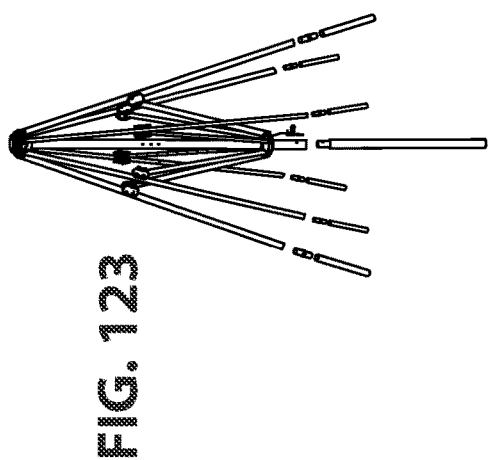
Figure 125:
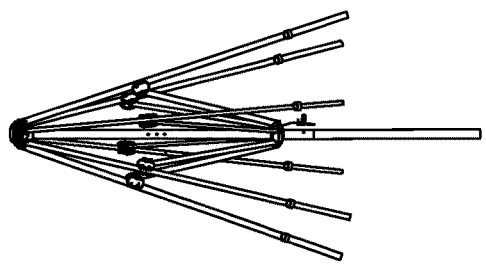
Figure 126:
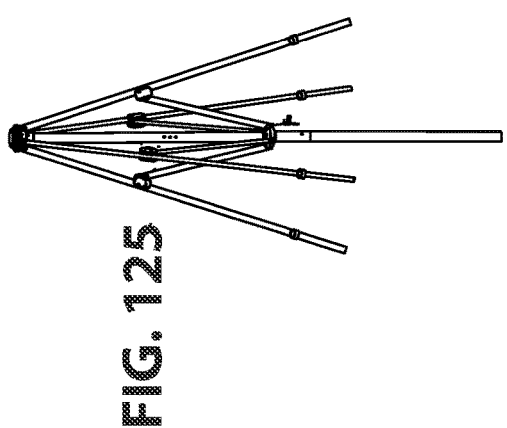
Figure 127:
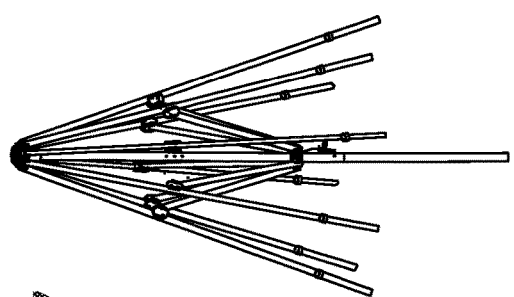
Figure 128:
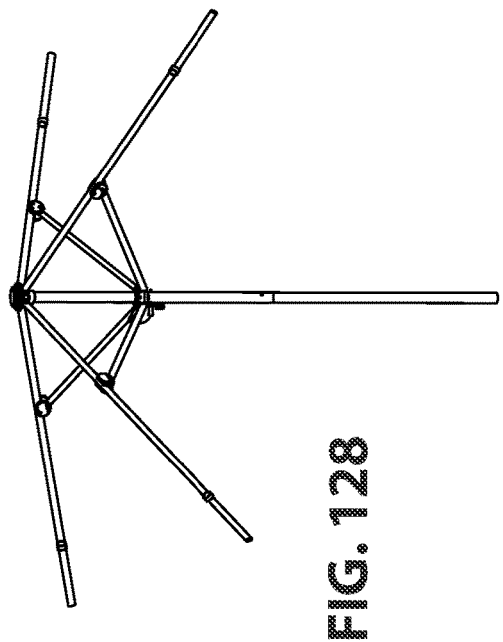
Figure 129:
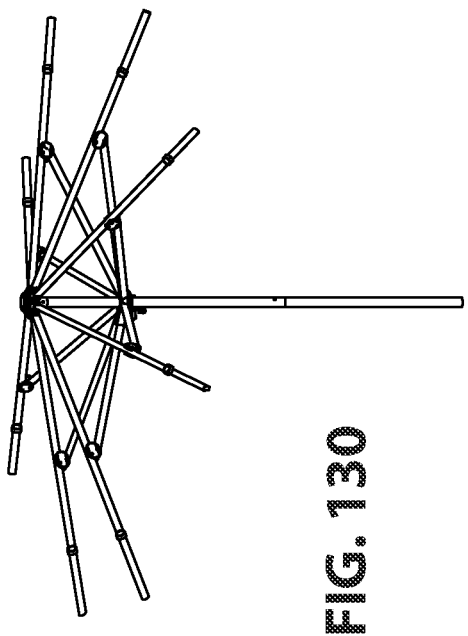
Figure 130:
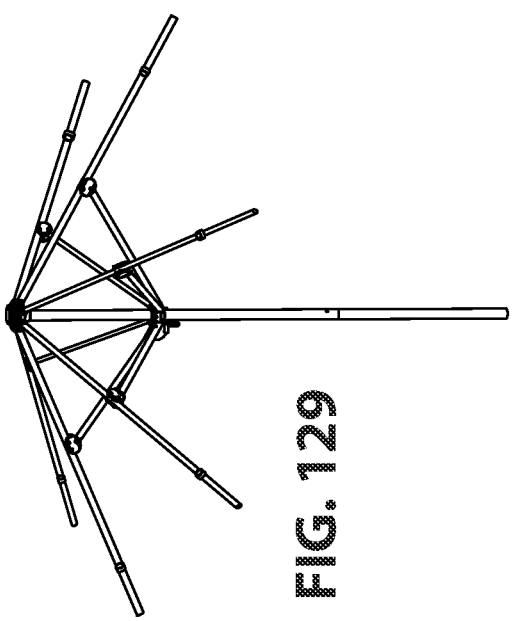
Figure 131:
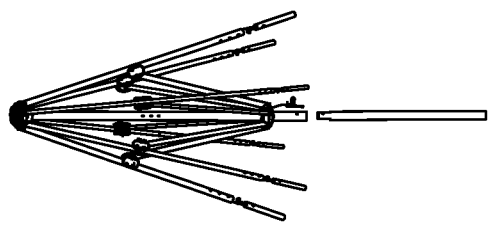
Figure 132:
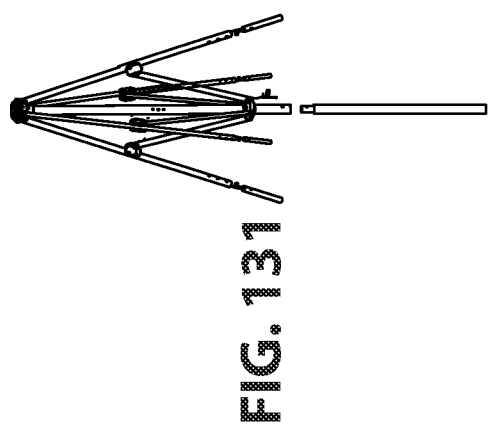
Figure 133:
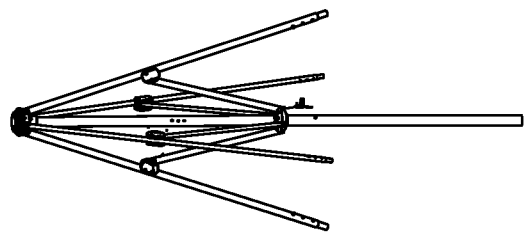
Figure 134:
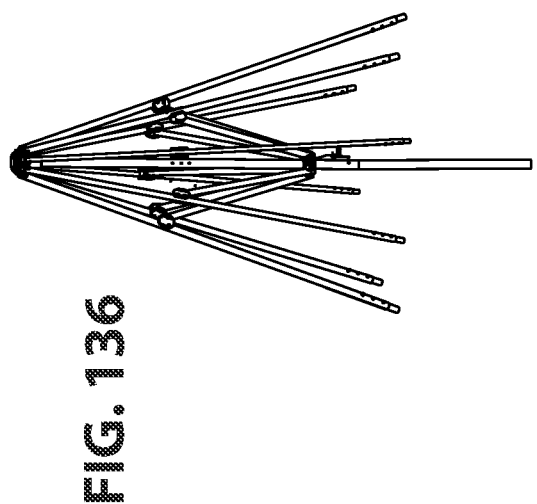
Figure 135:
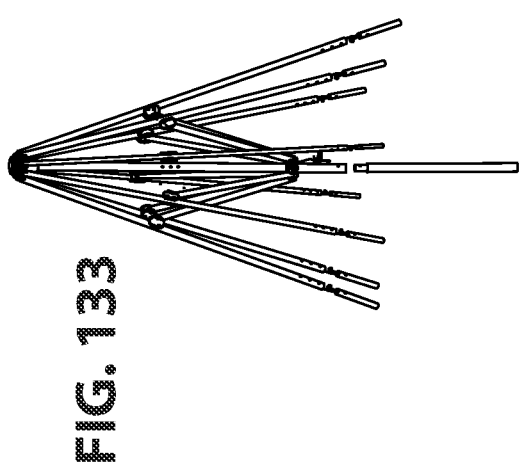
Figure 136:
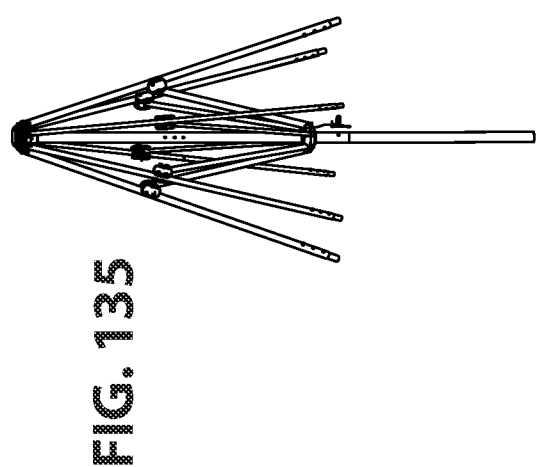
Figure 138:
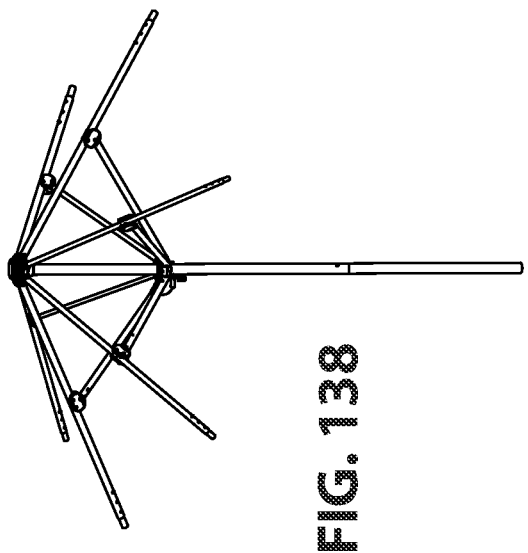
Figure 137:
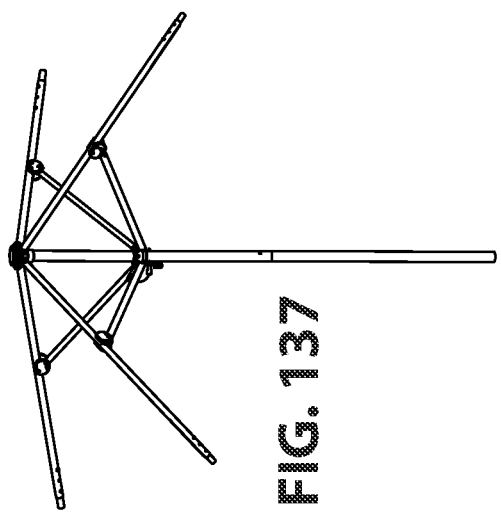
Figure 139:
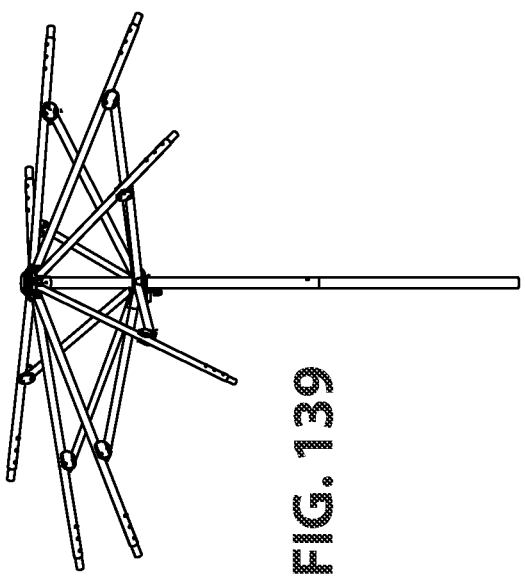

21) Snap-lock button 121
    is (or are respectively) for
    Working in conjunction with sail-multi-orienting snap-lock housing 120, snap-lock-button spring 123, snap-lock-button pin 122, and stationary snap-lock housing 124
        to securely lock upper post 118 into predetermined positions around a vertical axis
        in the direction of arrow 147
        (see FIG. 25).
22) Snap-lock-button pin 122
    is (or are respectively) for:
    Working in conjunction with sail-multi-orienting snap-lock housing 120, snap-lock-button spring 123, snap-lock button 121, and stationary snap-lock housing 124
        to securely lock upper post 118 into predetermined positions around a vertical axis
        in the direction of arrow 147
        (see FIG. 25).
23) Snap-lock-button spring 123
    is (or are respectively) for:
    a) Working in conjunction with sail-multi-orienting snap-lock housing 120, snap-lock-button pin 122, snap-lock button 121, and stationary snap-lock housing 124 to securely lock upper post 118 into predetermined positions around a vertical axis
        in the direction of arrow 147
        (see FIG. 25);
    b) Providing means for sail-multi-orienting snap-locking pivoting-elbow system 117 to securely lock into predetermined positions
        in the direction of arrow 147
        (see FIG. 25);
    c) Providing tension for snap-lock button 121; and
    d) Providing means to lock snap-lock-button pin 122.
24) Stationary snap-lock housing 124
    is (or are respectively) for:
    a) Supporting sail-multi-orienting snap-lock housing 120;
    b) Providing means for upper post 118 to be oriented in multiple positions rotationally around a vertical axis
        in the direction of arrow 147
        (see FIG. 25);
    c) Working in conjunction with sail-multi-orienting snap-lock housing 120, snap-lock-button spring 123, snap-lock-button pin 122, and snap-lock button 121
        to securely lock upper post 118 into predetermined positions rotationally around a horizontal axis
        in the direction of arrow 148
        (see FIG. 28 and FIG. 29); and
    d) Working in conjunction with sail-multi-orienting snap-lock housing 120, snap-lock-button spring 123, snap-lock-button pin 122, and snap-lock button 121
        to securely lock upper post 118 into predetermined positions around a vertical axis
        in the direction of arrow 147
        (see FIG. 25).
25) Adjustable multi-orienting pole-rotation-locking holes 125
    is (or are respectively) for:
    a) Providing means for the insertion of pole-rotation-locking screw 126 into upper post 118
        (see FIG. 28); and
    b) Working in conjunction with pole-rotation-locking screw 126 to securely lock upper post 118 into predetermined positions rotationally around a vertical axis
        in the direction of arrow 148
        (see FIG. 28 and FIG. 29).
26) Pole-rotation-locking screw 126
    is (or are respectively) for:
    a) Working in conjunction with adjustable multi-orienting pole-rotation-locking holes 125 to securely lock upper post 118 into predetermined positions rotationally around a horizontal axis
        in the direction of arrow 148
        (see FIG. 28 and FIG. 29); and
    b) Inserting into adjustable multi-orienting pole-rotation-locking holes 125
        (see FIG. 28).
27) Multi-function marine-yacht-water-collecting land-yacht-wind-redirecting balcony-privacy-screen-providing bumper-hooking trailer-hitch-mounting base system 127 is for performing the combined functions of its components.
28) Multi-angled multi-surface-mountable multi-plate-connecting reversible stackable base 128
    is (or are respectively) for:
    a) Stackably connecting multiple multi-angled multi-surface-mountable multi-plate-connecting reversible stackable bases 128 together
        (see FIG. 16, FIG. 17, FIG. 18, and FIG. 19)
    b) Securing the five-device-in-one water-and-leaf-separating leaf-filtering water-collecting wind-blocking wind-redirecting marine-yacht-land-yacht-balcony-bumper-and-trailer-hitch-mountable sail at the base of a wall
        (see FIG. 53);
    c) Securely wedging the five-device-in-one water-and-leaf-separating leaf-filtering water-collecting wind-blocking wind-redirecting marine-yacht-land-yacht-balcony-bumper-and-trailer-hitch-mountable sail to a step recess built into a truck-bumper corner or an RV-bumper corner without need for bolting
        (see FIG. 43A, FIG. 43B, FIG. 44, and FIG. 45);
    d) Securely wedging the five-device-in-one water-and-leaf-separating leaf-filtering water-collecting wind-blocking wind-redirecting marine-yacht-land-yacht-balcony-bumper-and-trailer-hitch-mountable sail into a tailgate gap without the need for bolting
        (see FIG. 42);
    e) Securely wedging the five-device-in-one water-and-leaf-separating leaf-filtering water-collecting wind-blocking wind-redirecting marine-yacht-land-yacht-balcony-bumper-and-trailer-hitch-mountable sail to a balcony railing without the need for bolting
        (see 62A, and FIG. 62B);
    f) Securely wedging the five-device-in-one water-and-leaf-separating leaf-filtering water-collecting wind-blocking wind-redirecting marine-yacht-land-yacht-balcony-bumper-and-trailer-hitch-mountable sail to a railing of a watercraft without the need for bolting
        (see FIG. 63A, FIG. 63B, FIG. 63C, and FIG. 63D);
    g) Securely attaching the five-device-in-one water-and-leaf-separating leaf-filtering water-collecting wind-blocking wind-redirecting marine-yacht-land-yacht-balcony-bumper-and-trailer-hitch-mountable sail to a tow hitch
        (see FIG. 48, and FIG. 49);

h) Securely attaching the five-device-in-one water-and-leaf-separating leaf-filtering water-collecting wind-blocking wind-redirecting marine-yacht-land-yacht-balcony-bumper-and-trailer-hitch-mountable sail to
a utility hole of a truck bed
(see FIG. 46, and FIG. 47);
i) Securely attaching the five-device-in-one water-and-leaf-separating leaf-filtering water-collecting wind-blocking wind-redirecting marine-yacht-land-yacht-balcony-bumper-and-trailer-hitch-mountable sail to
a wind-powered land vehicle
to act as a sail
in the direction of arrow 146
(see FIG. 63E, FIG. 63F, and FIG. 63G); and
j) Securely attaching the five-device-in-one water-and-leaf-separating leaf-filtering water-collecting wind-blocking wind-redirecting marine-yacht-land-yacht-balcony-bumper-and-trailer-hitch-mountable sail to
a column, table, wall, fence, bumper, balcony, or patio
(see FIG. 51, FIG. 52, FIG. 53, FIG. 54, FIG. 55, FIG. 56, FIG. 57, FIG. 58, FIG. 59, FIG. 60, and FIG. 61).
29) Multi-angled double-beveled base-mounting holes 129
is (or are respectively) for:
a) Adjustably installing multi-angled semi-spherical-headed base-mounting bolts 130 and multi-angled semi-spherical-headed base-mounting nuts 131 in multiple different angles;
b) Pivotably securing multi-angled semi-spherical-headed base-mounting bolts 130 and multi-angled semi-spherical-headed base-mounting nuts 131 in multiple different angles
in the direction of arrow 149a, 149b, 149c, 149d, 149e, 149f, 149g, 149h, 149i, and 149j;
(see FIG. 30, FIG. 31A, FIG. 31B, and FIG. 31C); and
c) Installing the five-device-in-one water-and-leaf-separating leaf-filtering water-collecting wind-blocking wind-redirecting marine-yacht-land-yacht-balcony-bumper-and-trailer-hitch-mountable sail in a variety of different locations and angles
(see FIG. 15).
30) Multi-angled semi-spherical-headed base-mounting bolts 130
is (or are respectively) for:
a) Being pivotably inserted into multi-angled double-beveled base-mounting holes 129;
b) Providing a semi-spherical head to pivot within multi-angled double-beveled base-mounting holes 129
to allow many angles for inserting and installing
in the direction of arrow 149a, 149b, 149c, 149d, 149e, 149f, 149g, 149h, 149i, and 149j;
(see FIG. 30, FIG. 31A, FIG. 31B, and FIG. 31C); and
c) Threadedly attaching to multi-angled semi-spherical-headed base-mounting nuts 131.
31) Multi-angled semi-spherical-headed base-mounting nuts 131
is (or are respectively) for:
a) Being pivotably capable of fitting into multi-angled double-beveled base-mounting holes 129;
b) Providing a semi-spherical shape to pivot within multi-angled double-beveled base-mounting holes 129
to allow many angles for inserting and installing
in the direction of arrow 149a, 149b, 149c, 149d, 149e, 149f, 149g, 149h, 149i, and 149j;
(see FIG. 30, FIG. 31A, FIG. 31B, and FIG. 31C); and
c) Threadedly attaching to multi-angled semi-spherical-headed base-mounting bolts 130.
32) First post-stabilizing foot 132
is (or are respectively) for:
Stabilizing the five-device-in-one water-and-leaf-separating leaf-filtering water-collecting wind-blocking wind-redirecting marine-yacht-land-yacht-balcony-bumper-and-trailer-hitch-mountable sail to prevent from tipping over.
33) Second post-stabilizing foot 133
is (or are respectively) for:
Stabilizing the five-device-in-one water-and-leaf-separating leaf-filtering water-collecting wind-blocking wind-redirecting marine-yacht-land-yacht-balcony-bumper-and-trailer-hitch-mountable sail to prevent from tipping over.
34) Four weight securing toe-plates 134
is (or are respectively) for:
Stabilizing the five-device-in-one water-and-leaf-separating leaf-filtering water-collecting wind-blocking wind-redirecting marine-yacht-land-yacht-balcony-bumper-and-trailer-hitch-mountable sail to prevent from tipping over.
35) Four base-stabilizing weights 135
is (or are respectively) for:
Weightedly stabilizing the five-device-in-one water-and-leaf-separating leaf-filtering water-collecting wind-blocking wind-redirecting marine-yacht-land-yacht-balcony-bumper-and-trailer-hitch-mountable sail to prevent from tipping over.
Variation
Referring to FIG. 64A, FIG. 64B, FIG. 64C, FIG. 64D, FIG. 64E, FIG. 64F, FIG. 64G, FIG. 64H, FIG. 64I, FIG. 64J, FIG. 64K, FIG. 64L, FIG. 64M, FIG. 65A, FIG. 65B, FIG. 66A, FIG. 66B, FIG. 67A, FIG. 67B, FIG. 68, FIG. 68, FIG. 68, FIG. 69, FIG. 70, FIG. 71, FIG. 72, FIG. 73, FIG. 74, FIG. 75, FIG. 76, FIG. 77, FIG. 78, FIG. 79, FIG. 80, FIG. 81, FIG. 82, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, FIG. 98, FIG. 99, FIG. 100, FIG. 101, FIG. 102, FIG. 103, FIG. 104, FIG. 105, FIG. 106, FIG. 107, FIG. 108, FIG. 109, FIG. 110, FIG. 111, FIG. 112, FIG. 113, FIG. 114, FIG. 115, FIG. 116, FIG. 117, FIG. 118, FIG. 119, FIG. 120, FIG. 121, FIG. 122, FIG. 123, FIG. 124, FIG. 125, FIG. 126, FIG. 127, FIG. 128, FIG. 129, FIG. 130, FIG. 131, FIG. 132, FIG. 133, FIG. 134, FIG. 135, FIG. 136, FIG. 137, FIG. 138, and FIG. 139:
Any component of the five-device-in-one water-and-leaf-separating leaf-filtering water-collecting wind-blocking wind-redirecting marine-yacht-land-yacht-balcony-bumper-and-trailer-hitch-mountable sail can have any shape and size. Any component of the five-device-in-one water-and-leaf-separating leaf-filtering water-collecting wind-blocking wind-redirecting marine-yacht-land-yacht-balcony-bumper-and-trailer-hitch-mountable sail can be made of any material or any combination of any materials. Any component of the five-device-in-one water-and-leaf-separating leaf-filtering water-collecting wind-blocking wind-redirecting marine-yacht-land-yacht-balcony-bumper-and-trailer-hitch-mountable sail can be made of any flexible, semi-flexible, bendable, semi-bendable, rigid, or semi-rigid material(s). Any component of the five-device-in-one water-and-leaf-separating leaf-filtering water-collecting wind-blocking wind-redirecting marine-yacht-land-yacht-balcony-bumper-and-trailer-hitch-mountable sail can be assembled together in any direction and angle. Any component of the five-device-in-one water-and-leaf-separating leaf-filtering water-collecting wind-blocking wind-redirecting marine-yacht-land-yacht-balcony-bumper-and-trailer-hitch-mountable sail can be attached to any other component(s) of the five-device-in-one water-and-leaf-separating leaf-filtering water-collecting wind-blocking wind-redirecting marine-yacht-land-yacht-balcony-bumper-and-trailer-hitch-mountable sail in any direction and angle. Any side of any component of the five-device-in-one water-and-leaf-separating leaf-filtering water-collecting wind-blocking wind-redirecting marine-yacht-land-yacht-balcony-bumper-and-trailer-hitch-mountable sail can be attached to any side of any other component(s) of the five-device-in-one water-and-leaf-separating leaf-filtering water-collecting wind-blocking wind-redirecting marine-yacht-land-yacht-balcony-bumper-and-trailer-hitch-mountable sail. For example, FIG. 64A, FIG. 64B, FIG. 64C, and FIG. 64D illustrate equivalent variations of five-device-in-one water-and-leaf-separating leaf-filtering water-collecting wind-blocking wind-redirecting marine-yacht-land-yacht-balcony-bumper-and-trailer-hitch-mountable sail, primary automatically-centered-and-reinforced ribs 108a, secondary automatically-centered-and-reinforced ribs 109a, and multi-rib-connecting automatically-centered-and-reinforced adjustable cores 110a. For example, FIG. 64E, FIG. 64F, FIG. 64G, FIG. 64H, FIG. 64I, FIG. 64J, FIG. 64K, and FIG. 64L illustrate an equivalent variation of primary automatically-centered-and-reinforced ribs 108a, secondary automatically-centered-and-reinforced ribs 109a, and multi-rib-connecting automatically-centered-and-reinforced adjustable cores 110a, respectively. For example, FIG. 64M illustrates equivalent variations of multi-function marine-yacht-water-collecting land-yacht-wind-redirecting balcony-privacy-screen-providing bumper-hooking trailer-hitch-mounting base system 127. For example, FIG. 65A, FIG. 65B, FIG. 66A, FIG. 66B, FIG. 67A, FIG. 67B, FIG. 68, FIG. 68, FIG. 68, FIG. 69, FIG. 70, FIG. 71, FIG. 72, FIG. 73, FIG. 74, FIG. 75, FIG. 76, FIG. 77, FIG. 78, FIG. 79, FIG. 80, FIG. 81, FIG. 82, FIG. 83, FIG. 84, FIG. 85, FIG. 86, FIG. 87, FIG. 88, FIG. 89, FIG. 90, FIG. 91, FIG. 92, FIG. 93, FIG. 94, FIG. 95, FIG. 96, FIG. 97, FIG. 98, FIG. 99, FIG. 100, FIG. 101, FIG. 102, FIG. 103, FIG. 104, FIG. 105, FIG. 106, FIG. 107, FIG. 108, FIG. 109, FIG. 110, FIG. 111, FIG. 112, FIG. 113, FIG. 114, FIG. 115, FIG. 116, FIG. 117, FIG. 118, FIG. 119, FIG. 120, FIG. 121, FIG. 122, FIG. 123, FIG. 124, FIG. 125, FIG. 126, FIG. 127, FIG. 128, FIG. 129, FIG. 130, FIG. 131, FIG. 132, FIG. 133, FIG. 134, FIG. 135, FIG. 136, FIG. 137, FIG. 138, and FIG. 139 illustrate equivalent variations of five-device-in-one water-and-leaf-separating leaf-filtering water-collecting wind-blocking wind-redirecting marine-yacht-land-yacht-balcony-bumper-and-trailer-hitch-mountable sail.

Major Advantages of the Invention

The present invention substantially departs from the conventional concepts and methods of the prior art. In doing so, the present invention provides (a or an) five-device-in-one water-and-leaf-separating leaf-filtering water-collecting wind-blocking wind-redirecting marine-yacht-land-yacht-balcony-bumper-and-trailer-hitch-mountable sail, having many unique and significant features, functions, and advantages, which overcome all the disadvantages of the prior art, as follows:

1) It is an object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
adjustable water-and-leaf-separating leaf-filtering central sail 105.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of functioning as a water diverting device
    to predeterminately redirect the flow of water
    in the directions of arrows 136 and 137
    (see FIG. 36);
  b) Capable of functioning as a leaf filtering device
    to filter leaves from rain water when used upside down
    in the direction of arrow 138
    (see FIG. 37A and FIG. 37B);
  c) Capable of functioning as a water collector
    to collect rain water when used upside down
    in the directions of arrows 136 and 137
    (see FIG. 36);
  d) Capable of functioning as a wind blocker
    to block wind
    (see FIG. 58 and FIG. 60);
  e) Capable of functioning as a privacy screen
    to provide privacy
    (see FIG. 57);
  f) Capable of functioning as an awning
    to angledly block rain and sun beams
    (see FIG. 53);
  g) Capable of functioning as a canopy
    to vertically block rain and sun beams
    (see FIG. 53);
  h) Capable of functioning as a wind redirector
    to redirect wind in and out of sail
    in the directions of arrows 139, 140, 141, and 142
    (see FIG. 39, and FIG. 40); and
  i) Capable of functioning as a sail-steering wind-powered device
    to steer the sail in multiple different directions
    in the directions of arrows 143 and 144
    (see FIG. 41, FIG. 63E, FIG. 63F, and FIG. 63G).

2) It is yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
primary automatically-centered-and-reinforced ribs 108a.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of resisting bending and warping due to heavy winds
    in the direction of arrow 145
    (see FIG. 38A (Prior Art);
  b) Capable of providing reinforced infrastructure for a sail when used on a wind-powered land vehicle
    in the direction of arrow 146
    (see FIG. 63E, FIG. 63F, and FIG. 63G);
  c) Capable of proving reinforced infrastructure for an emergency rainwater collecting device on a marine vessel
    (see FIG. 63C and FIG. 63D); and
  d) Capable of providing reinforced infrastructure for a shade canopy.

3) It is still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having primary automatic-rib-centering-and-reinforcing rail 108*b*.

Figure 38A:
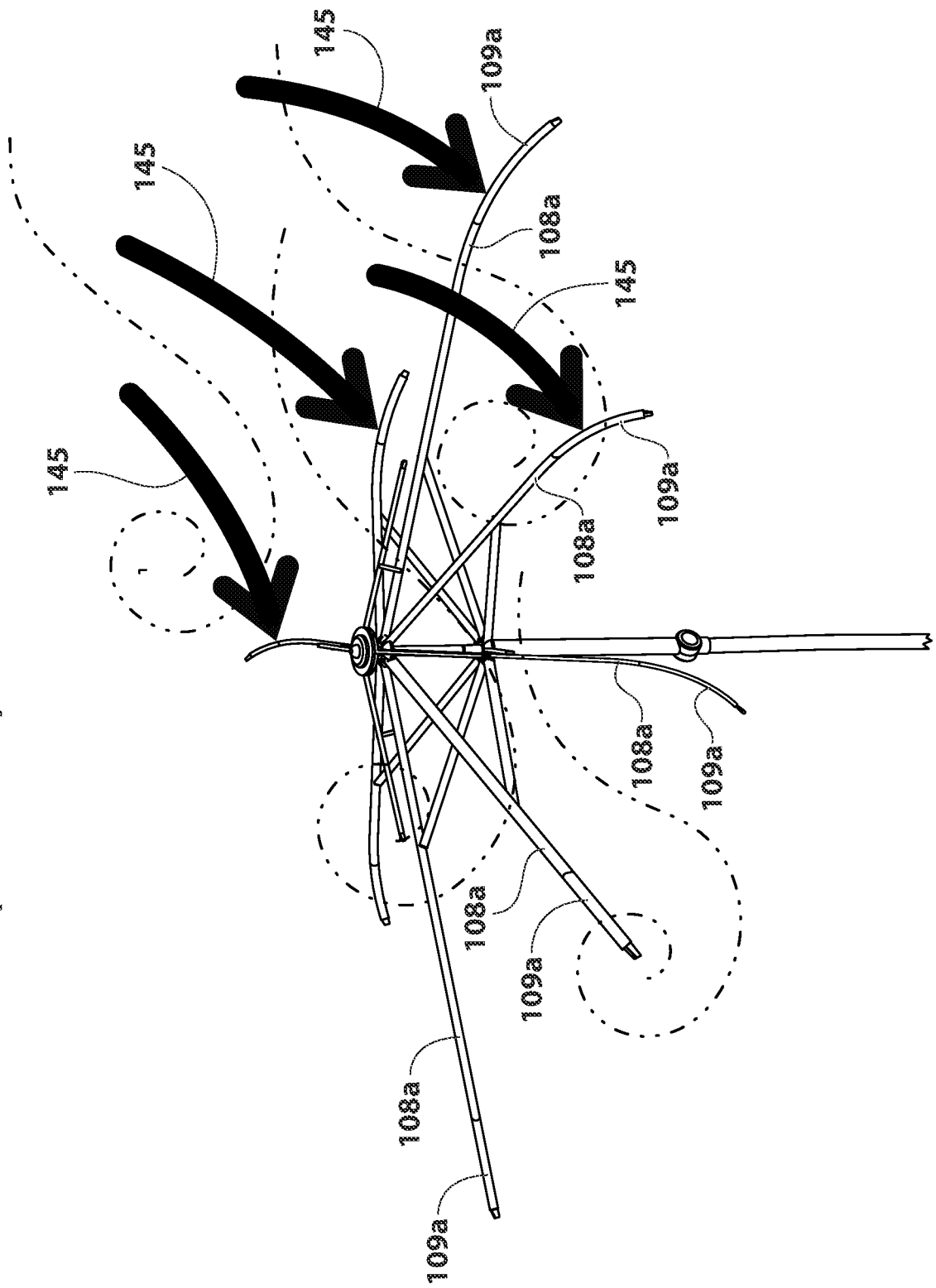
FIG. 38A (Prior Art) illustrates a perspective view demonstrating how sail ribs can be susceptible to bending when blown by wind.
Figure 38B:
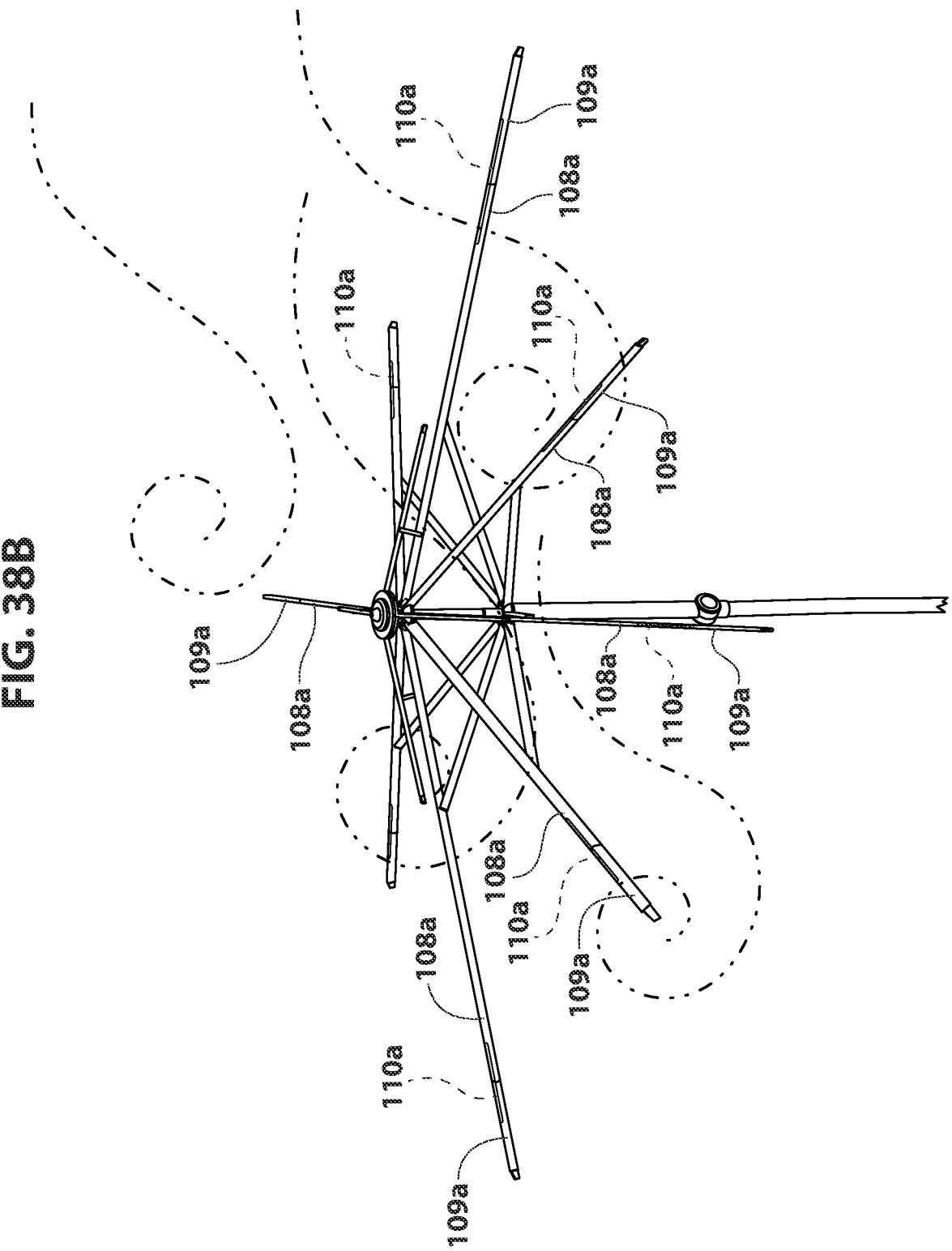
FIG. 38B illustrates a perspective view demonstrating how primary automatically-centered-and-reinforced ribs 108*a* and secondary automatically-centered-and-reinforced ribs 109*a* are strengthened and reinforced by primary automatic-rib-centering-and-reinforcing rail 108*b* and secondary automatic-rib-centering-and-reinforcing rail 109*b* when connected by multi-rib-connecting automatically-centered-and-reinforced adjustable cores 110*a*, each having an automatic-core-centering-and-reinforcing rail 110*b*, respectively.
Figure 39:
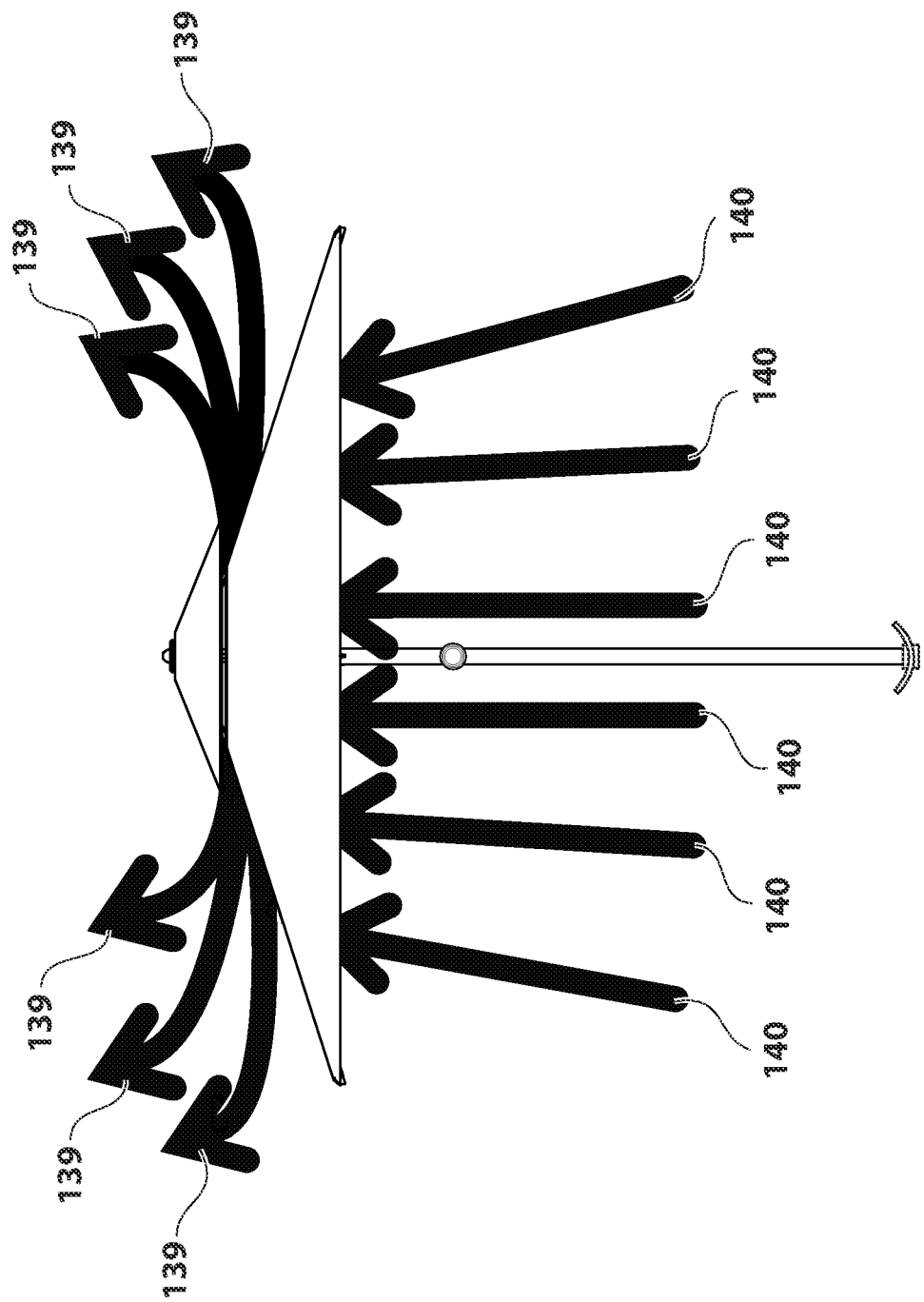
FIG. 39 and FIG. 40 illustrate side views demonstrating how the adjustable water-and-leaf-separating leaf-filtering central sail system 101 and adjustable water-collecting wind-blocking privacy-screen ring sail system 106 can direct wind flow, respectively.
Figure 40:
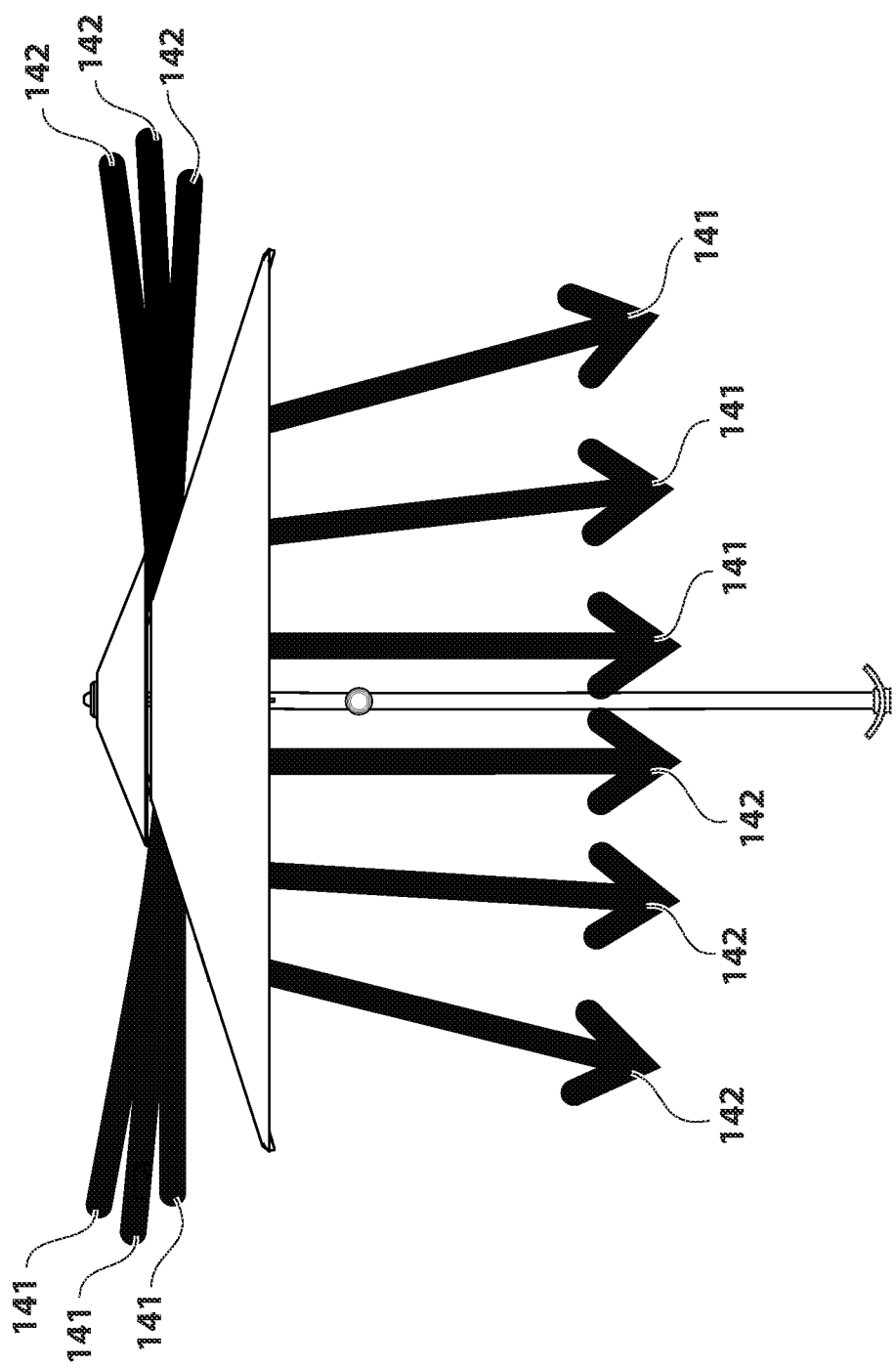

Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of resisting bending and warping due to heavy winds
     in the direction of arrow 145
     (see FIG. 38A (Prior Art);
  b) Capable of providing reinforced infrastructure for a sail when used on a wind-powered land vehicle
     in the direction of arrow 146
     (see FIG. 63E, FIG. 63F, and FIG. 63G);
  c) Capable of proving reinforced infrastructure for an emergency rainwater collecting device on a marine vessel
     (see FIG. 63C and FIG. 63D); and
  d) Capable of providing reinforced infrastructure for a shade canopy.

4) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having secondary automatically-centered-and-reinforced ribs 109*a*.

Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of resisting bending and warping due to heavy winds
     in the direction of arrow 145
     (see FIG. 38A (Prior Art);
  b) Capable of providing reinforced infrastructure for a sail when used on a wind-powered land vehicle
     in the direction of arrow 146
     (see FIG. 63E, FIG. 63F, and FIG. 63G);
  c) Capable of proving reinforced infrastructure for an emergency rainwater collecting device on a marine vessel
     (see FIG. 63C and FIG. 63D); and
  d) Capable of providing reinforced infrastructure for a shade canopy.

5) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having secondary automatic-rib-centering-and-reinforcing rail 109*b*.

Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of resisting bending and warping due to heavy winds
     in the direction of arrow 145
     (see FIG. 38A (Prior Art);
  b) Capable of providing reinforced infrastructure for a sail when used on a wind-powered land vehicle
     in the direction of arrow 146
     (see FIG. 63E, FIG. 63F, and FIG. 63G);
  c) Capable of proving reinforced infrastructure for an emergency rainwater collecting device on a marine vessel
     (see FIG. 63C and FIG. 63D); and
  d) Capable of providing reinforced infrastructure for a shade canopy.

6) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having multi-rib-connecting automatically-centered-and-reinforced adjustable cores 110*a*.

Figure 9A:
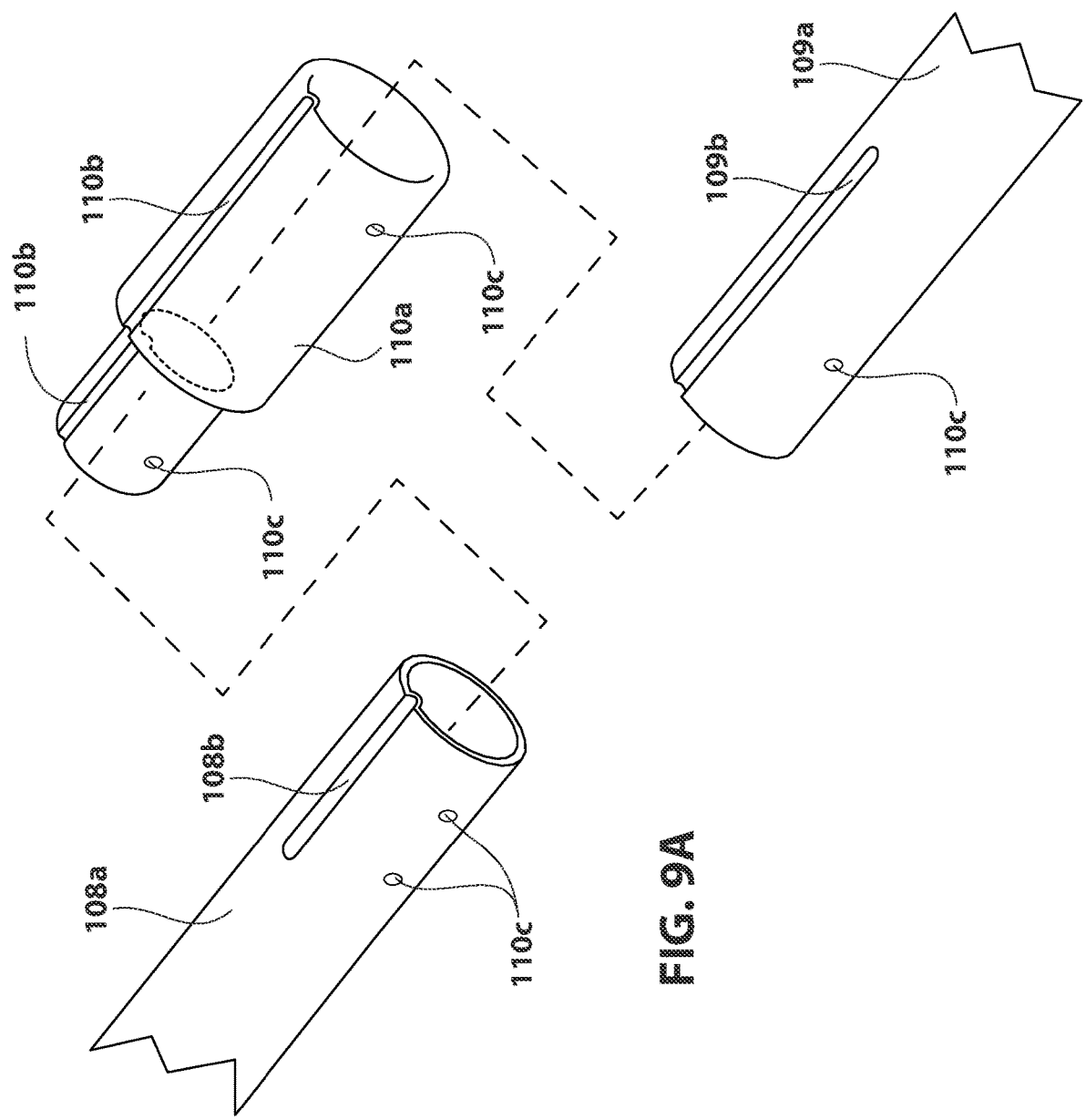
FIG. 9A illustrates a perspective view of demonstrating multi-rib-connecting automatically-centered-and-reinforced adjustable cores 110*a* insert into primary automatically-centered-and-reinforced ribs 108*a* and secondary automatically-centered-and-reinforced ribs 109*a*, respectively, demonstrating how the automatic-core-centering-and-reinforcing rail 110*b* works in conjunction with the primary automatic-rib-centering-and-reinforcing rail 108*b* and the secondary automatic-rib-centering-and-reinforcing rail 109*b*.
Figure 9B:
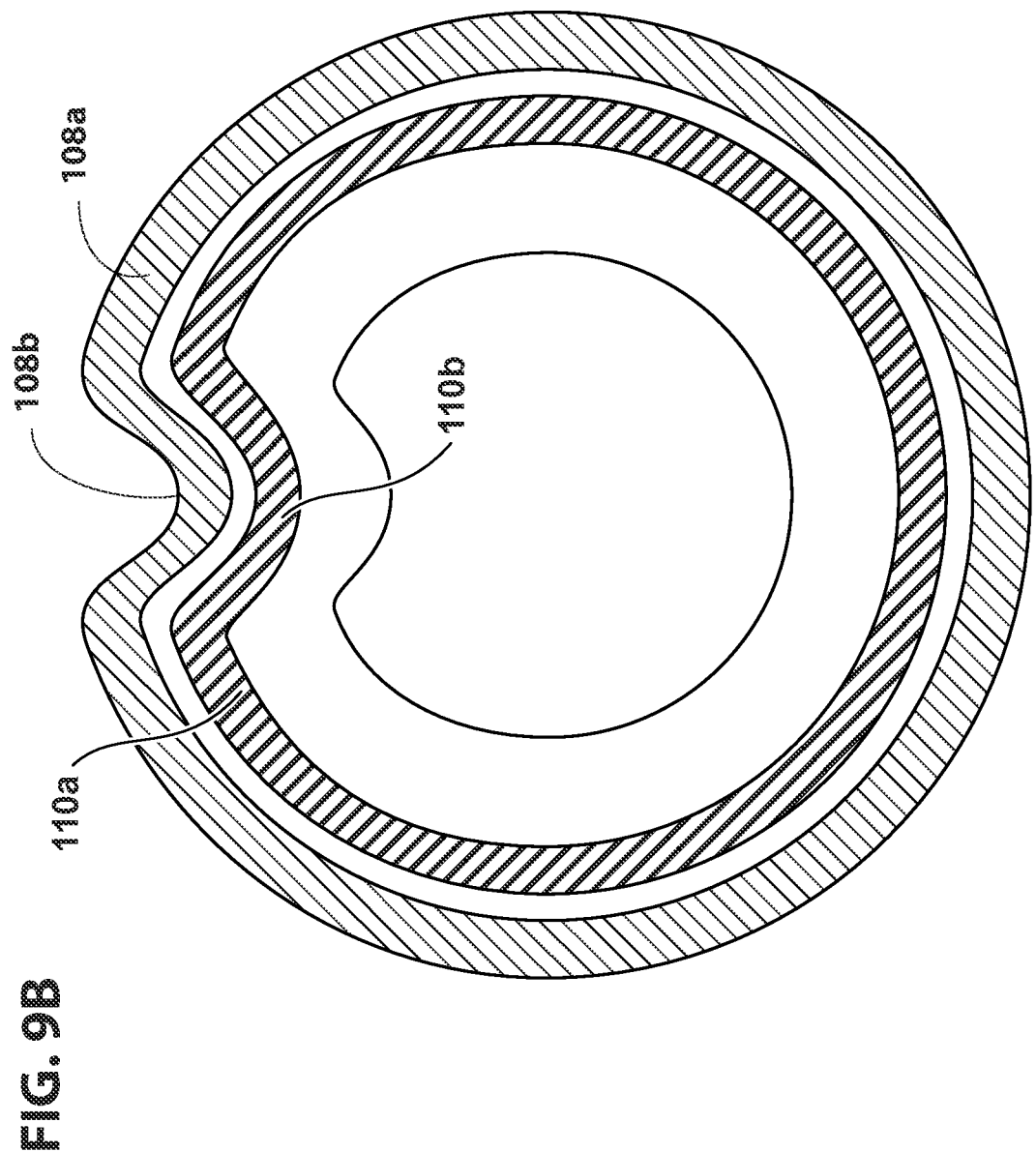
FIG. 9B illustrates a cross-sectional view demonstrating how multi-rib-connecting automatically-centered-and-reinforced adjustable cores 110*a* with automatic-core-centering-and-reinforcing rail 110*b* is automatically aligned within primary automatically-centered-and-reinforced ribs 108*a* with primary automatic-rib-centering-and-reinforcing rail 108*b*.
Figure 10:
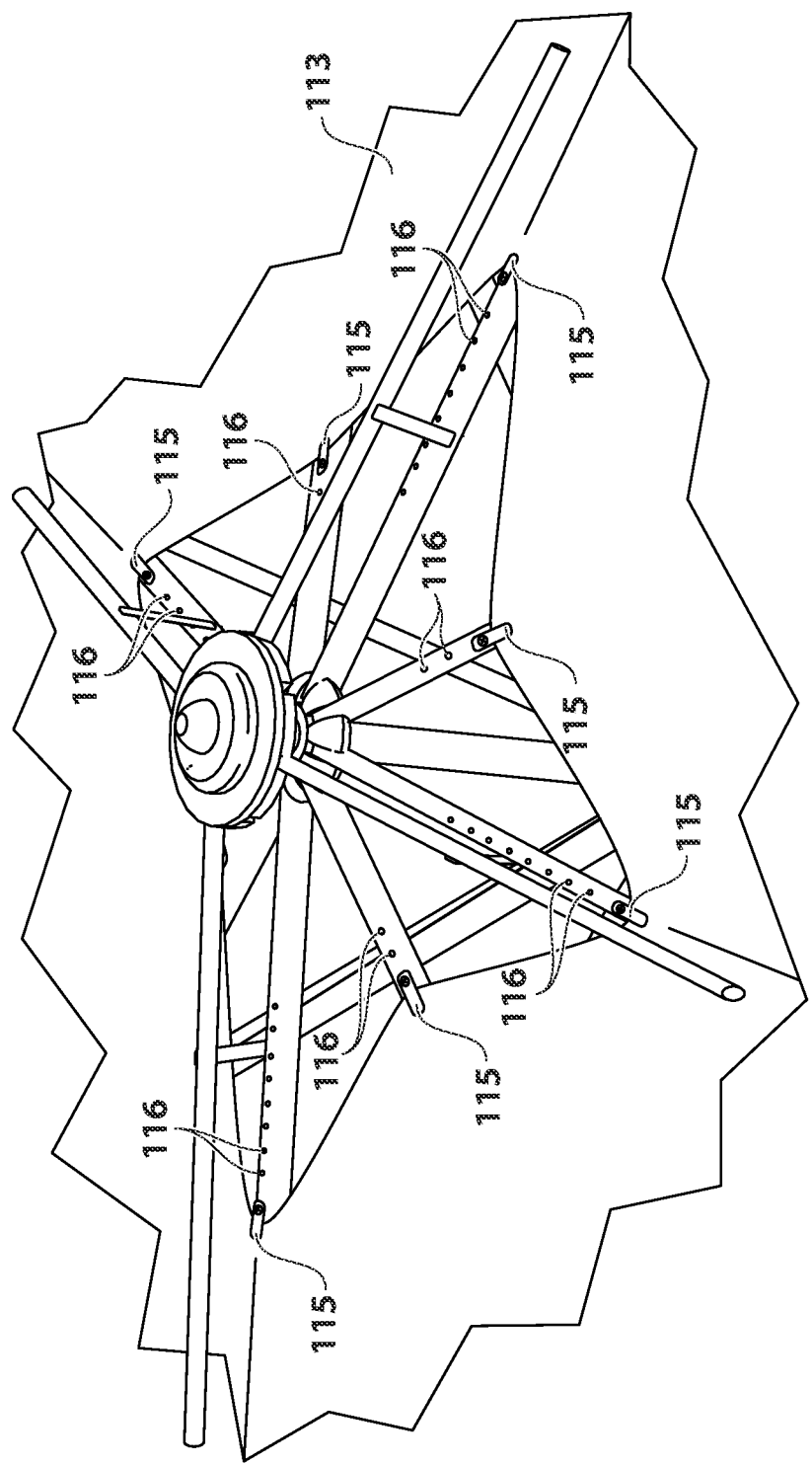
Figure 13:
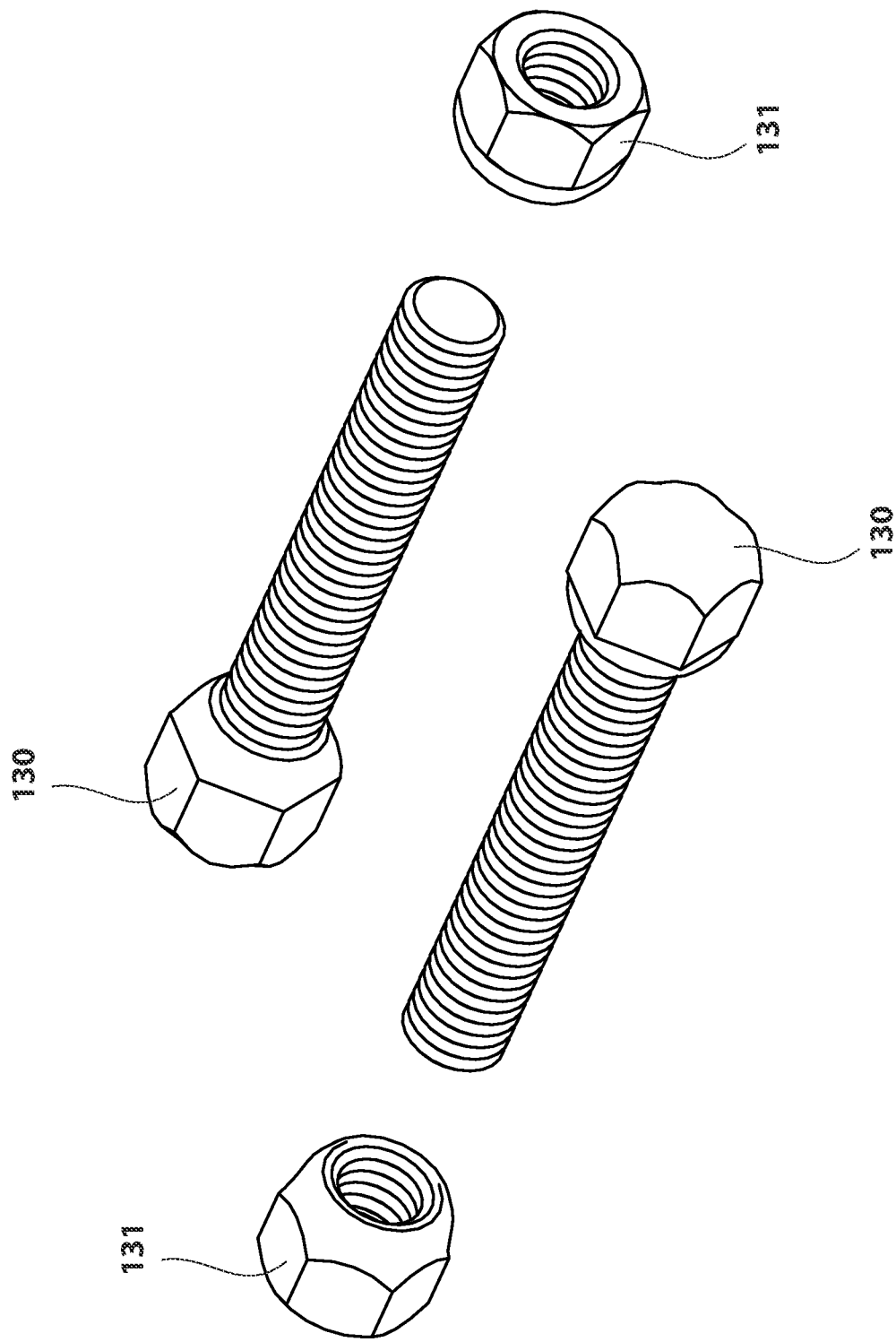
Figure 14:
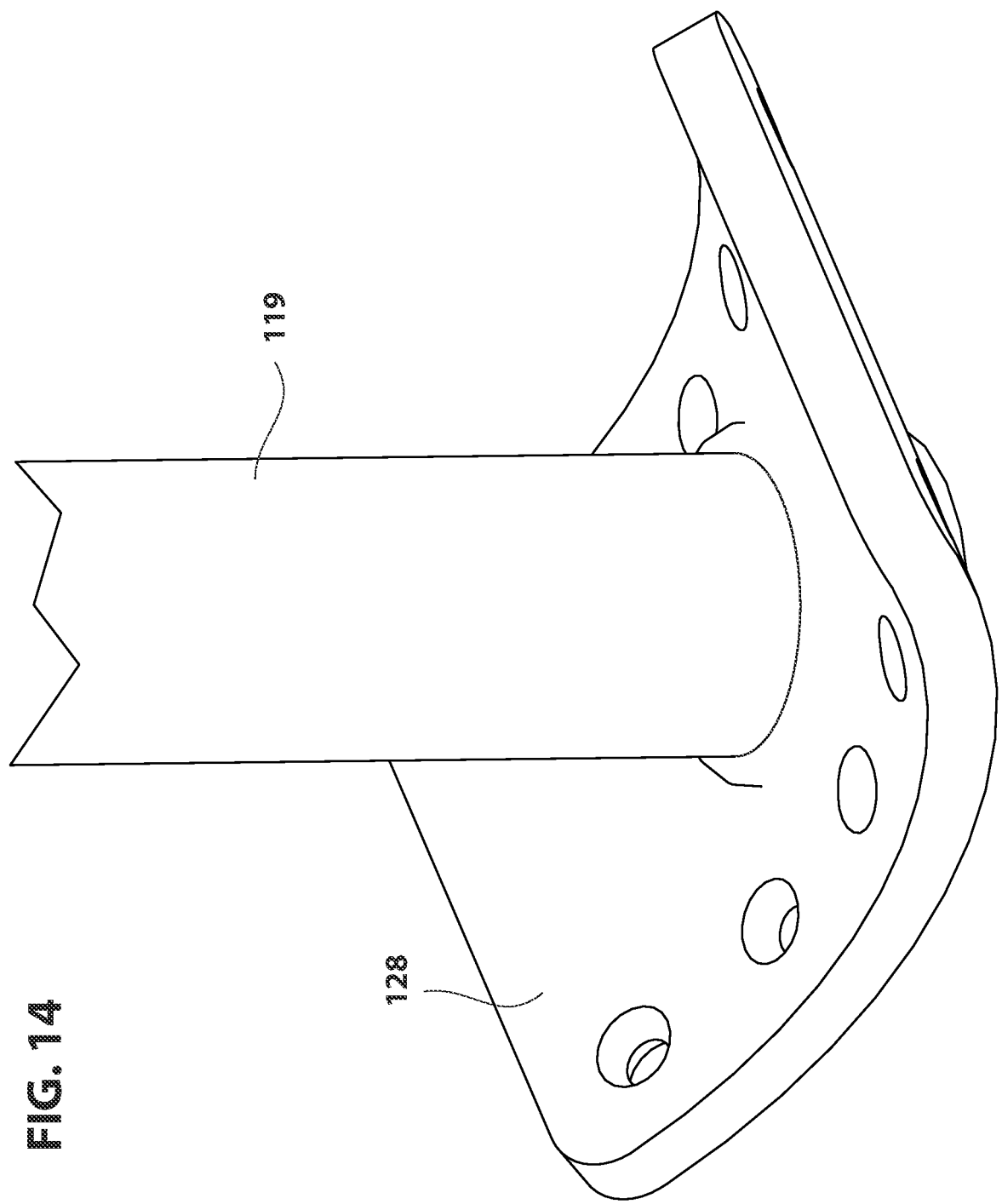
FIG. 14 and FIG. 15 illustrate close-up perspective views of multi-angled multi-surface-mountable multi-plate-connecting reversible stackable base 128 and multi-angled double-beveled base-mounting holes 129, oriented both right-side-up and up-side-down, respectively.
Figure 15:
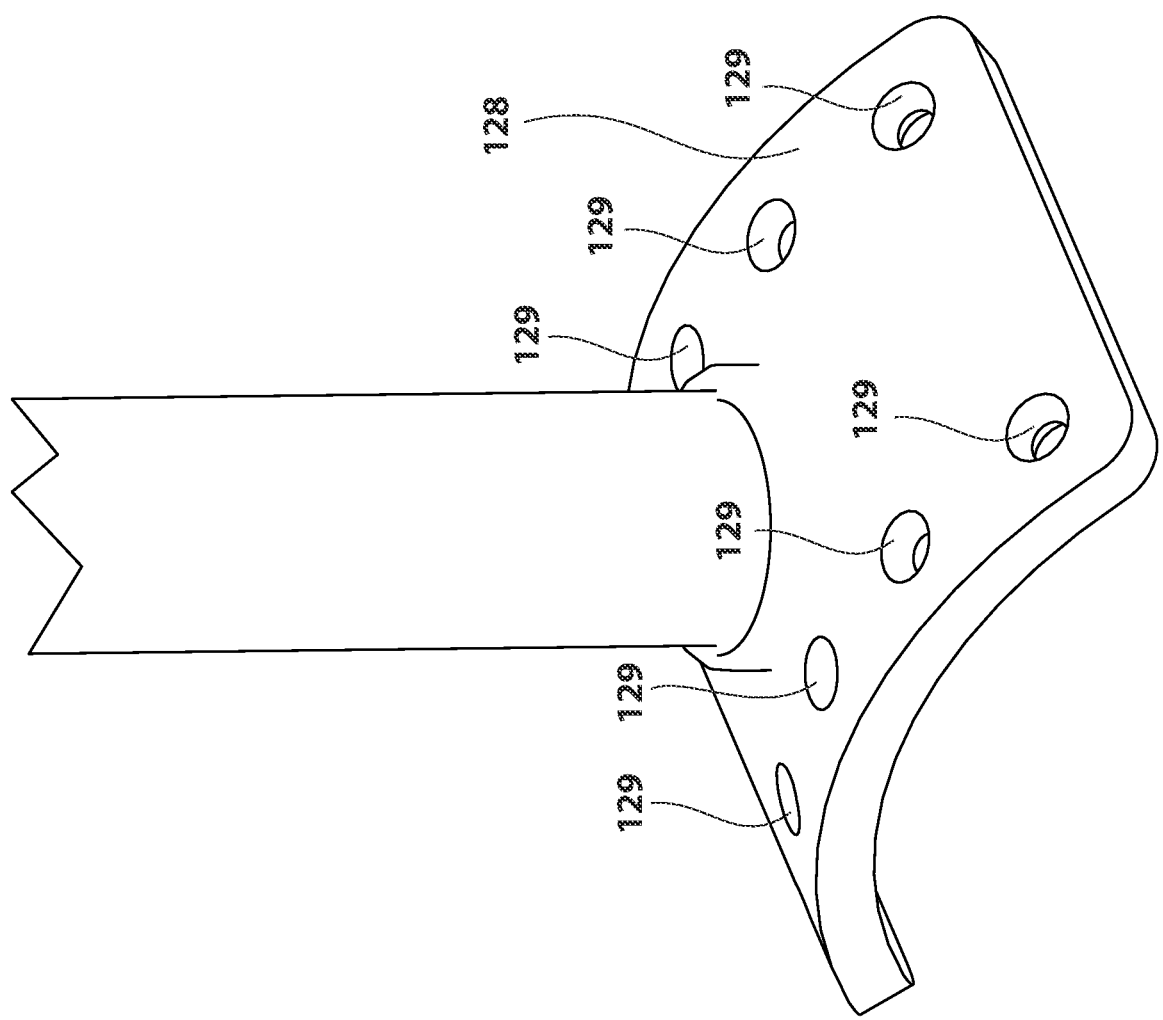
Figure 16:
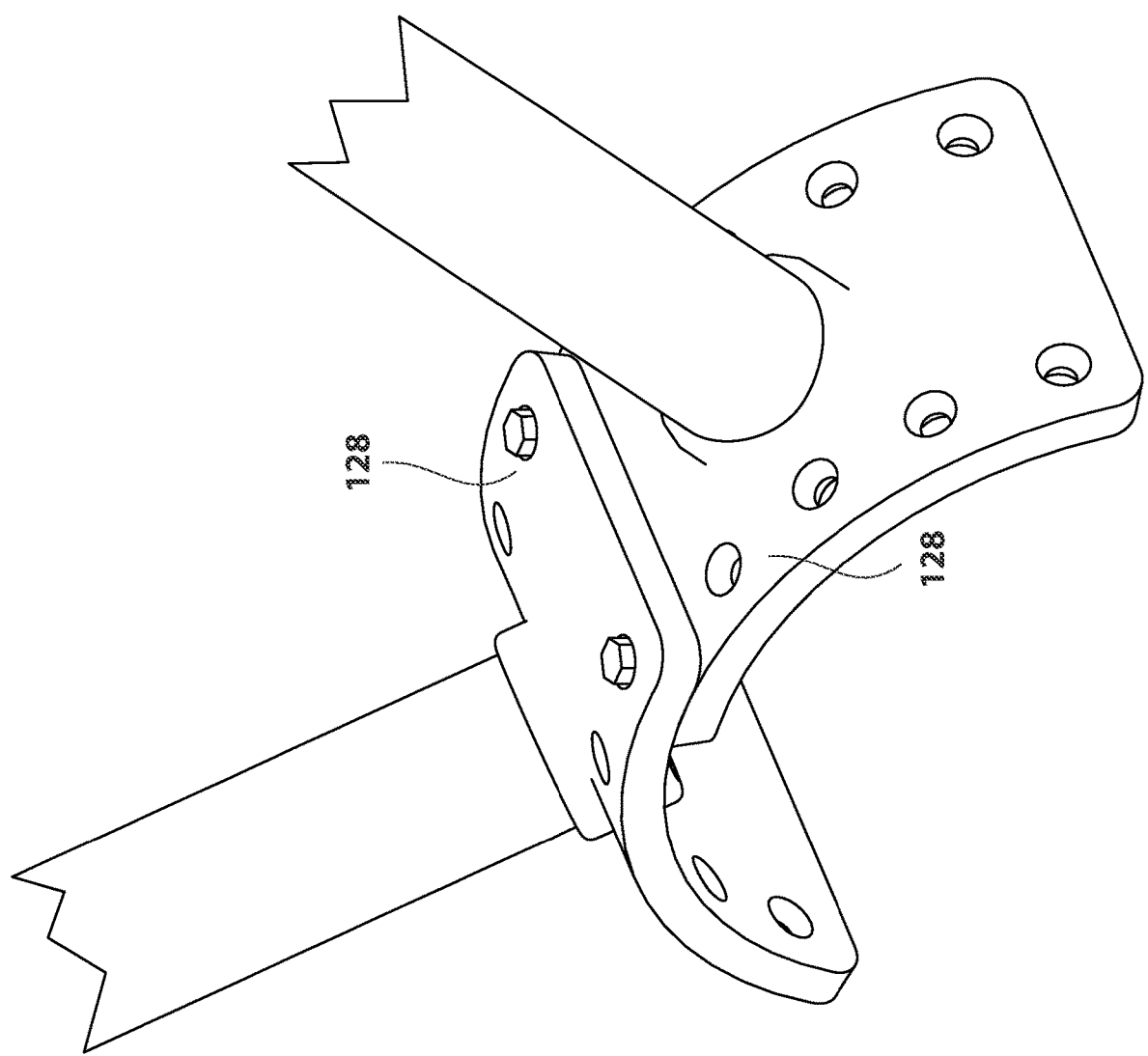
FIG. 16, FIG. 17, FIG. 18, and FIG. 19 illustrate close-up perspective views of multi-angled multi-surface-mountable multi-plate-connecting reversible stackable base 128 stacked in double, triple, quadruple, and quintuple configurations, respectively.
Figure 17:
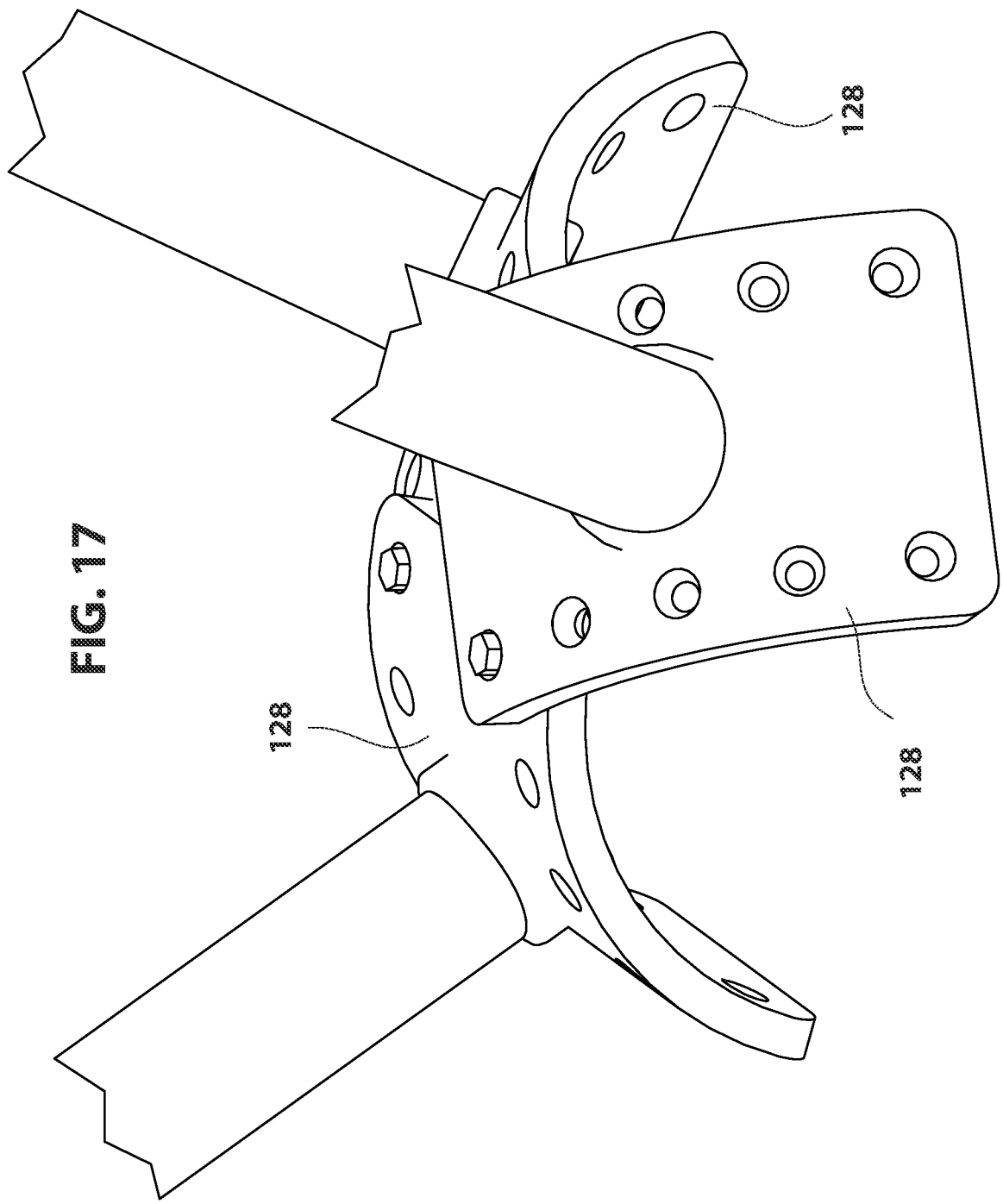
Figure 18:
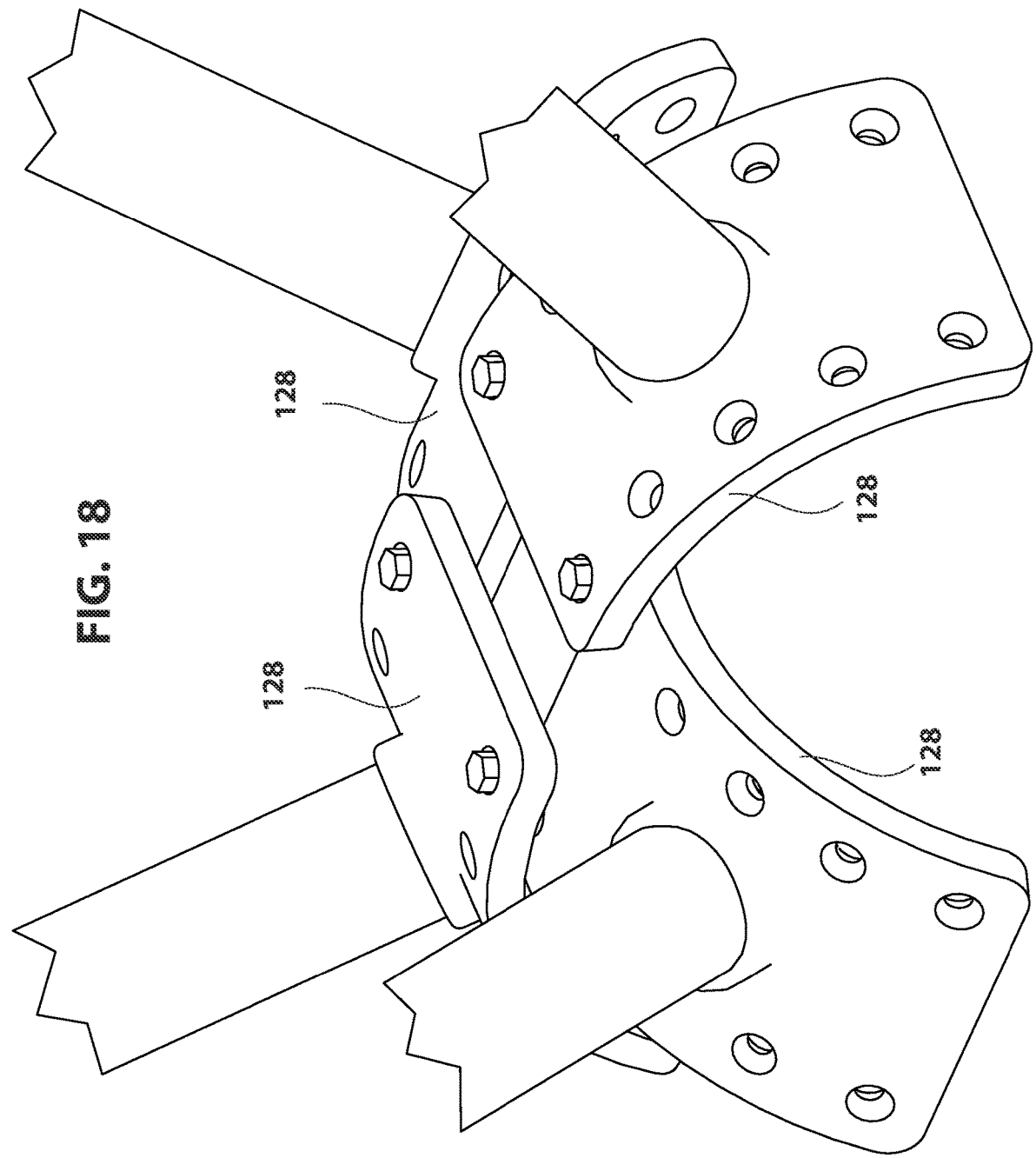
Figure 19:
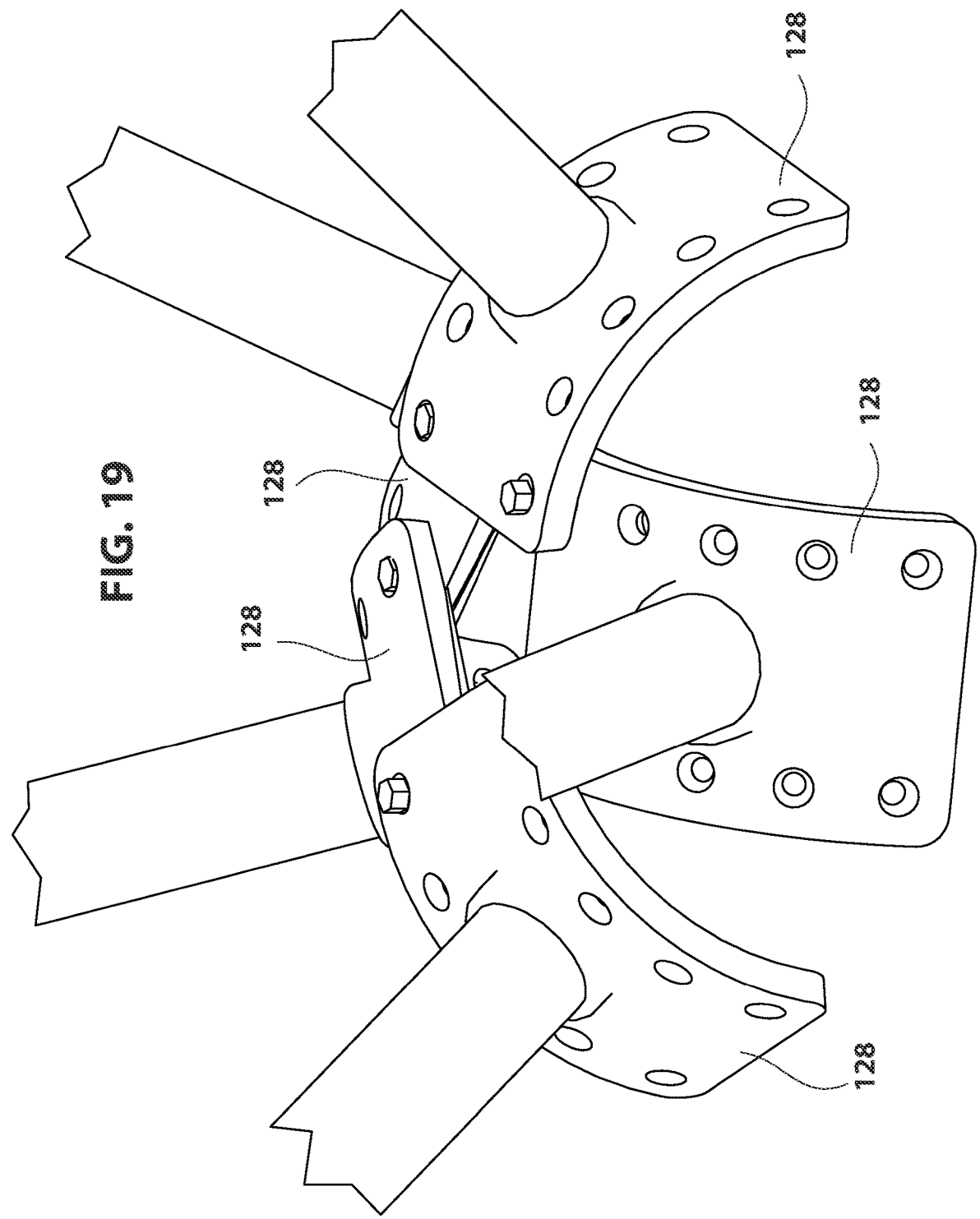
Figure 20:
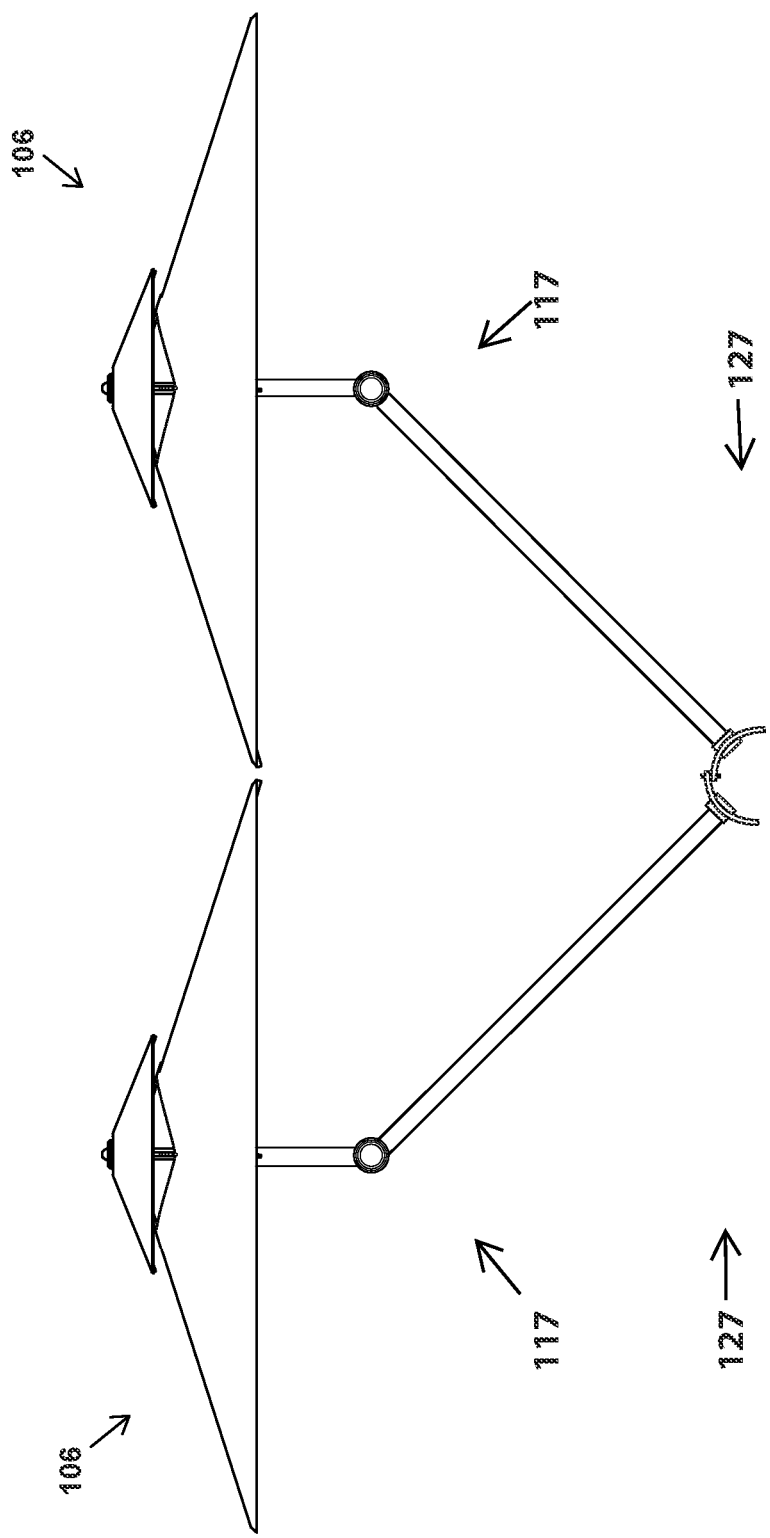
FIG. 20 illustrates a side view of how two five-device-in-one water-and-leaf-separating leaf-filtering water-collecting wind-blocking wind-redirecting marine-yacht-land-yacht-balcony-bumper-and-trailer-hitch-mountable sails can be configured by stacking multi-angled multi-surface-mountable multi-plate-connecting reversible stackable base 128, respectively.
Figure 21:
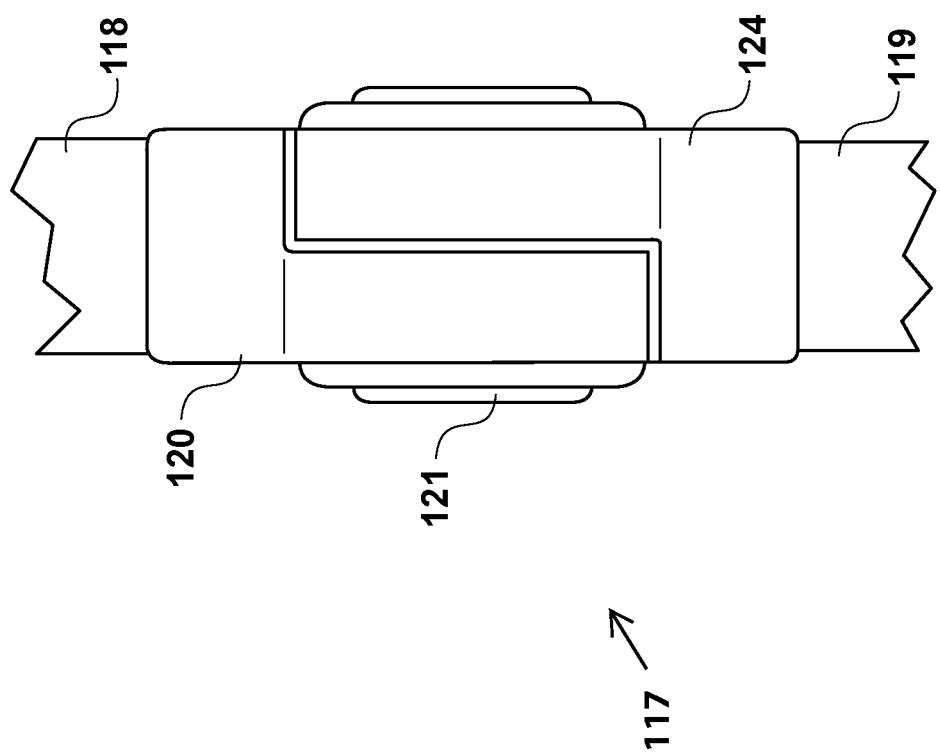
FIG. 21, FIG. 22, FIG. 23, and FIG. 24 illustrate front and side views of sail-multi-orienting snap-locking pivoting-elbow system 117, respectively.
Figure 22:
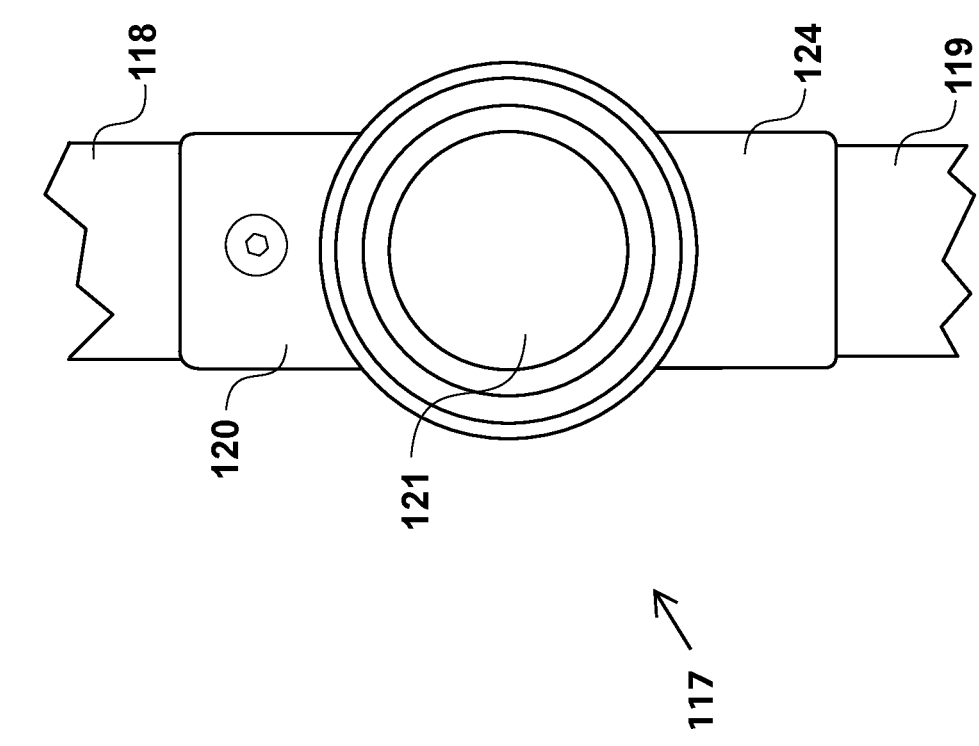
Figure 23:
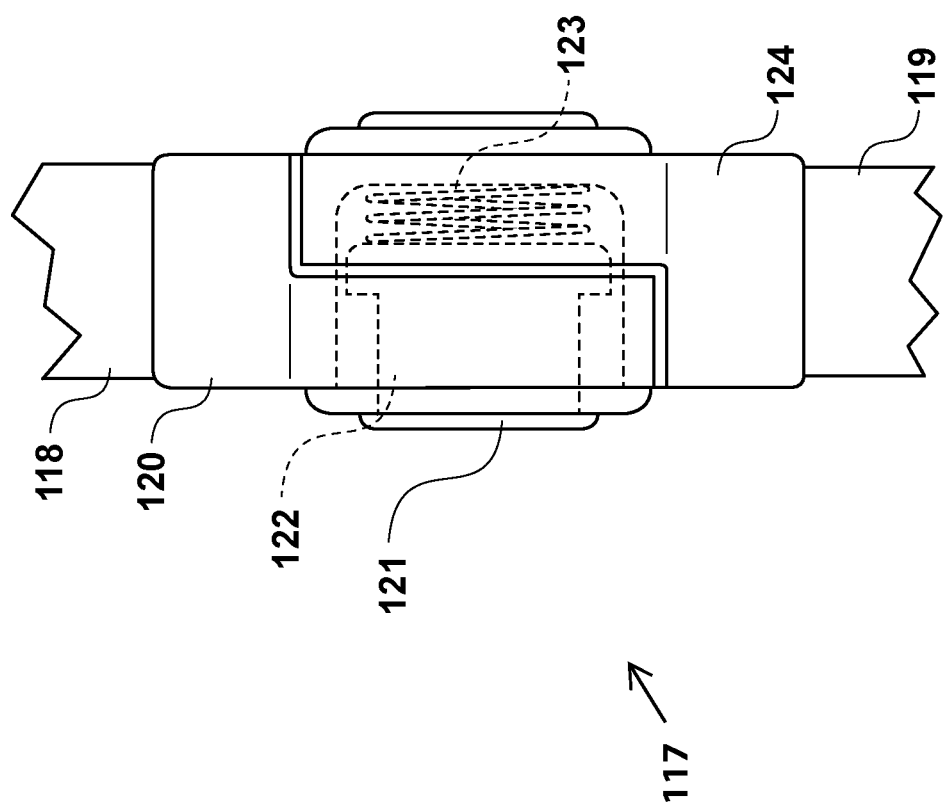
Figure 24:
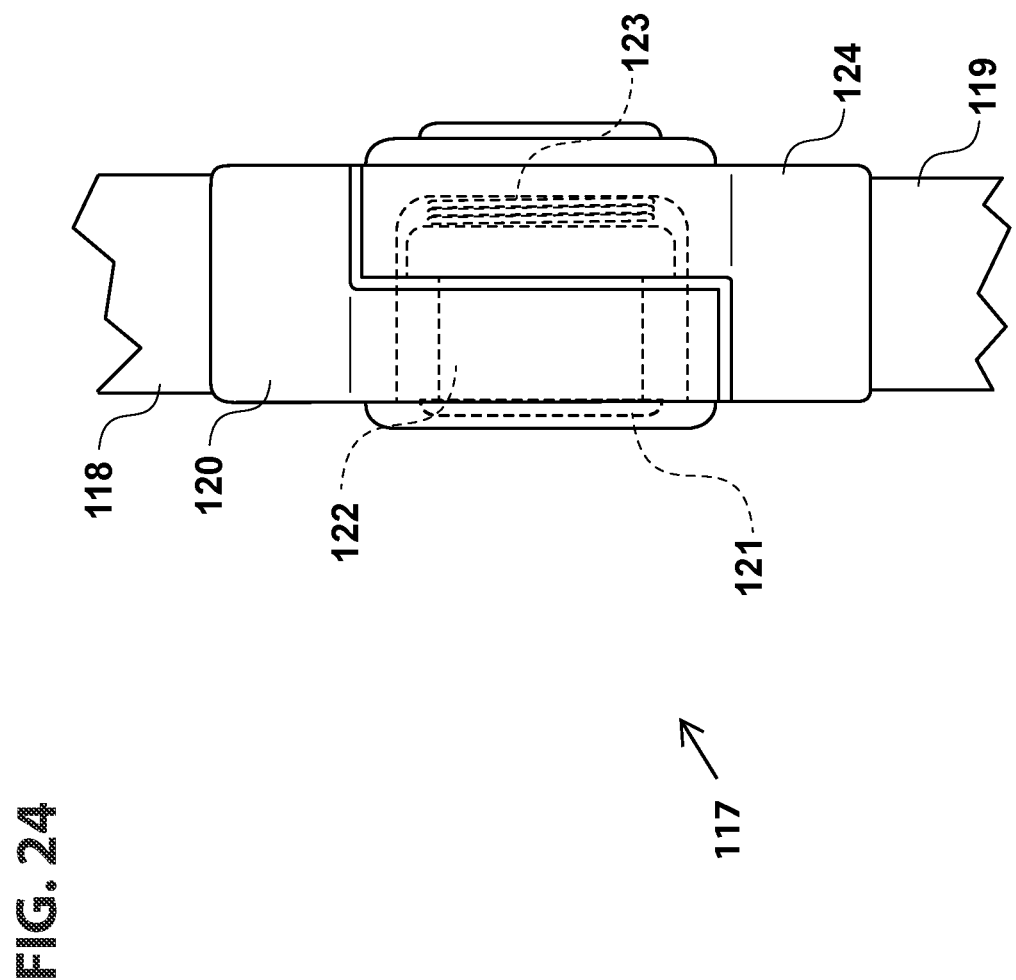
Figure 25:
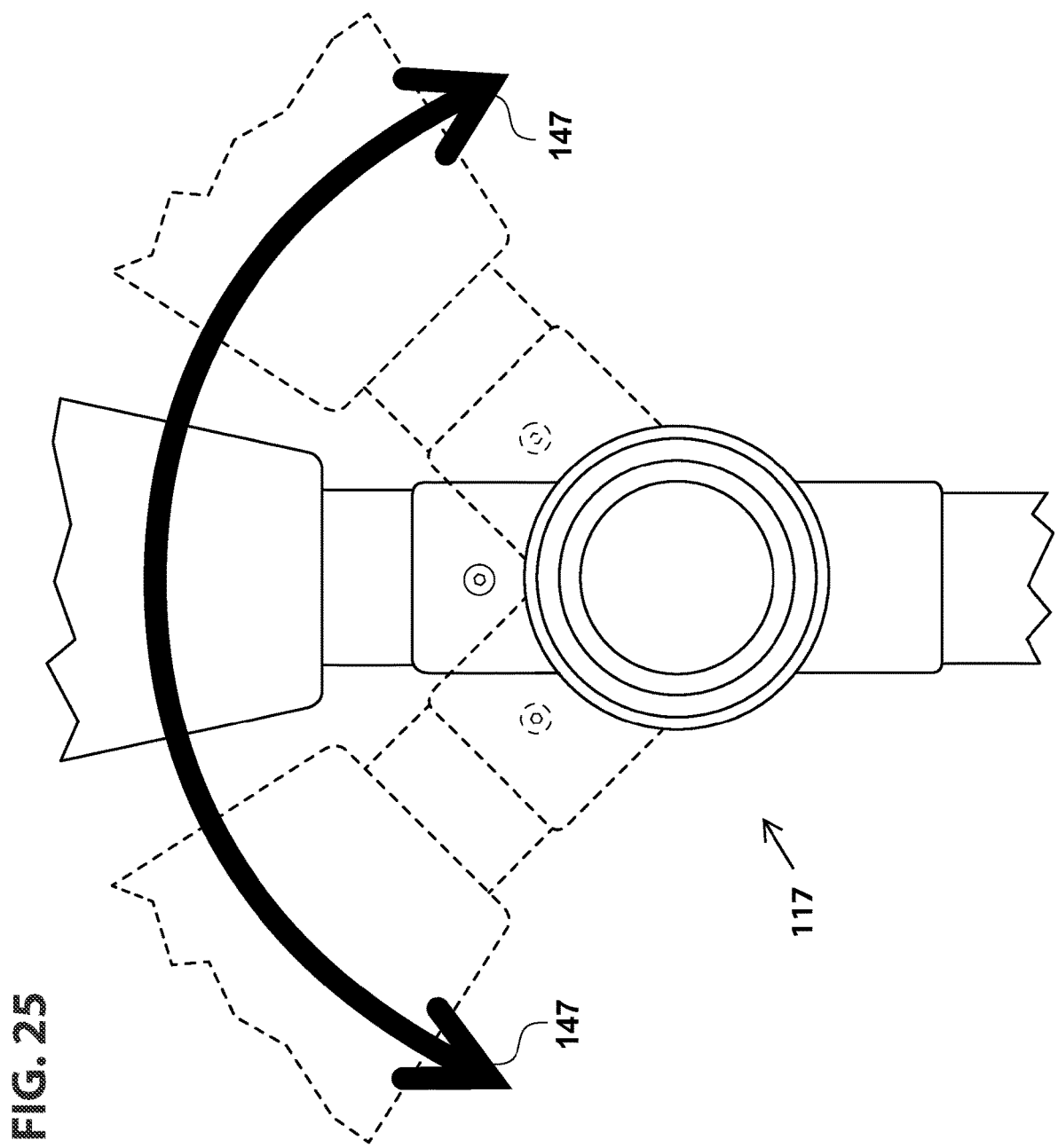
FIG. 25 illustrates a side view demonstrating how the sail-multi-orienting snap-locking pivoting-elbow system 117 rotates upper post 118 on a horizontal axis.
Figure 26:
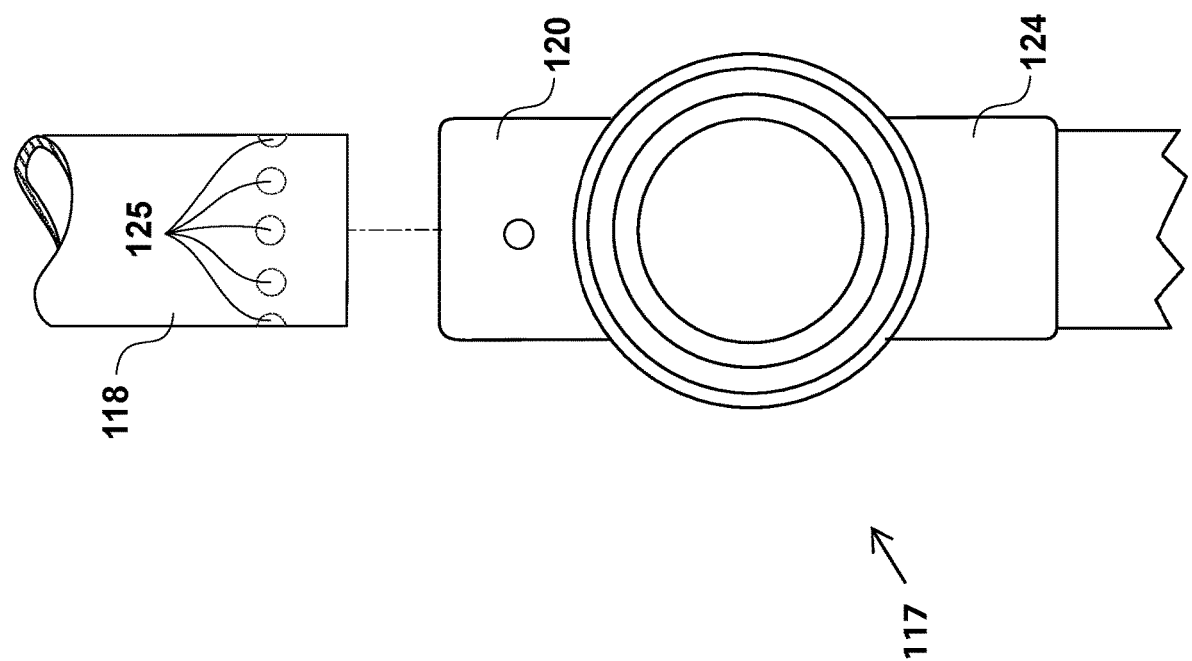
FIG. 26, FIG. 27, FIG. 28, and FIG. 29 illustrate front and top views demonstrating how sail-multi-orienting snap-lock housing 120, adjustable multi-orienting pole-rotation-locking holes 125, and pole-rotation-locking screw 126 provide rotation to upper post 118 on a vertical axis.
Figure 27:
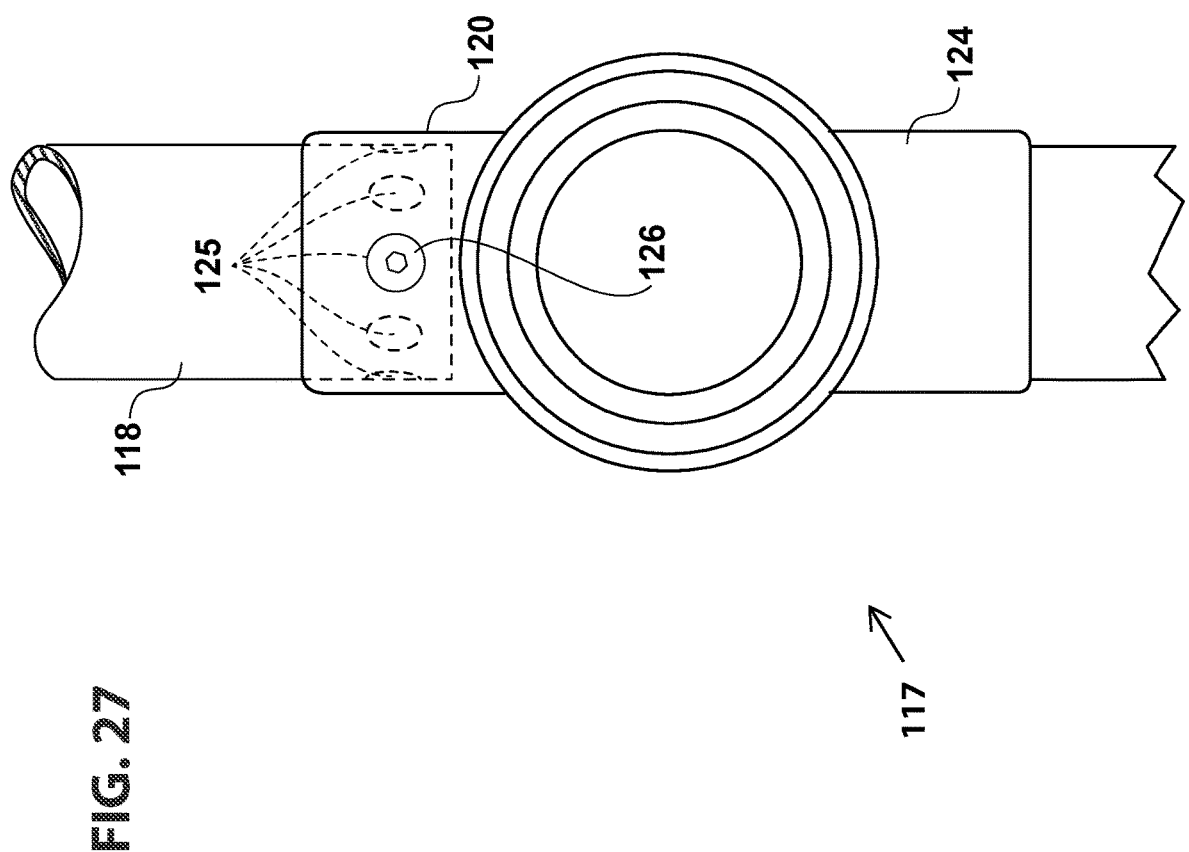

Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of allowing manufacturers to shorten long ribs into primary ring-sail-supporting ribs 108*a* and secondary ring-sail-supporting ribs 109*a*
     to reduce the length and volume of the shipping package of the five-device-in-one water-and-leaf-separating leaf-filtering water-collecting wind-blocking wind-redirecting marine-yacht-land-yacht-balcony-bumper-and-trailer-hitch-mountable sail in a shipping container
     to save money from expensive shipping costs
     (see FIG. 1A (Prior Art); and
  b) Capable of securely and reinforcingly connecting ring-sail-supporting ribs 108*a* to secondary ring-sail-supporting ribs 109*a*
     to provide strength and structure to the five-device-in-one water-and-leaf-separating leaf-filtering water-collecting wind-blocking wind-redirecting marine-yacht-land-yacht-balcony-bumper-and-trailer-hitch-mountable sail
     (see FIG. 9A and FIG. 9B).

7) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having automatic-core-centering-and-reinforcing rail 110*b*.

Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
  a) Capable of resisting bending and warping due to heavy winds
     in the direction of arrow 145
     (see FIG. 38A (Prior Art);
  b) Capable of providing reinforced infrastructure for a sail when used on a wind-powered land vehicle
     in the direction of arrow 146
     (see FIG. 63E, FIG. 63F, and FIG. 63G);
  c) Capable of proving reinforced infrastructure for an emergency rainwater collecting device on a marine vessel
     (see FIG. 63C and FIG. 63D); and
  d) Capable of providing reinforced infrastructure for a shade canopy.

8) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having adjustable water-collecting wind-blocking privacy-screen ring sail 113.

Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
 a) Capable of functioning as an emergency rainwater collector on a marine vessel
  (see FIG. 63C and FIG. 63D);
 b) Capable of functioning as a water collector
  to collect rainwater when used upside down
  in the directions of arrows 136 and 137
  (see FIG. 36);
 c) Capable of functioning as a sail on a wind-powered land vehicle
  in the direction of arrow 146
  (see FIG. 63E, FIG. 63F, and FIG. 63G);
 d) Capable of functioning as a wind blocker
  to block wind
  (see FIG. 58 and FIG. 60);
 e) Capable of functioning as a privacy screen
  to provide privacy
  (see FIG. 57);
 f) Capable of functioning as an awning
  to angledly block rain and sun beams
  (see FIG. 53);
 g) Capable of functioning as a canopy
  to vertically block rain and sun beams
  (see FIG. 53);
 h) Capable of functioning as a water diverting device
  to predeterminately redirect the flow of water
  in the directions of arrows 136 and 137
  (see FIG. 36);
 i) Capable of functioning as a leaf filtering device
  to filter leaves from rain water when used upside down
  in the directions of arrows 37A and 37B
  (see FIGS. 37A and 37B);
 j) Capable of functioning as a wind redirector
  to redirect wind in and out of sail
  in the directions of arrows 139, 140, 141, and 142
  (see FIG. 39 and FIG. 40); and
 k) Capable of functioning as a wind resistor
  to protect users
  in the directions of arrows 143 and 144
  (see FIG. 41).

9) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
 multi-angled multi-surface-mountable multi-plate-connecting reversible stackable base 128.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
 a) Capable of stackably connecting multiple multi-angled multi-surface-mountable multi-plate-connecting reversible stackable bases 128 together
  (see FIG. 16, FIG. 17, FIG. 18, and FIG. 19)
 b) Capable of securing the five-device-in-one water-and-leaf-separating leaf-filtering water-collecting wind-blocking wind-redirecting marine-yacht-land-yacht-balcony-bumper-and-trailer-hitch-mountable sail at the base of a wall
  (see FIG. 53);
 c) Capable of securely wedging the five-device-in-one water-and-leaf-separating leaf-filtering water-collecting wind-blocking wind-redirecting marine-yacht-land-yacht-balcony-bumper-and-trailer-hitch-mountable sail to a step recess built into a truck-bumper corner or an RV-bumper corner without need for bolting
  (see FIG. 43A, FIG. 43B, FIG. 44, and FIG. 45);
 d) Capable of securely wedging the five-device-in-one water-and-leaf-separating leaf-filtering water-collecting wind-blocking wind-redirecting marine-yacht-land-yacht-balcony-bumper-and-trailer-hitch-mountable sail into a tailgate gap without the need for bolting
  (see FIG. 42);
 e) Capable of securely wedging the five-device-in-one water-and-leaf-separating leaf-filtering water-collecting wind-blocking wind-redirecting marine-yacht-land-yacht-balcony-bumper-and-trailer-hitch-mountable sail to a balcony railing without the need for bolting
  (see 62A, and FIG. 62B);
 f) Capable of securely wedging the five-device-in-one water-and-leaf-separating leaf-filtering water-collecting wind-blocking wind-redirecting marine-yacht-land-yacht-balcony-bumper-and-trailer-hitch-mountable sail to a railing of a watercraft without the need for bolting
  (see FIG. 63A, FIG. 63B, FIG. 63C, and FIG. 63D);
 g) Capable of securely attaching the five-device-in-one water-and-leaf-separating leaf-filtering water-collecting wind-blocking wind-redirecting marine-yacht-land-yacht-balcony-bumper-and-trailer-hitch-mountable sail to a tow hitch
  (see FIG. 48, and FIG. 49);
 h) Capable of securely attaching the five-device-in-one water-and-leaf-separating leaf-filtering water-collecting wind-blocking wind-redirecting marine-yacht-land-yacht-balcony-bumper-and-trailer-hitch-mountable sail to a utility hole of a truck bed without need for bolting
  (see FIG. 46, and FIG. 47);
 i) Capable of securely attaching the five-device-in-one water-and-leaf-separating leaf-filtering water-collecting wind-blocking wind-redirecting marine-yacht-land-yacht-balcony-bumper-and-trailer-hitch-mountable sail to a wind-powered land vehicle
  to act as a sail
  in the direction of arrow 146
  (see FIG. 63E, FIG. 63F, and FIG. 63G); and
 j) Capable of securely attaching the five-device-in-one water-and-leaf-separating leaf-filtering water-collecting wind-blocking wind-redirecting marine-yacht-land-yacht-balcony-bumper-and-trailer-hitch-mountable sail to a column, table, wall, fence, bumper, balcony, or patio
  (see FIG. 51, FIG. 52, FIG. 53, FIG. 54, FIG. 55, FIG. 56, FIG. 57, FIG. 58, FIG. 59, FIG. 60, and FIG. 61).

10) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having multi-angled double-beveled base-mounting holes 129.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
 a) Capable of providing beveled holes for multi-angled semi-spherical-headed base-mounting bolts 130 and multi-angled semi-spherical-headed base-mounting nuts 131 to be adjustably installed;

b) Capable of providing beveled holes where multi-angled semi-spherical-headed base-mounting bolts 130 and multi-angled semi-spherical-headed base-mounting nuts 131 can be pivotably inserted in a variety of angles
in the direction of arrow 149*a*, 149*b*, 149*c*, 149*d*, 149*e*, 149*f*, 149*g*, 149*h*, 149*i*, and 149*j*;
(see FIG. 30, FIG. 31A, FIG. 31B, and FIG. 31C); and
c) Capable of providing a number of holes for installing the five-device-in-one water-and-leaf-separating leaf-filtering water-collecting wind-blocking wind-redirecting marine-yacht-land-yacht-balcony-bumper-and-trailer-hitch-mountable sail in a variety of locations
(see FIG. 15).

11) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
multi-angled semi-spherical-headed base-mounting bolts 130.
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
a) Capable of being pivotably inserted into multi-angled double-beveled base-mounting holes 129;
b) Capable of providing a semi-spherical head to pivot within multi-angled double-beveled base-mounting holes 129
to allow many angles for inserting and installing
in the direction of arrow 149*a*, 149*b*, 149*c*, 149*d*, 149*e*, 149*f*, 149*g*, 149*h*, 149*i*, and 149*j*;
(see FIG. 30, FIG. 31A, FIG. 31B, and FIG. 31C); and
c) Capable of threadedly attaching to multi-angled semi-spherical-headed base-mounting nuts 131.

12) It is even still yet another object of the new invention to provide (a or an) five-device-in-one water-and-leaf-separating leaf-filtering water-collecting wind-blocking wind-redirecting marine-yacht-land-yacht-balcony-bumper-and-trailer-hitch-mountable sail, having
multi-angled semi-spherical-headed base-mounting nuts 131
Therefore, the five-device-in-one water-and-leaf-separating leaf-filtering water-collecting wind-blocking wind-redirecting marine-yacht-land-yacht-balcony-bumper-and-trailer-hitch-mountable sail is (or are each):
a) Capable of being pivotably capable of fitting into multi-angled double-beveled base-mounting holes 129;
b) Capable of providing a semi-spherical shape to pivot within multi-angled double-beveled base-mounting holes 129
to allow many angles for inserting and installing
in the direction of arrow 149*a*, 149*b*, 149*c*, 149*d*, 149*e*, 149*f*, 149*g*, 149*h*, 149*i*, and 149*j*;
(see FIG. 30, FIG. 31A, FIG. 31B, and FIG. 31C); and
c) Capable of threadedly attaching to multi-angled semi-spherical-headed base-mounting bolts 130.

What is claimed is:
1. A five-device-in-one water-and-leaf-separating leaf-filtering water-collecting wind-blocking wind-redirecting marine-yacht-land-yacht-balcony-bumper-and-trailer-hitch-mountable sail comprising:
a central-sail intersector;
a plurality of central-sail-supporting ribs
pivotably connected to said intersector;
a plurality of central-sail-rib-raising arms
pivotably attached to said central-sail-supporting ribs;
an adjustable water-and-leaf-separating leaf-filtering central sail attached to said central-sail-supporting ribs
for
functioning as a water diverting device
to predeterminately redirect the flow of water,
functioning as a leaf filtering device
to filter leaves from rain water when used upside down,
functioning as a water collector
to collect rain water when used upside down,
functioning as a wind blocker
to block wind,
functioning as a privacy screen
to provide privacy,
functioning as an awning
to angledly block rain and sun beams,
functioning as a canopy
to vertically block rain and sun beams,
functioning as a wind redirector
to redirect wind in and out of sail, and
functioning as a sail-steering wind-powered device
to steer the sail in multiple different directions;
a ring-sail-rib intersector;
a plurality of primary automatically-centered-and-reinforced ribs pivotably connected to said ring-sail-rib intersector
for
resisting bending and warping due to heavy winds,
providing reinforced infrastructure for a sail when used on a wind-powered land vehicle,
providing reinforced infrastructure for an emergency rainwater collecting device on a marine vessel, and
providing reinforced infrastructure for a shade canopy;
a primary automatic-rib-centering-and-reinforcing rail
formed into said primary automatically-centered-and-reinforced ribs
for
resisting bending and warping due to heavy winds,
providing reinforced infrastructure for a sail when used on a wind-powered land vehicle,
providing reinforced infrastructure for an emergency rainwater collecting device on a marine vessel, and
providing reinforced infrastructure for a shade canopy;
a plurality of secondary automatically-centered-and-reinforced ribs
for:
resisting bending and warping due to heavy winds,
providing reinforced infrastructure for a sail when used on a wind-powered land vehicle,
providing reinforced infrastructure for an emergency rainwater collecting device on a marine vessel, and
providing reinforced infrastructure for a shade canopy;
a secondary automatic-rib-centering-and-reinforcing rail
formed into said secondary automatically-centered-and-reinforced ribs
for
resisting bending and warping due to heavy winds,
providing reinforced infrastructure for a sail when used on a wind-powered land vehicle, providing reinforced infrastructure for an emergency rainwater collecting device on a marine vessel, and providing reinforced infrastructure for a shade canopy;

a plurality of multi-rib-connecting automatically-centered-and-reinforced adjustable cores inserted into and screwed to said primary automatically-centered-and-reinforced ribs and said secondary automatically-centered-and-reinforced ribs, said multi-rib-connecting automatically-centered-and-reinforced adjustable cores for allowing manufacturers to shorten long ribs into said primary automatically-centered-and-reinforced ribs and said secondary automatically-centered-and-reinforced ribs to reduce the length and volume of the shipping package of said five-device-in-one water-and-leaf-separating leaf-filtering water-collecting wind-blocking wind-redirecting marine-yacht-land-yacht-balcony-bumper-and-trailer-hitch-mountable sail in a shipping container to save money from expensive shipping costs, and securely and reinforcingly connecting said primary automatically-centered-and-reinforced ribs to said secondary automatically-centered-and-reinforced ribs to provide strength and structure to said five-device-in-one water-and-leaf-separating leaf-filtering water-collecting wind-blocking wind-redirecting marine-yacht-land-yacht-balcony-bumper-and-trailer-hitch-mountable sail;

an automatic-core-centering-and-reinforcing rail formed into said multi-rib-connecting automatically-centered-and-reinforced adjustable cores for resisting bending and warping due to heavy winds, providing reinforced infrastructure for a sail when used on a wind-powered land vehicle, providing reinforced infrastructure for an emergency rainwater collecting device on a marine vessel, and providing reinforced infrastructure for a shade canopy;

a plurality of rib-length-adjusting holes drilled into said primary automatically-centered-and-reinforced ribs, said secondary automatically-centered-and-reinforced ribs, and said multi-rib-connecting automatically-centered-and-reinforced adjustable cores;

a ring-sail-arm intersector;

a plurality of ring-sail-rib-raising arms foldably attached to said ring-sail-arm intersector;

an adjustable water-collecting wind-blocking privacy-screen ring sail having sail corners and inner sail edges, said adjustable water-collecting wind-blocking privacy-screen ring sail attached to said primary automatically-centered-and-reinforced ribs and said secondary automatically-centered-and-reinforced ribs, said adjustable water-collecting wind-blocking privacy-screen ring sail for functioning as an emergency rainwater collector on a marine vessel functioning as a water collector to collect rainwater when used upside down, functioning as a sail on a wind-powered land vehicle, functioning as a wind blocker to block wind, functioning as a privacy screen to provide privacy, functioning as an awning to angledly block rain and sun beams, functioning as a canopy to vertically block rain and sun beams, functioning as a water diverting device to predeterminately redirect the flow of water, functioning as a leaf filtering device to filter leaves from rain water when used upside down, functioning as a wind redirector to redirect wind in and out of sail, and functioning as a wind resistor to protect users;

a plurality of zipper pockets sewn to said sail corners of said adjustable water-collecting wind-blocking privacy-screen ring sail;

a plurality of sail-size-adjusting flaps sewn to said inner sail edges of said adjustable water-collecting wind-blocking privacy-screen ring sail;

a plurality of sail-size-adjusting holes drilled into said primary automatically-centered-and-reinforced ribs;

an upper post attached to said central-sail intersector, said ring-sail-arm intersector slidably attached to said upper post;

a lower post;

a sail-multi-orienting snap-lock housing attached to said upper post;

a stationary snap-lock housing attached to said lower post;

a snap-lock-button spring attached to said stationary snap-lock housing;

a snap-lock-button pin springably attached to said snap-lock-button spring;

a snap-lock button attached to said snap-lock-button pin, said snap-lock button inserted through said sail-multi-orienting snap-lock housing and through said stationary snap-lock housing such that said sail-multi-orienting snap-lock housing and said stationary snap-lock housing are rotatably connected to each other;

a plurality of adjustable multi-orienting pole-rotation-locking holes drilled through said upper post;

a pole-rotation-locking screw interchangeably inserted into said adjustable multi-orienting pole-rotation-locking holes;

a multi-angled multi-surface-mountable multi-plate-connecting reversible stackable base attached to said lower post for stackably connecting multiple said multi-angled multi-surface-mountable multi-plate-connecting reversible stackable bases together, securing said five-device-in-one water-and-leaf-separating leaf-filtering water-collecting wind-blocking wind-redirecting marine-yacht-land-yacht-balcony-bumper-and-trailer-hitch-mountable sail at the base of a wall, securely wedging said five-device-in-one water-and-leaf-separating leaf-filtering water-collecting wind-blocking wind-redirecting marine-yacht-land-yacht-balcony-bumper-and-trailer-hitch-mountable sail to a step recess built into a truck-bumper corner or an RV-bumper corner without need for bolting, securely wedging said five-device-in-one water-and-leafseparating leaf-filtering water-collecting wind-blocking wind-redirecting marine-yacht-land-yacht-balcony-bumper-and-trailer-hitch-mountable sail into a tailgate gap without need for bolting, securely wedging said five-device-in-one water-and-leaf-separating leaf-filtering water-collecting wind-blocking wind-redirecting marine-yacht-land-yacht-balcony-bumper-and-trailer-hitch-mountable sail to a balcony railing without need for bolting, securely wedging said five-device-in-one water-and-leaf-separating leaf-filtering water-collecting wind-blocking wind-redirecting marine-yacht-land-yacht-balcony-bumper-and-trailer-hitch-mountable sail to a railing of a watercraft without need for bolting, securely attaching said five-device-in-one water-and-leaf-separating leaf-filtering water-collecting wind-blocking wind-redirecting marine-yacht-land-yacht-balcony-bumper-and-trailer-hitch-mountable sail to a tow hitch, securely attaching said five-device-in-one water-and-leaf-separating leaf-filtering water-collecting wind-blocking wind-redirecting marine-yacht-land-yacht-balcony-bumper-and-trailer-hitch-mountable sail to a utility hole of a truck bed without need for bolting, securely attaching said five-device-in-one water-and-leaf-separating leaf-filtering water-collecting wind-blocking wind-redirecting marine-yacht-land-yacht-balcony-bumper-and-trailer-hitch-mountable sail to a wind-powered land vehicle
to act as a sail, and securely attaching said five-device-in-one water-and-leaf-separating leaf-filtering water-collecting wind-blocking wind-redirecting marine-yacht-land-yacht-balcony-bumper-and-trailer-hitch-mountable sail to a column, table, wall, fence, bumper, balcony, or patio;

a plurality of multi-angled double-beveled base-mounting holes
drilled out of said multi-angled multi-surface-mountable multi-plate-connecting reversible stackable base
for
installing said five-device-in-one water-and-leaf-separating leaf-filtering water-collecting wind-blocking wind-redirecting marine-yacht-land-yacht-balcony-bumper-and-trailer-hitch-mountable sail in a plurality of different locations and angles;

a plurality of multi-angled semi-spherical-headed base-mounting bolts
each having a semi-spherical head,
said multi-angled semi-spherical-headed base-mounting bolts
inserted into said multi-angled double-beveled base-mounting holes
for
being pivotably capable of fitting into said multi-angled double-beveled base-mounting holes, and
providing said semi-spherical head to pivot within said multi-angled double-beveled base-mounting holes
to allow a plurality of angles for inserting and installing; and a plurality of multi-angled semi-spherical-headed base-mounting nuts
each having a semi-spherical end,
said multi-angled semi-spherical-headed base-mounting nuts threadedly attached to said multi-angled semi-spherical-headed base-mounting bolts
for
being pivotably capable of fitting into said multi-angled double-beveled base-mounting holes, and providing said semi-spherical end to pivot within said multi-angled double-beveled base-mounting holes
to allow a plurality of angles for inserting and installing wherein
said multi-angled double-beveled base-mounting holes each are for
adjustably installing said multi-angled semi-spherical-headed base-mounting bolts and said multi-angled semi-spherical-headed base-mounting nuts in a plurality of different angles,
pivotably securing said multi-angled semi-spherical-headed base-mounting bolts and said multi-angled semi-spherical-headed base-mounting nuts in a plurality of different angles, and
installing said five-device-in-one water-and-leaf-separating leaf-filtering water-collecting wind-blocking wind-redirecting marine-yacht-land-yacht-balcony-bumper-and-trailer-hitch-mountable sail in a variety of different locations and angles.

2. The five-device-in-one water-and-leaf-separating leaf-filtering water-collecting wind-blocking wind-redirecting marine-yacht-land-yacht-balcony-bumper-and-trailer-hitch-mountable sail of claim 1,
further comprising:
a first post-stabilizing foot
bolted to said multi-angled multi-surface-mountable multi-plate-connecting reversible stackable base
for
stabilizing said five-device-in-one water-and-leaf-separating leaf-filtering water-collecting wind-blocking wind-redirecting marine-yacht-land-yacht-balcony-bumper-and-trailer-hitch-mountable sail to prevent from tipping over,
and
a second post-stabilizing foot
bolted to said multi-angled multi-surface-mountable multi-plate-connecting reversible stackable base
for
stabilizing said five-device-in-one water-and-leaf-separating leaf-filtering water-collecting wind-blocking wind-redirecting marine-yacht-land-yacht-balcony-bumper-and-trailer-hitch-mountable sail to prevent from tipping over.

3. The five-device-in-one water-and-leaf-separating leaf-filtering water-collecting wind-blocking wind-redirecting marine-yacht-land-yacht-balcony-bumper-and-trailer-hitch-mountable sail of claim 1,
further comprising:
a plurality of weight-securing toe-plates
welded to said first post-stabilizing foot and said second post-stabilizing foot for
stabilizing said five-device-in-one water-and-leaf-separating leaf-filtering water-collecting wind-blocking wind-redirecting marine-yacht-land-yacht-balcony-bumper-and-trailer-hitch-mountable sail to prevent from tipping over.

4. The five-device-in-one water-and-leaf-separating leaf-filtering water-collecting wind-blocking wind-redirecting marine-yacht-land-yacht-balcony-bumper-and-trailer-hitch-mountable sail of claim 1,
further comprising:
a plurality of base-stabilizing weights
attached to said first post-stabilizing foot and said second post-stabilizing foot for
weightedly stabilizing said five-device-in-one water-and-leaf-separating leaf-filtering water-collecting wind-blocking wind-redirecting marine-yacht-land-yacht-balcony-bumper-and-trailer-hitch-mountable sail to prevent from tipping over.

5. The five-device-in-one water-and-leaf-separating leaf-filtering water-collecting wind-blocking wind-redirecting marine-yacht-land-yacht-balcony-bumper-and-trailer-hitch-mountable sail of claim 1,
wherein
said adjustable water-and-leaf-separating leaf-filtering central sail
is made of nylon or fabric material.

6. The five-device-in-one water-and-leaf-separating leaf-filtering water-collecting wind-blocking wind-redirecting marine-yacht-land-yacht-balcony-bumper-and-trailer-hitch-mountable sail of claim 1,
wherein
said adjustable water-collecting wind-blocking privacy-screen ring sail
is made of nylon or fabric material.

7. The five-device-in-one water-and-leaf-separating leaf-filtering water-collecting wind-blocking wind-redirecting marine-yacht-land-yacht-balcony-bumper-and-trailer-hitch-mountable sail of claim 1,
wherein
said multi-rib-connecting automatically-centered-and-reinforced adjustable cores
each are made of metallic or plastic material.

8. The five-device-in-one water-and-leaf-separating leaf-filtering water-collecting wind-blocking wind-redirecting marine-yacht-land-yacht-balcony-bumper-and-trailer-hitch-mountable sail of claim 1,
wherein
said primary automatic-rib-centering-and-reinforcing rail,
said secondary automatic-rib-centering-and-reinforcing rail, and
said automatic-core-centering-and-reinforcing rail
are each formed into a tubular U shape.

9. The five-device-in-one water-and-leaf-separating leaf-filtering water-collecting wind-blocking wind-redirecting marine-yacht-land-yacht-balcony-bumper-and-trailer-hitch-mountable sail of claim 1,
wherein
said multi-angled semi-spherical-headed base-mounting bolts
are each formed into an elongated threaded cylindrical shape with a hexagonal head with a semi-spherical end.

10. A five-device-in-one water-and-leaf-separating leaf-filtering water-collecting wind-blocking wind-redirecting marine-yacht-land-yacht-balcony-bumper-and-trailer-hitch-mountable sail comprising:
a central-sail intersector;
a plurality of central-sail-supporting ribs
pivotably connected to said intersector;
a plurality of central-sail-rib-raising arms
pivotably attached to said central-sail-supporting ribs;
an adjustable water-and-leaf-separating leaf-filtering central sail
attached to said central-sail-supporting ribs
for
functioning as a water diverting device
to predeterminately redirect the flow of water,
functioning as a leaf filtering device
to filter leaves from rain water when used upside down,
functioning as a water collector
to collect rain water when used upside down,
functioning as a wind blocker
to block wind,
functioning as a privacy screen
to provide privacy,
functioning as an awning
to angledly block rain and sun beams,
functioning as a canopy
to vertically block rain and sun beams,
functioning as a wind redirector
to redirect wind in and out of sail, and
functioning as a sail-steering wind-powered device
to steer the sail in multiple different directions;
a ring-sail-rib intersector;
a plurality of primary automatically-centered-and-reinforced ribs
pivotably connected to said ring-sail-rib intersector
for
resisting bending and warping due to heavy winds,
providing reinforced infrastructure for a sail when used on a wind-powered land vehicle,
providing reinforced infrastructure for an emergency rainwater collecting device on a marine vessel, and
providing reinforced infrastructure for a shade canopy;
a primary automatic-rib-centering-and-reinforcing rail
formed into said primary automatically-centered-and-reinforced ribs
for
resisting bending and warping due to heavy winds,
providing reinforced infrastructure for a sail when used on a wind-powered land vehicle,
providing reinforced infrastructure for an emergency rainwater collecting device on a marine vessel, and
providing reinforced infrastructure for a shade canopy;
a plurality of secondary automatically-centered-and-reinforced ribs
for:
resisting bending and warping due to heavy winds,
providing reinforced infrastructure for a sail when used on a wind-powered land vehicle,
providing reinforced infrastructure for an emergency rainwater collecting device on a marine vessel, and
providing reinforced infrastructure for a shade canopy;
a secondary automatic-rib-centering-and-reinforcing rail
formed into said secondary automatically-centered-and-reinforced ribs
for
resisting bending and warping due to heavy winds,
providing reinforced infrastructure for a sail when used on a wind-powered land vehicle,
providing reinforced infrastructure for an emergency rainwater collecting device on a marine vessel, and
providing reinforced infrastructure for a shade canopy;
a plurality of multi-rib-connecting automatically-centered-and-reinforced adjustable cores inserted into and screwed to said primary automatically-centered-and-reinforced ribs and said secondary automatically-centered-and-reinforced ribs,
said multi-rib-connecting automatically-centered-and-reinforced adjustable cores
for
allowing manufacturers to shorten long ribs into said primary automatically-centered-and-reinforced ribs and said secondary automatically-centered-and-reinforced ribs
to reduce the length and volume of the shipping package of said five-device-in-one water-and-leaf-separating leaf-filtering water-collecting wind-blocking wind-redirecting marine-yacht-land-yacht-balcony-bumper-and-trailer-hitch-mountable sail in a shipping container to save money from expensive shipping costs, and securely and reinforcingly connecting said primary automatically-centered-and-reinforced ribs to said secondary automatically-centered-and-reinforced ribs to provide strength and structure to said five-device-in-one water-and-leaf-separating leaf-filtering water-collecting wind-blocking wind-redirecting marine-yacht-land-yacht-balcony-bumper-and-trailer-hitch-mountable sail;

an automatic-core-centering-and-reinforcing rail
formed into said multi-rib-connecting automatically-centered-and-reinforced adjustable cores
for
resisting bending and warping due to heavy winds,
providing reinforced infrastructure for a sail when used on a wind-powered land vehicle,
providing reinforced infrastructure for an emergency rainwater collecting device on a marine vessel, and
providing reinforced infrastructure for a shade canopy;

a plurality of rib-length-adjusting holes
drilled into said primary automatically-centered-and-reinforced ribs,
said secondary automatically-centered-and-reinforced ribs, and said multi-rib-connecting automatically-centered-and-reinforced adjustable cores;

a ring-sail-arm intersector;

a plurality of ring-sail-rib-raising arms
foldably attached to said ring-sail-arm intersector;

an adjustable water-collecting wind-blocking privacy-screen ring sail
having sail corners and inner sail edges,
said adjustable water-collecting wind-blocking privacy-screen ring sail attached to said primary automatically-centered-and-reinforced ribs and said secondary automatically-centered-and-reinforced ribs,
said adjustable water-collecting wind-blocking privacy-screen ring sail for
functioning as an emergency rainwater collector on a marine vessel
functioning as a water collector
to collect rainwater when used upside down,
functioning as a sail on a wind-powered land vehicle,
functioning as a wind blocker
to block wind,
functioning as a privacy screen
to provide privacy,
functioning as an awning
to angledly block rain and sun beams,
functioning as a canopy
to vertically block rain and sun beams,
functioning as a water diverting device
to predeterminately redirect the flow of water,
functioning as a leaf filtering device
to filter leaves from rain water when used upside down,
functioning as a wind redirector
to redirect wind in and out of sail, and
functioning as a wind resistor
to protect users;

an upper post
attached to said central-sail intersector,
said ring-sail-arm intersector slidably attached to said upper post;

a lower post;

a sail-multi-orienting snap-lock housing
attached to said upper post;

a stationary snap-lock housing
attached to said lower post;

a snap-lock-button spring
attached to said stationary snap-lock housing;

a snap-lock-button pin
springably attached to said snap-lock-button spring;

a snap-lock button
attached to said snap-lock-button pin,
said snap-lock button inserted
through said sail-multi-orienting snap-lock housing and
through said stationary snap-lock housing
such that
said sail-multi-orienting snap-lock housing and
said stationary snap-lock housing are rotatably connected to each other;

a plurality of adjustable multi-orienting pole-rotation-locking holes
drilled through said upper post; and a pole-rotation-locking screw
interchangeably inserted into said adjustable multi-orienting pole-rotation-locking holes; and a multi-angled multi-surface-mountable multi-plate-connecting reversible stackable base attached to said lower post
for
stackably connecting multiple said multi-angled multi-surface-mountable multi-plate-connecting reversible stackable bases together, securing said five-device-in-one water-and-leaf-separating leaf-filtering water-collecting wind-blocking wind-redirecting marine-yacht-land-yacht-balcony-bumper-and-trailer-hitch-mountable sail at the base of a wall, securely wedging said five-device-in-one water-and-leaf-separating leaf-filtering water-collecting wind-blocking wind-redirecting marine-yacht-land-yacht-balcony-bumper-and-trailer-hitch-mountable sail to a step recess built into a truck-bumper corner or an RV-bumper corner without need for bolting, securely wedging said five-device-in-one water-and-leaf-separating leaf-filtering water-collecting wind-blocking wind-redirecting marine-yacht-land-yacht-balcony-bumper-and-trailer-hitch-mountable sail into a tailgate gap without need for bolting, securely wedging said five-device-in-one water-and-leaf-separating leaf-filtering water-collecting wind-blocking wind-redirecting marine-yacht-land-yacht-balcony-bumper-and-trailer-hitch-mountable sail to a balcony railing without need for bolting, securely wedging said five-device-in-one water-and-leaf-separating leaf-filtering water-collecting wind-blocking wind-redirecting marine-yacht-land-yacht-balcony-bumper-and-trailer-hitch-mountable sail to a railing of a watercraft without need for bolting, securely attaching said five-device-in-one water-and-leaf-separating leaf-filtering water-collecting wind-blocking wind-redirecting marine-yacht-land-yacht-balcony-bumper-and-trailer-hitch-mountable sail to a tow hitch, securely attaching said five-device-in-one water-and-leaf-separating leaf-filtering water-collecting wind-blocking wind-redirecting marine-yacht-land-yacht-balcony-bumper-and-trailer-hitch-mountable sail to a utility hole of a truck bed without need for bolting, securely attaching said five-device-in-one water-and-leaf-separating leaf-filtering water-collecting wind-blocking wind-redirecting marine-yacht-land-yachtbalcony-bumper-and-trailer-hitch-mountable sail to a wind-powered land vehicle
to act as a sail, and securely attaching said five-device-in-one water-and-leaf-separating leaf-filtering water-collecting wind-blocking wind-redirecting marine-yacht-land-yacht-balcony-bumper-and-trailer-hitch-mountable sail to a column, table, wall, fence, bumper, balcony, or patio.

11. The five-device-in-one water-and-leaf-separating leaf-filtering water-collecting wind-blocking wind-redirecting marine-yacht-land-yacht-balcony-bumper-and-trailer-hitch-mountable sail of claim 10,
further comprising:
a first post-stabilizing foot
bolted to said multi-angled multi-surface-mountable multi-plate-connecting reversible stackable base
for
stabilizing said five-device-in-one water-and-leaf-separating leaf-filtering water-collecting wind-blocking wind-redirecting marine-yacht-land-yacht-balcony-bumper-and-trailer-hitch-mountable sail to prevent from tipping over, and
a second post-stabilizing foot
bolted to said multi-angled multi-surface-mountable multi-plate-connecting reversible stackable base
for
stabilizing said five-device-in-one water-and-leaf-separating leaf-filtering water-collecting wind-blocking wind-redirecting marine-yacht-land-yacht-balcony-bumper-and-trailer-hitch-mountable sail to prevent from tipping over.

12. The five-device-in-one water-and-leaf-separating leaf-filtering water-collecting wind-blocking wind-redirecting marine-yacht-land-yacht-balcony-bumper-and-trailer-hitch-mountable sail of claim 10,
further comprising:
a plurality of weight-securing toe-plates
welded to said first post-stabilizing foot and said second post-stabilizing foot
for
stabilizing said five-device-in-one water-and-leaf-separating leaf-filtering water-collecting wind-blocking wind-redirecting marine-yacht-land-yacht-balcony-bumper-and-trailer-hitch-mountable sail to prevent from tipping over.

13. The five-device-in-one water-and-leaf-separating leaf-filtering water-collecting wind-blocking wind-redirecting marine-yacht-land-yacht-balcony-bumper-and-trailer-hitch-mountable sail of claim 10,
further comprising:
a plurality of base-stabilizing weights
attached to said first post-stabilizing foot and said second post-stabilizing foot
for
weightedly stabilizing said five-device-in-one water-and-leaf-separating leaf-filtering water-collecting wind-blocking wind-redirecting marine-yacht-land-yacht-balcony-bumper-and-trailer-hitch-mountable sail to prevent from tipping over.

14. The five-device-in-one water-and-leaf-separating leaf-filtering water-collecting wind-blocking wind-redirecting marine-yacht-land-yacht-balcony-bumper-and-trailer-hitch-mountable sail of claim 10,
wherein
said adjustable water-and-leaf-separating leaf-filtering central sail
is made of nylon or fabric material.

15. The five-device-in-one water-and-leaf-separating leaf-filtering water-collecting wind-blocking wind-redirecting marine-yacht-land-yacht-balcony-bumper-and-trailer-hitch-mountable sail of claim 10,
wherein
said adjustable water-collecting wind-blocking privacy-screen ring sail
is made of nylon or fabric material.

16. The five-device-in-one water-and-leaf-separating leaf-filtering water-collecting wind-blocking wind-redirecting marine-yacht-land-yacht-balcony-bumper-and-trailer-hitch-mountable sail of claim 10,
wherein
said multi-rib-connecting automatically-centered-and-reinforced adjustable cores
each are made of metallic or plastic material.

17. The five-device-in-one water-and-leaf-separating leaf-filtering water-collecting wind-blocking wind-redirecting marine-yacht-land-yacht-balcony-bumper-and-trailer-hitch-mountable sail of claim 10,
wherein
said primary automatic-rib-centering-and-reinforcing rail and
said secondary automatic-rib-centering-and-reinforcing rail
are each formed into a tubular U shape.

18. The five-device-in-one water-and-leaf-separating leaf-filtering water-collecting wind-blocking wind-redirecting marine-yacht-land-yacht-balcony-bumper-and-trailer-hitch-mountable sail of claim 10,
wherein
said automatic-core-centering-and-reinforcing rail
are each formed into a tubular U shape.

19. The five-device-in-one water-and-leaf-separating leaf-filtering water-collecting wind-blocking wind-redirecting marine-yacht-land-yacht-balcony-bumper-and-trailer-hitch-mountable sail of claim 10,
wherein
said automatic-core-centering-and-reinforcing rail
are each made of metallic material.

20. The five-device-in-one water-and-leaf-separating leaf-filtering water-collecting wind-blocking wind-redirecting marine-yacht-land-yacht-balcony-bumper-and-trailer-hitch-mountable sail of claim 10,
wherein
said automatic-core-centering-and-reinforcing rail
are each made of plastic material.

* * * * *